US005647001A

United States Patent [19]
Mittenthal

[11] Patent Number: 5,647,001
[45] Date of Patent: Jul. 8, 1997

[54] NONLINEAR DYNAMIC SUBSTITUTION DEVICES AND METHODS FOR BLOCK SUBSTITUTIONS EMPLOYING COSET DECOMPOSITIONS AND DIRECT GEOMETRIC GENERATION

[75] Inventor: Lothrop Mittenthal, Thousand Oaks, Calif.

[73] Assignee: Litton Systems, Inc., Woodland Hills, Calif.

[21] Appl. No.: 601,267

[22] Filed: Jan. 23, 1996

Related U.S. Application Data

[63] Continuation of Ser. No. 251,751, May 31, 1994, abandoned, which is a continuation-in-part of Ser. No. 68,910, May 25, 1993, Pat. No. 5,317,639, which is a continuation-in-part of Ser. No. 741,097, Aug. 5, 1991, Pat. No. 5,214,704, which is a continuation-in-part of Ser. No. 416,953, Oct. 4, 1989, Pat. No. 5,038,376.

[51] Int. Cl.$^6$ .................. H04L 9/06; H04L 9/28
[52] U.S. Cl. .................. 380/37; 380/28; 380/29
[58] Field of Search .................. 380/37, 28, 29

[56] References Cited

U.S. PATENT DOCUMENTS

| | | |
|---|---|---|
| 3,796,830 | 3/1974 | Smith . |
| 3,798,359 | 3/1974 | Feistel . |
| 4,078,152 | 3/1978 | Tuckerman, III . |
| 4,195,200 | 3/1980 | Feistel . |
| 4,255,811 | 3/1981 | Adler . |
| 4,316,055 | 2/1982 | Feistel . |
| 4,322,577 | 3/1982 | Brändström . |
| 4,520,232 | 5/1985 | Wilson . |
| 4,668,103 | 5/1987 | Wilson .................. 380/30 |
| 4,685,132 | 8/1987 | Bishop et al. . |
| 4,751,733 | 6/1988 | Delayaye et al. .................. 380/37 X |
| 4,797,921 | 1/1989 | Shiraishi . |
| 4,932,056 | 6/1990 | Shamir . |
| 4,979,832 | 12/1990 | Ritter .................. 380/28 |
| 5,003,596 | 3/1991 | Wood .................. 380/28 |
| 5,038,376 | 8/1991 | Mittenthal . |
| 5,214,704 | 5/1993 | Mittenthal . |
| 5,245,658 | 9/1993 | Bush et al. . |
| 5,270,956 | 12/1993 | Oruc et al. .................. 364/746 |
| 5,297,206 | 3/1994 | Orton .................. 380/30 |
| 5,317,639 | 5/1994 | Mittenthal .................. 380/37 |

*Primary Examiner*—Gilberto Barron, Jr.
*Attorney, Agent, or Firm*—Blakely, Sokoloff, Taylor & Zafman LLP

[57] ABSTRACT

Methods and apparatus for non-linearizing modulo 2 addition based encryption by block substitution techniques which allows use of the substitution scheme with relatively simple hardware and yet makes cryptanalysis more difficult. The basic block substitution, a one to one mapping of n-bit binary numbers onto themselves, is based on the fact that certain permutations of the n-bit binary numbers define linear orthomorphisms, which enable block substitution by modulo 2 addition of one permuted set of numbers to another. These equations representing the linear orthomorphism have an additive relationship when viewed as vectors, and in fact, form an additive group in the algebraic sense. The permutations of the n-bit binary numbers which define these linear orthomorphisms have the further property that any power of these permutations, that is, applying the permutations successively to the previously permuted numbers, generates a new linear orthomorphism. This allows the simple changing of the transformation on a frequent basis. However, this same property of linearity permits the entire linear orthomorphism to be generated from a limited subset of the equations. This is not possible with a nonlinear orthomorphism. To obtain a nonlinear version, the equations representing the original linear orthomorphism are transformed in an orderly and readily variable manner, so that the entire set of equations may no longer be generated from a limited subset of the equations. Various properties of the transformations and methods of using the same are disclosed.

8 Claims, 20 Drawing Sheets

| 000 | ⊕ | 000 | = | 000 |
| 001 | ⊕ | 011 | = | 010 |
| 010 | ⊕ | 110 | = | 100 |
| 011 | ⊕ | 100 | = | 111 |
| 100 | ⊕ | 111 | = | 011 |
| 101 | ⊕ | 001 | = | 100 |
| 110 | ⊕ | 101 | = | 011 |
| 111 | ⊕ | 010 | = | 101 |

FIG. 1

| 000 | ⊕ | 000 | = | 000 |
| 001 | ⊕ | 111 | = | 110 |
| 010 | ⊕ | 011 | = | 001 |
| 011 | ⊕ | 100 | = | 111 |
| 100 | ⊕ | 110 | = | 010 |
| 101 | ⊕ | 001 | = | 100 |
| 110 | ⊕ | 101 | = | 011 |
| 111 | ⊕ | 010 | = | 101 |

FIG. 2

| 000 | ⊕ | 000 | = | 000 |
| 011 | ⊕ | 100 | = | 111 |
| 100 | ⊕ | 110 | = | 010 |
| 110 | ⊕ | 101 | = | 011 |
| 101 | ⊕ | 001 | = | 100 |
| 001 | ⊕ | 111 | = | 110 |
| 111 | ⊕ | 010 | = | 101 |
| 010 | ⊕ | 011 | = | 001 |

FIG. 3

| 000 | ⊕ | 000 | = | 000 |
| 110 | ⊕ | 100 | = | 010 |
| 101 | ⊕ | 110 | = | 011 |
| 001 | ⊕ | 101 | = | 100 |
| 111 | ⊕ | 001 | = | 110 |
| 010 | ⊕ | 111 | = | 101 |
| 011 | ⊕ | 010 | = | 001 |
| 100 | ⊕ | 011 | = | 111 |

FIG. 4

| 000 | = | 000 | ⊕ | 000 |
| 110 | = | 100 | ⊕ | 010 |
| 101 | = | 110 | ⊕ | 011 |
| 001 | = | 101 | ⊕ | 100 |
| 111 | = | 001 | ⊕ | 110 |
| 010 | = | 111 | ⊕ | 101 |
| 011 | = | 010 | ⊕ | 001 |
| 100 | = | 011 | ⊕ | 111 |

FIG. 5

| 001 | ⊕ | 001 | = | 000 |
| 111 | ⊕ | 101 | = | 010 |
| 100 | ⊕ | 111 | = | 011 |
| 000 | ⊕ | 100 | = | 100 |
| 110 | ⊕ | 000 | = | 110 |
| 011 | ⊕ | 110 | = | 101 |
| 010 | ⊕ | 011 | = | 001 |
| 101 | ⊕ | 010 | = | 111 |

OFFSET = 0101

Find a $G^n$ first matrix of equations which is a linear orthomorphism, with the equations orderable as follows:

| Equation # | | | | | |
|---|---|---|---|---|---|
| 0 | $\theta$ | $\oplus$ | $\theta$ | = | $\theta$ |
| 1 | $x_m$ | $\oplus$ | $x_1$ | = | $x_{1-p}$ |
| 2 | $x_1$ | $\oplus$ | $x_2$ | = | $x_{2-p}$ |
| $\vdots$ | $\vdots$ | $\vdots$ | $\vdots$ | $\vdots$ | $\vdots$ |
| j | $x_j$ | $\oplus$ | $x_j$ | = | $x_{j-p}$ |
| $\vdots$ | $\vdots$ | $\vdots$ | $\vdots$ | $\vdots$ | $\vdots$ |
| m | $x_{m-1}$ | $\oplus$ | $x_m$ | = | $x_{m-p}$ | where $m = 2^n-1$, $L_n$, $M_n$ and $R_n$ are the left, middle and right columns respectively, $G^{n-1}$ is a subgroup of $G^n$ consisting of $2^{n-1}$ equations from the first matrix $G^n$, found by selecting n-1 nonzero equations in $G^n$ and taking all sums thereof as well as the identity equation to obtain additional equations identified in the specification by Equation 66, $\overline{G}^{n-1}$ is the complement of $G^{n-1}$ in $G^n$, etc., and where $G^{n-1} = L_{n-1} \times M_{n-1} \times R_{n-1}$, $\overline{G}_{n-1} = \overline{L}_{n-1} \times \overline{M}_{n-1} \times \overline{R}_{n-1}$, $W_{n-1} \times L_{n-1} \cap M_{n-1}$, $W_{n-2} = L_{n-2} \cap M_{n-1}$ and $\overline{W}_{n-2}$ is the complement of $W_{n-2}$ in $W_{n-1}$ etc. 102

↓

Modifying the equations of the first matrix to form a second matrix of equations by:

applying the mixing transforms in $\overline{W}_{n-2}$ to $\overline{G}^{n-1}$ 104 applying the mixing transforms in $\overline{W}_{n-3}$ to $\overline{G}^{n-2}$ 106 repeatedly applying mixing transforms until reaching $\overline{G}^2$ 108 applying $\overline{W}_1$ to $\overline{G}^2$ or applying $\theta$ to $\overline{G}^2$. 110

↓

For each clear text block in the left column to be encrypted, add an associated block in the middle column in accordance with an associated equation defined by the second matrix of equations to obtain an encrypted block in the right column. 112

FIG. 19

| Find $G^n$ a first matrix of equations which is a linear orthomorphism, with the equations orderable as follows: |
|---|

Equation #

| 0 | $\theta$ | $\oplus$ | $\theta$ | = | $\theta$ |
| --- | --- | --- | --- | --- | --- |
| 1 | $x_m$ | $\oplus$ | $x$ | = | $x_{1-p}$ |
| 2 | $x_1$ | $\oplus$ | $x$ | = | $x_{2-p}$ |
| . | . | . | . | . | . |
| . | . | . | . | . | . |
| j | $x_{j-1}$ | $\oplus$ | $x_j$ | = | $x_{j-p}$ |
| . | . | . | . | . | . |
| . | . | . | . | . | . |
| m | $x_{m-1}$ | $\oplus$ | $x_m$ | = | $x_{m-p}$ | where $m = 2^n - 1$, $L_n$, $M_n$ and $R_n$ are the left, middle and right columns respectively.  202

Modifying the equations of the first matrix to form a second matrix of equations representing a nonlinear orthomorphism by:

select from $G^n$ two or more disjoint corruptible subgroups of order $2^k$ where $k < n/2$, $G_0^k$, $H_0^k$, $I_0^k$...  204 form subgroups $M_0$, $N_0$ of order $2^{2k}$ from pairs of $G_0$, $H_0$, $I_0$...  206 continue this process until a subgroup of order $2^{n-1}$ or $2^{n-2}$, $Q_0^{n-1}$ or $Q_0^{n-2}$ is selected  208 decompose $G^n$ into alternating collection of cosets from $Q_0^{n-1}$ or $Q_0^{n-2}$, ...., $M_0^{2k}$, $N_0^{2k}$, ...., $G_0^k$, $H_0^k$, $I_0^k$....  210

Modify the cosets with their respective mixing transformations to form the second matrix of equations  212

For each clear test block in the left column to be encrypted, add an associated block in the middle collumn with an assoicated equation defined by the second matrix of equations, to obtain an encrypted block in the right column.  214

FIG. 21

Find $G^8$ a first matrix of equations representing a linear orthomorphism, with the equations orderable as follows:

| Equation # | | | | | |
|---|---|---|---|---|---|
| 0 | $\theta$ | $\oplus$ | $\theta$ | = | $\theta$ |
| 1 | $x_m$ | $\oplus$ | $x$ | = | $x_{1-p}$ |
| 2 | $x_1$ | $\oplus$ | $x$ | = | $x_{2-p}$ |
| ⋮ | ⋮ | ⋮ | ⋮ | ⋮ | ⋮ |
| j | $x_{j-1}$ | $\oplus$ | $x_j$ | = | $x_{j-p}$ |
| ⋮ | ⋮ | ⋮ | ⋮ | ⋮ | ⋮ |
| m | $x_{m-1}$ | $\oplus$ | $x_m$ | = | $x_{m-p}$ | where m = 255, $L_8$, $M_8$ and $R_8$ are the left, middle and right columns respectively, 302

Modifying the equations of the first matrix to form a second matrix of equations representing a nonlinear orthomorphism by:

select from $G^8$, three disjoint subgroups of order 4, $G_0^2$, $H_0^2$, and $I_0^2$  304 generate from $G_0^2$, $H_0^2$, and $I_0^2$, three subgroups of order 16, $M_0^4$, $N_0^4$ and $P_0^4$ respectively from the pairs of the three subgroups of order 4  306 generate cosets $Q_1^6$, $Q_2^6$ and $Q_3^6$ from $Q_0^6$, a subgroup of order 64 generated from the triple of $G_0^4$, $H_0^4$, and $I_0^4$  308 decompose the Q cosets into four cosets of 16 rows each  310 decompose each of the four cosets into four cosets of four rows each and select an alternating pattern of cosets and modify the selected cosets with their respective mixing transforms to form the second matrix of equations  312

For each clear text block in the left column to be encrypted, add an associated block in the middle column with an associated equation defined by the second matrix of equations, to obtain an encrypted block in the right column.  314

FIG. 22

402: Find $G^n$ a first matrix of equations representing a linear orthomorphism, with the equations orderable as follows:

Equation #

| | | | | | |
|---|---|---|---|---|---|
| 0 | $\theta$ | $\oplus$ | $\theta$ | $=$ | $\theta$ |
| 1 | $x_m$ | $\oplus$ | $x$ | $=$ | $x_{1-p}$ |
| 2 | $x_1$ | $\oplus$ | $x$ | $=$ | $x_{2-p}$ |
| . | . | . | . | . | . |
| . | . | . | . | . | . |
| j | $x_{j-1}$ | $\oplus$ | $x_j$ | $=$ | $x_{j-p}$ |
| . | . | . | . | . | . |
| . | . | . | . | . | . |
| m | $x_{m-1}$ | $\oplus$ | $x_m$ | $=$ | $x_{m-p}$ |

Where $m = 2^n - 1$ and where m is not a prime number, $L_n$, $M_n$ and $R_n$ are the left, middle and right columns respectively.

---

Modifying the equations of the first matrix to form a second matrix of equations representing a nonlinear orthomorphism, by:

---

404: select a corruptible subgroup of order 4 from $G^n$ generally represented as $$x_m \oplus x_1 = x_{1-p}$$
$$x_1 \oplus x_2 = x_{2-p}$$
$$x_{q-1} \oplus x_q = x_{q-pi}$$

where $x_q = x_1 \oplus x_2$

---

406: generate a coset by choosing an equation, represented by index a, which is not in the corruptible subgroup of order 4 and adding said equation vectorially to the corruptible subgroup, with the new subgroup being represented by $$x_{a-1} \oplus x_a = x_{a-p}$$
$$x_{b-1} \oplus x_b = x_{b-p}$$
$$x_{c-1} \oplus x_c = x_{c-p}$$
$$x_{d-1} \oplus x_d = X_{d-p}$$

---

408: choose an integer I which divides m, determining values for a mod I, b mod I, c mod I and d mod I

---

410: if any of said values are duplicated, repeat steps 406-408

---

412: generate m/I additional co-sets of the form $$x_{a+kI-1} \quad x_{a+kI} = x_{a+kI-p}$$
$$x_{b+kI-1} \quad x_{b+kI} = x_{b+kI-p}$$
$$x_{c+kI-1} \quad x_{c+kI} = x_{c+kI-p}$$
$$x_{d+kI-1} \quad x_{d+kI} = x_{d+kI-p}$$

where $0 < k < m/I - 1$

---

414: apply a mixing transform $W_{kI} \oplus W_{kI} = \Theta$ to said corresponding additional cosets, wherein $W_{kI} = W_{a+kI} \oplus W_{b+kI}$ to constructively corrupt the corresponding additional co-sets, yielding the second matrix of $2_n$ equations

---

416: for each clear text block in the left column to be encrypted, add an associated block in the middle column with an associated equation defined by the second matrix of equations to obtain an encrypted block in the right column.

FIG. 23

Find a first set of equations $G^n$ which is a linear orthomorphism, with the equations orderable as follows:

Equation #

| | | | | |
|---|---|---|---|---|
| 1 | $x_m$ | $x_1$ | = | $x_{1-p}$ |
| 2 | $x_1$ | $x_2$ | = | $x_{2-p}$ |
| • | • | • | • | • |
| • | • | • | • | • |
| j | $x_{j-1}$ | $x_j$ | = | $x_{j-p}$ |
| • | • | • | • | • |
| • | • | • | • | • |
| m | $x_{m-1}$ | $x_m$ | = | $x_{m-p}$ | where $m = 2^n$, $L_n$, $M_n$, $R_n$ are the left, middle and right columns respectively, and $G^n = L_n \times M_n \times R_n$ represents the set of equations. 502

Modify the equations of the first set to form a second set of equations representing a non-linear orthomorphism by:

Decomposing $G^n$ into a table of corruptible cosets of order 4, with the table being generally represented by $$\begin{matrix} G^2_{a,0} & G^2_{a+1,0} & \cdots & G^2_{i,0} & \cdots \\ G^2_{a,3} & G^2_{a+1,3} & \cdots & G^2_{i,3} & \cdots \\ \vdots & \vdots & & \vdots & \\ G^2_{a,j} & G^2_{a+1,j} & \cdots & G^2_{i,j} & \cdots \\ \vdots & \vdots & & \vdots & \end{matrix}$$

where each column represents a linear orthomorphism based on a different corruptible subgroup of $G^n$, followed by the corresponding collection of cosets and i, j and a are arbitrary integer indices and where each column has a unique mixing transform. 504

Selecting a group of non-overlapping cosets from sucessive rows of the table of cosets by choosing a first coset within some row, then determining which other cosets within the same row do not overlap with each other, then continuing on successive rows. 506

Applying the corresponding unique mixing transforms to the group of non-overlapping cosets to yield the second set of equations. 508

For each clear text block in the left column to be encrypted, add an associated block in the middle column with an associated equation defined by the second set of equations, to obtain an encrypted block in the right column. 510

FIG. 24

Find a first set of equations $G^n$ which is a linear orthomorphism, with the equations orderable as follows:

| Row Number | L | | M | | R |
|---|---|---|---|---|---|
| 0 | $\Theta$ | $\oplus$ | $\Theta$ | = | $\Theta$ |
| 1 | $L_1$ | $\oplus$ | $M_1$ | = | $R_1$ |
| 2 | $L_2$ | $\oplus$ | $M_2$ | = | $R_2$ |
| ⋮ | ⋮ | | ⋮ | | |
| k | $L_k$ | $\oplus$ | $M_k$ | = | $R_k$ |
| ⋮ | ⋮ | | ⋮ | | |
| m | $L_m$ | $\oplus$ | $M_m$ | = | $R_m$ | where $m = 2^n$, L, M, R are the left, middle and right columns respectively, and $G^n = L \times M \times R$ represents the set of equations: $x_{k-1} \oplus x_k = x_{k-p}$ and $L_k = x_{k-1}$, $M_k = x_k$ and $R_k = x_{k-p}$

602

Modify the equations of the first set to form a second set of equations representing a non-linear orthomorphism by decomposing $G^n$ into a consistent set of equations $L_i \oplus M_j = R_k$ where k is a function of i and j by (a) developing a table of indices of k; wherein each row and each column of the table contain each index in the set $\{0,1,2,...,m\}$
604

(b) selecting one entry from each row and column of the table of indices without duplicates by choosing a first entry then selecting other entries along a bar sinister diagonal within the table which includes the first entry and skipping to adjacent diagonals to avoid duplicates.
606

(c) applying the selected non-duplicate entries to the first set of equations to yield the second set of equations.
608

For each clear text block in the left column to be encrypted, add an associated block in the middle column with an associated equation defined by the second set of equations, to obtain an encrypted block in the right column
610

FIG. 25

|   | $M_j$ Middle Column | | | | | | | | | | | | | | | |
|---|---|---|---|---|---|---|---|---|---|---|---|---|---|---|---|---|
| j →<br>i ↓ | 0 | 1 | 2 | 3 | 4 | 5 | 6 | 7 | 8 | 9 | 10 | 11 | 12 | 13 | 14 | 15 |
| 0 | (0) | 5 | 6 | 7 | 8 | 9 | 10 | 11 | 12 | 13 | 14 | 15 | 1 | 2 | 3 | 4 |
| 1 | 4 | 1 | 13 | 8 | 7 | 14 | 12 | 2 | 10 | 6 | 9 | 3 | 5 | (11) | 15 | 0 |
| 2 | 5 | 0 | 2 | 14 | 9 | 8 | 15 | 13 | 3 | 11 | 7 | (10) | 4 | 6 | 12 | 1 |
| 3 | 6 | 2 | 0 | 3 | 15 | 10 | 9 | 1 | 14 | 4 | 12 | 8 | 11 | 5 | (7) | 13 |
| 4 | 7 | 14 | 3 | 0 | 4 | 1 | 11 | 10 | 2 | (15) | 5 | 13 | 9 | 12 | 6 | 8 |
| 5 | 8 | 9 | 15 | 4 | 0 | 5 | 2 | 12 | 11 | 3 | (1) | 6 | 14 | 10 | 13 | 7 |
| 6 | 9 | 8 | 10 | 1 | 5 | 0 | 6 | 3 | (13) | 12 | 4 | 2 | 7 | 15 | 11 | 14 |
| 7 | 10 | 15 | 9 | 11 | 2 | 6 | 0 | 7 | 4 | 14 | 13 | 5 | (3) | 8 | 1 | 12 |
| 8 | 11 | 13 | 1 | 10 | 12 | 3 | 7 | 0 | 8 | 5 | 15 | 14 | 6 | 4 | 9 | (2) |
| 9 | 12 | 3 | 14 | 2 | 11 | 13 | 4 | (8) | 0 | 9 | 6 | 1 | 15 | 7 | 5 | 10 |
| 10 | 13 | 11 | 4 | 15 | 3 | 12 | (14) | 5 | 9 | 0 | 10 | 7 | 2 | 1 | 8 | 6 |
| 11 | 14 | 7 | 12 | 5 | 1 | (4) | 13 | 15 | 6 | 10 | 0 | 11 | 8 | 3 | 2 | 9 |
| 12 | 15 | 10 | 8 | 13 | (6) | 2 | 5 | 14 | 1 | 7 | 11 | 0 | 12 | 9 | 4 | 3 |
| 13 | 1 | 4 | 11 | (9) | 14 | 7 | 3 | 6 | 15 | 2 | 8 | 12 | 0 | 13 | 10 | 5 |
| 14 | 2 | 6 | (5) | 12 | 10 | 15 | 8 | 4 | 7 | 1 | 3 | 9 | 13 | 0 | 14 | 11 |
| 15 | 3 | (12) | 7 | 6 | 13 | 11 | 1 | 9 | 5 | 8 | 2 | 4 | 10 | 14 | 0 | 15 |

$L_i$ Left Column 700, 702, 704

FIG. 26

NONLINEAR DYNAMIC SUBSTITUTION DEVICES AND METHODS FOR BLOCK SUBSTITUTIONS EMPLOYING COSET DECOMPOSITIONS AND DIRECT GEOMETRIC GENERATION

RELATED APPLICATIONS

This is a Continuation of application Ser. No. 08/251,751, filed May 31, 1994, abandoned, which application is a continuation-in-part of application Ser. No. 08/068,910 filed May 25, 1993, which issued a U.S. Pat. No. 5,317,639 on May 31, 1994, which was a continuation-in-part of Ser. No. 07/741,097 filed Aug. 5, 1991, which issued as U.S. Pat. No. 5,214,704 on May 25, 1993, which was a continuation-in-part of application Ser. No. 07/416,953 filed Oct. 4, 1989, which issued as U.S. Pat. No. 5,038,376 on Aug. 6, 1991.

BACKGROUND OF THE INVENTION

1. Field of the Invention

The present invention relates to the field of encryption devices and methods, and more particularly, to block substitution encryption methods and devices.

2. Prior Art

In many cases, it is desired to communicate information in digital form from one location to another in a manner which is clear and unambiguous to the receiver, but which is incomprehensible to an interloper there between. Accordingly, in many instances, it is common to encrypt the information to be communicated by some predetermined encryption process, to transmit the encrypted form of the information and to then decrypt the information at the receiving location. Depending upon the degree of security desired, a relatively simple and easily broken encryption may be used, as any level of encryption will make the transmission meaningless to the casual interloper. In other situations, the degree of security desired may dictate the use of an encryption technique which is more difficult to decipher by cryptanalysis, or of course hopefully in the highest level of security, make the same substantially impossible to decipher. Applications for such encryption techniques include commercial applications such as sensitive communications between manufacturing plants, bank branches, etc., and military applications including but not limited to IFF (identification friend or foe). While in some cases the primary objective of the encryption is to prevent an interloper from deciphering the information being communicated, in other cases a primary object, such as in IFF, is to prevent the interloper from himself originating false information with the same encryption scheme so as to mislead the intended receiver. Both objectives are frequently present in many applications.

Block substitution is a method used to encrypt a clear text message which is in the form of a sequence of binary numbers. In accordance with the method, the sequence is broken into blocks of some predetermined block length n, with the block substitution device substituting a unique new block of binary numbers for each of those in the clear text. Substitute blocks constitute the encrypted message or cipher text, each substitute block representing a non-ambiguous one-to-one transformation of a clear text block. In the prior art, such substitution generally takes place by means of look-up tables, switching arrangements, or feedback shift registers. However, without changing codes or substitution schemes frequently, the encryption may be broken by cryptanalysis, though, changing look-up tables is cumbersome, only a limited number of possible switching arrangements is practical, and repeated cycling of a shift register is time consuming. An additional problem arises in finding substitutions which do not have any pattern or bias in them. At the present time, candidate substitutions are examined by computer simulation for possible systematic patterns and in some cases, additional circuitry is used to compensate therefor.

Various types of encryption equipment and methods are well-known in the prior art. See for instance U.S. Pat. Nos. 3,796,830, 3,798,359, 4,078,152, 4,195,200, 4,255,811, 4,316,055 and 4,520,232. In general, these systems as they relate to block substitution are key dependent ciphering and deciphering systems and are not based upon block substitution by modulo 2 addition of one additive permuted set of numbers to another, as in the present invention.

In the great-grand-parent application, methods and apparatus for modulo 2 addition based encryption by block substitution techniques were disclosed which allow use of the substitution scheme with relatively simple hardware. The block substitution, a one to one mapping of n bit binary numbers onto themselves, is based on the fact that certain permutations of the n bit binary numbers define a block substitution by modulo 2 addition of one permuted set of numbers to another, and that a subset of these defined equations having an additive relationship when viewed as vectors, whereby the remainder of the set may be generated from a limited subset of the equations. This allows the simple changing of the transformation on a frequent basis. Various properties of the transformations and methods of using the same were disclosed. The fact that the remainder of the set equations may be generated from a limited subset of the equations, however, may make cryptanalysis less difficult than desired in some applications. The grand-parent application related to a method and apparatus for non-linearizing the equations, also in an orderly and readily variable manner, so that the remainder of the set equations may no longer be generated from a limited subset of the equations. The parent application provided methods for non-linearizing the equations employing a technique referred to herein as constructive corruption. The present invention is drawn to further methods for constructive corruption.

BRIEF DESCRIPTION OF THE INVENTION

Methods and apparatus for non-linearizing modulo 2 addition based encryption by block substitution techniques which allows use of the substitution scheme with relatively simple hardware and yet makes cryptanalysis more difficult. The basic block substitution, a one to one mapping of n bit binary numbers onto themselves, is based on the fact that certain permutations of the n bit binary numbers define a block substitution by modulo 2 addition of one permuted set of numbers to another, and that a subset of these defined equations having an additive relationship when viewed as vectors. This allows the simple changing of the transformation on a frequent basis. Then the equations are non-linearized, also in an orderly and readily variable manner, so that the remainder of the set equations may no longer be generated from a limited subset of the equations. Various properties of the transformations and methods of using the same are disclosed. In particular, methods for non-linearization, provided in accordance with the invention, include non-linearization by forming nested sequences of subgroups, fitted cosets, and cosets of disjoint corruptible subgroups. Further, methods for constructive corruption include a method of coset decomposition applicaable to arbitrary block sise and a "bar sinister" method of constructive corruption applicable to small block sizes, such as 4 or 5.

BRIEF DESCRIPTION OF THE DRAWINGS

FIG. 1 illustrates a many-one transformation of one set of three bit binary numbers to another set of binary numbers by a modulo 2 addition.

FIG. 2 illustrates a one-to-one transformation of one set of three bit binary numbers to another set of binary numbers by a modulo 2 addition.

FIG. 3 presents the transformation equations of FIG. 2 reordered, excluding the first equation, making the three digit number in the first column the same as the three digit number in the second column of the preceding row. Excluding the first equation, each column now is in the same order but with different starting positions.

FIG. 4 corresponds to FIG. 3, though with the first and third columns shifted vertically with respect to the second column. These shifts are 6 and 2 positions downward respectively. Except for the first equation, each column remains in the same order but with different starting positions.

FIG. 5 corresponds to FIG. 4, with the $\oplus$ and = symbols interchanged for encryption purposes.

FIG. 10 presents a set of transformation equations corresponding to those of FIG. 4 with the fixed word 001 added to columns 1 and 2 thereof. Except for the first equation, columns 1 and 2 are in the same order but with different starting positions.

FIG. 15 illustrates a rearrangement equations in FIG. 2 into the general form $x_{n-1} \oplus x_n = z_n$.

FIG. 17 illustrates a set of equations useful for encryption and decryption derived by adding the offset 0101 to the first and second columns of the set of equations presented on page A12 of Appendix 2.

FIG. 19 is a block diagram illustrating a method for encryption employing nested sequences of sub-groups;

FIG. 22 is a block diagram illustrating the method of FIG. 21 for a block size of n=8;

FIG. 23 is a block diagram illustrating a method for encryption employing cosets of disjoint, corruptible sub-groups.

FIG. 24 is a block diagram illustrating a method of encryption employing a complete coset decomposition.

FIG. 25 is block diagram illustrating a method of encryption applicable to encrpting text having small block sizes such as 4 or 5.

DETAILED DESCRIPTION OF THE INVENTION

Figure 6:
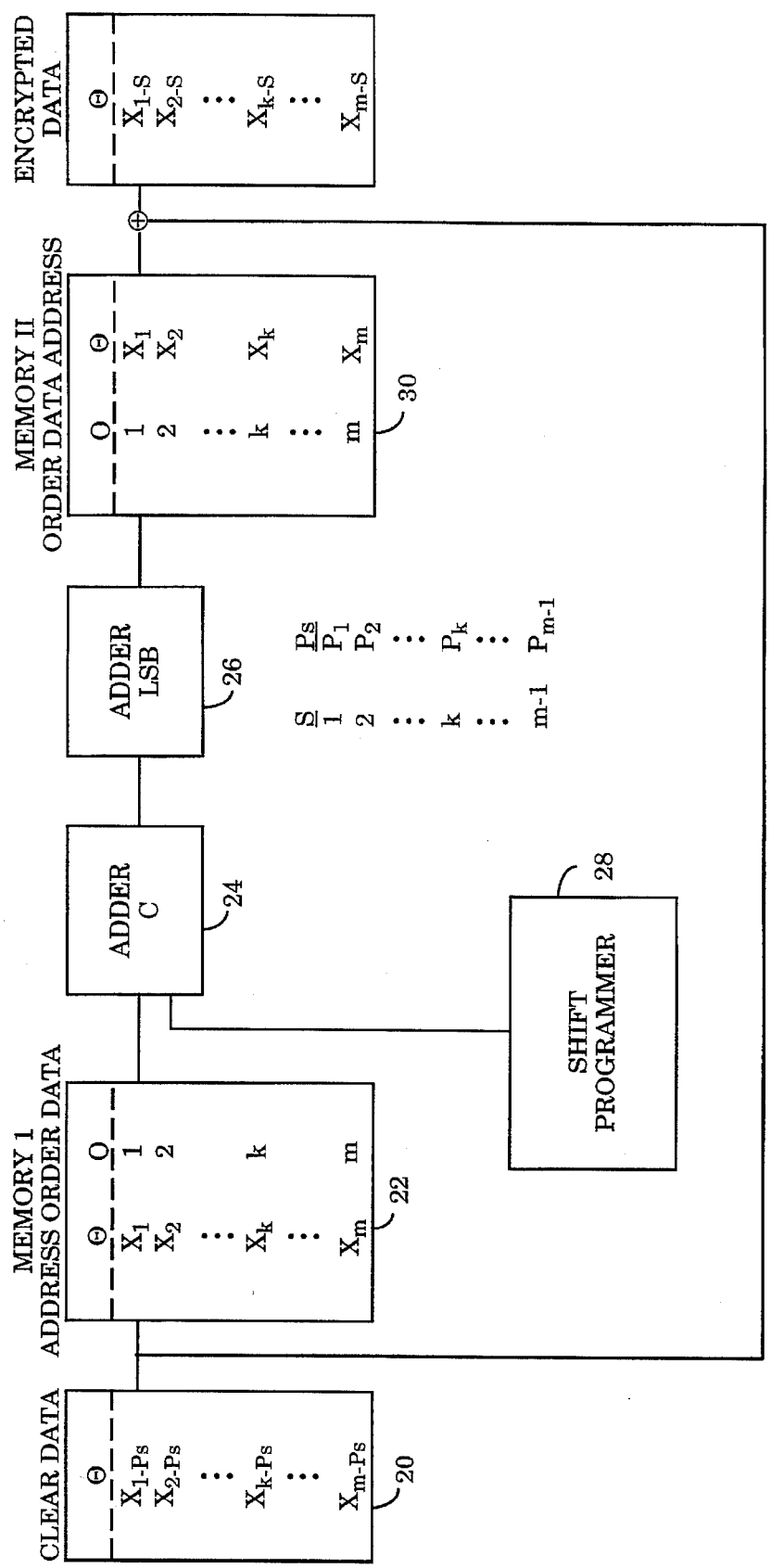
FIG. 6 is a block diagram of an apparatus for encrypting data.

The present invention comprises methods and apparatus for non-linearizing modulo 2 addition based encryption by block substitution described in detail in the previous continuation applications. These disclosures are repeated herein to provide a basis for the improvement of the present invention. Specifically, aspects of the great-grandparent application are set forth below section in I. BLOCK SUBSTITUTION. Descriptions of the invention of the grandparent application are set forth in section II. NON-LINEARIZATION OVERVIEW. Disclosure relevant to the present invention are set forth in the remaining sections. In particular, section III. MODIFICATIONS OF LINEAR ORTHOMORPHISMS provides a description of preliminary modifications and variations to the linear orthomorphisms described in the grand-parent and great-grandparent applications. Section IV. CONSTRUCTION OF COMPLETE NON-LINEAR ORTHOMORPHISMS provides a generalization of non-linear orthomorphisms. Section IV. CONSTRUCTION OF COMPLETE NON-LINEAR ORTHOMORPHISMS provides a detailed example describing the construction of an orthomorphism for a block size of n=8. A first method for constructive corruption by non-linearizing a set of block substitution equations is provided in section V. NESTED SEQUENCES OF SUB-GROUPS. A second method for constructive corruption is provided in section VI. FITTED COSETS FROM DEFERENT SUB-GROUPS. A third method for constructive corruption is provided in section VII. COSETS OF DISJOINT CORRUPTIBLE SUB-GROUPS. Section VII. COSETS OF DISJOINT CORRUPTIBLE SUB-GROUPS further includes a detailed example for block substitution system having block size n=8. Two improved methods for constructive corruption in accordance with the invention is provided in section VIII entitled COSET DECOMPOSITIONS OF CORRUPTIBLE SUB-GROUPS. The first improved method involves a complete coset decomposition applicable to encryption systems of arbitrary block size. The second improved method, referred to herein as the "bar sinister" method, is primarily applicable to encryption systems of small block size, such as 4 or 5. Finally, section IX. DEFINITIONS OF TERMS AND SYMBOLS provides a glossary of terms used within this patent application and the appendices attached hereto. Section IX. DEFINITIONS OF TERMS AND SYMBOLS further defines certain mathematical symbols used herein.

Additionally, eigth (8) Appendicies are attached hereto including: Appendix No. I, Unbiased Block Substitutions; Appendix No. II, Non-linear Dynamic Substitution Devices as Mechanisms for Block Substitutions; Appendix No. III, Methods of Non-linear Dynamic Substitution; Appendix No. IV, Constructive Corruption: A Method for Generating Non-linear Dynamic Substitutions; Appendix No. V, Constructive Corruption II: More General Methods for Generating Non-linear Dynamic Substitutions; and Appendix No. VI, The Algebraic Structure of Non-linear Orthomorphisms of Binary Numbers; Appendix No. VII, "Block Substitutions using Orthomorphic Mappings"; and Appendix No. VIII, "Orthomorphic Block Substitutions."

I. BLOCK SUBSTITUTION

In the description to follow, the methods and apparatus of the grand-parent application will first be described with respect to blocks of n bit binary numbers where the value of n is 3. Then the methods and apparatus will be expanded to n bit blocks generally, and certain characteristics of blocks up to n=8 will be presented. By presenting the following example for n=3, it is believed that the concepts of the original invention may be better understood than would be the case if a larger block having many more combinations were used.

Block substitution is the term usually applied to a one-to-one mapping of the n-bit binary numbers onto themselves. This mapping can be written as a pairing of the $2^n$ n-bit numbers:

$$X_1 \quad Z_1 \quad\quad (1)$$
$$X_2 \quad Z_2$$
$$\vdots \quad \vdots$$
$$X_k \quad Z_k$$
$$\vdots \quad \vdots$$

where each column is the set of the same $2^n$ distinct n-bit numbers but written in different orders. Thus, this mapping can be thought of as a permutation of the n-bit numbers written as:

$$X_1 \quad X_2 \quad \ldots \quad X_k \quad\quad (2)$$
$$Z_1 \quad Z_2 \quad \ldots \quad Z_k$$

or $(X_1 \, X_i \, X_j)$ for some set of indices. This usual notation for permutations simply means that $X_1 \to X_i$, $X_i \to X_j$, etc.

Going back to the column notations, one could define a set of simple equations from the original set and its image:

$$Y_1 \oplus X_1 = Z_1 \quad\quad (3)$$
$$Y_2 \oplus X_2 = Z_2$$
$$\vdots \quad \vdots \quad \vdots$$
$$Y_k \oplus X_k = Z_k$$
$$\vdots \quad \vdots \quad \vdots$$

where $\oplus$ means modulo 2 addition (i.e., addition of corresponding digits without any carry). In general, the set $\{Y_1, Y_2, \ldots\}$ will not all be distinct, but in certain circumstances they will be. In accordance with the original invention, when they are distinct, block substitutions can be generated by modulo 2 addition rather than by conventional means. The main tasks are to determine the circumstances, if any, in which this scheme works, how the substitutions can be quickly changed, and the lack of bias.

It is not obvious that block substitutions can ever be generated by modulo 2 addition. For example, consider the attempt to substitute one arrangement of 3-bit binary numbers for another by modulo 2 addition shown in FIG. 1. In column 3 on the right, 011 and 100 each appear twice, while 001 and 110 never appear. The numbers in column 1 on the left, acting on the numbers in column 2 in the center, constitute a transformation of the set of 3-bit binary words of column 1 into themselves. This is a many-one transformation and is useless for block substitutions because of the ambiguity that results when trying to recover the original block for the transformed blocks 011 and 100.

Trying another arrangement as shown in FIG. 2 gives a different result. Any pair of columns now constitutes a one-to-one transformation. In particular, the transformation is one-to-one from the 3-bit binary numbers of column 3 (the clear text) onto themselves, the encrypted text of column 1. Each column consists of all the 3-bit numbers exactly once.

Obviously, one could use the transformations of FIG. 2 to transform any three digit binary block into an encrypted binary block, and of course use the same equations to de-encrypt the encrypted message by finding the encrypted word in column 1 and then selecting the corresponding clear text word in the same row, column 3 of FIG. 2. This is most convenient if $\oplus$ and = are interchanged as shown in FIG. 5. An equivalent transformation to transform the encrypted word back to the clear text word results if the words of column one are added to those of column two to obtain those in column three.

Referring again to FIG. 2, an interesting property of the transformation shown therein, and for that matter, for all transformations of the type of interest herein, may be seen. In particular, of the eight blocks of three binary numbers, the lower four blocks 000, 001, 010 and 011 map into two blocks of the lower four, namely 000 and 001, and two blocks of the upper four, namely 110 and 111. Similarly of course, the four larger blocks of the eight map two into blocks in the lower four, and two into blocks of the upper four. Similarly, the even blocks 000, 010, 100 and 110 map into two even blocks, 000 and 010, and into two odd blocks, 001 and 011. The odd four blocks map half into odd blocks and half into even blocks. Obviously for decryption, the same is true. Thus, knowledge of some characteristic of the encrypted block such as its being large, small, even, odd, etc., does not convey any similar knowledge of a characteristic of the unencrypted block. As a result of this, the encryption is said to be unbiased. For that matter it should be noted that, even considering the middle digit of each block, the four blocks of FIG. 2 having a zero as the middle digit map two blocks into blocks also having a zero as a middle digit, and two blocks having one as the middle digit. Similarly of course, the four blocks having a one as the middle digit map two into blocks having a one as a middle digit, and two into blocks having a zero as the middle digit. This property applies to all block sizes and extends to dividing equally all set of blocks which may be characterized algebraically as maximal subgroups. This unbiased character of the encryption is a highly beneficial characteristic of the encryption scheme disclosed herein, particularly in conjunction with the frequent changing of the encryption from time to time.

In particular, in any practical encryption device of course, one would like to be able to frequently change the encryption scheme so that patterns will not persist for a sufficient length of time to allow cryptanalysis of the pattern. For this purpose, certain properties of the equations of FIG. 2 may be recognized by rearranging the rows of FIG. 2 as shown in FIG. 3. Rearrangement of the rows in any manner of course does not effect the transformation in any way, as each of the equations maintains its own integrity separate and apart from its position in the table. In essence, the second row of FIG. 3 is the 4th row in FIG. 2 and the third row of FIG. 3 is the fifth row in FIG. 2, with each successive row being arranged so that the left column in each successive row contains the same 3 bit number as the second column of the preceding row. When so arranged, neglecting the first or identity row, it will be noted that each of the three columns contains the same sequence of the 3 bit binary numbers, with wrap-around. In particular, the first column has the same sequence as the second column, but displaced downward therefrom one position (or upward six positions), and the third column has the same sequence as the second column, though displaced downward three positions (or upward four positions) from the sequence of column two.

Neglecting the first row or identity row of FIG. 3 again, if the 3 bit binary numbers in column 1 are shifted downward a total of six positions with wrap-around with respect to the second column, it will be noted that a one to one transformation still results, as shown in FIG. 4. Except for the identity row, the transformation is entirely different from that of FIG. 3. By way of example, 111 column 3 maps into 011 column 1 in FIG. 3, and maps into 100 column 1 in FIG. 4. In addition however, it is important to note that the sequence of the 3 digit numbers in columns 1 and 3 of FIG. 4 (separating out the identify row) is still the same as that in column 2 of FIGS. 3 and 4, though each is shifted with wrap-around in comparison to column 2. Thus, the transformation of FIG. 3 has been changed to the new transformation of FIG. 4 by merely shifting the numbers in the first column of FIG. 3 with respect to those in the second column, and with the numbers in the third column also being shifted with respect to those in the second column, but by a different amount to preserve the integrity of the modulo 2 addition equations. Again, for decryption, symbols $\oplus$ and $=$ of FIG. 4 can be interchanged as in FIG. 5.

More generally for any block size, the sets of equations can be written as:

ENCRYPTION $$\begin{array}{cccc} 1 & 2 & & 3 \\ \theta & = \theta & \oplus & \theta \\ X_{1-s} & = X_1 & \oplus & X_{1-P_s} \\ X_{2-s} & = X_2 & \oplus & X_{2-P_s} \\ \cdot & \cdot & & \cdot \\ \cdot & \cdot & & \cdot \\ \cdot & \cdot & & \cdot \\ X_{k-s} & = X_k & \oplus & X_{k-P_s} \\ \cdot & \cdot & & \cdot \\ \cdot & \cdot & & \cdot \\ \cdot & \cdot & & \cdot \\ X_{m-s} & = X_m & \oplus & X_{m-P_s} \end{array} \quad (4)$$

$\theta = 00 \ldots 00$

DECRYPTION $$\begin{array}{cccc} 1 & 2 & & 3 \\ \theta & \oplus \theta & = & \theta \\ X_{1-s} & \oplus X_1 & = & X_{1-P_s} \\ X_{2-s} & \oplus X_2 & = & X_{2-P_s} \\ \cdot & \cdot & & \cdot \\ \cdot & \cdot & & \cdot \\ \cdot & \cdot & & \cdot \\ X_{k-s} & \oplus X_k & = & X_{k-P_s} \\ \cdot & \cdot & & \cdot \\ \cdot & \cdot & & \cdot \\ \cdot & \cdot & & \cdot \\ X_{m-s} & \oplus X_m & = & X_{m-P_s} \end{array} \quad (5)$$

For block size n, $m=2^n-1$. $\theta=00\ldots00$, the n bit word consisting of all zeroes.

If column 1 is shifted by S positions with respect to column 2, then column 3 is shifted by a different amount $P_s$ to preserve the integrity of the modulo 2 addition equations. For a given shift S, $P_s$ is determined by the shift programmer.

Now referring to FIG. 6, a block diagram of a system for carrying out encryption in accordance with the encryption and decryption techniques discussed so far may be seen.

The clear test word is sent to its address in Memory I. This corresponds to selecting a word $X_{k-P_s}$ from column 3 other than $\theta$. The concept is to add it to its counterpart in column 2. If $X_{k-P_s}$ is other than $\theta$ and is to be added to $X_k$, this is equivalent to adding the word with order data $K-P_s$ in column 3 to the word with order $K-P_s+P_s=K$, also in column 3. Thus the order data of the clear test word $K-P_s$ is sent to the adder to be added to $P_s$. The new order number is sent to its address in Memory II. The content of that address is added modulo 2 to the clear test word to obtain the encrypted word $X_{k-s}$ in column 1. If the clear text word is $\theta$, its cipher test image is the same.

Adding of the order data is accomplished by two adders, carry (C) and least significant bit (LSB). The carry adder adds the numbers conventionally with carry, e.g. 001+011= 100. However, if the addition requires more than n digits, that is, a 1 is carried to the n+1 position, that extra 1 is instead added to the first position, e.g., 100+110=1010=>011. This is accomplished by the LSB adder. This is simply addition modulo m where $m=2^n-1$. In this example, n=3, m=7 and the addition expressed in decimal terms is 4+6=10 ≡3 mod 7 where 100=>4, 110=>6 and 011=>3.

Figure 7:
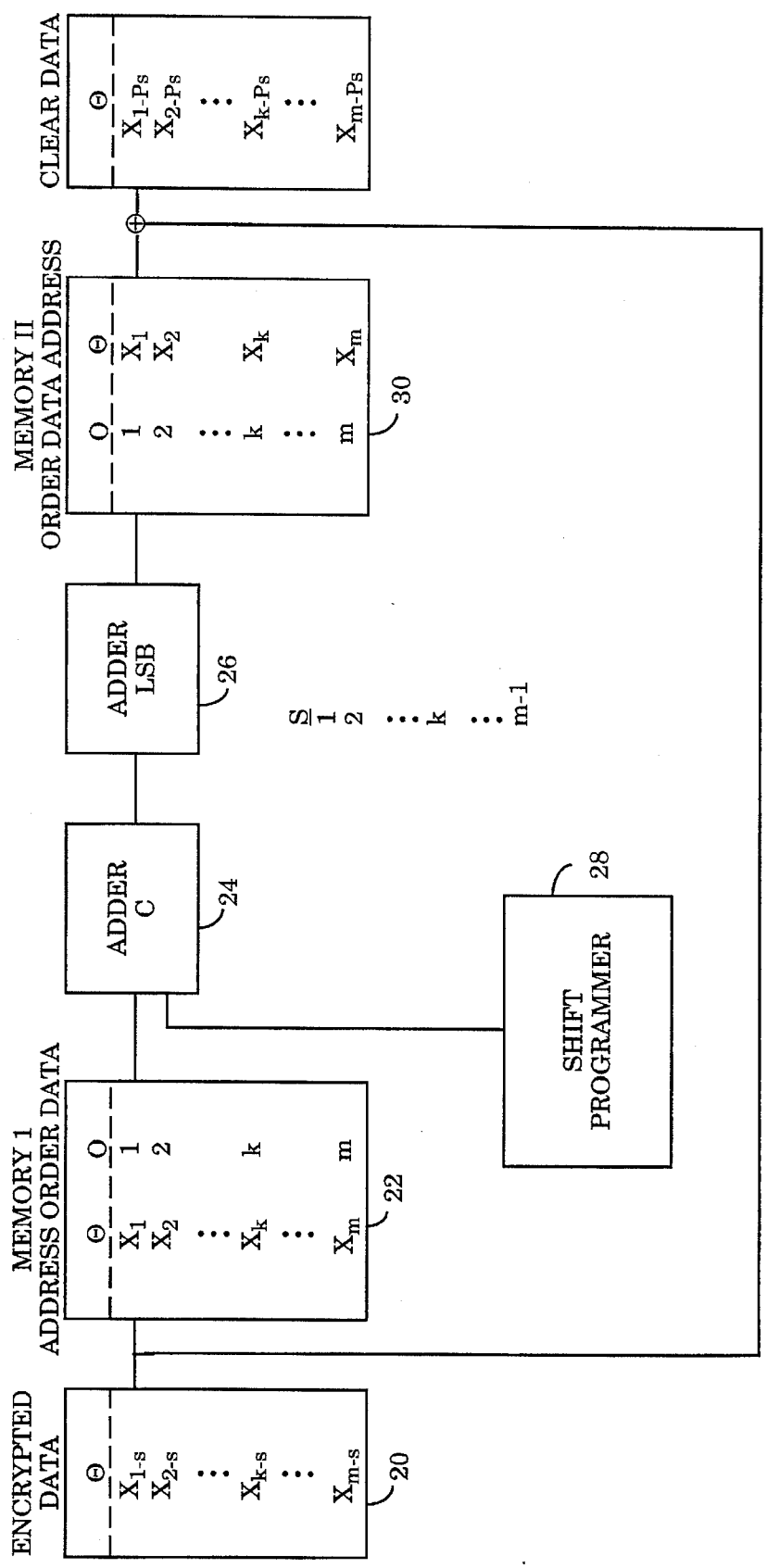
FIG. 7 is a block diagram of apparatus for decrypting data encrypted by the apparatus of FIG. 6.

The block diagram for decryption is shown at FIG. 7. The cipher text word is sent to its address in Memory I. This corresponds to selecting a word $X_{k-s}$ from column 1 other than $\theta$. The concept is to add it to its counterpart, $X_k$ in column 2. This is equivalent to adding $X_{k-s}$ in column 1 to the word with order data K-s+S=K, also in column 1. Thus the order data of the cipher text word, K-s is sent to the adder to be added to s. The new order number is sent to its address in Memory II. The contents of that address is added modulo 2 to the cipher text word to obtain the de-encrypted word $X_{k-P_s}$ in column 3. If the cipher text word is $\theta$, it is de-encrypted as $\theta$.

The addition of order data, K-S+S and $K-P_s+P_s$ is understood to be modulo m or with wraparound. That is, if the order data is greater than m, the last position, m is subtracted from the order data. If the cipher text word is $\theta$, it is de-encrypted as the same word.

The shift program determines the order in which the shifts, S, in column 1 are used, with the corresponding $P_s$ shift S in column 3. Any desired order can be used. The shift S corresponds to a power of the basic permutation described on Page 8, which determines the substitution by addition.

Figure 8:
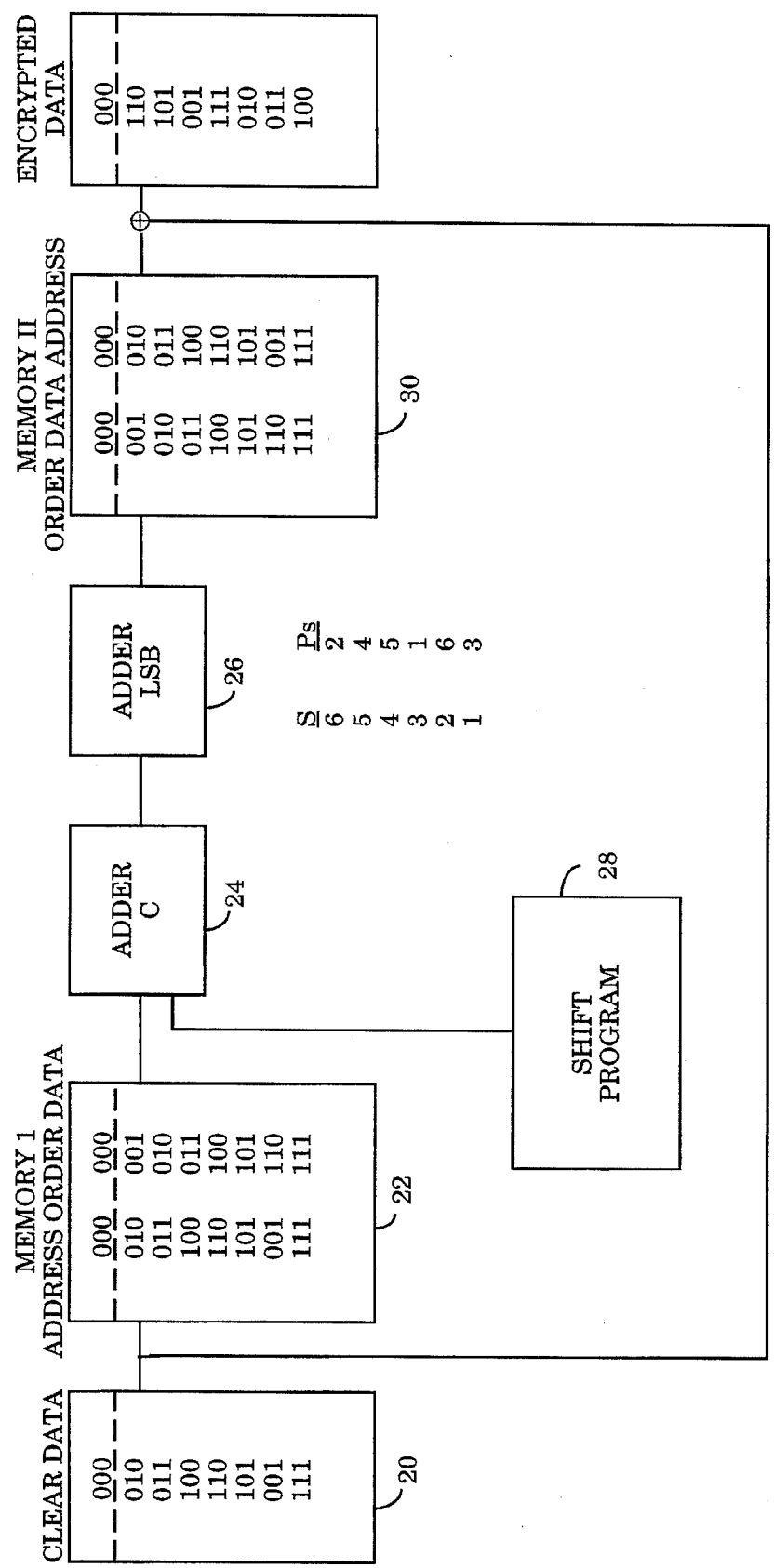
FIG. 8 is an example of encryption using FIG. 6.

Thus, by way of example, in FIG. 8, if the clear data value is 010, then that address in Memory I provides order data 001, which is binary notation that 010 is in position 1 in the sequence in Memory I (column 3 of the set of equations). The first shift position in the program is S=6, for which $P_6=2$. To the position of 010, $K-P_6=1$ is added $P_6=2$. In binary notation, 001+010=011. Corresponding to the address 011 in Memory II is the number 100. (This is equivalent to saying that 100 is in position 3 in column 3). 110=100$\oplus$010 is the cipher text word. This represents the first of the additive equations in FIG. 5.

Figure 9:
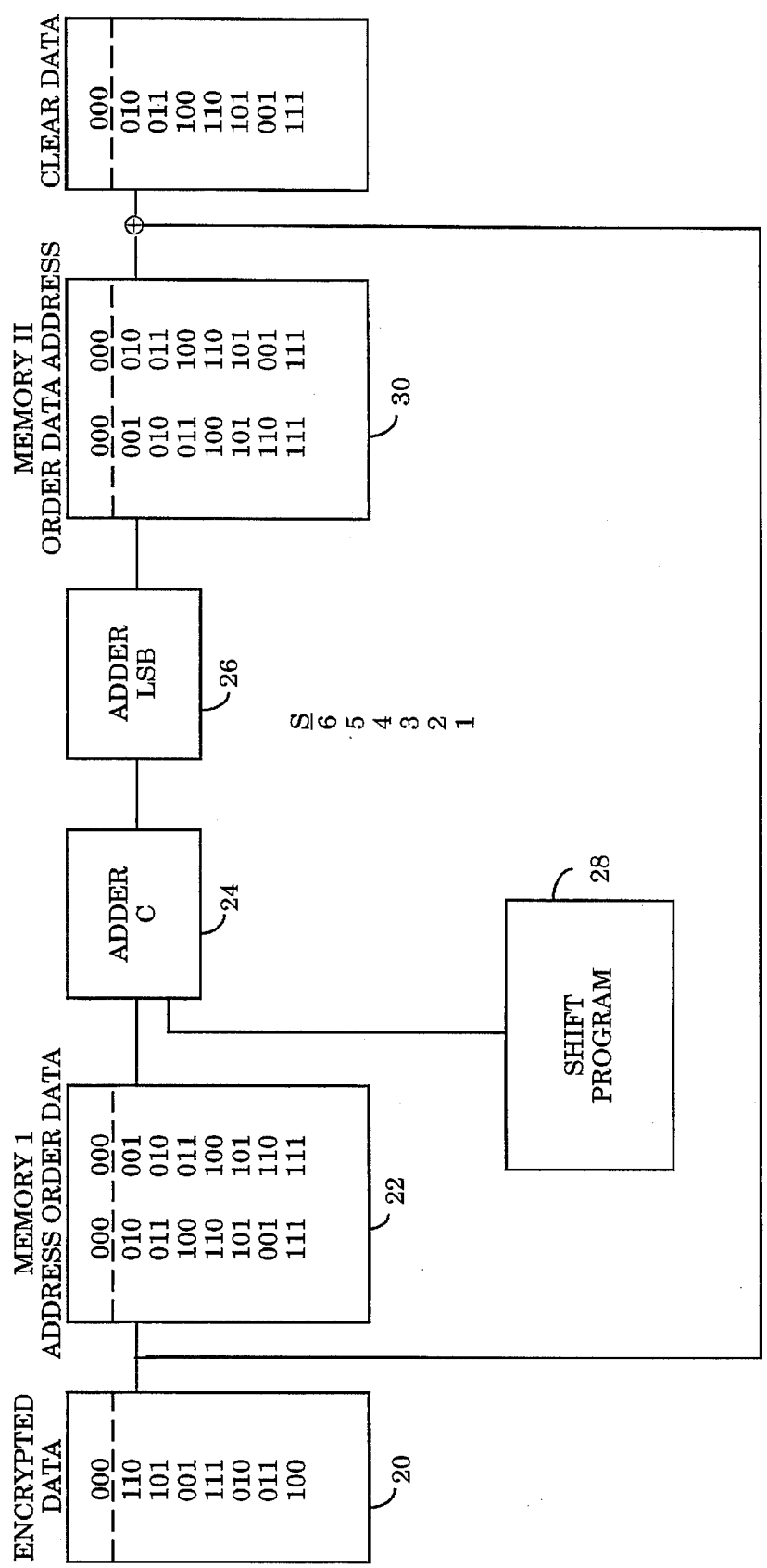
FIG. 9 is an example of decryption using FIG. 7.

For decryption, the cipher text word is 110. In FIG. 9, that address in Memory I provides order data 100, or position 4 in the sequence in Memory I. The first shift position in the program is S=6. To the position of 110, K-6=4, is added 6, or 110 in binary notation. 4+6=10. Subtracting by m=7, 10-7=3, or position 3 with wrap around. In binary notation, 100+110=011 modulo 7. Corresponding to the address 011 in Memory II is the number 100. 110$\oplus$100=010. This represents the first of the additive equations in FIG. 4.

If one adds Modulo 2 a fixed number to the first and second columns of FIG. 4. A still further one-to-one transformation results.

$$
\begin{array}{rcl}
& \text{ENCRYPTION} & \\
1 & 2 & 3 \\
(I \oplus Y) & = (I \oplus Y) \oplus & I \\
(X_{1-s} \oplus Y) & = (X_1 \oplus Y) \oplus & X_{1-P_s} \\
(X_{2-s} \oplus Y) & = (X_2 \oplus Y) \oplus & X_{2-P_s} \\
\cdot & \cdot & \cdot \\
\cdot & \cdot & \cdot \\
\cdot & \cdot & \cdot \\
(X_{k-s} \oplus Y) & = (X_k \oplus Y) \oplus & X_{k-P_s} \\
\cdot & \cdot & \cdot \\
\cdot & \cdot & \cdot \\
\cdot & \cdot & \cdot \\
(X_{m-s} \oplus Y) & = (X_m \oplus Y) \oplus & X_{m-P_s} \\
\end{array}
\quad (6)
$$

$$
\begin{array}{rcl}
& \text{DECRYPTION} & \\
1 & 2 & 3 \\
(I \oplus Y) & \oplus \quad (I \oplus Y) & = I \\
(X_{1-s} \oplus Y) & \oplus \quad (X_1 \oplus Y) & = X_{1-P_s} \\
(X_{2-s} \oplus Y) & \oplus \quad (X_2 \oplus Y) & = X_{2-P_s} \\
\cdot & \cdot & \cdot \\
\cdot & \cdot & \cdot \\
\cdot & \cdot & \cdot \\
(X_{k-s} \oplus Y) & \oplus \quad (X_k \oplus Y) & = X_{k-P_s} \\
\cdot & \cdot & \cdot \\
\cdot & \cdot & \cdot \\
\cdot & \cdot & \cdot \\
(X_{m-s} \oplus Y) & \oplus \quad (X_m \oplus Y) & = X_{m-P_s} \\
\end{array}
\quad (7)
$$

Figure 11:
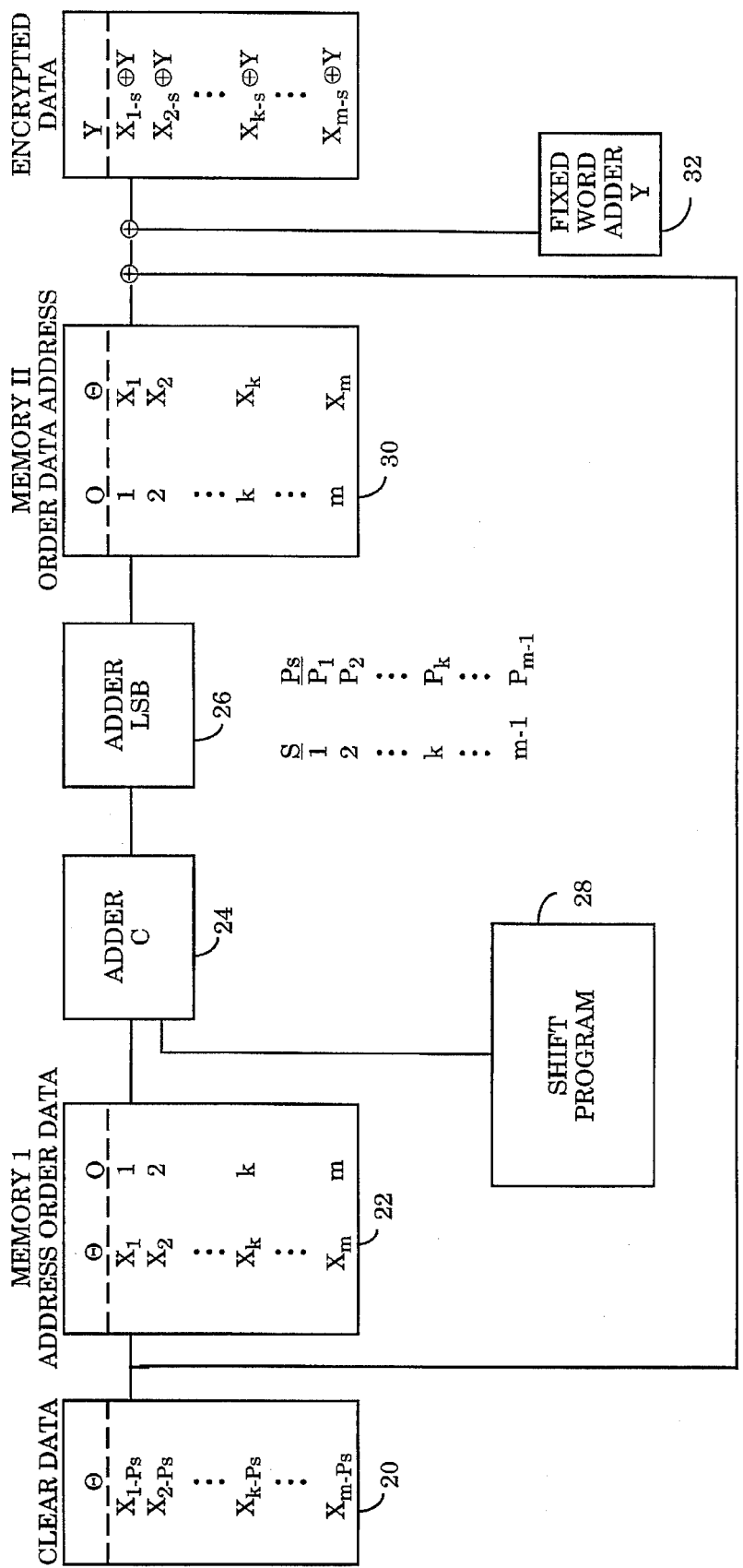
FIG. 11 is a block diagram for an apparatus for encrypting data in accordance with a set of transformation equations such as those of FIG. 10.
Figure 12:
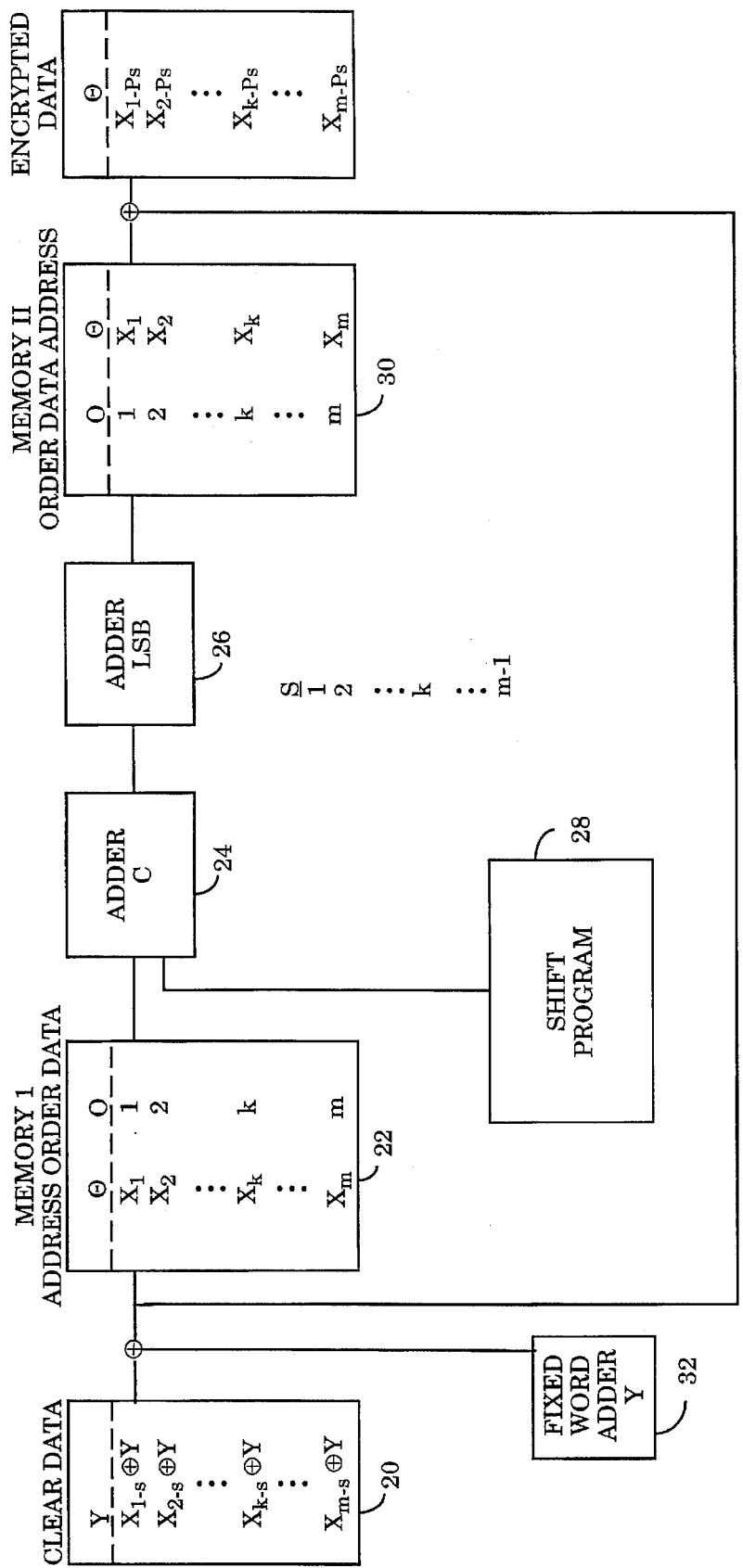
FIG. 12 is a block diagram for an apparatus for decrypting data encrypted with the apparatus of FIG. 11.

Now referring to FIGS. 11 and 12, for any block size a block diagram for carrying out encryption and decryption using a fixed word other than θ, the zero word, may be seen. The procedure is essentially the same as before with the additional step of adding the fixed word Modulo 2 as the last step in the encryption process and the first step in the decryption process.

Figure 13:
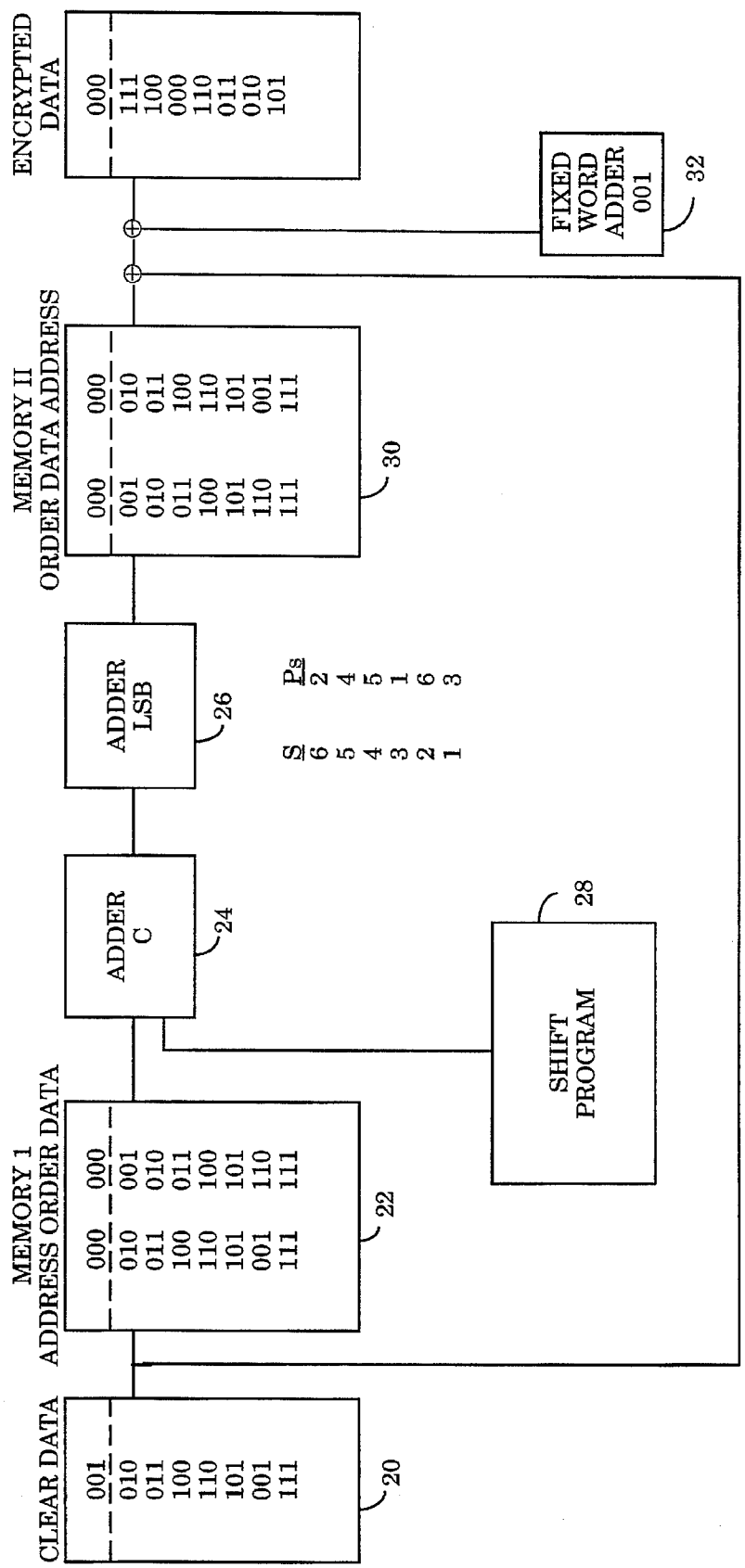
FIG. 13 is an example of encryption using FIG. 11.
Figure 14:
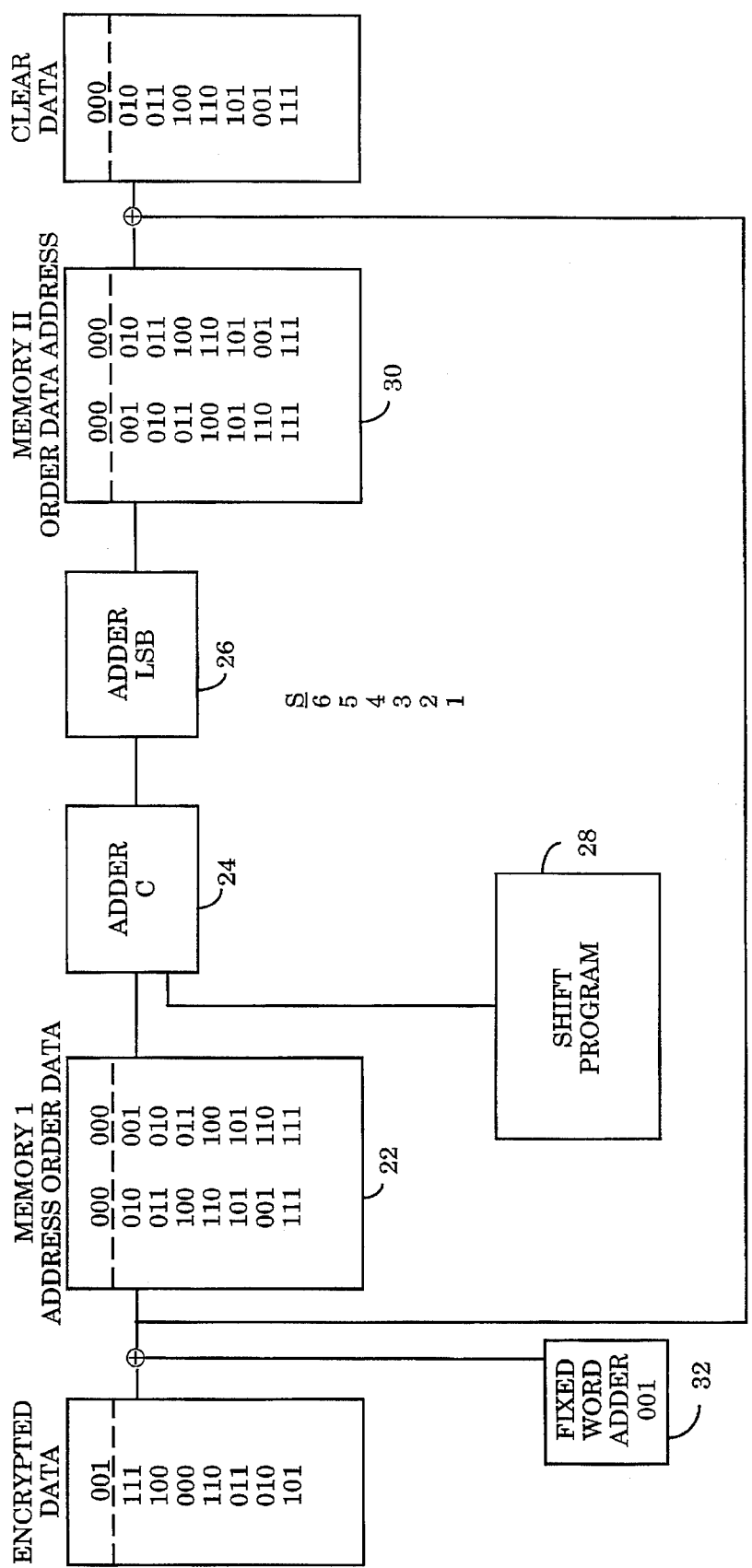
FIG. 14 is an example of encryption using FIG. 12.

An example is shown in FIG. 13 and 14. In this case, 000 no longer remains fixed, but is transformed into 001. Now 110 is transformed to itself and thus becomes fixed in this case.

The fixed word adder can add in succession any or all of the n bit words in whatever order is selected by the user.

Now referring to FIG. 8, as an example, a block diagram of a system for carrying out encryption in accordance with the encryption and decryption techniques discussed so far may be seen. As shown in the figure, any value of the clear data 20, except 000, is provided as an address to memory 22. Stored at the various memory addresses is the order data for the clear data value, that is, the position, expressed as a binary number, of that clear data value in the ordered sequence of the right column of FIG. 4 (and FIGS. 5 and 10). This position is provided as an output of the memory 22 to an adder shown as the combination of adders 24 and 26. The adders are coupled to add the output of the memory to a value of shift $P_s$ as controlled by shift programmer 28. This addition is not a modulo 2 addition but rather is the normal binary add, with the one exception that the carry from the most significant bit is coupled to the carry in of the least significant bit. Thus, the adder will provide the result 001 as the sum 1 larger than 111, not 1000 or simply 000. Thus, it may be seen that the output of the adders is a new three bit binary number shifted in the order data sequence by an amount $P_s$. This new position is then used as the address for memory 30, which provides as its output the three bit binary number corresponding to the value in column 2 of FIG. 4, or the corresponding clear data value in FIG. 3. Thus, by way of example, if the clear data value is 010, that value as an address to memory I provides the location of that value of 001 in the sequence. If the shift program selects S=6, then $P_6$=2 and column 3 is shifted downward two positions from column 2 or by an amount 010. The three bit binary number which would then be adjacent to the clear data value of 010 is 100 as in FIG. 5. This added modulo 2 to the clear data 010 provides an encrypted value of 110, corresponding to the value shown in FIG. 5. However, if the clear text data value is 000, that value as an address to Memory I provides the location of the value of 000 in the sequence. It is not shifted but provided unchanged as the order data in memory 30. Thus 000 added to itself, remains fixed.

The downward shift $P_s$ of the sequence of column 3 of FIG. 5 in comparison to the basic order data of column 2 of FIG. 5 of course corresponds to a complimentary upward shift. Thus, for an n bit block, a downward shift of $P_s$ is equivalent to an upward shift of $m-P_s$. Note also that for a three bit block, all values of possible shift provide the desired one-to-one mapping except for a shift of the first column with respect to the second column of zero, and of 7 and multiples thereof, as such shifts would provide a second column in the matrix having each row the same as the corresponding row of the first column, and any number added to itself modulo 2 will be zero. Thus, for a shift of seven or multiples thereof, all clear data values map to 000, useless for encryption purposes. In general however, it will be shown later that for n bit blocks larger than three bits, all shifts other than zero and integer multiples of m give the desired result and thus are usable in accordance with the original invention.

The block diagram for decryption in accordance with FIG. 7 is shown in FIG. 9. From a hardware standpoint, this diagram is exactly the same as that of FIG. 8 for encryption, the decryption differing only in the shift S applicable for a given shift $P_s$ for encryption. As in the example on page 14, for a shift $P_s$ of 2 for encryption, a shift 6 provides the proper decryption etc., as shown in the tables of FIGS. 8 and 9. Obviously, the encryption hardware and the decryption hardware must be using the associated shifts for the clear data to be properly recovered on decryption, though the applicable shift may be varied frequently at both ends to make cryptanalysis very difficult, if not virtually impossible.

If one adds modulo 2 a fixed number to any pair of columns of FIG. 5, a still further one-to-one transformation results. By way of example, in FIG. 10 the fixed number 001 has been added modulo 2 to the first and second columns of FIG. 5. Now 010 as a clear text word maps into an encrypted word 111, whereas in the example of FIG. 8, 010 mapped into 110.

An example of a block diagram for the encryption using a fixed word adder may be seen in FIG. 13. This figure is identical to FIG. 8 with the exception that the fixed word adder 32 has been included to add the fixed word (001 in the example) to the output of memory 30 corresponding to the value in the same row of the second column as 010 of the first column. Thus, the fixed word adder merely adds the fixed word (001 in the example) to the column 2 value, after which the clear text word is added modulo 2 thereto to obtain the encrypted data. Again for the example, using clear data of 010 as the address to memory 22, the output of the memory will be 001. Using the same shift as in the example of FIG. 8, 010, $P_s$=2 is added to the 001, to provide an address to memory 30 of 011. This results in an output from memory 30 of 100, to which fixed word adder adds modulo 2, the fixed word 001, yielding 101. This added modulo 2 to the clear text word 010 gives the encrypted word 111 as shown in FIG. 10.

A block diagram for decryption, corresponding to the block diagram for encryption of FIG. 13, is shown in FIG. 14. As may be seen, FIG. 14 is identical to FIG. 13 (though the shifts for decryption are again different from the shifts for encryption), with the exception of the fixed word adder also adding modulo 2 the fixed word to the encrypted data before the same is applied to memory 22. This modulo 2 addition is in essence the second modulo 2 addition of the fixed word, as a first modulo 2 addition of the fixed word was done in FIG. 11 to get the encrypted word. Thus, since a second modulo 2 addition of the same word in effect cancels the first modulo 2 addition so that after the encrypted data in FIG. 12 has the fixed word added modulo 2 thereto, the result of that modulo 2 addition may be used with the equations of FIG. 10 for decryption purposes. Thus, by way of example, using the encrypted word 111 of the example of FIG. 13, $111 \oplus 001 = 110$ as the address to memory 22 of FIG. 14. This gives a memory output of 100, to which the value of S=6 or 110 is added. $100+110=1010 \Rightarrow 011$ with wrap-around. This in turn gives an address of 011 to memory 30 or an output thereof of 100, to which is added modulo 2 110, the address to memory 22, to recover the clear text data 010. Further of course, while the fixed word adder of FIGS. 13 and 14 used a fixed word 001, any other 3-bit fixed word may be used, or for that matter, the fixed word may be varied from time to time with or separate and apart from variations in the shift, a fixed word of 000 essentially reducing the operation of the system to that of FIGS. 8 and 9.

Obviously, the methods described in relation to FIGS. 6, 7, 11 and 12 may readily be carried out with a microprocessor based system under program control. Alternatively, the memory could readily be preprogrammed in read only memory used essentially as look-up tables, and the adders and modulo 2 adders could readily be conventional adder circuitry so that at least the major elements of an encryption and decryption system could be realized in either high speed discrete components or through a custom integrated chip. The shift program also could take various forms depending upon how often a shift is desired, the extent to which the shift order is itself varied, etc., microprocessor based, integrated circuits or other realizations being readily applicable, including shift register implementations as desired.

II. NON-LINEARIZATION OVERVIEW

In Appendix 1 which follows, the transformations herein before described are further analyzed and various properties and characteristics thereof are set forth. In Appendix 2, certain aspects of the method of block substitution of the great-grand-parent application are reviewed, and the concepts of non-linearity and nonlinear mappings of clear text to encrypted text (and vice versa) are presented. Non-linearity in this sense means that the mappings of clear text to encrypted text (and from encrypted text to clear text) are nonlinear under the operation of bit-wise addition modulo 2. In that regard, it was pointed out that FIG. 1 illustrates a many-one transformation of one set of three bit binary numbers to another set of binary numbers by a modulo 2 addition. This specific example maps the eight possible values of the three bit numbers in the first column by modulo 2 addition to six three bit numbers in column 3 representing six of the eight possible combinations, with two (100 and 011), each being repeated twice. Because two three bit numbers (010 and 101) map to the same three bit number (100), and two other three bit numbers (100 and 110) map to the same three bit number (010), the reverse mapping will have ambiguities, making the mapping illustrated in FIG. 1 unsuitable for encryption and decryption purposes.

On the other hand, FIGS. 2 through 5 provide sets of equations for encryption of any of the eight possible three bit clear text words (column 1) to a corresponding non-ambiguous encrypted text word (column 3). These equations remain valid by the interchanging of columns 1 and 3, and thus with this interchange, form the equations for the corresponding decryption in the same way that the equations before the interchange form the equations for encryption. However, the set of equations shown in each of FIGS. 2 through 5 are linear in the sense that the addition of any two equations within a given set of equations (eight equations for three bit numbers such as in FIGS. 2 through 5) is also one of the equations of the set. For instance, in FIG. 2, while the addition of the first or null equation to any other equation yields that other equation and is thus trivial, the addition of the second and third equations provides the fourth equation, the addition of the third and fourth equation provides the second equation, the addition of the fourth and fifth equation provides the eighth equation, etc. Even when one adds modulo 2 one equation to itself, one obtains one of the eight equations, namely the null equation, as may occur when one adds more than two equations modulo 2 such as, by way of example, equations two, three and four, as the addition of equations two and three yields equation four, and equation four added to itself yields the null equation. In that regard, adding two equations modulo 2 may be considered equivalent to adding any greater number of equations, as either or both of the equations added may be considered to be the sum of two or more other equations. Further, there is no combination of equations the sum of which is not another equation in the given set. What is most significant from a cryptanalysis standpoint is that given the right three of the seven equations other than the null equation, the remaining four equations may be determined by the appropriate sums of the combinations of the three known equations. For instance, while the combinations of sums of equations two, three and four of FIG. 2 cannot be used to generate the rest of the equations, equations two, three or four, and five, six, seven or eight can be so used. Taking for example, equations two, four and eight, the sum of equations two and four provides equation three, the sum of equations two and eight provides equation seven, the sum of equations two, four and eight provides equation six, and the sum of equations four and eight provides equation five. Also the foregoing rule, of course, applies to encryption of words of other bit lengths, the generating equations for the sixteen equations for encryption of a four bit word being determined by adding modulo 2 various combinations of four independent equations.

With respect to the set of equations in FIG. 10, adding any two equations does not provide a third equation of the set, though adding 001 to each of the left hand columns of the FIG. 10 again provides the null equation and the rest of the set of equations of FIG. 5, which set is generally able by any three independent equations of the set. It is this ability to generate the remainder of the equations from a basic set of independent equations which the present invention is intended to avoid, the present invention doing so in an orderly and logical manner so that not only may the base set of linear equations be varied from time to time or dynamically in the various ways disclosed in the original application, but the resulting base set may also be non-linearized from time to time or dynamically to a varying extent and in varying combinations, making cryptanalysis much more difficult than before.

Referring again to FIG. 2, if one rearranges the order of the equations, there is, of course, no change in the mapping of the numbers in column 1 to the numbers in column 3. Accordingly, the equations in FIG. 2 may be rearranged as shown in FIG. 15. In particular, it will be noted that, neglecting the null equation, the first number appearing in column 2 (001) occurs in the next line of column 1, the second number in column 2 (111) occurs in the third line of column 1, etc., the wraparound resulting in the last number in column 2 (101) falling on the first line of column 1 (again neglecting the null equation). The resulting organization of the equations is in the form illustrated on page 7 of Appendix 2, where in FIG. 15, $x_1$ is 001 and $x_m$ is 101. Any set of equations for words (numbers) of any bit length having a null equation and $2^n-1$ non-zero equations may be so arranged without any changing of the mapping defined thereby, as such an arrangement is a mere changing of the order of appearance of the equations and not a changing of any of the equations themselves.

It is shown in Section 3.2 of Appendix 2 that certain groups of such equations may be altered by rearrangement of the words appearing in columns 1 and 2 to provide correspondingly new modulo 2 addition equations, which when substituted for the original group of equations within the original set of equations still maintains a one to one mapping and thus is suitable for use in encryption and decryption. In that regard, the one to one mapping is preserved because the order of the multi-bit words appearing in columns 1 and 2 of the selected group of equations is changed, but not the words themselves, so that the group of words mapped and the group of words to which they are mapped by the selected equations has not been changed, though within those two groups, which word in column 1 maps to which word in column 3 has been changed. The net effect of these changed equations is that the same no longer are linear extensions of the unchanged equations, that is, the same can no longer be generated by the addition of two or more of the unchanged equations. This, therefore, breaks up the linearity of the original set, the possible extent of which will be subsequently discussed, making the cryptanalysis more difficult as desired.

It is shown in Section 3.2 of Appendix 2 that under certain conditions, groups of equations within a given set may be altered and used to replace the corresponding original group of equations within the original set so as to maintain a one to one mapping for the complete set, and at the same time break up the linear characteristic of the set of equations as herein before described. These conditions are more specifically illustrated in equation form in Section 3.3 of Appendix 2, wherein the two possible modifications are illustrated in equation form. The basic concept is to take sums of consecutive triples of rows in the original set of equations, with the analysis in Section 3.2 of Appendix 2 showing that, as stated in Section 3.3, the non-linearization by taking such consecutive triples of rows works if, and only if, a set of only three or four consecutive rows of the original set are used. If three consecutive rows are used, four rows are actually modified, namely the three consecutive rows of the original set, together with a fourth row corresponding to the vector sum modulo 2 of the three consecutive rows. The modification can be obtained by adding vectorially to each of the four rows, the following equation:

$$(x_1 \oplus x_2) \oplus (x_1 \oplus x_2) = \Theta \qquad (8)$$

If four consecutive rows of the original set of linear equations are used, six rows of the original set of equations are modified, namely the four consecutive rows, together with the row representing the vector sum of the first three of the four consecutive rows, and the row corresponding to the vector sum of the last three of the four consecutive rows of the original set (e.g. the row corresponding to the sum of rows 1, 2 and 3, and the row corresponding to the sum of rows 2, 3 and 4, as shown on page 10 of Appendix 2). The modification in this case may be obtained by adding vectorially to the corresponding six rows the following:

| to rows 1 and $q$ | $(x_1 \oplus x_2) \oplus (x_1 \oplus x_2) = \Theta$ | (9) |
|---|---|---|
| to rows 2 and 3 | $(x_1 \oplus x_3) \oplus (x_1 \oplus x_3) = \Theta$ | |
| to rows 4 and $q+1$ | $(x_2 \oplus x_3) \oplus (x_2 \oplus x_3) = \Theta$ | |

The form of the equations above and the original equations shown on page 10 of page A2 of Appendix 2 suggests that non-linearization works if one takes the first, second, third and one other row of the original set of linear equations, or alternatively, if one takes the first, second, third, fourth and two other rows of the original set of linear equations. Since the method works because the equations in the original set as selected for modification are linear within themselves, equations once non-linearized by the methods of the present invention may not be again used as part of the non-linearization process. This would tend to suggest that only four or six equations could be non-linearized by this process, which of course would be an insignificant number of the total equations for larger word sizes (for instance, a four bit word requires 16 equations, an eight bit word 256 equations, etc.). However, again referring to FIG. 15, it is to be noted that which word or number in column 2 is to be selected from the non-null rows as $x_1$ is arbitrary. By way of example, if one selected 011 as $x_1$ rather than 001, the third non-zero line would become the first, the fourth non-zero line the second, the fifth non-zero line the third, the sixth non-zero line the fourth, the seventh non-zero line the fifth, the first non-zero line the sixth, etc., essentially shifting the lower five equations up and wrapping the upper two non-zero equations around, with the result that the equations themselves are not changed, nor is the ordering of the equations, but rather only the starting point in that sequence is changed. Such an arrangement of equations was shown in FIG. 3, wherein $x_1=100$ and $x_m$ $(=x_7)=011$. Thus the equations presented on page 10 of Appendix 2 are general in the sense that if three consecutive rows and the row corresponding to the sum of the three consecutive rows are to be modified (non-linearized) any three consecutive rows may be so selected, limited only by the fact that none of the three selected nor the row corresponding to the sum of the three can have previously been non-linearized as a result of an earlier selection. Similarly, if four consecutive rows plus the two sum rows herein before described are selected, any four consecutive rows may be so used, again provided that none of the four selected nor of the two sum rows may have previously been non-linearized by this process. To generalize the equations for non-linearization, one need only consider $x_1$ as being the value in the second column of the first of the three or four successive rows selected, and renumbering values in each column accordingly.

It will be noted that the non-linearization process is carried out on the equations other than the null equations. Since there are $2^n-1$ such equations, wherein n is the bit length of the word used, there is necessarily an odd number of equations available for non-linearization regardless of the value of n, whereas the non-linearization process non-linearizes an even number (4 or 6) equations at a time (obviously in a high speed system, apparatus may be provided to simultaneously non-linearize different non-overlapping groups of a given set of linear equations, as the non-linearization processes for non-overlapping groups are totally mutually independent, regardless of which process is used). Thus, it is clear that not all equations in any given linear set may be non-linearized. Consequently, there is a question as to how many of the equations may be non-linearized, and whether there is a logical manner of selecting equations for non-linearization. These considerations are discussed in Sections 3.4 through 3.6 of Appendix 2. In general, while not all equations may be non-linearized, normally a vast majority of the equations may be non-linearized for word sizes of four or more bits, leaving the remaining non-linearized equations of little significance, and perhaps if anything, possibly misleading from a cryptanalysis viewpoint. Further of course, it should be noted that varying from time to time or dynamically varying the number and identification of the rows to be non-linearized and which non-linearization technique is used further compounds the cryptanalysis problem, though such time varying or dynamically varying non-linearization is not that difficult from a hardware standpoint (or software standpoint, if done under software control) as the starting set of linear equations (which themselves may be varied from time to time or dynamically, as herein before described) may be generated from a simple and readily variable generating function, which set of equations may be non-linearized in both manner and extent utilizing logical processes, which manner and extent may each themselves be varied from time to time or dynamically.

As an example of the foregoing, attention is directed to the table on page A1 (Appendix A of Appendix 2 hereof) which provides the sixteen equations for the linear mapping of a four bit number or word to another four bit number or word utilizing a specific generating function. Note that these sixteen equations are organized in the manner indicated for the original equations on page 10 of Appendix 2. As noted on page A1, it is easily verified that the sum of any two of the sixteen equations on page A1 is another of the sixteen equations in accordance with the concept of linearity as used herein. This table on page A1 is non-linearized as described on page A8 and is presented in its non-linearized form on page A9 of Appendix 2. In particular, the non-linearization is in accordance with the first method, namely, utilizing three consecutive rows of the original set of equations (neglecting the null equation), plus the row representing the sum of the first three rows. In that regard, the sum modulo 2 of the first three non-zero numbers in column 1 (1001, 0001 and 0010) is equal to 1010, the value in the eleventh row of the non-zero equations. Thus rows one, two, three and eleven are non-linearized by adding modulo 2 $x_1 \oplus x_2$ to each of columns 1 and 2 thereof. To be more specific, $x_1$ equals 0001 and $x_2$ equals 0010, so that $x_1 \oplus x_2 = 0011$. Adding modulo 2 0011 to the first equation gives $1010 \oplus 0010 = 1000$ (1000 is the original value in column 3 for the first equation) as shown in the table on page A9. The same addition for the equations on lines 2, 3 and 11 carries out the transformation for these four lines. Similarly, if one adds lines 5, 6 and 7 of the non-zero equations, one obtains the equation of line 15 of the non-zero equations, the last non-zero equation shown on page A1. These four lines may be non-linearized in the same manner as lines one, two, three and eleven, noting however that the applicable equation is effectively now:

$$(x_5 \oplus x_6) \oplus (x_5 \oplus x_6) = \Theta \quad (10)$$

With respect to further non-linearization of the set of sixteen equations on page A9 of Appendix 2, there are two other series of three consecutive equations in the table, specifically, lines 8, 9 and 10 and 12, 13 and 14 which might be considered. The modulo 2 sum of lines 8, 9 and 10 however, provide line 3 of the non-zero equations, a line already used, and the modulo 2 sum of lines 12, 13 and 14 provide line 7, another line already used. Accordingly, while two additional groups of three consecutive lines or three consecutive equations exist, the same cannot be used for further non-linearization because the sum of either of the three is a line or equation which has already been non-linearized.

As another example, note the table set out at the top of page A4 of Appendix 2 hereof. This set of linear equations uses the same generating function but as applied to a new base (see the bottom of page A3 of Appendix 2), which when non-linearized using the same set of equations as in the previous example (equations 1, 2, 3, 5, 6, 7, 11 and 15) provides the nonlinear set of equations set forth on page A11 of Appendix 2.

As a third example, note the example described near the bottom of page A11, with the non-linearized equations shown on page A12. This example is an example of another non-linearization of the table of 15 equations (together with the null equation) presented on page A1 of Appendix 2, non-linearized using a different basis, specifically four successive (non-zero) equations 1, 2, 3 and 4 together with the sum of 1, 2 and 3, namely Equation 11, and the sum of equations 2, 3 and 4, namely Equation 12, together with the three successive equations 13, 14 and 15 and the sum thereof, Equation 8. The equations for non-linearizing four consecutive equations plus the two modulo 2 sum equations of course have been given before herein and are set out on page 10 of Appendix 2. In particular, three different equations are used, one for rows 1 and q, one for rows 2 and 3, and one for rows 4 and q+1. By way of example, taking row 1, zero is added to column 3 and $x_1 \oplus x_2$ is added modulo 2 to each of columns 1 and 2 (the modulo 2 sum of anything to itself equaling zero). Since $x_1 \oplus x_2 = 0011$, adding this to Equation 1 yields the equation $1010 \oplus 0010 = 1000$, the first non-zero equation in the non-linearized set of equations on page A12 of Appendix 2. For row 2 of the linear set of non-zero equations, $x_1 \oplus x_3$ is added to each of columns 1 and 2, namely $0001 \oplus 0100 = 0101$. Adding this to columns 1 and 2 of row 2 of the linear set of equations of page A1 yields the fifth non-zero equation in the set of equations on page A12. Finally, as an example of the use of the third equation for rows 4 and q+1, $x_2 \oplus x_3 = 0010 \oplus 0100 = 0110$. Adding this, for example, to columns 1 and 2 of row 4 of the linear non-zero equations yields row 2 of the non-zero equations in the non-linearized set of equations on page A12. Of course all six of the applicable rows must be modified in accordance with the non-linearization process. Thus, in this latter example, 10 of the equations are non-linearized instead of the 8 in the prior example, and of course the resulting mapping from column 1 to column 3 is generally quite different for the two sets of equations.

Finally, the non-linearized equations may be further modified by adding modulo 2 an offset to each of the first two columns. This, of course, is equivalent to adding the offset modulo 2 to itself which of course is 0 and therefore does not affect the numbers in the third column. By way of specific example, FIG. 17 presents the set of equations of the third example described above and shown on page A12 of Appendix 2 as modified by the addition of the offset 0101 to the first and second columns.

Figure 16:
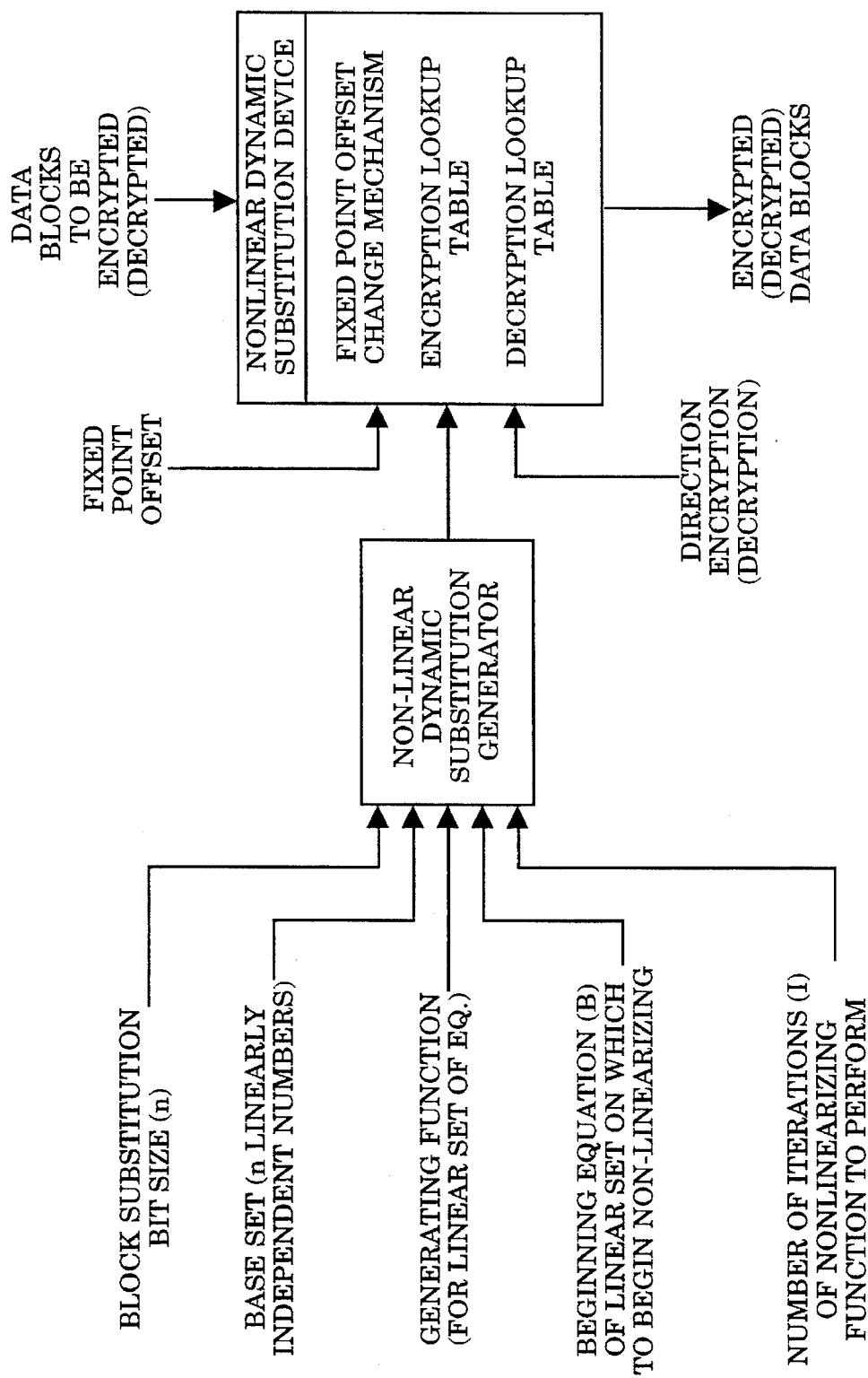
FIG. 16 is a block diagram of a system for encryption and decryption in accordance with the present invention.

FIG. 16 shows a block diagram of typical apparatus for encryption and decryption in accordance with the present invention of the great-parent application. As may be seen in FIG. 16, it is convenient to ultimately use a look-up table in the form of a read/write memory wherein the clear text data block or the encrypted text data block (both n bits long) is presented in parallel as the address to the memory with the data stored at the corresponding address corresponding to the encryption or decryption of the respective data block, respectively. For that purpose, it may be convenient to use a memory of twice the address space of that required for either encryption or decryption (e.g. n+1 address bits) so that the memory address range is one bit wider than the data block to be operated on. In this manner, one bit of the memory address may be used to designate whether the operation is to be an encryption or a decryption operation. By way a specific example, the most significant bit of the memory address might be 0 to indicate a decryption process or a 1 to indicate an encryption process, with the decryption data stored in the lower half of the address range of the memory and the encryption data stored in the upper address range of the memory. Thus both encryption and decryption may be done as desired by the look-up table by control of the single bit, and encryption or decryption of a block of n bits may be achieved in a single memory cycle.

Assuming that the mappings for encryption and decryption are to be changed periodically and/or dynamically, some method of altering the contents of the look-up table must be provided. While this could be done by specialized hardware, it is convenient to do the same by an appropriate processor under program control, as the alteration of the encryption and decryption schemes normally will occur far less frequently than the encryption and decryption process itself must be carried out. Accordingly, the same normally need not be accomplished with the same speed as encryption and decryption itself. Accordingly, the nonlinear dynamic substitution generator shown in FIG. 16 may operate under program control based on various inputs thereto. In particular, the equation for encryption may readily be generated under program control given certain basic information defining the same, such as by way of example the block substitution bit size (n), the base set of n linearly independent numbers, the generating function, the beginning equation of the linear set on which to begin non-linearizing, and the number of iterations of the non-linearizing function to perform.

Once the offset has been applied to the non-linearized equations, each number or block in column 3 is stored in the portion of the look-up table assigned to encryption at an address equal to the block in column 1 for the respective row. Thus, when a number or block in column 1 is applied as the address, the number read out of the memory is the number in column 3 for that row representing the respective encrypted block. For the decryption portion of the table, the process is reversed, in that the blocks in column 3 are used as memory addresses (more appropriately address portions, the full address including the address bit designating decryption) with the data stored at those addresses being the respective blocks in column 1. Thus, during decryption the memory is entered at the address defined by the encrypted block, with the data stored at the respective address being provided as the output corresponding to the associated clear text block. For convenience, detailed methods for encryption and decryption are set out in Appendix 3.

Obviously the encryption and decryption processes could be carried out entirely under program control, as both processes simply involve logical manipulations given certain (variable) starting information. However, the speed with which encryption and decryption could be carried out would be very grossly reduced, as the processor would wind up regenerating the same encryption and decryption equations over and over again. In comparison, the use of the look-up table allows a one time determination of the full set of encryption and decryption equations, which information for any data block to be encrypted or de-encrypted is continuously available in a single memory cycle until such time as the equations are to be changed.

III. MODIFICATIONS OF LINEAR ORTHOMORPHISMS

In this section, certain modifications to the linear orthomorphisms described above in sections I and II are provided.

Without loss of generality, and using $\theta$, the additive identity, as the fixed point, any maximal length orthomorphism can be written as a set of equations:

$$\begin{aligned}
\theta \oplus \theta &= \theta \\
x_m \oplus x_1 &= z_1 \\
x_1 \oplus x_2 &= z_2 \\
&\vdots \\
x_{k-1} \oplus x_k &= z_k \\
&\vdots \\
x_{m-1} \oplus x_m &= z_m
\end{aligned} \quad (11a)$$

where $m = 2^n - 1$. $R(x_{k-1}) = x_k$ and $S(x_{k-1}) = z_k$ are two of three possible mappings. By convention, $S(x)$ has been used as our cryptographic mapping or block substitution.

In the case of a linear orthomorphism, $\theta$, must be the fixed point, and if maximal, the representing equations take a very simple form:

$$\begin{aligned}
\theta \oplus \theta &= \theta \\
x_m \oplus x_1 &= x_{1-p} \\
x_1 \oplus x_2 &= x_{2-p} \\
&\vdots \\
x_{k-1} \oplus x_k &= x_{k-p} \\
&\vdots \\
x_{m-1} \oplus x_m &= x_{m-p}
\end{aligned} \quad (11b)$$

One can construct nonlinear orthomorphisms by suitably modifying the linear versions. Choose any n-bit number $w \neq \theta$ and consider the equation $w \oplus w = \theta$ as a vector. Add $w \oplus w = \theta$ vectorially to each of the equations representing the linear orthomorphism in Equation (11) to obtain:

$$\begin{aligned}
w \oplus w &= \theta \\
(x_m \oplus w) \oplus (x_1 \oplus w) &= x_{1-p} \\
(x_1 \oplus w) \oplus (x_2 \oplus w) &= x_{2-p} \\
&\vdots \\
(x_{k-1} \oplus w) \oplus (x_k \oplus w) &= x_{k-p} \\
&\vdots \\
(x_{m-1} \oplus w) \oplus (x_m \oplus w) &= x_{m-p}
\end{aligned} \quad (12)$$

Each column consists of all possible n-bit numbers and the mapping $S(x_{k-1} \oplus w) = x_{k-p}$ is affine. To be more generally nonlinear, the linear array of equations would have to be broken into subsets and modified in different ways. An individual equation from the ath row in the linear orthomorphism:

$$x_{a-1} \oplus x_a = x_{a-p} \tag{13}$$

must be modified to become:

$$x_{c-1} \oplus x_b = x_{a-p} \tag{14}$$

where $x_{c-1}$ occurs in the left column, row c, and $x_b$ occurs in the middle column, row b in the original linear orthomorphism. In this case:

$$w \equiv (x_{a-1} \oplus x_{c-1}) = (x_a \oplus x_b) \tag{15}$$

which is applied to transform the equation in row a in the same way as those in Equation 12.

The entire set of $2^n$ equations in the linear orthomorphism is corruptible, and from Equation (10), the smallest candidate for a corruptible set consists of three rows or equations. However, a linear orthomorphism containing a corruptible set of three equations may not be useful for cryptography because it would not be maximal.

Proposition 1:

It can be shown that a linear orthomorphism on $Z_2^n$ which has a corruptible set of three equations has a 3-cycle in the permutation which it represents.

The following analysis establishes the foregoing Proposition 1.

A corruptible set of three equations in a linear orthomorphism:

$$\begin{aligned} x_{a-1} \oplus x_a &= x_{a-p} \\ x_{b-1} \oplus x_b &= x_{b-p} \\ x_{c-1} \oplus x_c &= x_{c-p} \end{aligned} \tag{16}$$

can be shown by a matrix of indices:

$$\begin{pmatrix} a & a & a \\ b & b & b \\ c & c & c \end{pmatrix} \tag{17}$$

After non-linearization (corruption), only two matrices of indices are possible since the order of the rows is immaterial:

$$\begin{pmatrix} c & b & a \\ a & c & b \\ b & a & c \end{pmatrix} \text{ or } \begin{pmatrix} b & c & a \\ c & a & b \\ a & b & c \end{pmatrix} \tag{18}$$

Taking the matrix on the left, the corresponding corrupted equations are:

$$\begin{aligned} x_{c-1} \oplus x_b &= x_{a-p} \\ x_{a-1} \oplus x_c &= x_{b-p} \\ x_{b-1} \oplus x_a &= x_{c-p} \end{aligned} \tag{19}$$

Any two equations with indices a and D can be selected but there are three conditions on equation c which may be conflicting. In what follows, it is assumed that such an equation exists in the linear array. Since the linear array of equations is a group, there exists a fourth equation in the group of index d which is the sum of the original three:

$$x_d = x_a \oplus x_b \oplus x_c \tag{20}$$

and $$x_{d-1} \oplus x_d = x_{d-p}. \tag{21}$$

These four equations in the linear array form a coset derived from a subgroup of order 4 in the linear array. The sub-group can be found by adding one of the four equations in the coset to the other three, e.g., equation a to obtain:

$$\begin{aligned} \theta \oplus \theta &= \theta \\ (x_{a-1} \oplus x_{b-1}) \oplus (x_a \oplus x_b) &= (x_{a-p} \oplus x_{b-p}) \\ (x_{a-1} \oplus x_{c-1}) \oplus (x_a \oplus x_c) &= (x_{a-p} \oplus x_{c-p}) \\ (x_{b-1} \oplus x_{c-1}) \oplus (x_b \oplus x_c) &= (x_{b-p} \oplus x_{c-p}) \end{aligned} \tag{22}$$

Using Equation 19, the subgroup becomes:

$$\begin{aligned} \theta \oplus \theta &= \theta \\ (x_{a-1} \oplus x_{b-1}) \oplus (x_a \oplus x_b) &= (x_{a-p} \oplus x_{b-p}) \\ (x_a \oplus x_b) \oplus (x_{a-p} \oplus x_{b-p}) &= (x_{a-1} \oplus x_{b-1}) \\ (x_{a-p} \oplus x_{b-p}) \oplus (x_{a-1} \oplus x_{b-1}) &= (x_a \oplus x_b) \end{aligned} \tag{23}$$

The last three equations appear consecutively in the normalized form of the linear array (Equation 19) and form a 3-cycle. If the other matrix of indices is used, the left and middle columns can be interchanged, still maintaining equality and the same result is obtained.

The foregoing proposition also follows recognition that in a maximal linear array of block size n, any n consecutive rows are linearly independent. Since a subgroup of order 4 cannot have three linearly independent rows, the array cannot be maximal.

Now, considering a coset of four rows a, b, c, and d and modifying the first three as above, the result is:

$$\begin{aligned} x_{c-1} \oplus x_b &= x_{a-p} \\ x_{a-1} \oplus x_c &= x_{b-p} \\ x_{b-1} \oplus x_a &= x_{c-p} \\ x_{d-1} \oplus x_d &= x_{d-p} \end{aligned} \tag{24}$$

Comparing Equation 24 with the linear version (Equation 11), the following mixing transformations can be derived:

$$\begin{aligned} w_a &= x_{a-1} \oplus x_{c-1} = x_a \oplus x_b \\ w_b &= x_{a-1} \oplus x_{b-1} = x_b \oplus x_c \\ w_c &= x_{b-1} \oplus x_{c-1} = x_a \oplus x_c \\ w_d &= \Theta \end{aligned} \tag{25}$$

Since $w_c = w_a \oplus w_b$, the set of mixing transformations $\{\theta, w_a, w_b, w_c\}$ is a group.

Any three consecutive rows plus their sum constituted a corruptible set (see Appendix II, section 3.2). This is generalized to taking any two non-zero rows (see Appendix IV, section II):

$$\begin{aligned} x_{a-1} \oplus x_a &= x_{a-p} \\ x_{b-1} \oplus x_b &= x_{b-p} \end{aligned} \tag{26}$$

Finding the third row c, specified by:

$$x_{c-1} \oplus x_{a-p} = x_b \tag{27}$$

and, the fourth row d, specified by:

$$x_d = x_a \oplus x_b \oplus x_c \tag{28}$$

Thus, any two arbitrarily selected non-zero rows in the linear orthomorphic array of equations specify two corruptible sets of four equations. The second of these sets is specified by selecting the third row c by:

$$x_{c-1} \oplus x_a = x_{b-p} \tag{29}$$

In either, as shown in Appendix IV, the mixing transformation $w \equiv x_a \oplus x_b$ transforms this set of four equations into a 4-equation segment of a nonlinear orthomorphism. The original four equations are clearly the relative complement of a subgroup of order 4, or equivalently, a coset derived from such a subgroup. As in Proposition 1 above, the subgroup can be derived by adding one of the four equations to each of them, e.g., row a:

$$\begin{aligned}
\theta &\oplus \theta &= \theta \\
(x_{a-1} \oplus x_{b-1}) &\oplus (x_a \oplus x_b) &= x_{a-p} \oplus x_{b-p} \\
(x_{a-1} \oplus x_{c-1}) &\oplus (x_a \oplus x_c) &= x_{a-p} \oplus x_{c-p} \\
(x_{a-1} \oplus x_{d-1}) &\oplus (x_a \oplus x_d) &= x_{a-p} \oplus x_{d-p}
\end{aligned} \quad (30)$$

In the first case, since $x_{a-1} \oplus x_{c-1} = x_a \oplus x_b$, the second and third equations are consecutive in the linear array. A similar result holds in the second case. Thus, the process of finding four corruptible equations reduces to finding any coset in the coset decomposition of $Z_2^n \times Z_2^n \times Z_2^n$ defined by a sub-group of order 4 with two consecutive rows. More generally, let $G^n = Z_2^n \times Z_2^n \times Z_2^n$ be a maximal linear orthomorphism and let $G_0^k = L_k \times M_k \times R_k$ be a subgroup of order $2^k$. The subgroup has the form:

$$\begin{aligned}
L_k \quad & M_k \quad & R_k \\
\theta \oplus & \theta \quad & = \theta \\
x_{i_1-1} \oplus & x_{i_1} \quad & = x_{i_1-p} \\
& \cdot \\
& \cdot \\
& \cdot \\
x_{i_s-1} \oplus & x_{i_s} \quad & = x_{i_s-p}
\end{aligned} \quad (31)$$

where $s = 2^k - 1$. A coset can be formed by taking any row in $G^n \backslash G_0^k$, e.g., $x_{a-1} \oplus x_a = x_{a-p}$ and adding it to each row of $G_0^k$ to obtain:

$$G_a^k = (x_{a-1}L_k) \times (x_a M_k) \times (x_{a-p} R_k) \quad (32)$$

where $x_a M_k = \{x_a \oplus x_i | x_i \in M_k\}$. If $w$ is a mixing transformation and row $i$ is in $G_a^k$, then:

$$(x_{i-1} \oplus w) \oplus (x_i \oplus w) = x_{i-p} \quad (33)$$

$x_{i-1} \in x_{a-1} L_k$ and $x_i \in x_a M_k$. (See Appendix IV, section II). It must also be true that $x_{i-1} \oplus w \in x_{a-1} L_k$ and $x_i \oplus w \in x_a M_k$. This occurs if and only if $w \in L_k \cap M_k$. Similarly, if row $i$ is in $G_0^k$, since in that case $x_{i-1} \in L_k$ and $x_i \in M_k$. The group of mixing transformations determined by $G_a^k$ is $W_k = L_k \cap M_k$. In some circumstances $W_k = \{\theta\}$ and no constructive corruption is possible. The foregoing will be described further in Section IV, below.

There are corruptible sets which are not cosets or relative complements of subgroups. For example, a corruptive set is generated by taking four consecutive equations plus the sum of the first three and last three:

$$\begin{aligned}
x_m \oplus x_1 &= x_{1-p} \\
x_1 \oplus x_2 &= x_{2-p} \\
x_2 \oplus x_3 &= x_{3-p} \\
x_3 \oplus x_4 &= x_{4-p} \\
x_{q-1} \oplus x_q &= x_{q-p} \\
x_q \oplus x_{q+1} &= x_{q+1-p}
\end{aligned} \quad (34)$$

where $x_q = x_1 \oplus x_2 \oplus x_3$, etc., and the mixers are $w_1 = x_1 \oplus x_2$, $w_2 = x_1 \oplus x_3$, and $w_3 = w_1 \oplus w_2$. (See Appendix II, section 3.3) Two more rows can be added using:

$$\begin{aligned}
x_e &= x_1 \oplus x_3 \oplus x_4 \\
x_f &= x_1 \oplus x_2 \oplus x_4
\end{aligned} \quad (35)$$

The resulting eight equations constitute a coset which can easily be shown to be derived from a subgroup of order 8 with one set of three consecutive rows and one set of two consecutive rows.

While constructive corruption provides nonlinear segments which can be assembled to form a nonlinear orthomorphism, an issue arises as to whether or not there are some nonlinear which cannot be obtained this way.

Proposition 2:

In general, any maximal length nonlinear orthomorphism can be derived from a linear (automorphic) orthomorphism by the process of constructive corruption.

The foregoing proposition is established by the following analysis. Without loss of generality, it can be assumed that $\theta$ is the fixed point. The normalized form for any maximal length nonlinear orthomorphism is shown in Equation 11a. The $n$-bit numbers in the right column can be permuted so that the new order of permutation is a linear orthomorphism:

$$(\theta)(z_1, z_2, \ldots, z_m) \to (\theta)(u_1, u_2, \ldots, u_m) \quad (36)$$

This can be done many ways by applying a linear generating function, i.e., primitive polynomial, to a complete linearly independent set of the $Z_i$. Thus, $u_i = z_j$ where $i = f(j)$ represents the permutation above. This same permutation can be applied to the array of equations in Equation 11a without changing the nonlinear orthomorphic mapping $S(x_{k-1}) = z_k$. However, the $\{u_i\}$ permutation now defines a linear orthomorphism. The net result is a dual set of $m = 2^n - 1$ equations of the form:

$$x_{j-1} \oplus x_j = z_j = u_i = u_{i+p-1} \oplus u_{i+p} \quad (37)$$

The corresponding mixing transformations are:

$$w_i = u_{i+p-1} \oplus x_{j-1} = \oplus x_j \quad (38)$$

The principal results of the foregoing analysis are that coset decomposition using special subgroups is an effective and methodical means of finding candidates for piece wise non-linearization and that no class of nonlinear orthomorphisms is overlooked using such a technique. The next section provides analysis for determining what size pieces to corrupt and how to assemble the pieces into a nonlinear orthomorphism with desirable properties for cryptography.

IV. CONSTRUCTION OF COMPLETE NONLINEAR ORTHOMORPHISMS

Section III described how to find pieces of a linear orthomorphism (corruptible sets of equations) which can be non-linearized among themselves. The present section describes how to assemble the pieces into a complete nonlinear orthomorphism of $2^n - 1$ equations. This section further describes what constitutes a good nonlinear orthomorphism and a good non-linear substitution. At one extreme, one could modify a coset of order 4, leaving the remaining $2^n - 4$ equations unmodified. At the other extreme, one could modify all $2^n$ equations with a single mixing transformation. Neither a piece wise linear nor an affine mapping would be satisfactory. For any mapping $S$ an evaluation can be made of the following:

$$N(x,y) \equiv S(x) \oplus S(y) \oplus S(x \oplus y) = ? \quad (39)$$

If $S$ is an affine mapping, the sum of Equation 39 will be some fixed number $c$ for all pairs $x$, $y$, and $c = \theta$ if $S$ is linear. Thus, a natural measure of non-linearity would be the range and distribution of $N(x,y)$.

Proposition 3:

It can be established that, for a subgroup of order $2^k$ in a maximal length linear orthomorphism, the order of the corresponding group of mixing transformations, $W_k$, will be: $2^{2k-n} \leq |W_k| \leq 2^{k-1}$ The foregoing proposition is established by the following analysis. The subgroup of the orthomorphism is $G_0^k = L_k \times M_k \times R_k$ where $L_k$, $M_k$ and $R_k$ are subgroups of $Z_2^n$, each of order $2^k$. $W_k = L_k \cap M_k$. If $|W_k| = 2^k$, then $L_k = M_k$ implying that $G_0^k$ is a cycle in the orthomorphism. Since it is maximal, $|W_k| \leq 2^{k-1}$. $L_k$ and $M_k$ each have a set of k linearly independent numbers, respectively denoted $\{x_1, x_2, \ldots, x_k\} \in L_k$ and $\{x_{k+1}, x_{k+2}, \ldots, x_{2k}\} \in M_k$. (These indices here do not refer to rows as in Equation 11.) There are at most n linearly independent numbers in any subset of $Z_2^n$. So, if $2k > n$, there is a subset of $2k-n$ numbers in $\{x_1, \ldots, x_k, x_{k+1}, \ldots, x_{2k}\}$ dependent on the others. Without loss of generality, one can assume that $\{x_{k+1}, x_{k+2}, \ldots, x_n\}$ are independent of $\{x_1, \ldots, x_k\}$. The remaining numbers $\{x_{n+1}, \ldots, x_{2k}\}$ must be dependent on $\{x_1, \ldots, x_k\} \in L_k$. There are $2k-n$ such numbers, independent of each other, and so, $\{x_{n+1}, \ldots, x_{2k}\} \in L_k \cap M_k$.

An immediate corollary of the foregoing is that if a subgroup $G_0^k$ of a maximal linear orthomorphism $G^n$ has order $$\left| G\frac{k}{0} \right| > 2^{\frac{n}{2}},$$

then $G_0^k$ and its cosets are corruptible.

A coset of order $2^k$ is termed "completely corruptible" if the corresponding group of mixing transforms is of order $2^{k-1}$.

Let $G^n$ be a set of $2^n$ equations representing a linear orthomorphism on $Z_2^n$. Let $G_0^k$ be the subgroup of $G^n$ consisting of $2^k$ equations as in Equation 31. Assume that $|W_k| = 2^{k-1}$. With the foregoing assumptions and definitions, a coset decomposition takes the form:

$$G^n = G_0^k + G_1^k + \ldots + G_c^k \tag{40}$$

where $c = 2^{n-k} - 1$ and where $G_i^k$ is a coset derived by adding equations (vectors) $x_{i-1} \oplus x_i = x_{i-p}$ to each of the $2^k$ equations in $G_0^k$. Each successive equation must not have appeared in $G_0^k$ or any of the preceding cosets in the decomposition. For practical purposes, decomposition into corruptible sets is desired. Each of these cosets will have the same group of mixing transforms available.

A maximal subgroup of equations representing a linear orthomorphism can be broken into disjoint subsets which are transformable into a nonlinear orthomorphism by consecutive steps. (See Appendix IV). This can be generalized to any completely corruptible coset.

Practical problems in constructive corruption are the choice of the size of the set of equations in the linear orthomorphic array to be non-linearized and the method of assigning mixing transforms without conflict. If $G_0^k = L_k \times M_k \times R_k$ is a sub-group of the array of equations of order $2^k$, and if it is completely corruptible, the order of the set of mixing transforms is $|W_k| = 2^{k-1}$. Any coset $G_i^k$ is obtained by vectorially adding some equation $x_{i-1} \oplus x_i = x_{i-p}$, which is not in $G_0^k$, to all equations in $G_0^k$. This coset can be corrupted by applying some or all of the mixing transforms in $W_k$. If only one $w \in W_k$ is used, the result is an affine set. If one attempts to use all the w's, there is a problem of assigning the w's without conflict. One can always take a completely corruptible subgroup $G_0^{k-1} \subset G_0^k$, and divide $G_i^k$ into two cosets of $G_0^{k-1}$, $G_i^{k-1} \cup G_j^{k-1} = G_i^k$, and then corrupt these two smaller cosets separately. The problem is that the order of the set of mixing transforms $|W_{k-1}|$ is $2^{k-2}$, so that there are only half as many mixing transforms available as the number of equations to which they are applied. In the limit for $k=2$ and cosets of order 4, $W_2 = \{0, w\}$, and so, there is just one mixing transform that can be applied to all $2^{n-2} - 1$ cosets. In what follows, a method is provided for finding a subset of a coset $G_i^k = L_k \times M_k \times R_k$ derived from the sub-group $G_0^k = L_k \times M_k \times R_k$, such that the numbers in the left and middle columns of the subset can be combined among themselves but with their sums ranging over all of $\overline{R_k}$, the right column.

The method simplifies the assignment of multiple mixing transformations to an orderly process rather than by "cut and try" methods (see Appendix II, section 5). Appendix IV, pages 17—17 outlines a method for maximal subgroups. The following generalizes this process to subgroups of all orders $|G_0^k| = 2^k$ for $k \leq n-1$. The method seeks to find subgroups that act like maximal subgroups.

Proposition 4:

It can be established that a completely corruptible subgroup of order $2^k$ has k consecutive rows of equations from the complete array of equations representing the maximal linear orthomorphism.

The foregoing proposition is established by the following analysis. Let $G_0^k$ be a completely corruptible subgroup of order $2^k$. Then $|W_k| = 2^{k-1}$ by definition $G_0^k$ has a maximal set of k linearly independent equations. $W_k$ has maximal linearly independent sets of $k-1$ numbers. It is desirable to find the set with the largest collection of consecutive numbers from columns L or M in the complete linear array. If there are $k-1$ such numbers $x_a, x_{a+1}, \ldots, x_{a+k-2}$, the numbers correspond to the following rows in $G_0^k$ which are k consecutive rows:

$$x_{a-1} \oplus x_a = x_{a-p} \tag{41}$$

$$x_a \oplus x_{a+1} = x_{a+1-p}$$

$$\cdot$$
$$\cdot$$
$$\cdot$$

$$x_{a+k-2} \oplus x_{a+k-1} = x_{a+k-1-p}$$

If there are less than $k-1$ consecutive numbers in the set of $k-1$ linearly independent numbers, the numbers can be collected into smaller sets of consecutive numbers. The largest such set is $x_a, x_{a+1}, \ldots, x_{a+k_a-2}$; the second largest set is $x_b, x_{b+1}, \ldots, x_{b+k_b-2}$, etc, until a set of $k-1$ independent numbers in $W_k$ is assembled with $(k_a-1)+(k_b-1)+\ldots = k-1$. Each such set defines a set of equations in $G_0^k$, all consecutive, of the form:

$$x_{a-1} \oplus x_a = x_{a-p} \tag{42}$$

$$x_a \oplus x_{a+1} = x_{a+1-p} \quad k_a \text{ equations}$$

$$\cdot$$
$$\cdot$$
$$\cdot$$

$$x_{a+k_a-2} \oplus x_{a+k_a-1} = x_{a+k_a-1-p}$$

$$x_{b-1} \oplus x_b = x_{b-p} \quad k_b \text{ equations}$$

$$\cdot$$
$$\cdot$$
$$\cdot$$

$$x_{b+k_b-2} \oplus x_{b+k_b-1} = x_{b+k_b-1-p}$$

etc.

The $k_a + k_b + \ldots > k$ individual equations of Equation 42 are linearly independent since the x's are linearly independent. Thus $|G_0^k| > 2^k$, represents a contradiction.

Completely corruptible subgroups and cosets are not only useful for deriving nonlinear orthomorphisms but as will be shown below also affect the structure of smaller subgroups.

Proposition 5:

It can be established that, for any completely corruptible subgroup of order $2^k$, where $k \geq 4$, each subgroup of order $2^{k-1}$ is corruptible.

The foregoing proposition is proved by the following: Let $G_0^k$ be such a completely corruptible subgroup. By Prop. 4, $G_0^k$ has k consecutive equations from the complete orthomorphic array. It also has another set of k−1 consecutive equations which are sums of adjacent pairs of the k consecutive equations, since the latter are a set of generators of $G_0^k$. There is a sequence of successively smaller k-tuples of consecutive rows. The indices of the sequence are provided in Table I:

TABLE I

| | Consecutive Rows | |
|---|---|---|
| k | k − 1 | k − 2 |
| 1 | b | c |
| a + 1 | b + 1 | c + 1 |
| a + 2 | b + 2 | c + 2 etc → |
| . | . | . |
| . | . | . |
| . | . | . |
| a + k − 1 | b + k − 2 | c + k − 3 | where $x_a \oplus x_{a+1} = x_b$ and $x_b \oplus x_{b+1} = x_c$, etc.

Since k≥4, there are at least four consecutive a rows, three b's, and two c's. The three consecutive sets of k−1 rows:

$$(a, a+1, \ldots, a+k-2), \quad (43)$$
$$(a+1, a+2, \ldots, a+k-1),$$
and
$$(b, b+1, \ldots, b+k-2)$$

are linearly independent sets and can be used to generate a $G_0^{k-1}$ with k−1 consecutive rows. In a like manner, (b,a+2, a+3,...,a+k−1) would generate $G_0^{k-1}$ with k−2 consecutive rows, noting that $x_b$ is independent of $x_{a+2}, \ldots, x_{a+k-1}$. To ensure that $G_0^{k-1}$ is not corruptible, it would be necessary to eliminate all pairs from the above indices. If one eliminates all but one of the a's, e.g., a thru a+k−2, then $x_a, \ldots, x_{a+k-2}$ define rows which will be in the relative complement $\overline{G}_0^{k-1} = G_0^k \backslash G_0^{k-1}$, but $x_a \oplus x_{a+1} = x_b$, etc. At the least k/2 or $$\frac{k-1}{2}$$

of the b's must also be eliminated. Thus, some additive triple would be in $\overline{G}_0^{k-1}$, a contradiction for a complement. Depending on whether k is even or odd, k/2 or $$\frac{k-1}{2}$$

alternate a rows could also be left to the subgroup complement, but $x_a + x_{a+2} = x_c$, etc. Again, to eliminate the consecutive rows with c indices, some of such rows would be in the complement, thus resulting in triple sums.

For n≥5, this implies that any subgroup of order $2^{n-2}$ is corruptible, and, of course, by Prop. 4, any subgroup of order $2^{n-1}$ is completely corruptible.

Proposition 6:

Any maximal orthomorphism on $Z_2^3$ is linear or affine.

The forgoing proposition is established by the following: A nonlinear orthomorphism can be derived by constructive corruption from a linear one. If one applies $w \oplus w = \theta$ vectorially to all eight rows, where $w \neq \theta$, the mapping becomes affine. Since the orthomorphism has no 3 cycle, the smallest corruptible coset has order 4.

Let $G^3 = Z_2^3 \times Z_2^3 \times Z_2^3$ be the orthomorphism and $G^2 \cup \overline{G}^2 = G^3$ be a corruptible subgroup with corresponding single coset (complement). Because $|G^2| = 2^2$, $W = \{\theta, w\}$ where w is the single nontrivial mixer. If $S(x) = z$ is the original linear mapping, then $S'(x \oplus w) \equiv S(x)$ on the coset, and $S'(y) \equiv S(y)$ on the subgroup. $w \in G^2$, so $S'(w) = S(w)$. $x \in \overline{G}_2$, so does $x \oplus w \in \overline{G}^2$. $S'(x) = S'(x \oplus w \oplus w) = S(x \oplus w) = S(x) \oplus S(w)$. There are three cases:

a. $x, y \in G^2$. $x \oplus y \in G^2$. (44)
Also, $S'(x) \oplus S'(y) \oplus S'(x \oplus y)$
$= S(x) \oplus S(y) \oplus S(x \oplus y)$
$= \theta$.

b. $x, y \in \overline{G}^2$. $x \oplus y \in G^2$. (45)
Also, $S'(x) \oplus S'(y) \oplus S'(x \oplus y)$
$= S(x) \oplus S(w) \oplus S(y) \oplus S(w) \oplus S(x \oplus y)$
$= \theta$ c. $x \in G^2$ and $y \in \overline{G}^2$. (46)
Then $x \oplus y \in \overline{G}^2$
$S'(x) \oplus S'(y) \oplus S'(x \oplus y)$
$= S(x) \oplus S(y) \oplus S(w) \oplus S(x \oplus y) \oplus S(w) = \theta$ The same result holds for any block size if the complement of a maximal subgroup is corrupted with a single mixing transformation. The next step is to further refine the process of constructive corruption by finding completely corruptible subgroups which have the additional property that pairs of cosets or subsets thereof can be modified with minimum interaction, even though using the full group of mixing transforms.

Proposition 7:

It can be established that any completely corruptible coset $G_i^k$ of order $2^k$, k>2, in the group of equations representing a maximal linear orthomorphism on $Z_2^n$, can be divided into two cosets of order $2^{k-1}$ such that the numbers in the left and middle columns of each such smaller coset can be rearranged among themselves but the resulting sums will be distributed over the entire column of the parent coset $G_i^k$.

The foregoing proposition is proven by the following: The completely corruptible subgroup $G_0^k$ and coset $G_i^k$ can be represented as follows:

| $L_k$ | | $M_k$ | | $R_k$ | (47) |
|---|---|---|---|---|---|
| $\theta$ | $\oplus$ | $\theta$ | = | $\theta$ | |
| $x_{i_1} - 1$ | $\oplus$ | $x_{i_1}$ | = | $x_{i_1-p}$ | |
| | | . | | . | $G_0^k$ |
| | | . | | . | |
| | | . | | . | |
| $x_{i_s} - 1$ | $\oplus$ | $x_{i_s}$ | = | $x_{i_s-p}$ | |
| $\overline{L}_k$ | | $\overline{M}_k$ | | $\overline{R}_k$ | |
| $x_{j_1} - 1$ | $\oplus$ | $x_{j_1}$ | = | $x_{j_1-p}$ | |
| | | . | | . | $G_i^k$ |
| | | . | | . | |
| | | . | | . | |
| $x_{j_t} - 1$ | $\oplus$ | $x_{j_t}$ | = | $x_{j_t-p}$ | | where $s = 2^k - 1$ and $t = 2^k$. If $G_0^k$ is not a maximal subgroup, then:

$$L_k \cup \overline{L}_k \neq M_k \cup \overline{M}_k \neq R_k \cup \overline{R}_k \neq Z_2^n. \quad (48)$$

By Prop. 4, since the subgroup $G_0^k$ of order $2^k$ is completely corruptible, it contains a set of k consecutive rows or equations from the full orthomorphic set of equations. These k rows are a linearly independent set. The subgroup generated by taking all even sums of these k rows is a subgroup $G_0^{k-1}$ of order $2^{k-1}$, $G_0^{k-1} \subset G_0^k$, with columns $L_{k-1} \subset L_k$, $M_{k-1} \subset M_k$ and $R_{k-1} \subset R_k$. $L_{k-1} \subset R_k$ and $M_{k-1} \subset R_k$ since the same sums of numbers will occur within $L_{k-1}$ and $M_{k-1}$ and between $L_{k-1}$ and $M_{k-1}$. Since the orthomorphism is maximal, there are no proper cycles and, thus, $L_{k-1} \neq R_{k-1}$ and $M_{k-1} \neq R_{k-1}$. So, $L_{k-1} \cap R_k \backslash R_{k-1}$ and $M_{k-1} \cap R_k \backslash R_{k-1}$ are not empty, where $R_k \backslash R_{k-1}$ is the set of numbers in $R_k$ but not in $R_{k-1}$. Since $L_{k-1}$ and $M_{k-1}$, are subgroups of $R_k$, for any $x \in L_{k-1}$ and $y \in M_{k-1}$, $x \oplus y \in R_k$. Some such sums must be in $R_k \backslash R_{k-1}$ because, e.g., if $x \in L_{k-1} \cap R_k \backslash R_{k-1}$, then $x \oplus \theta \in R_k$. Thus, any rearrangement of pairs of numbers in $L_{k-1}$ and $M_{k-1}$ will yield corrupted equations in $L_{k-1} \times M_{k-1} \times R_k$.

$G_l^k$ can be divided into two distinct cosets of $G_0^{k-1}$, $G_a^{k-1} \cup G_b^{k-1} = G_l^k$. Consider one of the cosets $G_a^{k-1}$. It is obtained by adding vectorially some equation $x_{a-1} \oplus x_a = x_{a-p}$ to all equations in $G_0^{k-1} = L_{k-1} \times M_{k-1} \times R_{k-1}$. The coset $G_a^{k-1}$ can be expressed as a direct product of three cosets in $Z_2^n$, i.e.:

$$G_a^{k-1} = (x_{a-1} L_{k-1}) \times (x_a M_{k-1}) \times (x_{a-p} R_{k-1}) \quad (49)$$

Thus, if $u \in x_{a-1} L_{k-1}$ and $v \in x_a M_{k-1}$, where $u = x_{a-1} \oplus x$ and $v = x_a \oplus y$ for some $x \in L_{k-1}$ and $y \in M_{k-1}$, then by the first part of the proof, $x \oplus y = z \in R_{k-1}$. Correspondingly:

$$\begin{aligned} u \oplus v &= (x_{a-1} \oplus x) \oplus (x_a \oplus y) \\ &= (x_{a-p} \oplus z) \in x_{a-p} R_{k-1} \end{aligned} \quad (50)$$

So, for any pair of numbers, u,v where $u \in x_{a-1} L_{k-1}$ and $v \in x_a M_{k-1}$ there exists a $w \in x_{a-p} R_{k-1}$ such that $u \oplus v = w$. The same holds for the other coset $G_b^{k-1}$.

As an example of the foregoing, non-linearization method consider a block size 8 maximal length linear orthomorphism defined by the generating function $x_k = x_{k-8} \oplus x_{k-6} \oplus x_{k-3} \oplus x_{k-2}$. Let {A,B,C,D,E,F,G,H} be a complete, linearly independent set of 8-bit binary numbers where each letter represents an 8-bit binary number, and in particular, $A = X_1$, $B = X_2$, ..., $H = X_8$. For convenience and compactness, notation ABC stands for $A \oplus B \oplus C$. Applying the generating function to the above complete linearly independent set in that order will define the $2^8 = 256$ equations or rows representing the orthomorphism. For example, $X_9 = X_1 \oplus X_3 \oplus X_6 \oplus X_7 = A \oplus C \oplus F \oplus G = ACFG$. These, in part, are:

| | | | | | | (51) |
|---|---|---|---|---|---|---|
| 0 | θ | ⊕ | θ | = | θ | |
| 1 | BEFH | ⊕ | A | = | ABEFH | |
| 2 | A | ⊕ | B | = | AB | |
| 3 | B | ⊕ | C | = | BC | |
| 4 | C | ⊕ | D | = | CD | |
| 5 | D | ⊕ | E | = | DE | |
| 6 | E | ⊕ | F | = | EF | |
| 7 | F | ⊕ | G | = | FG | |
| 8 | G | ⊕ | H | = | GH | |
| 9 | H | ⊕ | ACFG | = | ACFGH | |
| . | | | | | | |
| . | | | | | | |
| 254 | BCDEH | ⊕ | ADEG | = | ABCGH | |
| 255 | ADEG | ⊕ | BEFH | = | ABDFGH | |

The orthomorphic mapping used for encryption is for example, $S(D) = DE$ from row 5. For simplicity, choose a subgroup $G_0^3$ of order 8 defined by eight equations:

| | $L_3$ | | $M_3$ | | $R_3$ | (52) |
|---|---|---|---|---|---|---|
| 0 | θ | ⊕ | θ | = | θ | |
| 2 | A | ⊕ | B | = | AB | |
| 3 | B | ⊕ | C | = | BC | |
| 4 | C | ⊕ | D | = | CD | $G_0^3$ |
| 176 | ABC | ⊕ | BCD | = | AD | |
| 213 | AC | ⊕ | BD | = | ABCD | |
| 235 | AB | ⊕ | BC | = | AC | |
| 236 | BC | ⊕ | CD | = | BD | |

One can read off the mixing transforms $W_3 = \{\Theta, B, C, BC\}$ from $W_3 = L_3 \cap M_3$. $|W_3| = 2^2 = 4$, so $G_0^3$ is completely corruptible. Now, one can construct a coset, e.g., using row 6:

| | $\bar{L}_3$ | | $\bar{M}_3$ | | $\bar{R}_3$ | (53) |
|---|---|---|---|---|---|---|
| 6 | E | ⊕ | F | = | EF | |
| 169 | AE | ⊕ | BF | = | ABEF | |
| 155 | BE | ⊕ | CF | = | BCEF | |
| 215 | CE | ⊕ | DF | = | CDEF | $G_6^3$ |
| 91 | ABCE | ⊕ | BCDF | = | ADEF | |
| 95 | ACE | ⊕ | BDF | = | ABCDEF | |
| 121 | ABE | ⊕ | BCF | = | ACEF | |
| 209 | BCE | ⊕ | CDF | = | BDEF | |

One example of a corruptible subgroup of order 4, $G_0^2$ is:

| | $L_2$ | | $M_2$ | | $R_2$ | (54) |
|---|---|---|---|---|---|---|
| 0 | θ | ⊕ | θ | = | θ | |
| 2 | A | ⊕ | B | = | AB | |
| 3 | B | ⊕ | C | = | BC | |
| 235 | AB | ⊕ | BC | = | AC | |

$W_2 = \{\Theta, B\}$. From this $G_6^3$ can be decomposed into two cosets:

| 6 | E | ⊕ | F | = | EF | (55) |
|---|---|---|---|---|---|---|
| 169 | AE | ⊕ | BF | = | ABEF | |
| 155 | BE | ⊕ | CF | = | BCEF | |
| 121 | ABE | ⊕ | BCF | = | ACEF | | and

| 215 | CE | ⊕ | DF | = | CDEF | |
|---|---|---|---|---|---|---|
| 91 | ABCE | ⊕ | BCDF | = | ADEF | |
| 95 | ACE | ⊕ | BDF | = | ABCDEF | |
| 209 | BCE | ⊕ | CDF | = | BDEF | |

Using this coset decomposition, the only nontrivial mixing transform that can be used on the separate cosets is B.

Now, applying Prop. 7 to the k=3 consecutive rows in $G_0^3$, one obtains a different subgroup which is also completely corruptible:

| | $L_2$ | | $M_2$ | | $R_2$ | (56) |
|---|---|---|---|---|---|---|
| 0 | θ | ⊕ | θ | = | θ | |
| 213 | AC | ⊕ | BD | = | ABCD | |
| 235 | AB | ⊕ | BC | = | AC | |
| 236 | BC | ⊕ | CD | = | BD | |

Unlike the sub-group in Equation 53, here $L_2 \subset R_3$ and $M_2 \subset R_3$ gives a different coset decomposition of $G_6^3$:

|     | $\overline{L}_3$ | | $\overline{M}_3$ | | $\overline{R}_3$ | | (57) |
|-----|------|---|------|---|------|---|------|
| 6   | E    | ⊕ | F    | = | EF   | | |
| 95  | ACE  | ⊕ | BDF  | = | ABCDEF | | |
| 121 | ABE  | ⊕ | BCF  | = | ACEF | $G_6^2$ | |
| 209 | BCE  | ⊕ | CDF  | = | BDEF | | | and

|     |      |   |      |   |      |   | (58) |
|-----|------|---|------|---|------|---|------|
| 169 | AE   | ⊕ | BF   | = | ABEF | | |
| 155 | BE   | ⊕ | CF   | = | BCEF | | |
| 215 | CE   | ⊕ | DF   | = | CDEF | $G_{91}^2$ | |
| 91  | ABCE | ⊕ | BCDF | = | ADEF | | |

From Prop. 7 when constructive corruption is applied, $G_6^2$ and $G_{91}^2$ will be closed in $\overline{L}_3$ and $\overline{M}_3$ but not in $\overline{R}_3$, that is, for example, no number in $\overline{L}_3$ of $G_6^2$ will be combined with number from $\overline{M}_3$ in $G_{91}^2$. This information can be used to employ varied mixing transforms without conflict. See Table II.

TABLE II

|  |  | $G_6^2$ | | | | $\overline{M}_3$ | $G_{91}^2$ | | | |
|---|---|---|---|---|---|---|---|---|---|---|
|  | Row #'s | Row 6 | Row 95 | Row 121 | Row 209 | Row 91 | Row 155 | Row 169 | Row 215 |
| $\overline{L}_3$ | 6 | 6/θ | 209/BC | 155/B | 215/C | | | | |
|  | 95 | 121/BC | 95/θ | 169/C | 91/B | | | | |
| $G_6^2$ | 121 | 169/B | 91/C | 121/θ | 95/BC | | | | |
|  | 209 | 155/C | 215/B | 6/BC | 209/θ | | | | |
|  | 91 | | | | | 91/θ | 169/BC | 121/C | 95/B |
|  | 155 | | | | | 215/BC | 155/θ | 6/B | 209/C |
| $G_{91}^2$ | 169 | | | | | 95/C | 121/B | 169/θ | 91/BC |
|  | 215 | | | | | 209/B | 6/C | 155/BC | 215/θ |

The ordinate lists row numbers of binary blocks in the left column of Equation 53 and the abscissa lists row numbers of binary blocks in the middle column of Equation 53. The table entries are the row numbers of equations in the linear array Equation 53, along with the mixing transformation which would convert that equation to another in a nonlinear array with the corresponding $\overline{L}_3$ block added to the corresponding $\overline{M}_3$ block. For example, the entry corresponding to $\overline{L}_3$ 95, $\overline{M}_3$ 121 means that row 169: AE⊕BF=ABEF by application of mixing transformation C⊕C=θ is converted to ACE⊕BCF=ABEF where the $\overline{L}_3$ row 95 block is ACE, and the $\overline{M}_3$ row 121 block is BCF. Where there is no entry, the combination is impossible. Note that each of the eight rectangles contains rows from one of two cosets $G_6^2$ and $G_{91}^2$. Each column and each row can be visited only once and no table entry (row number) can be repeated. If this were a 3-dimensional table, it would mean that each row, column, and axis could be visited once, at most.

Table II can be used to select a pattern of constructive corruption. For example, choose $\overline{L}_3$ 6, $\overline{M}_3$ 121 transformed from row 155 with mixer B. Next, choose $\overline{L}_3$ 95, $\overline{M}_3$ 6 from 121/BC. Two choices remain for $\overline{L}_3$ 121. Choose $\overline{M}_3$ 209 from 95/BC. There is now only one possibility for $\overline{L}_3$ 209, i.e., pairing with $\overline{M}_3$ 95 from 215/B. Next, going to the $G_{91}^2$ block unless we accept the identity transform, there is one choice: $\overline{L}_3$ 91, $\overline{M}_3$ 155 from 169/BC. For the remainder now, there is no choice: $\overline{L}_3$ 155, $\overline{M}_3$ 169 from 6/B, $\overline{L}_3$ 169, $\overline{M}_3$ 215 from 91/BC and $\overline{L}_3$ 215, $\overline{M}_3$ 91 from 209/B. We have used two mixing transforms.

Another approach is to include the identity transform, i.e., leave some rows unmodified. For example, $\overline{L}_3$ 6, $\overline{M}_3$ 6 from 6/θ; $\overline{L}_3$ 95, $\overline{M}_3$ 121 from 169/C; $\overline{L}_3$ 121, $\overline{M}_3$ 209 from 95/BC; and $\overline{L}_3$ 209, $\overline{M}_3$ 95 from 215/B; $\overline{L}_3$ 91, $\overline{M}_3$ 169 from 121/C; $\overline{L}_3$ 155, $\overline{M}_3$ 155 from 155/θ; $\overline{L}_3$ 169, $\overline{M}_3$ 215 from 91/BC; and, $\overline{L}_3$ 215, $\overline{M}_3$ 91 from 209/B. In this case, all mixing transforms have been used, but two, rows 6 and 155, are left unmodified. The two rows may be transformed later as parts of some other cosets or their sum, row 3, may be modified.

The foregoing method can be applied to subgroups and cosets of any size, and then to successively smaller subgroups for an orderly process of non-linearization. It is not necessary to modify all rows in the linear array to ensure that:

$$N(x,y)=S(x) \oplus S(y) \oplus S(x \oplus y) \neq \theta \tag{59}$$

most of the time, and to have an even distribution of values.

The foregoing provides generalized techniques and methods for constructing complete non-linear orthomorphisms.

The foregoing n=8 example is provided to illustrate the general techniques with concrete equations. In the following sections, specific techniques for non-linearization which are well suited for performing block substitutions in cryptography are described.

V. NESTED SEQUENCES OF SUBGROUPS

Figure 18:
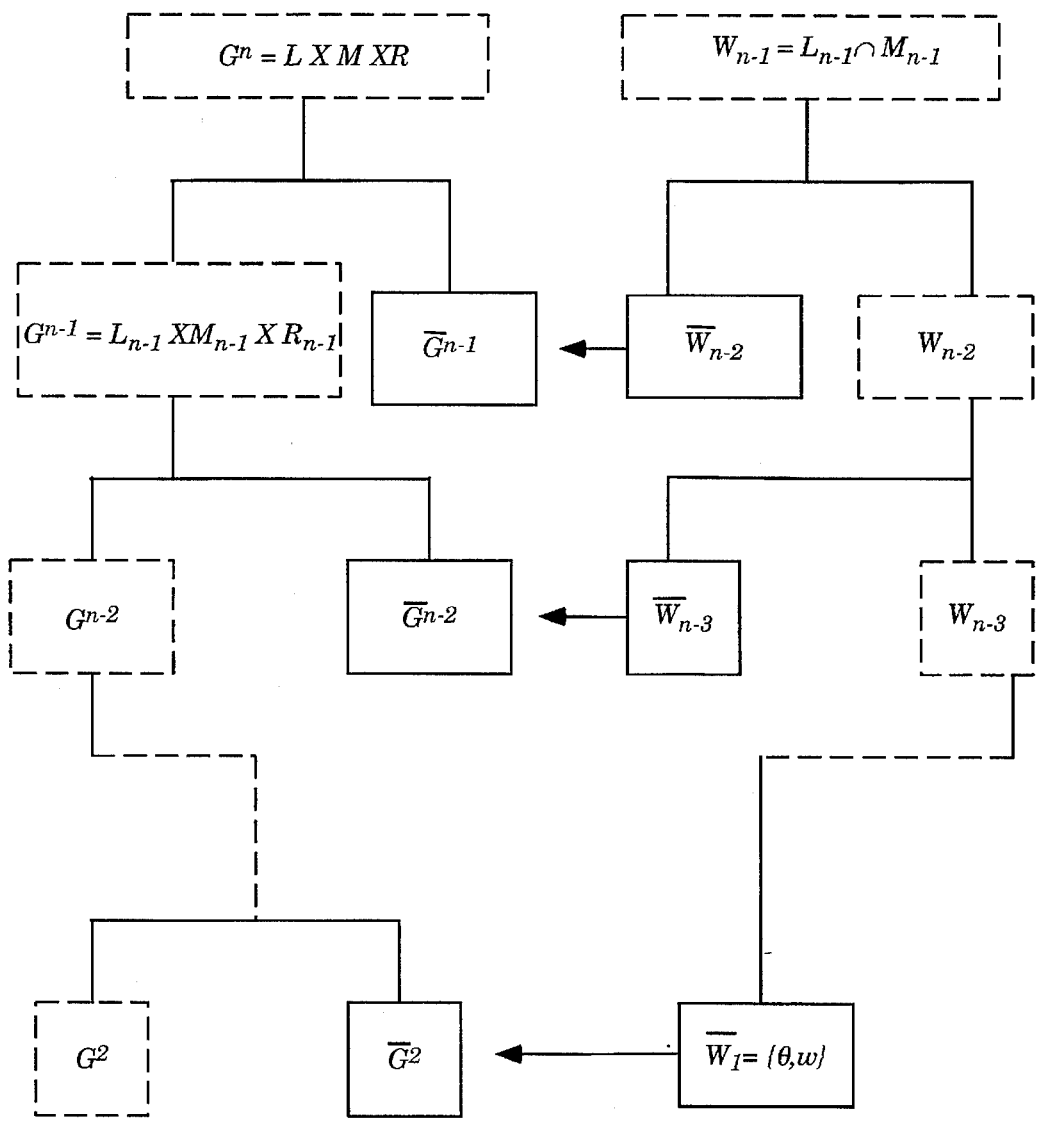
FIG. 18 graphically illustrates a method for non-linearization of a group of equations using nested sequences of sub-groups.

Referring to FIGS. 18 and 19, a first preferred method for non-linearization is provided. The method employs nested sequences of subgroups. Prior to describing the specific steps of the method, a description of nested sequences of subgroups is provided, with particular reference to background material provided in Appendix IV.

Section 3 of Appendix IV, outlines a non-linearization by starting with a maximal subgroup of equations in the linear array of $2^n$ equations. $G^{n-1}$ is one of $2^n-1$ such subgroups and $|G^{n-1}|=2^{n-1}$. All such maximal subgroups can be specified by selecting $n$-bit numbers in any one of the three columns which are a maximal subgroup of $Z_2^n$. The maximal subgroups can all be determined from the $n$ maximal subgroups of $Z_2^n$ which are specified by numbers which all have zero in a given bit position. All of these maximal subgroups of the orthomorphic array $G^n$ are essentially images of each other in that they have the same row spacing and can be obtained from each other by changing the indices of the member rows, all by the same increment. (See Appendix IV, Proposition 1). Thus, maximal subgroups, both of the n-bit numbers and of the linear orthomorphic arrays of equations are easy to find and easy to work with.

$G^{n-1}=L_{n-1} \times M_{n-1} \times R_{n-1}$ is a set of $2^{n-1}$ equations where $L_{n-1}$, $M_{n-1}$, and $R_{n-1}$ are the left, middle, and right columns, respectively. $\overline{G}^{n-1} = \overline{L}_{n-1} \times \overline{M}_{n-1} \times \overline{R}_{n-1}$ is the complement. The set of mixing transforms $W_{n-1} = L_{n-1} \cap M_{n-1}$ is a group, and $|W_{n-1}| = 2^{n-2}$. From $G^{n-1}$ one can construct a nested sequence of completely corruptible subgroups $$G^2 \subset G^3 \subset \ldots \subset G^{n-2} \subset G^{n-1} \qquad (60)$$

and a similar sequence of relative complements $$\overline{G}^2 \subset \overline{G}^3 \subset \ldots \subset \overline{G}^{n-2} \subset \overline{G}^{n-1} \qquad (61)$$

where $\overline{G}^k = G^{k+1} \backslash G^k$, each with an associated group of mixing transforms $$|W_{n-k}| = 2^{n-k-1} \qquad (62)$$

These subgroups also form a nested sequence $$W_2 \subset W_3 \subset \ldots \subset W_{n-2} \subset W_{n-1} \qquad (63)$$

In the limit, $G^2$ has middle column $M_2 = \{\theta, x_i, x_{i+1}, x_i \oplus x_i\}$ for some index $i$ and the corresponding $W_2 = \{\theta, x_i\}$. Also, for each $1 \leq k \leq n-2$ $$W_{n-k} = W_{n-k-1} \cup \overline{W}_{n-k-1} \qquad (64)$$

where $\overline{W}_{n-k-1} = W_{n-k} \backslash W_{n-k-1}$ i.e., $\overline{W}_{n-k-1}$ is the relative complement of $W_{n-k-1}$ in $W_{n-k}$. A simple and orderly procedure of non-linearization is as follows (and is graphically illustrated in FIG. 18):

a. Apply the $2^{n-3}$ mixing transforms in $\overline{W}_{n-2}$ to $\overline{G}^{n-1}$. None of these mixing transforms are in $W_{n-k}$ for $k>1$, so they will not be used on subsequent cosets $\overline{G}^{n-k}$.

b. Apply the $2^{n-4}$ mixing transforms in $\overline{W}_{n-3}$ to $\overline{G}^{n-2}$.

c. Continue this process sequentially until reaching $\overline{G}^3$ where two mixing transforms are applied to eight equations.

d. For the last subgroup $G^2$ of order 4, the sole $w=x_i$ could be applied to $\overline{G}^2$ or it simply could be left alone, i.e., apply $^{w=\theta}$.

Besides simplicity, the foregoing method has the merit of using up to $2^{n-2}-1$ nontrivial mixing transforms. Also, at least $2^n-4$ equations are transformed; however, the resulting structure retains some order. $G^{n-1}$ has a single set of n-1 consecutive rows, and because of the group structure, another set of n-2 consecutive rows. Thus, there are three ways that one can construct $G^{n-2}$ as a completely corruptible subgroup, from Prop. 4, i.e., using the set of n-2 rows as generators, or omitting the first or last of the set of n-1 consecutive rows in $G^{n-1}$. There is a choice of $2^n-1$ maximal subgroups to begin with and a choice of three subgroups at each subsequent level. So the total possible number of such nested sequences is $(2^n-1)(3^{n-2})$.

Now, consider two numbers x, y in the left column of $\overline{G}^{n-1}$, i.e., $x, y \in \overline{L}_{n-1}$. $x \oplus y \in \overline{L}_{n-1}$ since it is a group complement. So $x \oplus y \in \overline{L}_{n-k}$ for some $k>1$. Let $w_a$ and $w_b$ be mixing transforms applied to x and y, respectively. $w_a, w_b \in \overline{W}_{n-2}$. The set of mixers on $\overline{L}_{n-k}$ is $\overline{W}_{n-k-1} \subset \overline{W}_{n-1}$. Thus, in some instances $w_a \oplus w_b \in \overline{W}_{n-k-1}$.
In that case:

$$S(x \oplus w_a) \oplus S(y \oplus w_b) = S(x \oplus y \oplus w_a \oplus w_b), \qquad (65)$$

and despite the constructive corruption, there are some linear subgroups remaining.

With the foregoing considerations in mind, and with specific reference now to FIG. 19, a preferred method for encryption using nested sequences of subgroups will now be described. The method operates to encrypt data blocks by substituting for any one of $2^n$ n-bit clear text blocks of an n-bit binary number, an associated unique encrypted block of n-bit binary numbers. The method may be implemented using a non-linear dynamic substitution generator, as generally illustrated in FIG. 16.

With reference to FIG. 19, a first method, is employed to find a first matrix $G^n$ of $2^n$ equations as in (11a), which is a linear orthomorphism, with each equation representing the modulo 2 additions of one of the $2^n$ blocks on the left column with a unique one of the $2^n$-bit numbers in the middle to provide an associated, unique, n-bit block in the right column. All of the equations in the first matrix of $2^n$ equations are characterized by the vector sum modulo 2 of any number of the equations also being one of the equations in the first matrix. The equations include the identity equation $\Theta \oplus \Theta = \Theta$. In step 102, a subset $G^{n-1}$ of $2^{n-1}$ equations from the FIRST matrix is selected by choosing n-1 consecutive equations in the FIRST matrix and taking all sums of these and the identity equation to obtain:

| Equation # | $L_{n-1}$ | X | $M_{n-1}$ | X | $R_{n-1}$ | (66) |
|---|---|---|---|---|---|---|
| $i_o$ | $\Theta$ | | $\Theta$ | | $= \Theta$ | |
| $i_1$ | $i_{1-1}$ | $\oplus$ | $i_1$ | | $= i_{1-p}$ | |
| $i_2$ | $i_{2-1}$ | $\oplus$ | $i_2$ | | $= i_{2-p}$ | |
| . | . | . | . | | . | |
| . | . | . | . | | . | |
| . | . | . | . | | . | |
| $i_j$ | $i_{j-1}$ | $\oplus$ | $i_j$ | | $= i_{j-p}$ | |
| . | . | . | . | | . | |
| . | . | . | . | | . | |
| . | . | . | . | | . | |
| $i_s$ | $i_{s-1}$ | $\oplus$ | $i_s$ | | $= i_{s-p}$ | | where $s = 2^{n-1} - 1$, $L_{n-1}$, $M_{n-1}$ and $R_{n-1}$ are the left, middle and right columns respectively, $G^{n-1} = L_{n-1} \times M_{n-1} \times R_{n-1}$ represents the set of equations, $\overline{G}^{n-1} = \overline{L}_{n-1} \times \overline{M}_{n-1} \times \overline{R}_{n-1}$, is the complement of $G^{n-1}$, $W_{n-1} = L_{n-1} \cap M_{n-1}$ and $|W_{n-1}| = 2^{n-2}$.

The principle of determining the first matrix of equations is provided in Appendix III, section 2. At step 102–110, the plurality of non-zero $2^n$ equations in the first matrix of $2^n$ equations are modified to provide a second matrix of $2^n$ equations. The equations are modified so that the modified equations collectively map the same clear text blocks as in the left column of the first matrix, but in a different order to the same unique n-bit blocks as in the right column of the first matrix, in the original order of the unmodified equations. The plurality of equations are modified in such a manner that the modified equations are not generally the sums modulo two of any number of other equations in the second matrix. The modification of the $2^n-1$ non-zero equations is achieved by steps 104–106.

Specifically at step 104, the $2^{n-3}$ mixing transforms in $\overline{W}_{n-2}$ are applied to $\overline{G}^{n-1}$. Next at step 106 the $2^{n-4}$ mixing transforms in $\overline{W}_{n-3}$ are applied are applied to $\overline{G}^{n-2}$. Next, step 108, at the application of the mixing transforms are repeatedly applied to cosets in $G^n$ until reaching $\overline{G}^2$. The number of iterations of step 108 depends upon the value for n. With n=8, a total of five iterations of the mixing transforms are needed within steps 104–108 to reach $\overline{G}^2$. At step 110 $\overline{W}_1$ consists of $\theta$ and a single mixing transform, either of which is applied to $\overline{G}^2$. Finally, at step 112, each clear text block to be encrypted, which is uniquely located as one of the $2^n$ n-bit numbers in the left column of the second matrix of 2n equations, is added modulo 2 to the block in the middle column of the associated equation to obtain the encrypted block in the right column of the associated equation.

Step 112 operates to obtain the final encrypted block.

As with previous encryption methods described above in sections I and II, the steps of the method illustrated in FIG. 19 are preferably implemented using hardwire circuitry for maximum conversion speed. Alternatively, however, a programmed microprocessor can be employed to perform the various method steps illustrated in FIG. 19.

VI. FITTED COSETS FROM DIFFERENT SUBGROUPS

Figure 20:
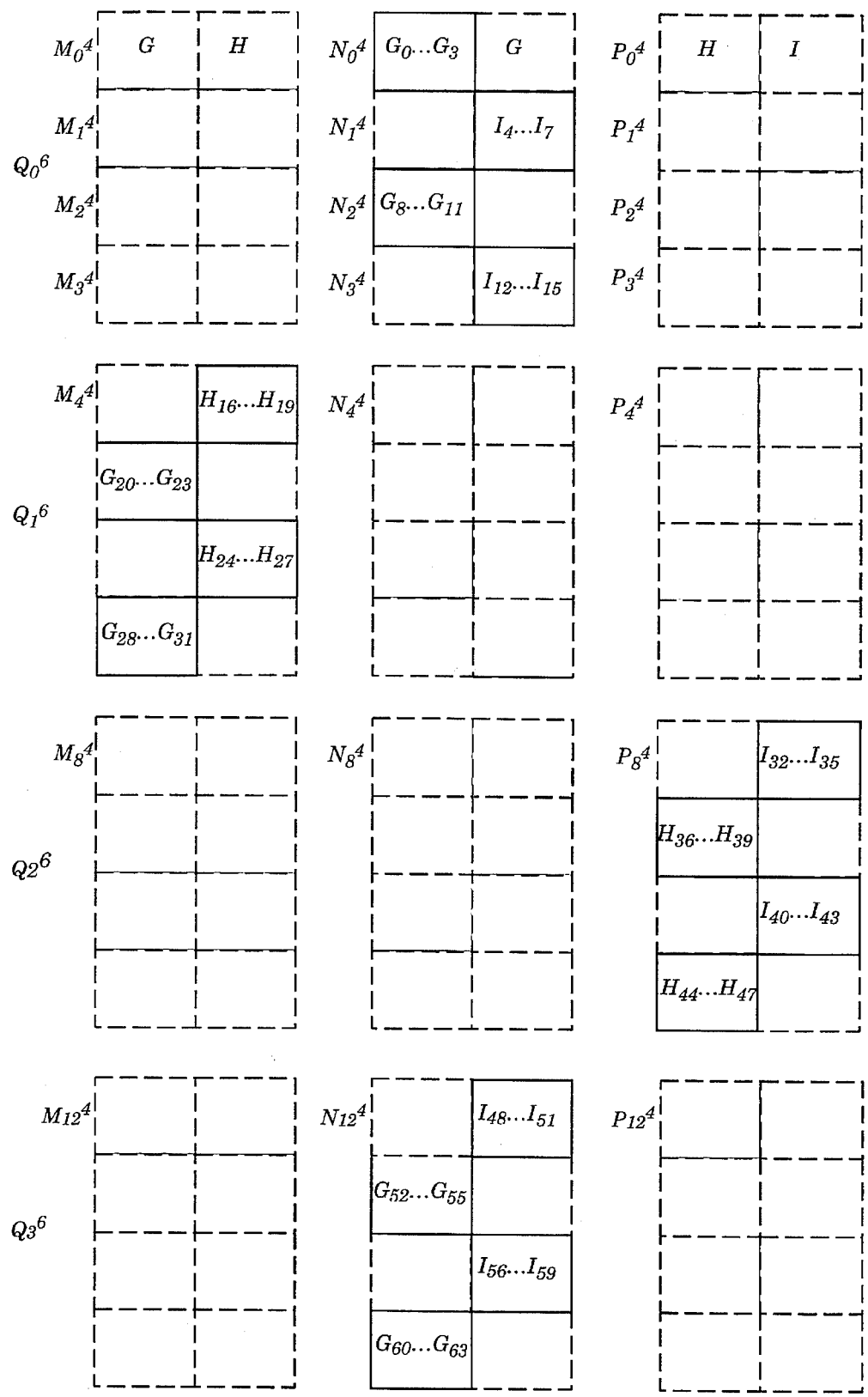
FIG. 20 illustrates multiple-coset decomposition for a maximal length linear orthomorphism on binary numbers of block size n=8.
Figure 21:
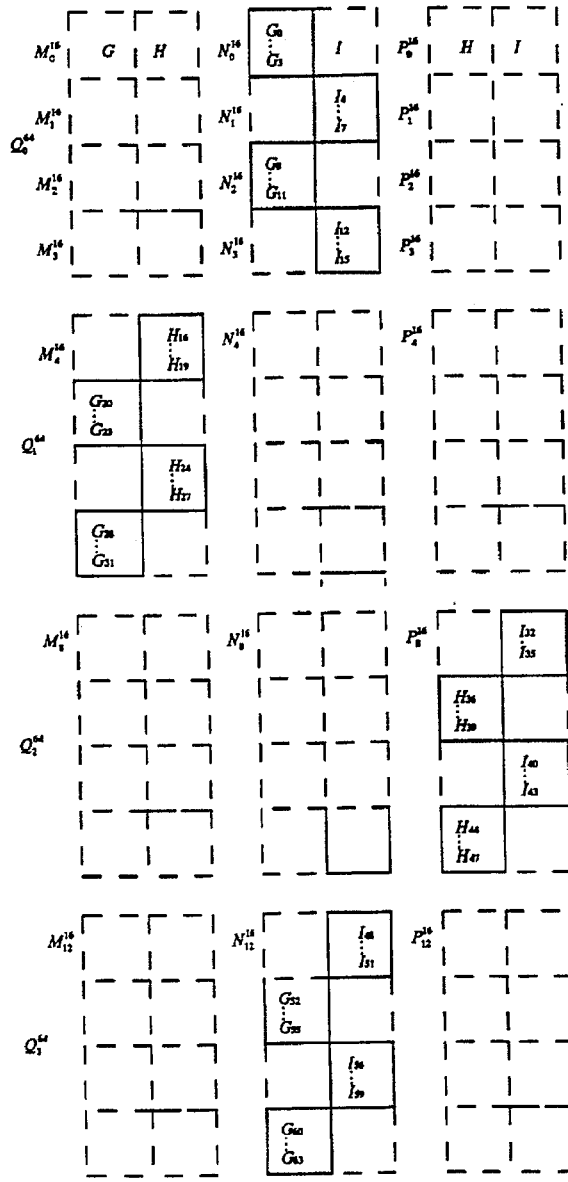
FIG. 21 is a block diagram illustrating a method of encryption employing fitted cosets from different sub-groups as graphically illustrated in FIG. 20.

Referring to FIGS. 20 and 21, a second preferred encryption method of the invention will now be described.

The method of FIG. 20 seeks cosets from different subgroups and, hence, with different groups of mixing transforms, but which still can be fitted together somewhat like a jigsaw puzzle.

The method of FIGS. 20 and 21 use fitted cosets from different subgroups to perform encryption. Initially a general description of the method is provided, then, a detailed description of the method with reference to FIG. 21 is provided.

If $G_0^k$ and $H_0^k$ are two disjoint corruptible subgroups of order $2^k$ where $k<n/2$, of a maximal linear orthomorphism on the n-bit numbers, $G_0^k$ and $H_0^k$ can be combined into one subgroup of order $2^{2k}$ with two different coset decompositions and two different groups of mixing transformations. Let $M_0^{2k}$ be the subgroup generated by the combined generators of $G_0^k$ and $H_0^k$. $M_0^{2k}/G_0^k$ and $M_0^{2k}/H_0^k$ are two coset decompositions, each isomorphic to a subgroup of $Z_2^n$ of order $2^k$, and, hence, to each other. Pairs of cosets consisting of one each from $M_0^{2k}/G_0^k$ and $M_0^{2k}/H_0^k$ will share exactly one row. If they had more than one in common, then it would not be possible for $G_0^k \cap H_0^k = \{\theta\}$ as the sum of a shared pair would be in $G_0^k \cap H_0^k$. If one pair of cosets shared no row, another pair would have to share more than one row. Since $G_0^k$ and $H_0^k$, are disjoint, so are the corresponding groups of mixers although the group of mixing transformations corresponding to $M_0^{2k}$ would have additional members if some rows in $G_0^k$ are adjacent to some in $H_0^k$. Next, the complete orthomorphism $Z_2^n \times Z_2^n \times Z_2^n$ can be decomposed into cosets of $M_0^{2k}$ which, in turn, can be decomposed into alternate collections of cosets from $G_0^k$ and $H_0^k$. Depending on the block size n, this can be extended to more than two coset decompositions. If instead of 2, some number c disjoint corruptible subgroups of order $2^k$ are chosen, then $$K \leq \frac{n}{c}.$$

The following is an example for n=8, where the maximal length linear orthomorphism contains 255 equations or rows besides the identity.

The example is graphically illustrated in FIG. 20 and in Table III below. FIG. 20 graphically illustrates multiple coset decomposition for a maximal length linear orthomorphism of binary numbers of block numbers of block size n=8. Table III illustrates the decomposition of 16-row into 4-row cosets for a maximal length linear orthomorphism for block size 8.

TABLE III

| $M_4^1$ | | |
|---|---|---|
| | $G_{16}^2$ | $H_{16}^2$ |
| | $G_{17}^2$ | $H_{17}^2$ |
| | $G_{18}^2$ | $H_{18}^2$ |
| | $G_{19}^2$ | $H_{19}^2$ |

Select three disjoint corruptible sub-groups of order 4: $G_0^2$, $H_0^2$, and $I_0^2$. Each has two consecutive rows, their sum and the identity row. Each subgroup establishes a unique coset decomposition of the complete linear array consisting of the subgroup and 63 cosets, each consisting of four equations. The subgroups of order 4 can be combined to define three subgroups of order 16, $M_0^4$ from $G_0^2 \cup H_0^2 \cup N_0^4$ from $G_0^2 \cup H_0^2$, and $P_0^4$ from $H_0^2 \cup I_0^2$. The subgroups of order 16 will not be disjoint. Finally, the subgroups can be combined into a subgroup $Q_0^6$ of order 64 from $G_0^2 \cup H_0^2 \cup I_0^2$. This subgroup and its three cosets $Q_1^6$, $Q_2^6$, and $Q_3^6$ form a decomposition of the complete linear orthomorphism. As shown in FIG. 20 each of the 64-row Q cosets can be decomposed three ways into four cosets each of 16 rows. For example, the 64 rows of $Q_1^6$ can be decomposed into $\{M_4^4, M_5^4, M_6^4, M_7^4\}$, or $\{N_4^4 \ldots N_7^4\}$, or $\{P_4^4 \ldots P_7^4\}$. If the M decomposition is chosen, then, for example, $M_4^4$ can be decomposed into four cosets of four rows each, either $\{G_{16}^2, G_{17}^2, G_{18}^2, G_{19}^2\}$ or $\{H_{16}^2, H_{17}^2, H_{18}^2, H_{19}^2\}$ (See Table III). Finally, mixing transformations can be applied to complete the process of constructive corruption.

If desired, all equations in the linear array can be modified this way. While somewhat more complicated than the sequential approach in Section V, the present method has produced better results in terms of non-linearity as measured by Equation 9.

Specifically referring to FIG. 21, steps of a preferred method for encrypting data employing fitted cosets from different subgroups will now be described. As with the method described in section V above, the present method achieves encryption by substituting for any one of $2^n$ unique clear text blocks of n-bit binary numbers, an associated unique encrypted block of n-bit binary numbers. Initially, at step 202, a first matrix $G^n$ of $2^n$ equations is found. This method step is identical to step 102 of FIG. 19 and will not be described in further detail herein.

At step 204, two or more mutually disjoint corruptible subgroups $G_0^k, H_0^k, I_0^k \ldots$ of order $2^k$ are selected from $G^n$, where $$k < \frac{n}{2}.$$

Next at step 206 subgroups, not necessarily disjoint, $M_o^{2k}$, $N_o^{2k}, \ldots$ of order $2_0^{2k}$ are formed from pairs of $G_0^k, H_0^k, I_0^k$ ... This process is continued until a subgroup $Q_0^{n-1}$ or $Q_0^{n-2}$ is selected at step 208, accordingly as n is even or odd, $G^n$ is decomposed, at step 210, into an alternating collection of cosets from $Q_0^{n-1}$ or $Q_0^{n-2}, \ldots, M_0^{2k}, N_0^{2k} \ldots, G_0^k, H_0^k$, $I_0^k$ ... where each subgroup and coset is decomposed into successively smaller cosets. At step 212, the selected cosets are modified by their respective mixing transforms. The resulting second matrix of $2^n$ equations is the nonlinear orthomorphism.

Finally, at step 214, each clear text block to be encrypted, which is uniquely located as one of the $2^n$ n-bit numbers in the left column of the second matrix of $2^n$ equations is added modulo 2 to the block in the middle column of the associated equation to obtain the encrypted block in the right column of the associated equation. Final step 214 is in accordance with the encryption steps of methods described above and will not be set forth further herein.

FIG. 22 illustrates the method of FIG. 21 for an encryption wherein n=8. Initially, at step 302, a first matrix $G^8$ of 256 equations is determined. All of the equations in the first matrix of the 256 equations are characterized by the sum modulo 2 of any number of the equations also being one of the equations in the first matrix. One of the set of 256 is the identity equation $\Theta \oplus \Theta = \Theta$. The remaining 255 equations are orderable as illustrated in Equation 11b. However, whereas these equations represent a general n-bit system, the equations generated by step 302 of the method of FIG. 22 correspond to an 8-bit system. Hence, $L_8$, $M_8$ and $R_8$ are the left, middle and right columns respectively. $G^8 = L_8 \times M_8 \times R_8$.

Steps 304–314 act to modify a plurality of the non-zero equations in the first matrix of 256 equations to provide a second matrix of 256 equations. The equations are modified so that the modified equations collectively map the clear text blocks in a nonlinear manner to the encrypted blocks in contrast to the linear manner by which this is done by the corresponding unmodified equations. The plurality of equations are modified in such a manner that the modified equations are not generally the sums modulo 2 of any number of the other equations in the second matrix of equations.

At step 304, three disjoint corruptible subgroups of order 4 are selected from $G^8$. The three disjoint corruptible subgroups are identified by $G_0^2$, $H_0^2$, and $I_0^2$. At step 306 three subgroups of order 16 are generated from the pairs of disjoint corruptible subgroups of order 4. The three subgroups of order 16 are identified as $M_0^4$, $N_0^4$, and $P_0^4$. $M_0^4$ is derived from $G_0^2 \cup H_0^2$. $N_0^4$ is derived from $G_0^2 \cup I_0^2$. $P_0^4$ is derived from $H_0^2 \cup I_0^2$.

At step 308, a subgroup $Q_0^6$ of order 64 is derived from the union of the three disjoint corruptible subgroups $G_0^2 \oplus H_0^2 \cup I_0^2$. At 310, cosets $Q_1^6$, $Q_2^6$, and $Q_3^6$ are generated. The cosets 16 rows are decomposed into 4 cosets of each at step 312. Next, at step 314, each of the four cosets 16 rows are decomposed into four cosets of four rows each. At step 316 the cosets are transformed by their respective mixing transforms as shown in Section III above.

Finally, at step 318, each clear text block in the left column to be encrypted, is added modulo 2 to the corresponding block in the middle column of the associated equation of the second matrix of 256 equations to obtain the encrypted block in the right column.

As with preceding embodiments, the methods illustrated in FIGS. 21 and 22 are implemented using the block substitution devices described above, but modified to perform a particular manipulations of the blocks set forth herein. Preferably, hardwired circuitry is provided to perform the manipulations. However, a programmed computer or microprocessor can alternatively be employed.

VII. COSETS OF DISJOINT, CORRUPTIBLE SUBGROUPS

With reference to FIG. 23, a third preferred method for encrypting data will now be described. The method employs cosets of disjoint corruptible subgroups. The method will be initially described in general, mathematical terms, then specific steps of the method will be described with reference to the figures.

If two subgroups are disjoint, except for the identity row, then they will also have disjoint subgroups of mixing transformations. Considering a pair of subgroups of order 4, then a corresponding pair of cosets can have, at most, one row in common. If a collection of such disjoint cosets is assembled, each will be corrupted with a different mixing transformation. This raises two fundamental issues:

a. How many such disjoint corruptible cosets can be found in a given linear orthomorphism?

b. What group structure is there in the corresponding set of mixing transformations?

To make a good nonlinear orthomorphism, that is, to ensure that in Equation 39, N(x, y) has a uniform distribution over $Z_2^n$, it is necessary to corrupt enough equations and to have a set of mixing transformations that do not frequently cancel each other out.

In a maximal length linear orthomorphic array of equations, two subsets of k equations, each having the same relative spacing, are defined as being "similar". The middle columns of two such subsets have the form:

$$\left. \begin{array}{cc} x_a & x_{a+l} \\ x_b & x_{b+l} \\ x_c & x_{c+l} \\ \cdot & \cdot \\ \cdot & \cdot \\ \cdot & \cdot \end{array} \right\} k \text{ rows} \tag{67}$$

for some integer l. Maximal subgroups are examples of similar subsets.

Proposition 8:

If $G_i^2$ is a coset of order $2^2=4$ in the coset decomposition defined by a corruptible subgroup $G_0^2$ of order 4 and $H_{i+d}^2$ is a set of four equations similar to, but disjoint from, $G_i^2$, then, $H_{i+d}^2$ is a coset in the decomposition defined by another corruptible subgroup $H_0^2$ where $G_0^2 \cap H_0^2 = \{\theta\}$.

The foregoing proposition is established by the following: A corruptible subgroup of order 4 has the form:

$$\begin{array}{ccccc} \theta & \oplus & \theta & = & \theta \\ x_{j-1} & \oplus & x_j & = & x_{j-p} \\ x_j & \oplus & x_{j+1} & = & x_{j+1-p} \\ x_{q-1} & \oplus & x_q & = & x_{q-p} \end{array} \tag{68}$$

where $x_q = x_j \oplus x_{j+1}$. The corresponding mixing transform is $x_j \oplus x_j = \theta$. A coset is generated by adding a row, not in the subgroup, to each row in the subgroup, to obtain:

$$\begin{array}{l} x_{a-1} \oplus x_a = x_{a-p} \\ (x_{j-1} \oplus x_{a-1}) \oplus (x_j \oplus x_a) = (x_{j-p} \oplus x_{a-p}) \\ (x_j \oplus x_{a-1}) \oplus (x_{j+1} \oplus x_a) = (x_{j+1-p} \oplus x_{a-p}) \\ (x_{q-1} \oplus x_{a-1}) \oplus (x_q \oplus x_a) = (x_{q-p} \oplus x_{a-p}) \end{array} \tag{69}$$

The sum of the first two numbers in the middle column of the coset, $x_a \oplus (x_j \oplus x_a) = x_j$, regains the mixing transform. $x_j \oplus x_a = x_b$ for some row of index b. Similarly, $x_{j+1} \oplus x_a = x_c$ and $x_q \oplus x_a = x_d$ for some indices c and d. If all the indices are shifted by some integer l, a similar set of equations is formed:

$$x_{a+l-1} \oplus x_{a+l} = x_{a+l-p} \tag{70}$$

-continued $$x_{b+l-1} \oplus x_{b+l} = x_{b+l-p}$$
$$x_{c+l-1} \oplus x_{c+l} = x_{c+l-p}$$
$$x_{d+l-1} \oplus x_{d+l} = x_{d+l-p}$$

Before shifting the indices, $x_a \oplus x_b = x_j$, the original mixer. However, because of the structure of the linear orthomorphic array which is generated by a linear recursive function, $x_{a+l} \oplus x_{b+l} = x_k \neq x_j$, for some index k. Adding row a+1 to each of the other three produces a new corruptible subgroup:

$$\begin{array}{cccc} \theta & \oplus & \theta & = \theta \\ x_{k-1} & \oplus & x_k & = x_{k-p} \\ x_k & \oplus & x_{k+1} & = x_{k+1-p} \\ x_{r-1} & \oplus & x_r & = x_{r-p} \end{array} \quad (71)$$

where $x_r = x_k \oplus x_{k+1}$. The three non-zero rows will be displaced from their counterparts in $G_o^2$ by a difference in index of k-j.

With the foregoing general description of the method in mind, the method will now be described with reference to FIG. 23. As with the previously described methods of sections V and VI, the method of FIG. 23 operates to encrypt a set of $2^n$ unique clear text blocks of n-bit binary numbers by substituting therefore associated unique encrypted blocks of n-bit binary numbers. Also as with the prior methods, encryption begins, step 402 by finding a first matrix $G^n$ of $2^n$ equations representing a linear orthomorphism with each equation representing the modulo 2 additions of one the $2^n$ clear text blocks in the left column with a unique one of the $2^n$ n-bit numbers in the middle column to provide an associated unique n-bit block in the right column with all of the equations in the first matrix of $2^n$ equations characterized by the vector sum modulo two of any number of the equations also being one of the equations of the first matrix. Equations include the null equation with the remaining $2^n-1$ being orderable as illustrated in Equation 11b above. At step 404–414, a plurality of non-zero $2^n-1$ equations in the first matrix are modified to provide a second matrix of $2^n-1$ equations.

At step 304, a corruptible subgroup of order four is selected from $G^n$. Such a subgroup of order four is generally represented as:

$$\begin{array}{cccc} \theta & \oplus & \theta & = \theta \\ x_m & \oplus & x_1 & = x_{1-p} \\ x_1 & \oplus & x_2 & = x_{2-p} \\ x_{q-1} & \oplus & x_q & = x_{q-p} \end{array}$$

where $x_q = x_1 \oplus x_2$.

At step 306, a coset is generated by choosing an equation, represented by index a, which is not in the corruptible subgroup of order four. The equation is added vectorially to the corruptible subgroup to yield a coset represented by:

$$\begin{array}{cccc} x_{a-1} & \oplus & x_a & = x_{a-p} \\ x_{b-1} & \oplus & x_b & = x_{b-p} \\ x_{c-1} & \oplus & x_c & = x_{c-p} \\ x_{d-1} & \oplus & x_d & = x_{d-p} \end{array}$$

where $x_b = x_a \oplus x_1$, $x_c = x_a \oplus x_2$, $x_d = x_a \oplus x_q$. In the case where m is not a prime number, choose an integer l which divides m.

Thereafter, at step 308, values are determined for values a mod 1, b mod 1, c mod 1 and d mod 1. At 310, if any of the values determined at step 308 are duplicated, then steps 306, and 308 are repeated with an equation of different index. Once a set of values are achieved wherein there are no duplications, step 312 is performed wherein m/l additional cosets are generated. The additional cosets have the form $$\begin{array}{cccc} x_{a+kl-1} & \oplus & x_{a+kl} & = x_{a+kl-p} \\ x_{b+kl-1} & \oplus & x_{b+kl} & = x_{b+kl-p} \\ x_{c+kl-1} & \oplus & x_{c+kl} & = x_{c+kl-p} \\ x_{d+kl-1} & \oplus & x_{d+kl} & = x_{d+kl-p} \end{array}$$

where $0 \leq k \leq \frac{m}{l} - 1$.

At step 314, the mixing transforms are applied to the corresponding cosets. The mixing transform is represented by $w_{kl} \oplus w_{kl} = \Theta$ wherein $w_{kl} = W_{a+kl} \oplus X_{b+kl}$. Each mixing transform is applied to constructively corrupt the corresponding coset, thereby yielding the second matrix of $2^n$ equations.

Finally, at step 316, each clear text block in the left column to be encrypted, is added modulo two to the corresponding block in the middle column of the associated equation of the second matrix of $2^n$ equations to obtain the encrypted block in the right column. Final step 316 is similar to previous final steps described above with reference to the other preferred embodiments of the invention.

Preferably, hardwired circuitry is provided for performing the various steps set forth in FIG. 23. However, programmed computers or microprocessors may alternatively be employed.

As a specific example of the method of FIG. 23, consider the orthomorphism in Equation 51. Let $G_o^2$ be:

$$\begin{array}{ccccc} 0 & \theta & \oplus & \theta & = \theta \\ 1 & BEFH & \oplus & A & = ABEFH \\ 2 & A & \oplus & B & = AB \\ 234 & ABEFH & \oplus & AB & = EFH \end{array} \quad (72)$$

The mixing transform is A. Use row 7 to generate a coset:

$$\begin{array}{ccccc} 7 & F & \oplus & G & = FG \\ 50 & BEH & \oplus & AG & = ABEGH \\ 226 & AF & \oplus & BG & = ABFG \\ 139 & ABEH & \oplus & ABG & = EGH \end{array} \quad (73)$$

From the middle column, the mixer is $x_7 \oplus x_{50} = G \oplus AG = A$. Displace the indices by l=5 to obtain:

$$\begin{array}{ccccc} 12 & AEFGH & \oplus & ABCH & = BCEFG \\ 55 & AFGH & \oplus & ABCFH & = BCG \\ 231 & AEGH & \oplus & ABCGH & = BCE \\ 144 & AGH & \oplus & ABCFGH & = BCF \end{array} \quad (74)$$

The corresponding subgroup can be found by adding row 12 to the other 3:

$$\begin{array}{ccccc} 0 & \theta & \oplus & \theta & = \theta \\ 6 & BEFH & \oplus & A & = ABEFH \\ 7 & F & \oplus & G & = FG \\ 239 & EF & \oplus & FG & = EG \end{array} \quad (75)$$

From either the new coset or the corresponding subgroup, the new mixing transform is $F \oplus F = \theta$.

This process can be applied to subgroups of larger order but is particularly easy to use for constructive corruption with cosets of order 4. A procedure is as follows, choose an arbitrary corruptible subgroup of order 4. Without loss of generality the subgroup is:

$$\theta \oplus \theta = \theta \qquad (76)$$
$$x_m \oplus x_1 = x_{1-p}$$
$$x_1 \oplus x_2 = x_{2-p}$$
$$x_{q-1} \oplus x_q = x_{q-p}$$

Assume initially that $m=2^n-1$ is not a prime (that is not a Mersenne prime). Choose some integer l which divides m and use this as the shift of indices as in the proof of Prop. 8 above. As in that same proof, choose an equation with some index a, which is not in the subgroup. Adding it vectorially to each equation in Equation 76, one obtains a coset:

$$x_{a-1} \oplus x_a = x_{a-p} \qquad (77)$$
$$x_{b-1} \oplus x_b = x_{b-p}$$
$$x_{c-1} \oplus x_c = x_{c-p}$$
$$x_{d-1} \oplus x_d = x_{d-p}$$

Next, determine the four values a mod l, b mod l, c mod l, and d mod l. If there is any duplication, reject this coset and try another, since finding successive similar cosets by using multiples of l as an increment to the indices would lead to a conflict. For example, assume that a≡b mod l. Then, for some integer g, a=b+gl so that some subsequent coset would have the same row as a previous coset. Assume now that a, b, c, and d are distinct mod l. Generate m/l similar cosets of the form:

$$x_{a+kl-1} \oplus x_{a+kl} = x_{a+kl-p} \qquad (78)$$
$$x_{b+kl-1} \oplus x_{b+kl} = x_{b+kl-p}$$
$$x_{c+kl-1} \oplus x_{c+kl} = x_{c+kl-p}$$
$$x_{d+kl-1} \oplus x_{d+kl} = x_{d+kl-p}$$

where $$0 \leq k \leq \frac{m}{l} - 1.$$

This will give a total of $$\frac{4m}{l}$$

equations in the linear orthomorphism as candidates for constructive corruption. In each coset, the mixing transform is $w_{kl} \oplus w_{kl} = \theta$ where $w_{kl} = x_{a+kl} \oplus x_{b+kl}$. From equations 76 and 77 $w_0 = x_a \oplus x_b = x_1$ and thus $w_{kl} = x_{1+kl}$. Thus, the set of mixers is $W = \{x_i | i \equiv 1 \bmod l\}$ and $$|W| = \frac{m}{l}.$$

Proposition 9:

It can be established that for a set of m/l similar corruptible cosets of order 4, if 3∤m, then for any pair $x_i$, $x_j \in W$ $x_i \oplus x_j \notin W$. Also, it can be established that if 3|m and $x_i \oplus x_j = x_k$, where all are in W, then $$j - 1 \equiv k - j \equiv \frac{m}{3} \bmod m.$$

The forgoing proposition is established by the following: $W \cup \theta$ is not a group. If it were, being a subgroup of $Z_n^2$, $$|W \cup \theta| = \frac{m}{l} + 1 = 2^k$$

for some positive integer k. In that case, $$\frac{2^n - 1}{l} + 1 = 2^k \text{ and } 2^k = \frac{l - 1}{l - 2^{n-k}}.$$

Even if $l-2^{n-k}|l-1$ the ratio must be odd while $2^k$ is even for k>0. Without loss of generality, assume $x_1 \oplus x_{1+gl} = x_{1+hl}$ for some integers g and h, that is, $x_1$, $x_{1+gl}$ and $x_{1+hl} \in W$. If hl>m, then hl≡cl mod m, and cl<m since l|m. Keeping in mind that the subscripts are indices of rows in the linear orthomorphic array, it is also true that $x_{1+gl} \oplus x_{1+2gl} = x_{1+gl+hl}$. Assuming that 3∤m, combine $x_{1+gl} \oplus x_{1+2gl} = x_{1+gl+hl}$ with $x_1 \oplus x_{1+gl} = x_{1+hl}$ to obtain:

$$x_1 \oplus x_{1+2gl} = x_{1+hl} \oplus x_{1+gl+hl} = x_{1+2hl} \qquad (79)$$

More generally, for all integers j:

$$x_1 \oplus x_{1+jgl} = x_{1+jhl} \qquad (80)$$

Thus, $x_1 \oplus x_k \in W$ for all $x_k \in W$. The same reasoning can be applied to any other $x_i \in W$ in place of $x_1$. This would imply that $W \cup \theta$ is a group, which is a contradiction. Now, suppose 3|m. Consider a possible sum:

$$x_1 \oplus x_{1+\frac{m}{3}} = x_{1+\frac{2m}{3}} \qquad (81)$$

If we use the same procedure which led to Equation 80

$$x_{1+\frac{m}{3}} \oplus x_{1+\frac{2m}{3}} = x_{1+\frac{3m}{3}} = x_1 \qquad (82)$$

Thus, we obtain the same equation. So this cannot be used to generate a group.

The practical consequences of this are that if two equations are in the same coset, their sum will be elsewhere. The equations will have a common mixer, say $w_i$, for constructive corruption. That sum will be one of the three nontrivial equations in the subgroup of Equation 76. Noting that $S(x)=S'(x) \oplus w_i$ where $S'(x)$ is the original mapping from the linear orthomorphism, and $S(x)$ is the resultant mapping after constructive corruption, if that sum equation is not in one of the other corruptible cosets, then from Equation 4:

$$N(x,y) = w_i \oplus w_i \oplus \theta = \theta \qquad (83)$$

and the triple will be linear. If the sum equation is in another of the corruptible cosets, it will have as mixer some $w_j \neq w_i$ so that:

$$N(x,y) = w_i \oplus w_i \oplus w_j = w_j \qquad (84)$$

If two equations from different cosets are added, with respective mixers $w_i$ and $w_j$, then there are three possibilities, accordingly as the sum equation is not in a coset, is in one of the original cosets, or is in a third coset:

$$N(x,y) = w_i \oplus w_j \oplus \theta = w_i \oplus w_j \neq \theta \qquad (85)$$
$$N(x,y) = w_i \oplus w_j \oplus w_i = w_j \neq \theta$$
$$N(x,y) = w_i \oplus w_j \oplus w_k \neq \theta \text{ if } 3 \text{ or } l \nmid m$$

If two equations, one from a coset and one not in any of the cosets, are added, there are three possibilities as in the previous case:

$$N(x,y) = w_i \oplus \theta \oplus \theta = w_i \neq \theta \qquad (86)$$
$$N(x,y) = w_i \oplus \theta \oplus w_i = \theta$$
$$N(x,y) = w_i \oplus \theta \oplus w_j = w_i \oplus w_j \neq \theta$$

Lastly, if two equations are added, neither of which is in one of the corruptible cosets, then there are two possibilities, accordingly as their sum is not/or is in a coset:

$$N(x,y) = \theta \oplus \theta \oplus \theta = \theta$$
$$N(x,y) = \theta \oplus \theta \oplus w_i = w_i \neq \theta \quad (87)$$

To minimize residual linearity, it is clear from the above that two conditions are required, namely, that the residual set of equations not included in the cosets be small and contain no subgroups. As an example, consider the same linear orthomorphism in Equation 51 on 8-bit binary numbers, and the subgroup and coset in Equations 72 and 73:

| Row Index | | | | | (88) |
|---|---|---|---|---|---|
| 7 | F | $\oplus$ | G | = FG | |
| 50 | BEH | $\oplus$ | AG | = ABEGH | |
| 226 | AF | $\oplus$ | BG | = ABFG | |
| 139 | ABEH | $\oplus$ | ABG | = EGH | |

Again we will apply $l=5$ as the increment to the row indices to generate a sequence of cosets. Note that:

$$\begin{aligned}7 &\equiv 2 \bmod 5 \\ 50 &\equiv 0 \bmod 5 \\ 226 &\equiv 1 \bmod 5 \\ 139 &\equiv 4 \bmod 5\end{aligned} \quad (89)$$

Since $m=2^n-1=255=5.51, l|m$ and the set of row indices above, when incremented by $l=5$, will never overlap, i.e., $7+5i \neq 50+5j$ for all integers $i, j$ and the same for the other pairs. Thus, this process will yield 51 cosets of four equations each, a total of 204 equations for modification by constructive corruption. As shown in the proof of Prop. 8, the mixer for the above coset is $G \oplus AG = A$, that is, the sum of the middle terms of the first two equations in the coset.

That is the middle term of the first non-zero row in the linear orthomorphism:

$$x_m \oplus x_l = x_{l-p} \quad (90)$$
or
$$BEFH \oplus A = ABEFH$$

Thus, designating coset $5k$ as the coset whose first equation is:

$$x_{6+5k} \oplus x_{7+5k} = x_{7+5k-p} \quad (91)$$

The corresponding mixing transform is:

$$w_{5k} = x_{7+5k} \oplus x_{50+5k} = x_{1+5k}. \quad (92)$$

So, including the additive identity, $W=\{\theta, x_1, x_6, \ldots, x_{251}\}$ and $|W|=52$. Since $m=255=3.85, 3|m,$ and $x_1 \oplus x_{86} = x_{171}$. As in the proof of Prop. 9, this is the only such triple of numbers all in W. In this example:

$$x_1 = A, \; x_{86} = ADH, \text{ and } x_{171} = DH. \quad (93)$$

There are, of course, many ways to select cosets from different sub-groups. For example, choose $l=17$ in the same linear orthomorphism since $m=255=15.17$. Consider three cosets (shown below) from three distinct subgroups:

| Row Index | Coset | Row Index | Subgroup | (94) |
|---|---|---|---|---|
| 4 | $C \oplus D = CD$ | 0 | $\theta \oplus \theta = \theta$ | |
| 75 | $CDEFGH \oplus ACDEH = AFG$ | 251 | $DEFGH \oplus ACEH = ACDFG$ | |
| 37 | $AEH \oplus ABCG = BCEGH$ | 252 | $ACEH \oplus ABCDG = BDEGH$ | |
| 142 | $ADFG \oplus BEGH = ABDEFH$ | 229 | $ACDFG \oplus BDEGH = ABCEFH$ | |
| 9 | $H \oplus ACFG = ACFGH$ | 0 | $\theta \oplus \theta = \theta$ | |
| 80 | $BEF \oplus CFG = BCEG$ | 1 | $BEFH \oplus A = ABEFH$ | |
| 42 | $AH \oplus ABCFG = BCFGH$ | 2 | $A \oplus B = AB$ | |
| 147 | $ABEF \oplus BCFG = ACEG$ | 234 | $ABEFH \oplus AB = EFH$ | |
| 14 | $ABDFG \oplus BCEGH = ACDEFH$ | 0 | $\theta \oplus \theta = \theta$ | |
| 85 | $ABDEFG \oplus BCEFGH = ACDH$ | 6 | $E \oplus F = EF$ | |
| 47 | $ABDG \oplus BCEH = ACDEGH$ | 7 | $F \oplus G = FG$ | |
| 152 | $ABDEG \oplus BCEFH = ACDFGH$ | 239 | $EF \oplus FG = EG$ | |

| MIXERS | | (95) |
|---|---|---|
| $4 \equiv 4 \bmod 17$ | $x_{251} = ACEH$ | |
| $75 \equiv 7 \bmod 17$ | | |
| $37 \equiv 3 \bmod 17$ | | |
| $142 \equiv 6 \bmod 17$ | | |
| $9 \equiv 9 \bmod 17$ | $x_1 = A$ | |
| $80 \equiv 12 \bmod 17$ | | |
| $42 \equiv 8 \bmod 17$ | | |
| $147 \equiv 11 \bmod 17$ | | |
| $14 \equiv 14 \bmod 17$ | $x_6 = F$ | |
| $85 \equiv 0 \bmod 17$ | | |
| $47 \equiv 13 \bmod 17$ | | |
| $152 \equiv 16 \bmod 17$ | | |

Since all row indices are different mod 17, there will be no overlap using increment $l=17$. This process will generate 3×15=45 cosets or 180 equations as candidates for constructive corruption. The set of mixers $$W = \{\theta, x_1, x_{18}, \ldots, x_{239}; x_6, x_{23}, \ldots, x_{244}; \quad (96)$$
$$x_{13}, x_{30}, \ldots, x_{251}\}$$
and
$$|W| = 46. \quad (97)$$

There are many other possibilities. For example, one could use the subgroup of order 8 in Equation 52. Its cosets are completely corruptible, i.e., they have a group a four mixing transformations. Applying Prop. 7, one can select a coset of eight equations, Equation 53 of which six are to be non-linearized, as follows:

Row (98)

| Index | | Mixer |
|---|---|---|
| 6 | $E \oplus F = EF$ | $x_0 = \theta$ |
| 169 | $AE \oplus BF = ABEF$ | $x_3 = C$ |
| 95 | $ACE \oplus BDF = ABCDEF$ | $x_{235} = BC$ |
| 215 | $CE \oplus DF = CDEF$ | $x_2 = B$ |
| 121 | $ABE \oplus BCF = ACEF$ | $x_3 = C$ |
| 155 | $BE \oplus CF = BCEF$ | $x_0 = \theta$ |
| 91 | $ABCE \oplus BCDF = ADEF$ | $x_{235} = BC$ |
| 209 | $BCE \oplus CDF = BDEF$ | $x_2 = B$ |

Using an increment l=17, one can obtain 15 disjoint sets of six rows each from:

Row (99)

| Index | | Mixer |
|---|---|---|
| 169 | $\equiv 16 \bmod 17$ | $x_3$ |
| 95 | $\equiv 10 \bmod 17$ | $x_{235}$ |
| 215 | $\equiv 11 \bmod 17$ | $x_2$ |
| 121 | $\equiv 2 \bmod 17$ | $x_3$ |
| 91 | $\equiv 13 \bmod 17$ | $x_{235}$ |
| 209 | $\equiv 5 \bmod 17$ | $x_2$ |

Shifting row indices by 7, one can obtain 15 more disjoint sets of six rows each from:

Row (100)

| Index | | Mixer |
|---|---|---|
| 176 | $\equiv 6 \bmod 17$ | $x_{10}$ |
| 102 | $\equiv 0 \bmod 17$ | $x_{242}$ |
| 222 | $\equiv 1 \bmod 17$ | $x_9$ |
| 128 | $\equiv 9 \bmod 17$ | $x_{242}$ |
| 98 | $\equiv 3 \bmod 17$ | $x_{10}$ |
| 216 | $\equiv 12 \bmod 17$ | $x_9$ |

The combination provides 180 rows or equations for non-linearization, but the set of mixing transformations W is no longer free of additive triples, so that there is some group structure among the mixers.

The process of obtaining corruptible cosets from disjoint subgroups is slightly more complicated when $2^n-1=m$ is a prime since there is a discontinuity when shifting the row indices across m. As an example, consider the block size 7 maximal length linear orthomorphism defined by the generating function:

$$x_k = x_{k-7} \oplus x_{k-5} \oplus x_{k-4} \oplus x_{k-3} \oplus x_{k-2} \oplus x_{k-1}. \quad (101)$$

As in Equation 52 one can let $\{A,B,C,D,E,F,G\}$ be an arbitrary, complete, linearly independent set of 7-bit binary numbers. As before, the notation ABC is shorthand for $A \oplus B \oplus C$. A partial listing of the resulting equations is as follows:

Row (102)

| Index | | | | | |
|---|---|---|---|---|---|
| 0 | $\theta$ | $\oplus$ | $\theta$ | = | $\theta$ |
| 1 | BCDEFG | $\oplus$ | A | = | ABCDEFG |
| 2 | A | $\oplus$ | B | = | AB |
| 3 | B | $\oplus$ | C | = | BC |
| 4 | C | $\oplus$ | D | = | CD |
| 5 | D | $\oplus$ | E | = | DE |
| 6 | E | $\oplus$ | F | = | EF |
| 7 | F | $\oplus$ | G | = | FG |
| 8 | G | $\oplus$ | ACDEFG | = | ACDEF |
| . | . | | . | | . |
| . | . | | . | | . |
| . | . | | . | | . |
| 126 | AFG | $\oplus$ | ABCDEF | = | BCDEG |
| 127 | ABCDEF | $\oplus$ | BCDEFG | = | AG |

A typical corruptible subgroup of order 4 is:

Row (103)

| Index | | | | | |
|---|---|---|---|---|---|
| 0 | $\theta$ | $\oplus$ | $\theta$ | = | $\theta$ |
| 1 | BCDEFG | $\oplus$ | A | = | ABCDEFG |
| 2 | A | $\oplus$ | B | = | AB |
| 110 | ABCDEFG | $\oplus$ | AB | = | CDEFG |

From this one can construct the following coset:

Row (104)

| Index | | | | | |
|---|---|---|---|---|---|
| 8 | G | $\oplus$ | ACDEFG | = | ACDEF |
| 91 | BCDEFG | $\oplus$ | CDEFG | = | BG |
| 109 | AG | $\oplus$ | ABCDEFG | = | BCDEF |
| 127 | ABCDEFG | $\oplus$ | BCDEFG | = | AG |

Although 5X127 one finds it is a possibility for incremental spacing if we find a coset with different row indices mod 5. In this case:

$$\begin{aligned}8 &\equiv 3 \bmod 5 \\ 91 &\equiv 1 \bmod 5 \\ 109 &\equiv 4 \bmod 5 \\ 127 &\equiv 2 \bmod 5\end{aligned} \quad (105)$$

Displacing these indices by 5, one obtains:

$$\begin{aligned}13 &\equiv 3 \bmod 5 \\ 96 &\equiv 1 \bmod 5 \\ 114 &\equiv 4 \bmod 5 \\ 5 &\equiv 0 \bmod 5\end{aligned} \quad (106)$$

Displacing these indices by another 15, one obtains:

$$\begin{aligned}28 &\equiv 3 \bmod 5 \\ 111 &\equiv 1 \bmod 5 \\ 2 &\equiv 2 \bmod 5 \\ 20 &\equiv 0 \bmod 5\end{aligned} \quad (107)$$

Displacing these indices by another 20, one obtains:

$$\begin{aligned}48 &\equiv 3 \bmod 5 \\ 4 &\equiv 4 \bmod 5 \\ 22 &\equiv 2 \bmod 5 \\ 40 &\equiv 0 \bmod 5\end{aligned} \quad (108)$$

Displacing these indices by another 80, one obtains:

$$1 \equiv 1 \bmod 5$$
$$84 \equiv 4 \bmod 5$$
$$102 \equiv 2 \bmod 5$$
$$120 \equiv 0 \bmod 5$$
(109)

One can go one step further with a final increment of 10:

$$11 \equiv 3 \bmod 5$$
$$94 \equiv 4 \bmod 5$$
$$112 \equiv 2 \bmod 5$$
$$3 \equiv 0 \bmod 5$$
(110)

This process has produced 27 disjoint cosets or 104 out of 127 rows for the constructive corruption process. The above procedure has used up all rows of indices 0 or 3 mod 5. So no further corruptible cosets exist with all different row indices. However, 15 rows of index 1 mod 5, 2 of index 2 mod 5, and 2 of index 4 mod 5 remain. The mixing transforms are the sums of the numbers in the middle columns of the first two rows in each coset, that is:

$$x_8 \oplus x_{91} = x_1, x_{13} \oplus x_{96} = x_6, \ldots, x_6 \oplus x_{89} = x_{126}$$
and
$$x_{11} \ominus x_{94} = x_4.$$
(111)

Thus the set of mixing transforms is $W=\{\Theta, x_{1+5k}, x_4\}$ for $0 \leq k \leq 25$ and $|W|=28$. Note that in this case, the conditions of Prop. 9 do not hold, that is, $1/m$ and there are some pairs in W whose sums are also in W.

There are many other ways of selecting corruptible cosets for the non-linearization process. Mixing cosets of different orders can provide a mechanism for including almost all of the equations in the linear array but this must be balanced against the structure of the set of mixing transforms. The total number of orthomorphisms on n-bit numbers is not known.

While a preferred embodiment for the encryption and decryption of the present invention has been disclosed and described herein, it will be obvious to one skilled in the art that various changes in form and detail may be made therein without departing from the spirit and scope of the invention.

VIII. COSET DECOMPOSITIONS OF CORRUPTIBLE SUBGROUPS

With reference to FIGS. 24–26, additional methods for encrypting data will now be described. The methods employ a coset decomposition by corruptible subgroups of order 4. The methods will first be described in general mathematical terms, then specific steps of the methods will be described with reference to FIGS. 24–26. It should be noted that the following describes operations performed on sets of equations whereas the forgoing refers to matrices of equations. The terms are intended to be equivalent herein. In other words, the use of the term matrix in the forgoing is not intended to be limited soley to an algebraic matrix, but instead refers to a collection of equations.

1. Introduction

Let $G^n = Z_2^n \times Z_2^n \times Z_2^n$ be a maximal linear orthomorphism of block size n. It can be represented as shown in Appendix VI, FIG. 2.

$$\begin{aligned} \Theta \oplus \Theta &= \Theta \\ x_m \oplus x_1 &= x_{1-p} \\ x_1 \oplus x_2 &= x_{2-p} \\ &\vdots \\ x_{m-1} \oplus x_m &= x_{m-p} \end{aligned}$$
(112)

where $m=2^n-1$. As shown in Appendix VII, Proposition 1, the equations or rows, viewed as vectors, form a group under componentwise addition modulo 2. The mapping from $G^n \to Z_2^n$ given by $x_{k-1} \oplus x_k = x_{k-p} \to x_k$ is clearly an isomorphism. Thus a subgroup of order 4 in $G^n$ can be represented by a subgroup in $Z_2^n$ $$\{\Theta, x_i, x_j, x_i \oplus x_j\}$$
(113)

As shown in Appendix VI, page 7, a corruptible subgroup of order 4 has two consecutive rows and any corruptible coset of order 4 is in the coset decomposition of such a subgroup. Thus one need to look only at one of the m subgroups of $Z_2^n$ of the form $$\{\Theta, x_i, x_{i+1}, x_i \oplus x_{i+1}\}$$
(114)

By Definition 5 and Proposition 8, Appendix VI, the cosets corresponding to $\{\Theta, x_i, x_{i+1}, x_i \oplus x_{i+1}\} = G_{io}^2$ will be similar to cosets in the decompositions defined by similar subgroups. Without loss of generality, let $G_{1,0}^2 = \{\Theta, x_1, x_2, x_1 \oplus x_2\}$. $G_{1,0}^2$ decomposes $Z_2^n$ into $2^{n-2}-1$ cosets plus $G_{1,0}^2$, each of four rows or numbers. The coset $G_{1k}^2 = \{x_k, x_1 \oplus x_k, x_2 \oplus x_k, x_1 \oplus x_2 \oplus x_k\}$ represents the coset in the orthomorphism with four equations whose middle terms are:

$$x_k, x_1 \oplus x_k, x_2 \oplus x_k, x_1 \oplus x_2 \oplus x_k.$$
(115)

The mixing transform for the subgroup and all its cosets is $x_1 \oplus x_1 = \Theta$. An arbitrary coset corresponding to a corruptible subgroup, in this format, can be written as:

$$\{x_a, x_b, x_c, x_d\}$$
(116)

corresponding to the subgroup $\{\Theta, x_a \oplus x_b, x_a \oplus x_c, x_a \oplus x_d\}$ where $x_a \oplus x_b$ is the mixer. A similar coset has the form:

$$\{x_{a+l}, x_{b+l}, x_{c+l}, x_{d+l}\}$$
(117)

where l is any integer, and a+l, etc., is taken modulo $2^n$. The corresponding corruptible subgroup is:

$$\{\Theta, x_{a+l} \oplus x_{b+l}, x_{a+l} \oplus x_{c+l}, x_{a+l} \oplus x_{d+l}\}$$
(118)

with $x_{a+l} \oplus x_{b+l}$ being the mixer.

One can apply the forgoing by writing down all corruptible subgroups of order 4, horizontally, and then listing vertically the corresponding coset decompositions. The ith subgroup is:

$$G_{i,0}^2 = \{\Theta, x_i, x_{i+1}, x_i \oplus x_{i+1}\}$$
(119)

with mixer $x_i$. A typical coset $G_{1j}^2$ from the first column, i.e., in the coset decomposition generated by $G_{10}^2$ is $$G_{1j}^2 = \{x_j, x_1 \oplus x_j, x_2 \oplus x_j, x_1 \oplus x_2 \oplus x_j\}$$
(120)

Because of the group structure, the above sums represent other rows or equations of some index in the linear orthomorphism, for example, let:

$$x_1 \oplus x_j = x_b, x_2 \oplus x_j = x_c, x_1 \oplus x_2 \oplus x_j = x_d \quad (121)$$

then a similar coset in the decomposition generated by $G_{1+l,0}^2$ has the form:

$$G_{1+l,j}^2 = \{x_{j+l}, x_{b+l}, x_{c+l}, x_{d+l}\}. \quad (122)$$

The corresponding subgroup $G_{1+l,0}^2$ is obtained by adding $x_{j+l}$ to each number in the coset, or directly by taking a similar image of $G_{1,0}^2$, that is:

$$G_{1+l,0}^2 = \{\Theta, x_{1+l}, x_{2+l}, x_{1+l} \oplus x_{2+l}\} \quad (123)$$

The mixing transformation is $x_{1+l} \oplus x_{1+l} = \Theta$. Table I provides all coset decompositions of $G^n$ by corruptible subgroups of order 4.

TABLE I

| $G_{1,0}^2$ | $G_{2,0}^2$ | ... | $G_{1+l,0}^2$ | ... | $G_{m,0}^2$ |
|---|---|---|---|---|---|
| $G_{1,3}^2$ | $G_{2,3}^2$ | ... | $G_{l+l,3}^2$ | ... | $G_{m,3}^2$ |
| . | . | | . | | . |
| . | . | | . | | . |
| . | . | | . | | . |
| $G_{1,j}^2$ | $G_{2,j}^2$ | ... | $G_{l+l,j}^2$ | ... | $G_{m,j}^2$ |
| . | . | | . | | . |
| . | . | | . | | . |
| . | . | | . | | . |

In Table I, there are $m = 2^n - 1$ columns, each representing a coset decomposition. There are $2^{n-2}$ rows, each containing m similar cosets. The index j thus runs over some subset of $\{0, 1, 2, \ldots, m\}$. WLOG, the first coset, is formed by adding $x_3$ to each entry in $G_{1,0}^2$ since $x_3 \notin G_{1,0}^2$, that is:

$$G_{1,3}^2 = \{x_3, x_1 \oplus x_3, x_2 \oplus x_3, x_1 \oplus x_2 \oplus x_3\} \quad (124)$$

It is convenient, but not necessary, to generate each successive coset in the $G_{1,0}^2$ decomposition by selecting the n-bit block or row of lowest index which has not appeared in a previous coset in that decomposition.

To generate the nonlinear orthomorphism, one selects up to $2^{n-2}$ cosets which are non-overlapping, and applies the individual mixing transformations. It is desirable to select cosets from a variety of decompositions, i.e., different columns in Table I, to obtain a large set of distinct mixers.

2. Optimizing Nonlinearity

Nonlinearity has a negative definition, namely, not being linear. This permits a wide variation of mappings, such as, affine or piecewise linear which are not much better for cryptographic purposes than a linear mapping. In the context of n-bit binary numbers $Z_2^n$ under addition modulo 2, a mapping $S: Z_2^n \to Z_2^n$ is linear if:

$$S(x \oplus y) = S(x) \oplus S(y) \text{ for all } x, y \in Z_2^n \quad (125)$$

One can define a mapping $N: Z_2^n \times Z_2^n \to Z_2^n$ by:

$$N(x, y) = S(x \oplus y) \oplus S(x) \oplus S(y) \quad (126)$$

where S is a bijective mapping on $Z_2^n$.

The domain of $N(x, y)$ is all of $Z_2^n \times Z_2^n$ but the range may be a proper subset of $Z_2^n$. If S is linear, then $N(x, y) \equiv \Theta$. If $N(x, y) \equiv c \neq \Theta$, a constant, then S is affine. If the range of $N(x, y)$ is all of $Z_2^n$ and if the values of $N(x, y)$ are more or less evenly distributed, then $S(x)$ is "very" nonlinear.

Achieving a high degree of non-linearity is one goal of the methods of constructive corruption of the invention.

The mapping from the original linear orthomorphism is:

$$F(x_i) = x_{i+1-p} \quad (127)$$

After constructive corruption, the modified mapping is:

$$S(y_i) = x_{i+1-p} \quad (128)$$

where $y_i = x_i \oplus w_i$ and $w_i \oplus w_j = \Theta$ is the mixing transformation.

$$
\begin{aligned}
N(y_i, y_j) &\equiv S(y_i) \oplus S(y_j) \oplus S(y_i \oplus y_j) \quad (129)\\
y_k &= y_i \oplus y_j = (x_i \oplus w_i) \oplus (x_j \oplus w_j)\\
&= (x_i \oplus x_j) \oplus (w_i \oplus w_j) = (x_k \oplus w_k)\\
S(y_i) &= F(x_i) = F(y_i \oplus w_i) = F(y_i) \oplus F(w_i)
\end{aligned}
$$

so that:

$$N(y_i, y_j) = F(w_i) \oplus F(w_j) \oplus F(w_k) \neq \Theta \quad (129a)$$

unless $w_i \oplus w_j = w_k$.

Conclusion:

The set $W = \{w_i\}$ should contain no even sums, that is, $$w_i \oplus w_j \neq w_k, i \neq j. \quad (129b)$$

If $G^{n-1}$ is a maximal subgroup of $G^n$, then its complement $\overline{G}^{n-1}$ has this property. Since $|\overline{G}^{n-1}| = 2^{n-1}$, there are more potential mixing transformations available with this property than there are cosets to be corrupted.

3. Noncanceling Mixing Transformations

Consider an arbitrary maximal subgroup $G^{n-1}$ and its corresponding complement $\overline{G}^{n-1}$. Each contains $2^{n-1}$ rows or equations. Any maximal subgroup will contain exactly one set of n–1 consecutive equations from the complete orthomorphism, and the complement will contain exactly one set of n consecutive equations from the complete orthomorphism. Choose any n consecutive equations, represented by the numbers in the middle column. The consecutive equations will be a complete linearly independent set:

$$\{x_a, x_{a+1}, \ldots, x_{a+n-1}\} \quad (130)$$

$G^{n-1}$ can be generated by taking all even sums of these, i.e., sums of pairs, quadruples, etc. The n–1 consecutive equations in $G^{n-1}$ will be defined by the n–1 pairs:

$$x_a \oplus x_{a+1}, x_{a+1} \oplus x_{a+2}, \quad (131)$$

$\overline{G}^{n-1}$ can be generated directly by taking all odd sums of these n numbers, i.e., the n numbers themselves, sums of triples, quintuples, etc. For any number $x_i \in \overline{G}^{n-1}$, there is a corruptible subgroup:

$$G_{i,0}^2 = \{\Theta, x_i, x_{i+1}, x_i \oplus x_{i+1}\} \quad (132)$$

$x_i \oplus x_j = \Theta$ is the mixing transformation for this subgroup and all of its cosets of order 4. The decomposition of Table I can therefore be replaced by the decomposition of Table II which consists of $2^{n-1}$ columns, each representing a coset decomposition corresponding to some $x_i \in \overline{G}^{n-1}$. Hence, Table II provides all coset decompositions of $G^n$ by corruptible subgroups of order 4 defined by $x_i \in \overline{G}^{n-1}$.

TABLE II

| $G^2_{a,0}$ | $G^2_{a+1,0}$ | ... | $G^2_{i,0}$ | ... |
|---|---|---|---|---|
| $G^2_{a,3}$ | $G^2_{a+1,3}$ | ... | $G^2_{i,3}$ | ... |
| . | . | | . | |
| . | . | | . | |
| . | . | | . | |
| $G^2_{a,j}$ | $G^2_{a+1,j}$ | ... | $G^2_{i,j}$ | ... |
| . | . | | . | |
| . | . | | . | |
| . | . | | . | |

Each coset decomposition (columns in Table II) contains $2^{n-2}$ cosets, including the subgroup itself, each consisting of four rows or equations. Any pair of subgroups will share either one row, $\Theta \oplus \Theta = \Theta$ (represented by $\Theta$) or two rows, $\Theta \oplus \Theta = \Theta$ and $x_{k-1} \oplus x_k = x_{k-p}$ for some index k (represented by $\Theta$ and $x_k$). Correspondingly, a coset in some coset decomposition (column in Table II) will overlap with either four cosets or two cosets in another decomposition (column). Thus, selecting the first coset from some column gives a choice or either $2^{n-2}-4$ cosets or $2^{n-2}-2$ cosets from another column without overlap. For example, if n=4, each coset decomposition (column) will contain four cosets, including the subgroup. Thus, if two subgroups share only $\Theta$, a coset from one will overlap with the other subgroup and its three cosets. If the two subgroups share $\Theta$ and some $x_k$, then a coset from one will overlap with just two from the other, permitting a selection of two nonoverlapping cosets from two columns. For larger block sizes n, the choices will be progressively larger.

To accomplish the nonlinearization in general, a DSD device is provided which selects an arbitrary coset from some column. Next, the DSD examines the similar coset, in the same row but in the next column to the right. If it does not overlap with the first coset, the similar coset is selected. If it does overlap with the first coset, the similar coset is rejected and a next coset is examined in the same row to the next column. The next coset is selected or rejected accordingly depending upon whether it does or does not overlap with the first coset or any other previously selected coset. This procedure continues until a collection of non-overlapping cosets from different columns are selected. With this procedure, each selected coset will have a different mixer and none will be the sum of any other pair of mixers. It should be noted that the resulting selected cosets do not overlap with any of the other select cosets. It also should be noted that it is not necessary to examine cosets on a row by row basis. Rather, the cosets can be examined in any order. Proceeding row by row, however, provides an effective method.

If, for example, the DSD started in row j of Table II, the DSD would generate a collection of cosets of the form $G^2_{kj}$ where k varies over some subset of the $2^{n-2}$ columns in the table. Having gone through one row in Table II, the DSD can proceed to another row and examine cosets from previously unused columns. Not counting a subgroup of order 4, there are at most $2^{n-2}-1$ cosets to be obtained this way.

If the first row in Table II were used, since it consists entirely of subgroups each sharing at least the identity $\theta$, only one selection could be made. However, if the nonlinear orthomorphism to be constructed is to retain $\Theta$ as the fixed point, i.e., retain $\Theta \oplus \Theta = \Theta$, the first row will not be used.

Consider the same example as in Appendix VI, FIG. 13, with n=8 and generating function $x_k = x_{k-8} \oplus x_{k-6} \oplus x_{k-3} \oplus x_{k-}$ 2. Let {A,B,C,D,E,F,G,H} be a complete linearly independent set. For simplicity of notation, let A,B,C stand for $A \oplus B \oplus C$. Then, the maximal length linear orthomorphism can be represented in part by:

| 0 | $\Theta$ | $\oplus$ | $\Theta$ | = | $\Theta$ | (133) |
|---|---|---|---|---|---|---|
| 1 | BEFH | $\oplus$ | A | = | ABEFH | |
| 2 | A | $\oplus$ | B | = | AB | |
| 3 | B | $\oplus$ | C | = | BC | |
| 4 | C | $\oplus$ | D | = | CD | |
| 5 | D | $\oplus$ | E | = | DE | |
| 6 | E | $\oplus$ | F | = | EF | |
| 7 | F | $\oplus$ | G | = | FG | |
| 8 | G | $\oplus$ | H | = | GH | |
| . | . | | . | | . | |
| . | . | | . | | . | |
| . | . | | . | | . | |
| 254 | BCDEH | $\oplus$ | ADEG | = | ABCGH | |
| 255 | ADEG | $\oplus$ | BEFH | = | ABDFGH | |

In our convention, the orthomorphic mapping which we are using for encryption, e.g., would be S(D)=DE, from row 5. $\overline{G}^{n-1} = \overline{G}^7$ can be generated by taking the complete linearly independent set and all odd sums.

$$\overline{G}^7 = \{A,B,C,D,E,F,G,H,ABC,BCD,\ldots,FGH,ABD,\ldots\} \quad (134)$$

Table II has the form:

| Column: | 1 | 2 | 3 | | (134a) |
|---|---|---|---|---|---|
| Row 0 | {$\Theta$,A,B,AB} | {$\Theta$,B,C,BC} | {$\Theta$,C,D,CD} | ... | |
| Row 1 | {C,AC,BC,ABC} | {D,BD,CD,BCD} | {E,CE,DE,CDE} | ... | |
| | . | . | . | | |
| | . | . | . | | |
| | . | . | . | | |

A typical coset in column 1 has the form:

| B | $\oplus$ | C | = | BC | (134b) |
|---|---|---|---|---|---|
| EFH | $\oplus$ | AC | = | ACEFH | |
| AB | $\oplus$ | BC | = | AC | |
| AEFH | $\oplus$ | ABC | = | BCEFH | | with mixing transformation $A \oplus A = \Theta$. Its similar image in column 2 is:

| C | $\oplus$ | D | = | CD | (134a) |
|---|---|---|---|---|---|
| AC | $\oplus$ | BD | = | ABCD | |
| BC | $\oplus$ | CD | = | BD | |
| ABC | $\oplus$ | BCD | = | AD | | with mixing transformation $B \oplus B = \Theta$. As these two cosets do not overlap, both could be selected. To not overlap means that the cosets do not have an equation in common, or equivalently, that the cosets share no number in their middle columns.

4. Residual Linearity

Residual linearity is considered to be the case where $N(x,y)=\Theta$ and $x \neq \Theta$, $y \neq \Theta$, and $x \neq y$. Assume that, at most, one coset is corrupted in each decomposition (column). Such a case can occur in two ways even though the set of mixers has no even sums. If two numbers $a,b \in G_{ij}^2$, then $a \oplus b = c \in G_{i0}^2$, the subgroup corresponding to that coset. By assumption, the coset $G_{ij}^2$ is corrupted with mixer $x_i$ but $G_{i0}^2$, as a subgroup, is not corrupted as assumed above. However, c is one of the non-zero members of $G_{i0}^2\{x_i,x_{i+1},x_i \oplus x_{i+1}\}$.

These occur in each of the other coset decompositions. If they all occur in cosets which are corrupted in other decompositions, for example, if $c \in G_{kj}^2$ for some k and j, with mixer $x_k$, then c is modified to become $c \oplus x_k$. In that case, as in Section 2 above:

$$
\begin{aligned}
N(a,b) &= S(a) \oplus S(b) \oplus S(a \oplus b) \\
&= S(a) \oplus S(b) \oplus S(c) \\
&= F(a \oplus x_i) \oplus F(b \oplus x_i) \oplus F(c \oplus x_k) \\
&= F(x_i) \oplus F(x_i) \oplus F(x_k) \\
&= F(x_k) \neq \Theta
\end{aligned} \quad (135)
$$

where S is the nonlinear mapping and F is the linear mapping from which S is derived. However, if c does not occur in any coset which is corrupted, then the triple a,b,c is linear.

In general, there will be some residual set of rows or numbers H which are not modified from their form in the original linear orthomorphism, $G^n$ defining the linear mapping F. If e,f and $e \oplus f \in H$, then this triple will remain linear. A sufficient condition to avoid this is that H is contained in the complement of some maximal subgroup.

In view of the forgoing general remarks and examples, a method for performing dynamic block substitutions, illustrated in FIG. 24, is provided as follows. As with the previously described methods, the method of FIG. 24 operates to encrypt a set of 2n unique clear text equations blocks of n-bit binary numbers by substituting therefor associated unique encrypted blocks of n-bit binary numbers. Also as with the above-described methods, encryption beings, at set 502, by finding a first set $G^n$ of $2^n$ equations. The equations including the identity equations $\Theta \oplus \Theta = \Theta$ and the remaining $2^n-1$ equations are orderable as follows:

$$
\begin{array}{cccccc}
\text{Equation \#} & & & & & (136) \\
1 & x_m & \oplus & x_1 & = & x_{1-p} \\
2 & x_1 & \oplus & x_2 & = & x_{2-p} \\
\cdot & \cdot & \cdot & \cdot & \cdot & \cdot \\
\cdot & \cdot & \cdot & \cdot & \cdot & \cdot \\
j & x_{j-1} & \oplus & x_j & = & x_{j-p} \\
\cdot & \cdot & \cdot & \cdot & \cdot & \cdot \\
\cdot & \cdot & \cdot & \cdot & \cdot & \cdot \\
m & x_{m-1} & \oplus & x_m & = & x_{m-p}
\end{array}
$$

where $m=2^n$, $L_n$, $M_n$ and $R_n$ are the left, middle and right columns respectively of the set of equations, and $G^n = L_n \times M_n \times R_n$ represents the set of equations.

The first set of equations represents a linear orthomorphism with each equation of the set representing the modulo 2 additions of one of the $2^n$ clear text blocks in the left column with a unique one of $2^n$ n-bit blocks in the middle column to provide the associated unique n-bit block in the right column. All of the equations in the first set of $2^n$ equations are characterized by the vector sum modulo 2 of any number of the equations also being one of the equations in the first set of equations.

In steps 504–508, the equations of the first set of equations are modified to provide a second set of equations. The equations are modified so that the modified equations collectively map the same text blocks in the left column to unique n-bit blocks in the right column, but in a nonlinear manner so that each of the modified equations is not generally the sum modulo 2 of any number of the equations in the unmodified first step. More specifically, at step 504, the first set of equations is decomposed into a table of corruptible cosets of order 4 based on different subgroups. The resulting table is generally represented by $$
\begin{array}{cccc}
G_{a,0}^2 & G_{a+1,0}^2 & \cdots & G_{i,0}^2 & \cdots \\
G_{a,3}^2 & G_{a+1,3}^2 & \cdots & G_{i,3}^2 & \cdots \\
\cdot & \cdot & & \cdot \\
\cdot & \cdot & & \cdot \\
\cdot & \cdot & & \cdot \\
G_{a,j}^2 & G_{a+1,j}^2 & \cdots & G_{i,j}^2 & \cdots \\
\cdot & \cdot & & \cdot \\
\cdot & \cdot & & \cdot \\
\cdot & \cdot & & \cdot
\end{array} \quad (137)
$$

Each column represents a coset decomposition of the same linear orthomorphism based on a different subgroup of $G^n$. a, i and j are arbitrary integer indices. The decomposition may be achieved by first generating a subgroup by selecting any two successive equations columns of the first set of equations adding the two equations to yield a third equation and completing the sub-group by including the identity equation. For example, the 12th and 13th rows of the first set of equations may be selected, added together to yield a third equation (which is one of the other equations of the first set of equations.) As noted, the fourth equation of the sub-group is the identity equation. The subgroup is then employed to generate one column of the table, for example the "a" column. The entire column represents a linear orthomorphism of the first set of equations with each element of each column being a coruptible coset. Then a second pair of consecutive equations are selected to enerate a second sub-group and a second column of the table is generated, and so on, until a sub-group is reached which overlaps with a previously used sub-group. In some implementations, it may not necessary to perform a complete coset decomposition.

At step 506, a set of non-overlapping cosets are selected from rows of the table. The non-overlapping cosets are selected by choosing a first coset within some row, then determining whether the adjacent coset to the right within the same row overlaps the first coset. For example, the first coset of the second row may be selected. The immediately adjacent coset to the right of the second row is then compared to determine if an overlap occurs. As noted above, two cosets are deemed to not overlap if the cosets do not have an equation in common, or equivalently, that the cosets share no number in their middle columns. A third coset, immediately to the right of the second coset is examined to determine if it overlaps with either of the first two cosets. In this manner all non-overlapping cosets of the first row are selected. Then non-overlapping cosets of the second row are selected. This process continue until all, or at least a sufficient number, of non-overlapping cosets are selected. Typically, it is necessary to examine only about three fourths of the cosets to achieve an adequate number of non-overlapping cosets. Furthermore, the cosets need not be selected row by row. Rather, any method may be employed for selecting cosets for overlap comparison. However, selecting the cosets row by row provides a particularly efficient implementation method.

The resulting collection of cosets each having a unique mixing transform associated therewith. The mixing transforms are applied to the first set of equations, in generally the same manner of mixing as described above with reference to other methods of constructive corruption, to yield the second set of equations. More specifically, for each selected non-overlapping coset, the mixing transform associated with the sub-group corresponding to the coset is applied to the equations of the coset. This has the effect of rearranging the elements of the equations of the first set of equations which form the cosets. This achieves a reordering of the equations of the first set to yield the desired non-linear second set of equations. The step of applying the mixing transforms to the first set of equations is identified in FIG. 24 as step 508.

At 510, the encryption is performed using the second set of equations by applying elements of a second column of clear textr blocks to those of a first column of clear text blocks. More specifically, for each clear text block in the left column to be encrypted, the unique one of the $2^n$ n bit blocks associated therewith in the middle column is added modulo 2 to that block in accordance with the associated equation of the second set of equations of $2^n$ equations to obtain the encrypted block in the right column. Final step 510 is similar to previous final steps described above with reference to the other embodiments of the invention.

As an alternative to selecting only those cosets which overlap, a selection method may be performed wherein only non-overlapping cosets from different columns are selected. Although such a method is somewhat more complicated, and therefore time consuming, it has the advantage of achieving a greater degree of non-linearization. Another alternative method involves selecting non-overlapping cosets from columns having mixing transforms which are not the sum modulo 2 of the mixing transforms of any two previously selected non-overlapping cosets. In other words, a non-overlapping coset is selected only if $w_1 \oplus w_2$ is unequal to $w_3$ where $w_3$ is the mixing transform of a newly selected non-overlapping coset and $w_1$ and $w_2$ represent the mixing transforms of any two previously selected non-overlapping coset. Again, the alternative method is more complicated, but had the advantage of achieving a greater degree of nonlinearity.

Preferably, hard-wired circuitry is employed for performing the various steps set forth FIG. 24. However, programmed computers or microprocessors may alternatively be employed.

5. The Bar Sinister Method of Constructive Corruption

The method of non-canceling transformations described above with reference to FIG. 24 typically produces orthomorphisms with little if any residual nonlinearity. That is, the range of N(x,y) is all of $Z_2^n$ with a relatively even distribution. However, the method of Noncanceling transformations may not work effectively for very small block size. As pointed out in Section 3, for n=4, only 8 equations out of 16 can be modified using the method of noncanceling mixing transformations. The following method is more suited to the constructive corruption of linear orthomorphisms of small block size.

As before, a linear orthomorphism on $Z_2^n$ can be written as:

| Row Number | L | | M | | R | | (138) |
|---|---|---|---|---|---|---|---|
| 0 | $\Theta$ | $\oplus$ | $\Theta$ | = | $\Theta$ | | |
| 1 | $x_m$ | $\oplus$ | $x_1$ | = | $x_{1-p}$ | | |
| 2 | $x_1$ | $\oplus$ | $x_2$ | = | $x_{2-p}$ | | |
| . | . | | . | | . | | |
| . | . | | . | | . | | |
| . | . | | . | | . | | |
| k | $x_{k-1}$ | $\oplus$ | $x_k$ | = | $x_{k-p}$ | | |
| . | . | | . | | . | | |
| . | . | | . | | . | | |
| . | . | | . | | . | | |
| $m = 2^n - 1$ | $x_{m-1}$ | $\oplus$ | $x_m$ | = | $x_{m-p}$ | | |

For simplicity of notation, we can use $x_{k-1}=L_k$ in the left column; $x_k=M_k$ in the middle column; and, $x_{k-p}=R_k$ in the right column. In that case, the equation immediately above can be rewritten as:

| Row Number | L | | M | | R | (139) |
|---|---|---|---|---|---|---|
| 0 | $\Theta$ | $\oplus$ | $\Theta$ | = | $\Theta$ | |
| 1 | $L_1$ | $\oplus$ | $M_1$ | = | $R_1$ | |
| 2 | $L_2$ | $\oplus$ | $M_2$ | = | $R_2$ | |
| . | . | | . | | . | |
| . | . | | . | | . | |
| . | . | | . | | . | |
| k | $L_k$ | $\oplus$ | $M_k$ | = | $R_k$ | |
| . | . | | . | | . | |
| . | . | | . | | . | |
| . | . | | . | | . | |
| m | $L_m$ | $\oplus$ | $M_m$ | = | $R_m$ | |

If columns L and M can be permuted, leaving column R fixed, and maintaining equality, a new and generally non-linear orthomorphism will have been generated. This is achieved by finding a consistent set of equations:

$$L_i \oplus M_j = R_k \qquad (139a)$$

where the indices refer to the row numbers in Equation (139). The index k is a function of indices i and j, so that one can write:

$$k \equiv k(i,j) \qquad (140)$$

From Equation (138), $L_i \oplus M_{i-1} = R_0 = \Theta$ for all i so that $k(i,i-1)=0$. $L_i \oplus M_i = R_i$ so that $k(i,i)=i$. $L_0 \oplus M_i = R_{i+p}$ and $L_i \oplus M_0 = R_{i+p-1}$, from Equation (138), where p is the shift between the middle and right columns determined by the generating function for the linear orthomorphism. Thus, $k(0,i)=i+p$ and $k(i,0)=i+p-1$. The possible combinations in Eq. (138) are expressed Table III. In Table III the entries are indices of k(i,j) of $R_k=L_i \oplus M_j$ wherein indices are row numbers in the linear orthomorphism in Equation a.

TABLE III

|  | | $M_j$ Middle Column | | | | | | |
|---|---|---|---|---|---|---|---|---|
|  | | 0 | 1 | 2 | 0 | | 1 | m |
| | 0 | 0 | p+1 | p+2 | p+3 | | p+1 | p+m |
| | 1 | p | 1 | k(1,2) | k(1,3) | | k(1,l) | k(1,m) |
| | 2 | p+1 | 0 | 2 | k(2,3) | | k(2,l) | k(2,m) |
| $L_i$ Left Column | 3 | p+2 | k(3,1) | 0 | 3 | | k(3,l) | k(3,m) |
| | ⋮ | ⋮ | ⋮ | ⋮ | ⋮ | | ⋮ | ⋮ |
| | l | p+l−1 | k(l,1) | k(l,2) | k(l,3) | | 1 | k(l,m) |
| | ⋮ | ⋮ | ⋮ | ⋮ | ⋮ | | ⋮ | ⋮ |
| | m | p+m−1 | k(m,1) | k(m,2) | k(m,3) | | k(m,l) | m |

Each row and each column in Table III contains each index in the set $\{0,1,2,\ldots,m\}$ exactly once. An orthomorphism is generated by selecting one entry from each row and column without duplicates. Equivalently, the entries $k(i,j)$ can be thought of as Z axis coordinates in a 3-dimensional array, in which case, each row, column, and parallel plane must be visited exactly once.

If the principal diagonal is chosen, from upper left to lower right, the original linear orthomorphism is obtained. If the subdiagonal from upper left to lower right is chosen, $k(i,i-1)$, it is easy to see that the trivial orthomorphism mapping everything onto $\Theta$ is obtained. As noted above $x_{i-1}=L_i$ and $x_j=M_j$. Thus $$x_{i-1} \oplus x_j = x_{k-p} \tag{141}$$

This equation corresponds to some power s of the basic orthomorphic permutation where $i-1=j-s$ and $k-p=j-p_s$. Thus, $s=j-i+1$ and $k+j+p-p_s=j+p-p_{(j-i+1)}$. If $p_s$ has been tabulated as a function of s, Table III could be derived this way. (See Appendix VIII, section 4.) Now consider any other such diagonal from upper left to lower right, that is, $k(i,i+a)$ for all i and some fixed a. Then $k(i,i+a)=i+a-p_s$ with $s=a+1$ and $x_{i-1} \Theta x_{i+a}=x_{i+a-p_s}$. Thus, the orthomorphism which is generated is the $(a+1)$st power of the original, and is linear again.

Now, if a diagonal is chosen from upper right to lower left, we can start with some pair $$L_a \oplus M_b = R_k \text{ with } k=k(a,b) \tag{142}$$

or equivalently $$x_{a-1} \oplus x_b = x_{b-p_s} = x_{k-p} \tag{143}$$

where $s=b-a+1 \mod m$.

Proceed downward from right to left with successive values:

$$k(a+i,b-i)=b+p-p_s-2i \tag{144}$$

and equations of the form $$x_{a+i-1} \oplus x_{b-i} = x_{b-i-p_s}$$

where $$s=b-i-(a+i-1)=b-a+1-2i \mod m$$

and the successive values of the index i give equations from different powers of the basic linear orthomorphism. Proceeding along such diagonals from upper right to lower left eventually leads to a repeated value of $k(i,j)$. This "collision" occurs when $$\begin{aligned}k(a+i,b-1) &= k(a,b) \text{ or} \\ b+p-p_{(b-a+1)} &= b - Wi + p - p_{(b-a+1-2i)}\end{aligned} \tag{145}$$

so that $i=p_{(b-a+1)}-p_{(b-a+1-2i)}$. The repeated value is either skipped or a transitions made to a parallel diagonal. The method thereby selects entries along one or more diagonals from a top right to a bottom left of the entries of Table III. This method is herein referred to as a Bar Sinister method as the resulting direction of the diagonals is reminiscent of the bar sinister from heraldry.

6. Determining the Mixing Transformations

As mentioned above in Section 4, the mixers used give some measure of residual linearity. Even though the nonlinear orthomorphism in the bar sinister approach is generated without use of mixing transformations, determining them gives some information on nonlinearity in the sense described in Section 2. It is typically necessary only to compare the left and middle columns, respectively, of the original orthomorphism with those of the nonlinear version, keeping the right column in the original order. If the kth rows, respectively, are Linear      Nonlinear (146)

$$x_{k-1} \oplus x_k = x_{k-p} \qquad u_k \oplus v_k = x_{k-p}$$

-continued then $w_k = (u_k \oplus x_{k-1}) = (v_k \oplus x_k)$.

7. Constructing the Bar Sinister Table

Because the table of entries produced during the bar sinister method has $2^{2n}$ entries, it would seem to be a formidable task to construct the table. However, there are some simplifications. For example, the top row and the left company are automatically generated but not needed if $\Theta$ is to be maintained as the fixed point. The main diagonal, from upper left to bottom right, and the subdiagonal are also fixed. Consider $x_m \oplus x_j = x_{l-p_s}$ in the row of index 1. $s \equiv (1-m) \mod m = 1$. So $k(1,1) = 1-p_l$. In row 2, $x_l \oplus x_{l+1} = x_{l+1-p_s}$ where again $s \equiv (1+1-1) \mod m = 1$. Therefore, $k(2,1) = 1+1-p_j = k(1,1)+1$. In general, $k(1+d,1) = k(1,1)+d$. $k(1,m) = 0$. So, it is necessary only to determine $2^n - 3$ numbers in the row of index 1.

In view of the forgoing general remarks and examples, a method for performing dynamic block substitutions employing the bar sinister method of the invention is as follows. The method is illustrated in FIG. 25. As with the previously described methods, the method of FIG. 24 operates to encrypt a set of $2^n$ unique clear text equations blocks of n-bit binary numbers by substituting therefor associated unique encrypted blocks of n-bit binary numbers. Encryption beings, at set 602, by finding a first set of equations $G^n$ of $2^n$ equations. The equations including the identity equations $\Theta \oplus \Theta = \Theta$ and the remaining $2^n - 1$ equations are orderable as follows:

| Row Number | L | | M | | R | (147) |
|---|---|---|---|---|---|---|
| 0 | $\Theta$ | $\oplus$ | $\Theta$ | = | $\Theta$ | |
| 1 | $L_1$ | $\oplus$ | $M_1$ | = | $R_1$ | |
| 2 | $L_2$ | $\oplus$ | $M_2$ | = | $R_2$ | |
| . | . | | . | | . | |
| . | . | | . | | . | |
| . | . | | . | | . | |
| k | $L_k$ | $\oplus$ | $M_k$ | = | $R_k$ | |
| . | . | | . | | . | |
| . | . | | . | | . | |
| . | . | | . | | . | |
| m | $L_m$ | $\oplus$ | $M_m$ | = | $R_m$ | | right columns respectively of the set of equations.

As with the first set of equations employed in the above-described methods, the first set of equations of the method FIG. 25 represents a linear orthomorphism with each equation of the set of equations representing the modulo 2 additions of one of the $2^n$ clear text blocks in the left column with a unique one of $2^n$ n-bit blocks in the middle column to provide the associated unique n-bit block in the right column. All of the equations in the first set of $2^n$ equations are characterized by the vector sum modulo 2 of any number of the equations also being one of the equations in the first set of equations.

In steps 604–608, the equations of the first set of equations are modified to provide a second set of equations. The equations are modified so that the modified equations collectively map the same text blocks in the left column to unique n-bit blocks in the right column, but in a nonlinear manner so that each of the modified equations is not generally the sum modulo 2 of any number of the equations in the unmodified first step.

More specifically, finding the second set of equations is performed by finding a consistent set of equations $$L_i \oplus M_j = R_k, \quad (148)$$

where $x_{k-1} = L_k$ is the left column; $x_k = M_k$ is the middle column; and, $x_{k-p} = R_k$ is the right column and k is a function of i and j.

The steps of finding the consistent set of equations include steps 604, 606 and 608. At step 604 a table of indices of k is developed wherein each row and each column of the table contains each index in the set $\{0,1,2, \ldots, m\}$. The table of indices is illustrated above in Table III, above. At step 604 one entry from each row and column of said table is selected without duplicates by choosing an index and selecting entries along a diagonal within the table extending from high to low j and from low to high i. In other words, within table III, a diagonal is selected which extends from top right to bottom left. For example, the j=m, i=0 entry may be selected. Next the j=m−1, i=1 entry is compared to determine if the two elements are non-duplicates. The elements are duplicates, the j=m−1, i=1 entry is discarded, if not the next entry along the top right to bottom left diagonal is selected. The process proceeds along the diagonal until a duplicate term is encountered. If a duplicate entry is encountered, either a transition is made to an adjacent diagonal or the entry is simply skipped and processing proceeds along the original diagonal. In this manner, a set of non-duplicate entries are developed.

Other methods for selecting entries may be employed which do not necessarily involve traversing a bottom left of top right diagonal of the table. However, employing such a diagonal has been found to be a particularly effective for finding nonduplicate entries which yield a nonlinear orthomorphism. It should be noted that the selection of a top left to bottom right diagonal yields a linear orthomorphism.

At step 608 the selected entries are applied to the first set of equations to yield the second set of equations, in the manner described above in mathematical terms. It should be noted that no mixing transforms need be generated. Rather, the selected nonduplicate entries provide the indices for rearranging the equations of the first set to yield the second set.

At 610, the encryption is performed by applying the second set of equations to the clear text data. More specifically, for each clear text block in the left column to be encrypted, the unique one of the $2^n$ n bit blocks associated therewith in the middle column is added modulo 2 to that block in accordance with the associated equation of the second set of equations of $2^n$ equations to obtain the encrypted block in the right column. Final step 610 is similar to previous final steps described above with reference to the other embodiments of the invention.

Once, a particular set of indices are selected which yield a nonlinear orthomorphism, the arbitrary indices of the nonlinear orthomorphism may be set to any of a large number of combinations of particular numerical values to thereby yield a large number of different encryption codes. Furthermore, additional nonlinear orthomorphisms may be generated by performing the selection method on the table of indices but, for example, beginning with a different entry along a different diagonal. In general, there are a very large number of possible combinations of non-duplicate entries which can be selected based on the table using the diagonal selection method.

Although the method of FIG. 25 may be also employed for large block sizes, it is ideally suited for small block sizes such as n=5 or n=4.

Preferably, hard-wired circuitry is employed for performing the various steps set forth FIG. 25. However, programmed computers or microprocessors may alternatively be employed.

8. An Example for Block Size 4

FIG. 26 is an example of the table of indices for block size 4 developed using the method of FIG. 25. More specifically, FIG. 26 provides a compatible rearrangement of columns of indices for $n=4$, $p=4$, $x_k=x_{k-4}\oplus x_{k-1}$ (149)

The contents of the table of FIG. 26 are integers k, corresponding to $R_k$, the right column of the linear orthomorphism, $L_i \oplus M_j = R_k$. Each entry is the modulo 2 sum of the corresponding ith and jth indices. The ith indices are represented by reference numeral 700 and the jth entries are represented by reference numeral 702.

The original linear orthomorphism is as shown in section above with p=4. The table shows compatible rearrangements of the three columns. For example, $L_{10}$ and $M_6$ have the corresponding entry k(10,6)=14 which means that $L_{10} \oplus M_6 = R_{14}$ or that $$x_{10-1} \oplus x_6 = x_{14-4}$$
$$x_9 \oplus x_6 = x_{10}$$ (150)

The small circles in FIG. 26, identified generally by reference numeral 704, are selected values of k(a,b) which are all different and taken from each row and column exactly once. Equivalently, this represents a 16×16×16 cube in which each row and column in the X, Y plane and each parallel plane along the Z axis are sampled once. As far as possible, a lower left to upper right diagonal was used. Three values of k, 15, 1, and 3, occur on an upper left to lower right diagonal. The values define three equations of the form:

$$x_{i-6} \oplus x_i = x_{i-p6} \text{ where } p_6 = 13.$$ (151)

If g designates the permutation of $Z_2^4$ defined by the generating function $x_k = x_{k-4} \oplus x_{k-1}$ acting upon some complete linearly independent set, then these three equations come from the orthomorphism defined by $g^6$. However, the three equations are linearly independent and thus do not form a linear subgroup in the orthomorphism defined by the selection in FIG. 26.

The nonlinear orthomorphism resulting from applying the selected nonduplicate entries is provided in Table IV.

TABLE IV

| | ⊕ | ⊖ | = | ⊖ |
|---|---|---|---|---|
| | $X_m$ | ⊕ | $X_{13}$ | = | $X_7$ |
| | $X_1$ | ⊕ | $X_{11}$ | = | $X_6$ |
| | $X_2$ | ⊕ | $X_{14}$ | = | $X_3$ |
| | $X_3$ | ⊕ | $X_9$ | = | $X_{11}$ |
| | $X_4$ | ⊕ | $X_{10}$ | = | $X_{12}$ |
| | $X_5$ | ⊕ | $X_8$ | = | $X_9$ |
| | $X_6$ | ⊕ | $X_{12}$ | = | $X_{14}$ |
| | $X_7$ | ⊕ | $X_{15}$ | = | $X_{13}$ |
| | $X_8$ | ⊕ | $X_7$ | = | $X_4$ |
| | $X_9$ | ⊕ | $X_6$ | = | $X_{10}$ |
| | $X_{10}$ | ⊕ | $X_5$ | = | $X_{15}$ |
| | $X_{11}$ | ⊕ | $X_4$ | = | $X_2$ |
| | $X_{12}$ | ⊕ | $X_3$ | = | $X_5$ |
| | $X_{13}$ | ⊕ | $X_2$ | = | $X_1$ |
| | $X_{14}$ | ⊕ | $X_1$ | = | $X_8$ |

IX. DEFINITIONS OF TERMS AND SYMBOLS

All the following definitions are specialized to n-bit binary numbers, under the operation of bit wise addition modulo 2 (XORing) and to bijective mappings on these numbers.

Affine Mapping: A bijective mapping, T on $Z_2^n$ such that $T(x) \oplus T(y) = T(x \oplus y) \oplus c$ for some constant c and all x, y, $\epsilon$ $Z_2^n$. In engineering, this is frequently referred to as linear. Here, the term linear is reserved for the case where c=θ, the additive identity.

Perfectly Balanced Mapping: Let $H_i$ be a maximal subgroup of $Z_2^n$, i.e., $H_i$ is a subgroup of order $|H_i|=2^{n-1}$. $Z_2^n = H_i \cup \overline{H}_i$. If a bijective mapping T has the property $|TH_i| = |T\overline{H}_i| = 2^{n-1}$ for all maximal subgroups, T is said to be a perfectly balanced mapping.

Completely Corruptible: A corruptible coset with a maximal number of mixing transformations. If the order of the completely corruptible coset is $2^k$ then the order of the corresponding set of mixing transforms is $2^{k-1}$.

Constructive Corruption: The process of converting a linear orthomorphism to a nonlinear orthomorphism by rearranging the order of the blocks in two columns of the linear array of equations (FIG. 2), holding the third column fixed, while preserving equality in each row.

Corruptible Set: A set of equations, usually a coset or a subgroup, which can be non-linearized as a self-contained set, by the process of constructive corruption.

Dynamic Substitution Device: A block substitution device or S-box, which uses an orthomorphism on $Z_2^n$, the n-bit binary numbers, for encryption or decryption.

Generating Function: A recursive function of the form:

$$x_k = x_{k-n} \oplus x_{k-j} \oplus$$ (152)

which, when applied to a complete linearly independent set of n-bit numbers, defines a linear orthomorphism in equation 11. These are the same as generating functions of linear feedback shift registers but with domain $Z_2^n$ rather then individual binary bits. The generating functions are primitive polynomials in the Galois field $GF(2^n)$.

Linear Array: An array of $2^n$ equations which represents a linear (auto-morphic) orthomorphism on $Z_2^n$. (See Equation 11)

Linear Orthomorphism: An orthomorphism where the mapping $Z_2^n \rightarrow Z_2^n$ is linear.

Maximal Orthomorphism: An orthomorphism on $Z_2^n$ which can be represented as a permutation of $Z_2^n$ with no cycles except for a single fixed point.

Mixer or Mixing Transformation/Transform: An equation of the form $w \oplus w = \theta$ used in the process of constructive corruption. The mixer or mixing transform is added vectorially modulo 2 to a corruptible set of equations in a linear orthomorphism to obtain a nonlinear orthomorphism.

Orthomorphism: A one-to-one mapping on $Z_2^n$ such that each number added modulo 2 to its image, generates all of $Z_2^n$, that is, $R: Z_2^n \rightarrow Z_2^n$ such that:

$$\{x \oplus R(x) | x \in Z_2^n\} = Z_2^n.$$ (153)

Orthomorphic Permutation: The permutation on $Z_2^n$ defined by an orthomorphism.

Row: A single equation in the array of equations representing an orthomorphism on $Z_2^n$. (See Equation 10)

Shift: The displacement between columns of n-bit numbers in the array of equations representing a linear orthomorphism. Each column has the same order but a different starting point. (See Equation 11)

Similar Sets: Subsets of equations in a linear array that have the same relative spacing.

Vector: A row or equation in a linear array which can be thought of as a vector in three dimensions with coefficients in $Z_2^n$.

⊕: Addition modulo 2 (XORing)

θ=00 . . . 0: Additive identity $Z^{2n}$: Group of all n-bit binary numbers $GF(2^n)$: Galois field of polynomials of degree n with binary coefficients $G^n$: A set of $2^n$ equations representing a linear orthomorphism on $Z_2^n$. $G^n$ is a group.

$G_0^k$: A subgroup of $G^n$ of order $2^k$.

$G_i^k$: A coset of $G_0^k$.

$R_k \backslash R_{k-1}$: $R_k \cap \overline{R}_{k-1}$ a/b: a does not divide b.

$W_k$: The group of mixing transforms associated with $G_0^k$.

$\overline{G}^k$: A particular coset of $G_0^k$, defined as the relative complement $G_0^{k+1} \backslash G_0^k$.

APPENDIX I

UNBIASED BLOCK SUBSTITUTIONS

PREPARED BY:

BLAKELY, SOKOLOFF, TAYLOR & ZAFMAN
12400 Wilshire Boulevard
Seventh Floor
Los Angeles, California 90025
(213) 207-3800

*I hereby certify that this correspondence is being deposited with the United States Postal Service as Express Mail (Label No. RB984587912US) in an envelope addressed to: Commissioner of Patents and Trademarks, Washington, D.C. 20231 on: May 31, 1994*

_____  May 31, 1994
Krystle P. DiPaolo           Date

UBIASED BLOCK SUBSTITUTIONS

ABSTRACT

A block substitution is a one-to-one mapping of the n-bit binary numbers onto themselves. Such a substitution or transformation can be represented by a permutation. It is shown that certain permutations of the n-bit binary numbers define a block substitution by modulo 2 addition of one permuted set of numbers to another. Such permutations are termed replicative. A subset of these have an additional feature which is that the equations which they define have an additive relationship when viewed as vectors. Such permutations are termed additive. An unbiased block substitution is defined. It is shown that substitutions defined by an additive permutation are unbiased and that any unbiased block substitution can be represented by a replicative permutation. Additive permutations are shown to form groups which retain the same properties. The conditions for existence of these additive permutations are established, some properties of the groups determined, and the number of such groups enumerated and compared with all possible permutations of the n-bit numbers.

-1-

APPENDIX 1

INTRODUCTION

A block substitution is the term usually applied to a one-to-one mapping of the n-bit binary numbers onto themselves. This mapping can be written as a pairing of the $2^n$ n-bit numbers:

$$\begin{array}{ll} x_1 & z_1 \\ x_2 & z_2 \\ \cdot & \cdot \\ \cdot & \cdot \\ x_k \longrightarrow & z_k \\ \cdot & \cdot \\ \cdot & \cdot \end{array}$$

where each column is the set of the same $2^n$ distinct n-bit numbers but written in different orders. Thus, this mapping can be thought of as a permutation of the n-bit numbers written as:

$$\begin{pmatrix} x_1 & x_2 & \cdots & x_k & \cdots \\ z_1 & z_2 & \cdots & z_k & \cdots \end{pmatrix}$$

or $(x_1 \, x_i \, x_j \, \ldots)$ for some set of indices. This usual notation for permutations simply means that $x_1 \longrightarrow x_i$, $x_i \longrightarrow x_j$, etc.

Going back to the column notation, one could define a set of simple equations from the original set and its image:

$$\begin{array}{lll} y_1 \oplus x_1 & = & z_1 \\ y_2 \oplus x_2 & = & z_2 \\ \cdot & & \cdot \\ \cdot & & \cdot \\ y_k \oplus x_k & = & z_k \\ \cdot & & \cdot \\ \cdot & & \cdot \end{array}$$

-2- where ⊕ means mod*ulo* 2 addition (i.e., addition of *cor*responding digits without carrying). In general, the set $\{y_1, y_2 ...\}$ will not all be distinct but in certain circumstances they will be. When they are distinct, block substitutions can be generated by modulo 2 addition rather than by conventional means. The main tasks are to determine the circumstances, if any, in which this scheme works, how the substitutions can be quickly changed, and the lack of bias.

It is not obvious that block substitutions can ever be generated by modulo 2 addition. For example, consider the attempt to substitute one arrangement of 3-bit binary numbers for another by modulo 2 addition. This is shown in Figure 1. In column 3, on the right, 011 and 100 each appear twice, while 001 and 110 never appear. The numbers in column 1, on the left, acting on the numbers in column 2, in the center, constitute a transformation of the set of 3-bit binary words into themselves. This is a many-one transformation and is useless for block substitutions.

$$
\begin{aligned}
000 \oplus 000 &= 000 \\
001 \oplus 011 &= 010 \\
010 \oplus 110 &= 100 \\
011 \oplus 100 &= 111 \\
100 \oplus 111 &= 011 \\
101 \oplus 001 &= 100 \\
110 \oplus 101 &= 011 \\
111 \oplus 010 &= 101
\end{aligned}
$$

Figure 1. Modulo 2 Addition, Many-One Transformation

Trying another arrangement shown in Figure 2 gives a different result. In this case, the transformation is one-to-one from the 3-bit binary numbers onto themselves. Each column consists of all the 3-bit numbers exactly once.

$$
\begin{aligned}
000 \oplus 000 &= 000 \\
001 \oplus 111 &= 110 \\
010 \oplus 011 &= 001 \\
011 \oplus 100 &= 111 \\
100 \oplus 110 &= 010 \\
101 \oplus 001 &= 100 \\
110 \oplus 101 &= 011 \\
111 \oplus 010 &= 101
\end{aligned}
$$

Figure 2. Modulo 2 Addition, One-to-One Transformation

Definition: A replicative array of n-bit binary numbers is a set of $2^n = m+1$ equations:

$$y_1 \oplus x_1 = z_1$$
$$\vdots$$
$$y_{m+1} \oplus x_{m+1} = z_{m+1}$$

where the sets $\{y_k\}$, $\{x_k\}$, and $\{z_k\}$ each consist of the $2^n$ distinct n-bit binary numbers.

The set $\{y_k\}$ defines the mapping $x_k \rightarrow z_k$. Since the $y_k$ take on all values, exactly one member of the set $y_j = I = (0\cdots0)$ the identity. Thus, $x_j = z_j$ is a fixed point and there is no other. Since each column consists of the distinct n-bit numbers, it is a permutation of each of the other two columns.

The first question is how to construct such a replicative array.

Proposition 1: A replicative array of n-bit binary numbers can be constructed from sums of any set of n+1 rows each of whose columns contain the identity and n generators of $G_n$, the group of n-bit binary numbers.

Proof: Without loss of generality we can assume that the first n+1 rows have this property. Either one row is $I = I \oplus I$ or the identity occurs in three different rows. Assume $z_1 = x_1 = y_1 = I$. Then each set $\{z_2, \ldots, z_{n+1}\}$, $\{x_2, \ldots, x_{n+1}\}$, $\{y_2, \ldots, y_{n+1}\}$ is composed of n distinct generators of $G_n$. To construct the remaining rows of the array, take modulo 2 sums of pairs of rows 2 through n+1, sums of triples of these rows, etc, and, finally, $\sum_{i=2}^{n+1} z_i$. The number of additional rows constructed in this manner is:

$$\binom{n}{2} + \binom{n}{3} + \ldots + \binom{n}{n} = \sum_{k=0}^{n} \binom{n}{k} - \binom{n}{1} - \binom{n}{0} = 2^n - (n+1).$$

So the array is completely specified by this process. Since each of the $z_i$, $x_i$, and $y_i$ for $i > n+1$ are different linear combinations of the generators, they will all be distinct, and the sets of $2^n$ elements of $\{z_i\}$, $\{x_i\}$ and $\{y_i\}$ will each be a permutation of the n-digit binary numbers.

Now assume that $z_1 = x_2 = y_3 = I$. No pair of rows from the first three could be added together because this would cause a duplication of $z_1$, $x_2$, or $y_3$ in one of the columns. We avoid this problem by adding together odd numbers of rows from the initial n+1 rows. Thus we have:

$$n+1 = \frac{(n+1)!}{(n+1)! 1!} = \binom{n+1}{1} \quad \text{single rows}$$

$$\frac{(n+1)!}{3!(n-2)!} = \binom{n+1}{3} \quad \text{triple sums of rows}$$

$$\frac{(n+1)!}{5!(n-4)!} = \binom{n+1}{5} \quad \text{quintuple sums, etc}$$

-5-

Keeping in mind the general identity for binomial coefficients:

$$\binom{n+1}{k} = \binom{n}{k-1} + \binom{n}{k}$$

we can sum the number of rows generated this way, for n odd:

$$\binom{n+1}{1} + \binom{n+1}{3} + \ldots + \binom{n+1}{n} = \binom{n}{0} + \binom{n}{1} + \binom{n}{2} + \binom{n}{3} + \ldots + \binom{n}{n-1} + \binom{n}{n} = 2^n$$

For n even, the final term in the sum on the left is:

$$\binom{n+1}{n+1} = \binom{n}{n}$$

so that it again adds to $2^n$ rows.

As in the first case, the column elements are $2^n$ distinct linear combinations of the generators and the identity.         (Q.E.D.)

Proposition 1 gives a method of generating replicative arrays but does not imply that all can be generated this way. It is convenient to introduce another definition. The individual rows of the replicative array can be thought of as vectors which can be added to each other by adding the corresponding scalar components modulo 2.

Definition: A replicative array, which has the property that the vector sum modulo 2 of any odd number of rows is again another row in the original array, will be called an additive array.

Clearly, replicative arrays generated as in proposition 1 are additive arrays, but there are others as well which do not have this additive property.

Proposition 2: Any additive array of n-bit numbers with fixed row $I \oplus I = I$ has a maximal set of n linearly independent rows.

Proof: Let k be the maximal number of independent rows and assume $k < n$. The additive array has exactly $2^n$ rows including the identity. By proposition 1 these k rows generate an array of $2^k$ rows. Thus, the remaining $2^n - 2^k$ rows must be duplicates, and the array cannot be additive.

If $k = n+q$ where q is a positive integer, then a maximal set of independent rows will generate $2^{n+q}$ rows. In each column, each of the $2^n$ distinct n-bit numbers will appear $2^q$ times. This $2^n$ additive array is embedded in the array with $2^{n+q}$ rows. One can extract it by making a proper selection of rows from the larger array. Choose the first row for the additive array, for example, $x_1 \oplus y_1 = z_1$. $x_1$ will appear $2^q-1$ more times in column 1, similarly for $y_1$ in column 2 and $z_1$ in column 3. Since the same combination of $x_1$ and $y_1$ will not occur again, $3(2^q-1)$ rows must be eliminated from further consideration for the additive array. From the second choice, $z_2$, one must eliminate $2^q-1$ rows containing $z_2$ in column 3, but since $x_2$ or $y_2$ may have appeared in a row already eliminated, we can only say that in the second step, the number of rows eliminated is $\geq 2^q-1$. For each succeeding step $\geq 2^q-1$ rows are eliminated. The process is complete after $2^n$ steps. $2^n$ rows have been selected and the number of rows eliminated is:

$$\geq 3(2^q-1) + (2^n-1)(2^q-1) = (2^n+2)(2^q-1)$$

Thus, the total number of rows selected and eliminated is:

$$\geq 2^n + (2^n+2)(2^q-1) = 2^{n+q} + 2(2^q-1) > 2^{n+q}.$$

So there are not sufficient rows to complete this process. This contradiction implies $k = n$.

(Q.E.D.)

The above may seem to be rather academic, but it shows how to generate additive arrays and the resulting substitutions, and also shows that this process gets them all. But these additive arrays have another very useful property described in the next proposition.

Proposition 3: An additive array with fixed identity row is a group.

Proof: Rows in the array can be thought of as vectors and added by respective components:

$$\begin{array}{ccc} x_i & \oplus & y_i = z_i \\ x_j & \oplus & y_j = z_j \\ \hline x_k & \oplus & y_k = z_k \end{array}$$

where $x_i \oplus x_j = x_k$, etc. This is the group operation. Each row in the array is the sum of some subset of the n generators. The sum of two rows is also the sum of some subset of the generators and, thus, is in the array which consists of all possible such sums. The group identity is the row
$I = I \oplus I$. (Q.E.D.)

Each pair of columns defines a permutation as follows: take a number in one column, e.g., $y_1$ in column 2, and find the same number in column 1. It will have a partner, say $y_2$, in column 2. Again, locating $y_2$ in column 1, there will be a partner $y_3$ in column 2. This defines a permutation $y_1 \rightarrow y_2 \rightarrow y_3 \rightarrow \ldots$ from column 2 to column 1. Six such permutations, three of which are distinct, are defined by the additive array.

Definition: A permutation defined by an additive array will be called an additive permutation.

Initially, consider the case where the fixed point is I, and let $y_{m+1} = x_{m+1} = z_{m+1} = I$. The order of rows in the additive array is arbitrary. For the second row, one could select $y_j = x_1$ and for the third row, $y_k = x_j$, etc. Redesignating the indices, one obtains:

$$\begin{array}{ccc} I & \oplus & I = I \\ x_m & \oplus & x_1 = z_1 \\ x_1 & \oplus & x_2 = z_2 \\ x_2 & \oplus & x_3 = z_3 \\ & \cdot & \\ & \cdot & \\ & \cdot & \end{array}$$

The order of the numbers in columns 1 and 2 now represent the permutation defined by those two columns which leads to:

Definition: An additive array whose rows are arranged in the order defined by the permutation between columns 1 and 2 will be said to be normalized.

Proposition 4: An additive array with fixed identity can be written in the form:

$$I \oplus I = I$$
$$x_m \oplus x_1 = x_{1-p}$$
$$x_1 \oplus x_2 = x_{2-p}$$
$$\vdots$$
$$x_{m-1} \oplus x_m = x_{m-p}$$

where p is an integer.

Proof: In normalized form the array can be written:

$$I \oplus I = I$$
$$x_m \oplus x_1 = z_1$$
$$x_1 \oplus x_2 = z_2$$
$$\vdots$$
$$x_{m-1} \oplus x_m = z_m$$

-9-

Since the array is a group, it can be regenerated by taking sums of successive pairs of rows to obtain $$I \oplus I = I$$
$$(x_1 \oplus x_m) \oplus (x_1 \oplus x_2) = (z_1 \oplus z_2)$$
$$(x_1 \oplus x_2) \oplus (x_2 \oplus x_3) = (z_2 \oplus z_2)$$
$$\vdots$$
$$(x_{m-1} \oplus x_m) \oplus (x_m \oplus x_1) = (z_m \oplus z_1)$$

The rows in the new array must be the same (but rearranged) as those in the original. From the diagonal structure on the left, the order of the rows must be the same although the starting point in the sequence of rows has been shifted by some unspecified number of positions. Column 2 in the new array is:

$$z_2$$
$$z_3$$
$$\vdots$$
$$z_1$$

which is the same as column 3 in the original array. So column 3 in the original array is the same as column 2 in the original array but shifted by some unspecified number of positions p.  (Q.E.D.)

As will be seen later, the shift p can take on only certain values. So far, no means has been found to determine p in advance or from a knowledge of p, to determine the array, except for special cases. However, there are some rules for eliminating possible values of p and for pairing permissible values. The shift p determines whole classes of arrays and substitutions. So far, all possible values of p have been found for block size $n \leq 8$.

Proposition 4: If g is a maximal length additive permutation of n-bit binary numbers with fixed identity, then for any power s of the permutation g, $g^s$ is also additive.

Proof: g is defined by columns 1 and 2 of the following additive array, omitting the identity:

$$x_m \oplus x_1 = x_{1-p}$$
$$x_1 \oplus x_2 = x_{2-p}$$
$$\vdots$$
$$x_{m-1} \oplus x_m = x_{m-p}$$

The array which defines $g^s$ is:

$$x_{1-s} \oplus x_1 = w_1$$
$$x_{2-s} \oplus x_2 = w_2$$
$$\vdots$$
$$x_{m-s} \oplus x_m = w_m$$

As in the proof of proposition 4, from the group structure of the array for g, g can be regenerated by taking the sums of the m pairs of rows which are s spaces apart:

$$(x_m \oplus x_s) \oplus (x_1 \oplus x_{s+1}) = w_1 \oplus w_{s+1}$$
$$(x_1 \oplus x_{s+1}) \oplus (x_2 \oplus x_{s+2}) = w_s \oplus w_{s+2}$$
$$\vdots$$
$$(x_{m-1} \oplus x_{s+m-1}) \oplus (x_m \oplus x_{s+m}) = w_m \oplus w_{s+m}$$

From the diagonal structure on the left, it is clear that columns 1 and 2 are in the same order as before but with a different starting point, i.e., the array has been rotated. Notice that $x_{s-s} = x_m$, from the array for $g^s$, $x_m \oplus x_s = w_s$ Thus, column 1 (or column 2) of the rotated array for g consists of the set $\{w_1, ..., w_m\}$ which is a displaced or rotated form of $\{x_1, ..., x_m\}$. (Q.E.D.)

This shows that the general form of a row in the additive array for $g^s$ is:

$$x_{k-s} \oplus x_k = x_{k-p_s}$$

where $p_s$ is the shift corresponding to the power s. $p_s$ is related to the basic shift p and is different for each value of s. It is important to know these shifts and their sequences when changing from one substitution to another in the same permutation group. More will be said about this later.

In proposition 5, the property of being additive is necessary. Examples can be shown of replicative permutations g which are not additive and for which $g^s$ is not replicative.

Proposition 5 is also true even if g is not a maximal length permutation. The presence of cycles slightly complicates the proof. However, there is little practical interest in starting with substitutions corresponding to non-maximal permutations because powers will not generate the full group. The permutations which have fixed points other than the identity also form groups. However, the additive arrays which generate them are not groups.

The next step is to show that these groups of permutations and the corresponding substitutions have the highly desirable property of yielding all possible input/output pairs.

Since each additive permutation is generated by an array in which pairs of columns keep exactly one element fixed, each permutation will keep one of the $2^n$ binary words fixed. Thus, these permutations not only belong to the symmetric group of all permutations on $2^n$ elements, but they also belong to the subgroup $P_m$ of permutations on $m = 2^n-1$ elements. All powers of a given permutation will form a group. The order of the permutation is the least common multiple of its cycles, and the order of the group is the number of distinct permutations in it. A permutation is said to be regular if all its cycles are the same length.

-12-

An important property for a group of permutations is transitivity. A transitive group has at least one permutation which transforms any element or word into any other.

Proposition 6: If G is a subgroup of $P_m$ which is generated by powers of an additive permutation g, where g is of order $m = 2^n-1$, then G is transitive on the $2^n-1$ non-fixed words.

Proof: Omitting the single cycle permutation (J) corresponding to the fixed word, $x_j$, G is a subgroup of permutations on the $2^n-1$ n-bit words that are held fixed. Since the m powers of g $\{g, g^2, g^3, \ldots, g^m = I\}$ generate G, its order $|G| = m$. Let $G_1$ be the subgroup of G which holds fixed one of the $2^n-1$ n-bit words. Since this is a group of additive permutations, $G_1 = \{I\}$ the identity permutation only. So $G_1$ has order $|G_1| = 1$ and the index of $G_1$ in G $\left|\frac{G}{G_1}\right| = m$. So G is transitive. (Q.E.D.)

ADDITIVE ARRAYS WITH OTHER FIXED POINTS

One can generate additive arrays with a fixed element other than the identity by simply adding a fixed binary number to each number in column 1 and column 2. For example, let H be the array (and group) as written in proposition 4, and generate a new array H' as follows:

$$
\begin{array}{ll}
H & H' \\
I \oplus I = I & w \oplus w = I \\
x_m \oplus x_1 = x_{1-p} & (x_m \oplus w) \oplus (x_1 \oplus w) = x_{1-p} \\
x_1 \oplus x_2 = x_{2-p} & (x_1 \oplus w) \oplus (x_2 \oplus w) = x_{2-p} \\
\vdots & \vdots \\
x_{m-1} \oplus x_m = x_{m-p} & (x_{m-1} \oplus w) \oplus (x_m \oplus w) = x_{m-p}
\end{array}
$$

Clearly, H' has $2^n$ rows and the sum of any pair or even number of rows will be in H since the w's will cancel out. If any odd number of rows in H' are summed, it will result in a row in H' because it is equivalent to the sum of rows in H plus the row $w \oplus w = I$. Thus, $H \cup H'$ has $2^{n+1}$ elements, is closed under addition follows, and contains the identity $\oplus$ I = I. Thus, H∪H' is a group, H is a maximal subgroup, and H' = H̄ is the relative complement of H.

We can shift column 1 in H' to obtain the array corresponding to a power of the permutation defined by the original array. A typical row is:

$$(x_{k-j} \oplus w) \oplus (x_k \oplus w) = x_k - p_j$$

This is the image of the corresponding row in the jth power of H. So the permutation defined by H' is additive and so are its powers.

Now, suppose that we have an additive array with $2^n$ rows for which I is not fixed. Further, assume that the array contains sums of all odd combinations of n+1 linearly independent rows. As in the proof of proposition 1, this generates exactly $2^n$ rows. Thus, no sums of even sets or rows can be in the array. Since I occurs once in column 3, there is one row of the form w $\oplus$ w = I. Adding it to each of the single rows, including itself, generates an additive array of $2^n$ rows with fixed identity.

Thus, there is a one-to-one correspondence between additive arrays with fixed identity and additive arrays with another fixed number.

Thus, all the additive arrays of interest for use as block substitutions have either fixed identity or can be derived from such arrays as described above. In what follows, additive arrays will have fixed identity unless otherwise specified. Typically, the row I $\oplus$ I = I will be omitted.

GENERATION OF ADDITIVE ARRAYS

It is helpful to know something about the distribution of independent rows or generators in the array.

Proposition 7: In a maximal additive array with fixed I, on the n-bit binary numbers, any n consecutive rows are generators.

Proof: Consider the first n rows:

$$x_m \oplus x_1 = x_{1-p}$$

$$\vdots$$

$$x_{n-1} \oplus x_n = x_{n-p}$$

If these are not independent then $$x_n = \sum_{i \in Q} x_i \qquad x_{n-1} = \sum_{i \in Q} x_{i-1} \qquad x_{n-p} = \sum_{i \in Q} x_{i-p}$$

where Q is a subset of $\{1, \ldots, n-1\}$ with $s \leq n-1$ elements. The next row in the array will be: $x_n \oplus x_{n+1} = x_{n+1-p}$. Since the array is an additive group, it must be true that $x_{n+1} = \sum_{i \in Q} x_{i+1}$ and $x_{n+1-p} = \sum_{i \in Q} x_{i+1-p}$.

In that case applying this to each successive row, one could generate the entire array with $s < n$ generators.

(Q.E.D.)

This is enough for our purposes, but it can also be shown that any n equally spaced rows are generators.

THE SHIFT p

In what follows, it is assumed, unless otherwise stated, that the additive arrays are maximal, normalized, and with fixed identity. For brevity, the row $I \oplus I = I$ will be omitted. The general form for the kth row of the basic array is:

$$x_{k-1} \oplus x_k = x_{k-p}$$

For the array corresponding to the power s of the basic permutation, the kth row is:

$$x_{k-s} \oplus x_k = x_{k-p_s}$$

As usual, n is the block size and $m = 2^n - 1$. By definition, $p_1 = p$. It is important to know something about the values of $p_s$ in order to use the block substitutions which they generate. It is obvious that $p_s \neq p_t$ if $s \neq t$.

Proposition 8: $p \geq n$

Proof: The (p+1)st row of the basic array is:

$$x_p \oplus x_{p+1} = x_{p+1-p} = x_1$$

If $p+1 \leq n$, this implies that the first n rows are dependent which contradicts proposition 7. (Q.E.D.)

Note: Since s is a power of a permutation g of order m, if $s = m+k$ $$g^{m+k} = g^m \circ g^k = I \circ g^k.$$

So the exponents can be expressed modulo m.

Proposition 9: If p is an allowable value of the shift, so is $\bar{p} = 2^n - p$.

Proof: In the normalized array, the first column is displaced down one place with respect to column 2. The third column is displaced down p places (the shift) with respect to column 2 and p-1 places from column 1. If we interchange columns 1 and 2 and turn the resulting array upside down (i.e., reverse the order of the rows) then in the new array, the third column is shifted down $m-(p-1) = 2^n-p$ places with respect to column 2. Since only the order has been changed, the new array is equivalent to the original in the sense that it will generate permutations from the same group. (Q.E.D.)

Note: Since $\bar{p} \geq n$, $p \leq 2^n - n$.

Proposition 10: If the power $s = 2^r$ for some integer $r \geq 0$, $p_s = sp$.

Proof: If $r = 1$, $s = 2$ and $x_{k-2} \oplus x_k = x_{k-p_2}$. One can write:
$$x_{k-2} \oplus x_k = x_{k-2} \oplus x_{k-1} \oplus x_{k-1} \oplus x_k.$$
Considering k-1 and k-p as indices,
$$x_{k-2} \oplus x_k = x_{k-1-p} \oplus x_{k-p} = x_{k-p-p} = x_{k-2p}.$$
So $p_2 = 2p$ and the statement is true for $r = 1$.

Assume that for some $s = 2^r$, $p_s = 2^r p$. $2^{r+1} = 2^r + 2^r$.
Then,
$$x_{k-2^{r+1}} \oplus x_k = x_{k-2^r-2^r} \oplus x_k = x_{k-2^r-2^r} \oplus x_{k-2^r} \oplus x_{k-2^r} \oplus x_k$$
$$= x_{k-2^r-2^r p} \oplus x_{k-2^r p} = x_{k-2^r p - 2^r p} = x_{k-2^{r+1} p}. \qquad \text{(Q.E.D.)}$$

There are other constraints on p, the shift in the third column. If g is the permutation defined by columns $2 \to 1$ of the additive array, then the permutation defined by columns $1 \to 3$ is $g^{p-1}$ and by columns $3 \to 2$, is $g^{m-p}$. These permutations are obviously commutative and $g \circ g^{p-1} \circ g^{m-p} = g^0 = I$, the identity permutation.

The sum of the exponents $1 + (p-1) + (m-p) \equiv 0$ ... Clearly, $1 < p < m$. More generally, for a power $g^s$, the corresponding permutations are:
$$g^s \circ g^{p_s - s} \circ g^{m - p_s} = I$$
Then $s + (p_s - s) + (m - p_s) \equiv 0 \mod m$ and $p_s \neq s, m$.

Proposition 11: If an additive array generates the power s of the basic permutation in pairs of columns, it generates in all three columns and 3s ≡ 0 mod m. (Generation)

Proof: If two of the three permutations are of the same power, the array can be arranged so that typical rows are:

$$x_{k-s} \oplus x_k = x_{k+s}$$
$$\vdots$$
$$x_k \oplus x_{k+s} = x_{k+2s}$$

By the group property, adding these together will give another row in the same array:

$$x_{k+s} \oplus x_{k+2s} = (x_k \oplus x_{k+s}) \oplus (x_k \oplus x_{k-s})$$
$$= x_{k+s} \oplus x_{k-s}$$

which implies that $x_{k+2s} = x_{k-s}$ and that $3s \equiv 0 \mod m$. This will occur only if $3 \mid m$, in which case, $p_s = -s \equiv 2s \mod m$, and $p_s - s = 2s - s = s$, $m - p_s = s$.

(Q.E.D.)

Corollary: If an additive array generates the same permutation with each pair of columns, the permutation is of order 3.

Proof: If $h = g^s$ is generated as in proposition 11, then $h^3 = g^{3s} = I$.

(Q.E.D.)

If $p_s = 2s$, $\frac{m+s}{2}$ or $m-s$, the same permutation will be generated, so if $3 \nmid m$, $p_s \neq \{s, 2s, \frac{m+s}{2}, m-s, m\}$.

There are a number of miscellaneous facts that can select or eliminate candidates for the shift, but so far insufficient rules have been found to fully determine the shift pattern. Some of the facts are:

1. If $p_s = t$, then $p_t = s$ by symmetry

2. If $p = 2^t$, then $$x_{k-1} = x_k \oplus x_{k-p} = x_k \oplus x_{k-2^t} = x_{k-2^t p} = x_{k-2^{2t}}$$

which is possible only if $2^{2t} \equiv 1$ modulo m.

3. If $p = 2^t + 1$, then $$x_k = x_{k-1} \oplus x_{k-1-2^t} = x_{k-1-2^t p} = x_{k-1-2^t(2^t+1)}$$

which is possible only if $2^{2t} + 2^t + 1 \equiv 0$ modulo m.

4. If $p \mid m$ then $\frac{m}{p} \neq 2^t - 1$ since otherwise, $2^t p = m+p$ and $$x_k \oplus x_{k-2^t} = x_{k-2^t p} = x_{k-m-p} = x_{k-p} = x_k \oplus x_{k-1} \quad \text{and } t = 0.$$

-19-

ENUMERATION OF MAXIMAL ADDITIVE PERMUTATIONS

The additive arrays, by convention, have been constructed according to the permutation defined by columns 1 and 2. If the permutation is of maximal length (i.e., a permutation of $m = 2^n-1$ elements with no subcycles) the array will be maximal also in the sense that it has no distinct self-contained blocks. Conversely, the maximal array will generate a maximal permutation. However, powers of a maximal permutation may have cycles. This will be the case unless the maximal length permutation is of prime order. Thus, no general conclusions can be drawn about the permutations generated by other pairs of columns.

If all six of the permutations generated by the additive array have the same cycles, the array will have corresponding cycles in the form of disjoint subarrays of the same length in which each column has the same elements. If the basic permutation generated by columns 1 and 2 has a cyclical structure not shared by the other permutations, then there will be disjoint subarrays or blocks in the array in which the elements in column 3 will be distinct from those in columns 1 and 2.

It is also obvious that any maximal length additive permutation can be used to generate a maximal array. Thus, initially considering arrays and permutations with fixed identity, there is a one-to-one correspondence between maximal length permutations and columns 1 and 2 of maximal arrays and, hence, with the array as an entity.

Proposition 12: For n-bit binary numbers, the number of maximal length additive arrays with fixed identity for a given value of the shift $p$, is $$M(n) = \prod_{k=1}^{n-1} (2^n - 2^k) \quad \text{where } m = 2^n - 1.$$

Proof: Let $Q(n)$ be the number of distinct sets of generators of the n-bit binary numbers. Each set of generators will generate a maximal array. However, the order in which the generators are used makes a difference. This is because the column 3 lead term $x_m = f(x_1, \ldots x_n)$ depends on the relative

-20- orders of the generators. There are n! such orders. Once an array is generated, the starting row of the array or starting point of the permutation is irrelevant. For example, if the first row is: $x_m \oplus x_1 = x_{1-p}$ it could be circulated to the bottom and instead start with: $x_1 \oplus x_2 = x_{2-p}$ so the process is redundant by a factor of $m = 2^n-1$.
Therefore:

$$M(n) = \frac{n!}{m} Q(n)$$

Assume $Q(n,k) = \frac{1}{k!} \prod_{j=0}^{k-1} (2^n - 2^j)$ is the number of independent k-tuples which can be selected from n-bit words. Clearly, it is true for $k = 1$ or $k = 2$. n-tuples can be constructed by adjoining a single n-bit word to an (n-1)-tuple. There are m such words which could be adjoined. However, $m = 2^n-1$ must be diminished by eliminating the $n-1 = \binom{n-1}{1}$ words which duplicate those in the (n-1)-tuple, by the $\binom{n-2}{2}$ words which are sums of pairs of words in the (n-1)-tuple, etc, and finally by the $1 = \binom{n-1}{n-1}$ word which is the sum of all words in the (n-1)-tuple. Thus, m must be diminished by $\sum_{j=1}^{n-1} \binom{n-1}{j} = 2^{n-1} - 1$.

The number of words to be adjoined to the (n-1)-tuples $= 2^n-1-(2^{n-1}-1) = 2^n-2^{n-1}$. However, each n-tuple could be generated by n different (n-1)-tuples, so that, $$Q(n) = Q(n,n) = \frac{2^n-2^{n-1}}{n} Q(n,n-1) = \frac{2^n-2^{n-1}}{n} \frac{1}{(n-1)!} \prod_{k=0}^{n-2} (2^n-2^k) = \frac{1}{n!} \prod_{k=0}^{n-1} (2^n-2^k)$$

Thus, $$M(n) = \frac{1}{m} \prod_{k=0}^{n-1} (2^n-2^k) = \prod_{k=1}^{n-1} (2^n-2^k)$$

(Q.E.D.)

-21-

M(n) can be rewritten in a form easier to compute:

$$M(n) = \prod_{k=1}^{n-1} (2^n - 2^k) = 2^s \prod_{j=1}^{n-1} (2^j - 1)$$

where $s = \frac{n(n-1)}{2}$. There is a simple recursive relationship:

$$M(n+1) = 2^n (2^n - 1) M(n)$$

Unless m is prime, the permutation group will contain some permutations which are not maximal and, thus, will have some proper cycles. These will be powers $g^s$ of a maximal permutation g where s is a divisor of m. These can be enumerated by counting the number of values of s which are divisors of m-1.

In a group of additive permutations of n-bit numbers with fixed I, there are L(n) maximal permutations and S(n) non-maximal permutations.

$$L(n) + S(n) = m-1 = 2^n - 2$$

While there are $2^n!$ permutations on the set of n-bit numbers, there are only $2^{n-1}!$ which give distinct substitutions because the starting point in the permutation does not make any difference. In the maximal additive array, we can cycle the order of the rows, other than the fixed row, and not change the substitution. These additive arrays generate permutations which are a subset of all possible permutations having a single fixed point. If F(n) is the total number of permutations holding any one of the $2^n$ words fixed, then $$F(n) = 2^n (2^n - 2)! = \frac{2^n!}{m}.$$

For convenience, a number of other terms can be defined. They are as follows:

$N_p(n)$ — the number of distinct values of $p_1$, the basic shift in column 3 of a maximal additive array of n-bit numbers.

M(n) — the number of maximal additive permutations for a given p and a given fixed point. It is derived in proposition 12.

T(n) — the total number of additive permutations for a given p and a given fixed point. If $m = 2^n - 1$ is prime, then $T(n) = M(n)$. In general:

$$T(n) = \frac{m-1}{L(n)} M(n).$$

H(n) — the total number of additive permutations on n-bit numbers:

$$H(n) = 2^n N_p(n) T(n).$$

G(n) — the number of groups of additive permutations on n-bit numbers:

$$G(n) = \frac{H(n)}{m-1} = \frac{2^n N_p(n) M(n)}{L(n)}.$$

Table 1 is a tabulation of these parameters for bit size $n \leq 8$. Ratio $\frac{H(n)}{F(n)}$ gives a measure of the relative rarity of additive permutations.

UNBIASED BLOCK SUBSTITUTIONS

In designing a block substitution device, a basic goal is to have an unbiased transformation of the n-bit binary numbers onto themselves. This does not seem to be well defined but, basically, one desires that the cipher text contain no information on the nature of the clear text. For example, no subset should be mapped onto itself, and numbers with some characteristic (such as, even, lower half, zero in a binary position) should be equally likely to be images of a number with the same property or the reverse property. To require Table 1. Comparison of Permutations of Various Bit Sizes

| n | 3 | 4 | 5 | 6 | 7 | 8 |
|---|---|---|---|---|---|---|
| $2^n$ | 8 | 16 | 32 | 64 | 128 | 256 |
| m | 7 | 15 | 31 | 63 | 127 | 255 |
| $N_p(n)$ | 2 | 2 | 6 | 6 | 18 | 16 |
| M(n) | 24 | 1,344 | 322,560 | $3.20 \times 10^8$ | $1.29 \times 10^{12}$ | $8.42 \times 10^{16}$ |
| L(n) | 6 | 8 | 30 | 36 | 126 | 128 |
| S(n) | 0 | 6 | 0 | 26 | 0 | 126 |
| T(n) | 24 | 2,352 | 322,560 | $5.51 \times 10^8$ | $1.29 \times 10^{12}$ | $16.78 \times 10^{16}$ |
| H(n) | 384 | 75,264 | 61,931,520 | $2.12 \times 10^{11}$ | $2.97 \times 10^{15}$ | $6.87 \times 10^{20}$ |
| G(n) | 64 | 5,376 | 2,064,384 | $3.41 \times 10^9$ | $2.36 \times 10^{13}$ | $2.71 \times 10^{18}$ |
| F(n) | 5760 | $1.39 \times 10^{12}$ | $8.49 \times 10^{33}$ | $2.01 \times 10^{87}$ | $3.04 \times 10^{213}$ | $3.36 \times 10^{504}$ |
| $\frac{H(n)}{F(n)}$ | .0667 | $5.40 \times 10^{-8}$ | $7.30 \times 10^{-27}$ | $1.05 \times 10^{-76}$ | $9.79 \times 10^{-199}$ | $2.04 \times 10^{-484}$ | that all outputs be wholly likely for a random input is insufficient and requires only that the transformation be one-to-one. The following definition is proposed.

Definition: A transformation or substitution of the n-bit binary numbers onto themselves is said to be unbiased if:

a. There is no invariant subset other than a single fixed point.

b. Every maximal subgroup of the n-bit numbers is mapped in two equal parts into itself and into its relative complement.

Before proceding further, it is necessary to collect some facts on these maximal subgroups. Any set of binary numbers that has zeros in the same binary position is such a subgroup; however, there are others as well. Any subgroup of order $2^k$ is embedded in a subgroup of order $2^{k+1}$ and has a relative complement in the larger subgroup with $2^k$ elements.

Proposition 13: Let $G_n$ be the group of n-bit binary numbers with modulo 2 addition as the group operation. Let H be a subgroup of order $2^{n-1}$ and $\overline{H}$ its complement in $G_n$. Then for $x, y \in \overline{H}$, $x \oplus y \in H$, and if $x \in H$, and $y \in \overline{H}$, $x \oplus y = z \in \overline{H}$.

Proof: $\overline{H}$ cannot be a subgroup since it does not contain the identity $I = (0\cdots0)$. By definition, if $x, y \in H$, $x \oplus y \in H$.

Let $z = x \oplus y$ where $x \in H$ and $y \in \overline{H}$. If $z \in H$, then $y = z \oplus x \in H$ by the group property. This is a contradiction since $H \cap \overline{H} = \emptyset$. So $z \in \overline{H}$. The number of elements in H and in $\overline{H}$ is $p = 2^{n-1}$. Each element or binary number in H can be written as the sum of p pairs of numbers belonging to H. This gives $p^2$ pairs from H to H.

The numbers in $\overline{H}$ which are sums of mixed pairs can be expressed in two ways considering order: $p^2$ pairs in which the p numbers from H are matched with the p numbers from $\overline{H}$. Another $p^2$ pair is generated by matching the p words from $\overline{H}$ with p words from H. This gives a total of $2p^2$ ways of expressing the mixed sums in $\overline{H}$.

Overall, there are $2p$ words which can be expressed as $(2p)^2 = 4p^2$ pairs. The remaining $p^2$ pairs are those where the sum of numbers from $\overline{H}$ is taken. So far, $2p^2$ pairs correspond to $\overline{H}$ and $p^2$ pairs to H. Since the two sets H and $\overline{H}$ have the same number of elements, the remaining $p^2$ pairs belong to H (i.e., $x, y \in \overline{H} \Rightarrow x \oplus y \in H$).

(Q.E.D.)

A substitution of the n-bit binary numbers $G_n$ onto themselves can also be thought of as a transformation T, such that, $TG_n = G_n$ if this is expressed by an additive array:

$$y_1 \oplus x_1 = z_1$$
$$\vdots$$
$$y_k \oplus x_k = z_k$$
$$\vdots$$

Then the first column defines the transformation $Tx_k = z_k$. If T is linear, $T(x_j \oplus x_k) = Tx_j \oplus Tx_k$.

<u>Proposition 14:</u> A maximal additive array with fixed identity defines a linear transformation.

<u>Proof:</u> A general row is $x_{k-1} \oplus x_k = x_{k-p}$.
Let T be the transformation mapping column 2 on column 3, $Tx_k = x_{k-p}$.
Let $x_k \oplus x_j = x_i$.
$T(x_k \oplus x_j) = Tx_i = x_{i-p}$.
$Tx_k \oplus Tx_j = x_{k-p} \oplus x_{j-p}$.
Since the array is an additive group by proposition 3,
$$x_{k-p} \oplus x_{j-p} = (x_k \oplus x_j) \oplus (x_{k-1} \oplus x_{j-1}) = x_i \oplus x_{i-1} = x_{i-p}$$
and
$$T(x_k \oplus x_j) = Tx_k \oplus Tx_j.$$
This property is not generally true for one-to-one transformations on $G_n$.

Proposition 15: A transformation of the n-bit binary numbers onto themselves can be linear only if $I = (00\cdots 0)$ is a fixed point.

Proof: Without loss of generality, the n-bit binary numbers can be arranged in order such that the successor to each is its image under the transformation:

$$x_1 \longrightarrow x_2$$
$$x_2 \longrightarrow x_3$$
$$\vdots$$
$$x_k \longrightarrow x_{k+1}$$
$$\vdots$$
$$x_m \longrightarrow x_1$$

Since T is linear, $T(x_k \oplus x_j) = Tx_k \oplus Tx_j = x_{k+1} \oplus x_{j+1}$. $x_k \oplus x_j = x_i$ for some i in the set $1,\ldots,m$. If $x_j = I$, then $T(x_k \oplus x_j) = T(x_k \oplus I) = Tx_k = Tx_k \oplus Tx_j$, which implies that $Tx_j = x_{j+1} = I$.

(Q.E.D.)

Proposition 16: A linear transformation of the n-bit binary numbers onto themselves can be represented as an additive array.

Proof: Without loss of generality, the n-bit numbers can be arranged in an order so that each is mapped onto its successor:

$$x_1 \longrightarrow x_2$$
$$x_2 \longrightarrow x_3$$
$$\vdots$$
$$x_k \longrightarrow x_{k+1}$$
$$\vdots$$
$$x_m \longrightarrow x_1$$

By proposition 15, if $T$ is linear, $I = (0\cdots0)$ is a fixed point. Initially, it is assumed that there are no cycles. $Tx_k = x_{k+1}$. Since T is a linear transformation, $T(x_k \oplus x_j) = Tx_k \oplus Tx_j$. If $x_i = x_k \oplus x_j$, then
$$x_{i+1} = Tx_i = T(x_k \oplus x_j) = Tx_k \oplus Tx_j = x_{k+1} \oplus x_{j+1}.$$
Let $z_k = x_k \oplus x_{k-1}$ for each of the $m = 2^{n-1}$ binary numbers other than $I = (0\cdots0)$. There are $m = 2^{n-1}$ such equations. Either $z_k$ takes on all values of the n-bit numbers except $I$, or there are duplicates. Suppose $z_k = z_j$ for some $k \neq j$. Then $x_k \oplus x_{k+1} = x_j \oplus x_{j+1}$ and $x_i = x_k \oplus x_j = x_{k+1} \oplus x_{j+1} = x_{i+1}$, a contradiction.

If there are cycles or invariant sets, each cycle can be written as above as a self-contained set and the same reasoning applied to each cycle.

(Q.E.D.)

So far we have seen that all linear transformations on $G_n$ are additive with fixed identity. Next we consider affine transformations which are non-linear (at least to a mathematician). An affine transformation has the property that $T(x \oplus y) = Tx \oplus Ty \oplus C$ where $C$ is some constant.

<u>Proposition 17:</u> A maximal additive array with a fixed point other than the identity defines an affine transformation.

<u>Proof:</u> It has already been shown that an additive array with some fixed number A can be obtained from an array with fixed I by adding the row $A \oplus A = I$ to each row in that array.

In the array with fixed I, $Tx_k = x_{k-p}$. In the array with fixed A, $T'(x_k \oplus A) = x_{k-p}$. Then, redesignating $$x_j = x_k \oplus A, \quad T'x_j = Tx_k = T(x_j \oplus A).$$
$$T'(x \oplus y) = T(x \oplus y \oplus A) = T(x \oplus A \oplus y \oplus A \oplus A)$$
$$T'(x \oplus y) = T(x \oplus A) \oplus T(y + A) + TA$$
$$T'(x \oplus y) = T'x \oplus T'y \oplus C \text{ where } C = TA. \qquad \text{(Q.E.D.)}$$

If T' is an arbitrary affine transformation, it can be written in terms of a linear transformation T as $T'x = Tx \oplus \ldots$ By proposition 16, T can be represented as an additive array. Defining $A = T^{-1}C$, a corresponding additive array can be generated to represent T' by adding the row $A \oplus A = I$ to each row in the array for T.

<u>Proposition 18</u>: If H is a subgroup of $G_n$, the group of n-bit binary numbers, and T is a linear transformation or $T'x = Tx \oplus TA$ with $A \in H$, is an affine transformation on $G_n$, then TH and T'H are subgroups of $G_n$.

<u>Proof:</u> Let G = TH. By propositions 15 and 16, T can be represented by an additive array with fixed identity. $I \in H$, $TI = I$ so $I \in G$. Let $x, y \in H$. Since H is an additive group $x \oplus y = z \in H$. Tx, Ty and Tz $\in$ G. By linearity $Tz = T(x \oplus y) = Tx \oplus Ty \in G$, so G is closed under modulo 2 addition. For any $x \in G$, $x \oplus x = I \in G$, so x is its own inverse and G is a group. In the affine case, $TA \in G$ and $T'A = TA \oplus TA = I$, so $I \in G$. $T'x \oplus T'y = T'(x \oplus y \oplus A) \in G$ since $x \oplus y \oplus A \in H$.

(Q.E.D.)

<u>Proposition 19</u>: A maximal length linear or affine transformation is unbiased.

<u>Proof:</u> First of all, being of maximal length, the transformation has no cycles, other than its fixed point, and thus has no proper invariant set.

Let T be linear and consider a maximal subgroup H of $G_n$. Define two sets:

$$M = \{x \in H \mid Tx \in H\}$$
$$N = \{x \in H \mid Tx \in \overline{H}\}$$
$$I \in M, M \cap N = \emptyset \text{ and } H = M \cup N.$$

If $x, y \in M$, $T(x \oplus y) = Tx \oplus Ty \in H$ since T is linear and H is a group. Thus, $x \oplus y \in M$ also. Since each x is a self-inverse, M is a subgroup, and N is its complement relative to H.

If $x \in M$ and $y \in N$, then $z = x \oplus y \in H$ and is either in M or N. If $z \in M$, then $y = z \oplus x \in M$ by its group property. Thus, $z \in N$.

-29-

If $x, y \in N$, $\overline{Ty \in H}$, complement of a maximal subgroup H. By proposition 13, $Tx \oplus Ty \in H$. By linearity $T(x \oplus y) \in H$. Since $x, y \in H$, $x \oplus y \in H$. Since $T(x \oplus y) \in H$, so $x, y \in N \Rightarrow x \oplus y \in M$.

Since T has no proper invariant subset, $TH \neq H$ and $N \neq \emptyset$, the empty set. Select $x \in N$ and consider the group Q generated by x and M. $Q \subset H$. Q contains the complex $x \oplus M$ which includes all pairs of the form $x \oplus y$ where $y \in M$. Obviously, $M \subset Q$. Choose any $z \in N$, where $z \neq x$. This is possible since $|M|$ divides $|H| = 2^{n-1}$. So $|N| \geq 2$. $z = x \oplus w$ for some w. Since $z, x \in H$, a group, $w \in H$ also. Since $x, z \in N$, $w \in M$. Thus, any element of N or M is an element of Q. Therefore, $Q = H$ and M is a maximal subgroup of H. H is of order $2^{n-1}$ and, thus, the order of the maximal subgroup M is $|M| = 2^{n-2} = \frac{1}{2}|H|$. $|N| = |H| - |M| = \frac{1}{2}|H|$.

Note: TM is a group and $|TM| = |M|$.

Let T' be an affine transformation defined by $T'x = Tx \oplus TA$, and $C = TA$. Again define two sets:

$$M' = \{x \in H \mid T'x \in H\}$$
$$N' = \{x \in H \mid T'x \in \overline{H}\}$$

Assume $C \in H$. If $x \in M'$, $T'x = Tx \oplus C \in H$. Thus $Tx \in H$ and $M' \subseteq M$. If $x \in M$, $Tx \in H$. $T'x = Tx \oplus C \in H$, so $x \in M'$, and $M' = M$. Since $M' \cup N' = H$ and $M' \cap N' = \emptyset$, $N' = N$. From here, the proof proceeds as in the first part.

Now assume $C \in \overline{H}$. If $x \in M'$, $T'x = Tx \oplus C \in H$. Thus, $Tx \in \overline{H}$ and $M' \subseteq N$. If $x \in N$, $Tx \in \overline{H}$. $T'x = Tx \oplus C \in H$, $M' = N$ and, consequently, $N' = M$. In this case, M' is not a subgroup but, by the first part of the proof, $|M'| = |N| = \frac{1}{2}|H|$. Since H is maximal, the relative complement $\overline{H}$ is the total complement, so that $C \in H$ or $C \in \overline{H}$. (Q.E.D.)

If T is linear, the proof holds for any subgroup. If H is of order $2^{n-1}$ it is isomorphic to the group $G_{n-1}$ of n-1 bit binary numbers. $G_{n-1}$ has a relative complement in $G_n$ consisting of $\overline{H}$. The same process can be applied to $G_{n-1}$. This leads to a nested sequence of subgroups $$G_n \supset G_{n-1} \supset \cdots G_1 \supset G_0 = \{I\}$$

in which each $G_k$ is mapped by T half onto $G_{k-1}$ and half onto $\overline{G}_{k-1}$.

Note: This sequence of subgroups is not unique, as we can begin with several candidates for $G_{n-1}$, etc.

We have seen that any additive array produces unbiased substitutions or transformations. Next, we consider the necessary properties for a transformation or substitution to be unbiased in the sense defined here.

<u>Proposition 20:</u>  $G_n$ has $m = 2^n - 1$ maximal subgroups.

<u>Proof:</u> $G_n$ is generated by any n independent n-bit numbers. Let $\{x_1, x_2, \cdots, x_n\}$ be such a set. Any subset of n-1 of the generators will generate a maximal subset. $\binom{n}{n-1} = n$ maximal subgroups will be generated this way. Let this collection of maximal subgroups be designated $H_1, H_2, \cdots, H_n$ where $H_i$ is generated by $\{x_1, \cdots, x_{i-1}, x_{i+1}, \cdots, x_n\}$, that is, by all except $x_i$. Then $x_i \in H_i$ for each $i \leq n$, and $x_i \in H_j$ for $i \neq j$.

Next, one can define an operation "+" between maximal subgroups as:

$$H_k = H_i + H_j \equiv (H_i \cap H_j) \cup (\overline{H}_i \cap \overline{H}_j).$$

$|H_k| = 2^{n-1}$ since it is a union of disjoint sets and $|H_i \cap H_j| = |\overline{H}_i \cap \overline{H}_j| = 2^{n-2}$. Let $x_c = x_a \oplus x_b$ where $x_a, x_b \in H_k$. There are three possibilities:

1. $x_a, x_b \in H_i \cap H_j$, then $x_c \in H_i \cap H_j$ since $H_i \cap H_j$ is a group.

2. $x_a, x_b \in \overline{H_i} \cap \overline{H_j}$, then $x_c \in H_i \cap H_j$ by proposition 13.

3. $x_a \in H_i \cap H_j$ and $x_b \in \overline{H_i} \cap \overline{H_j}$, then $x_c \in \overline{H_i} \cap \overline{H_j}$ by proposition 13.

In each case $x_c \in H_k$, obviously $I \in H_k$, so $H_k$ is also a maximal subgroup.

To each maximal subgroup generated in this fashion, we can associate $x_k = x_i \oplus x_j$, that is, $x_k$ is the sum of generators in the set $\{x_1, x_2, \cdots, x_n\}$ which belong to $\overline{H_k}$. Clearly, the maximal subgroups generated this way total m and are in one-to-one correspondence to the n-bit numbers.

Assume there is some maximal subgroup $H_0$ which was not generated this way. Let the q numbers $\{x_a, x_b, \cdots\} \in \overline{H_0}$ be the maximal such subset of the generators $\{x_1, x_2, \cdots, x_n\}$. $x_0 = x_a \oplus x_b \oplus \cdots$. $x_0 = x_k$ for some $H_k$ previously generated. Since the generators produce unique sums, then $\{x_a, x_b, \cdots\} \in \overline{H_k}$. There are p remaining generators $\{x_f, x_g \cdots\} \in H_0 \cap H_k$ where $p + q = n$. Then $(H_0 \cap H_k) \cup (\overline{H_0} \cap \overline{H_k})$ is a maximal subgroup. This is not possible unless $H_0 = H_k$.

(Q.E.D.)

There is an interesting relationship between the maximal subgroups and the numbers. $G_n$ is trivially a maximal subgroup of itself. $G_n + H_i = H_i + G_n = H_i$ and $H_i + H_i = G_n$. The collection of maximal subgroups $\hat{G} = \{G_n, H_i, \cdots, H_n, H_1 + H_2, \cdots\}$ form a group under the operation "+" with $G_n$ acting as the identity. $\hat{G}$ is isomorphic to $G_n$ under the mapping $x_k \rightarrow H_k$ defined above.

The above proof is a little complicated, but it illustrates something of the structure of the subgroups. The same result can be obtained by more elementary means.

Each set of n-1 independent elements generates a maximal subgroup of order $2^{n-1}$. The number of distinct sets of independent (n-1)-tuples, from proposition 12, is $Q(n, n-1)$. However, different (n-1)-tuples may generate the same subgroup. The subgroup of order n-1 is isomorphic to the group of n-1 bit numbers. This latter group has $Q(n-1)$ independent (n-1)-tuples. Thus, the group of n-1 bit numbers can be generated by Q(n-1) sets of generators, and each maximal subgroup is generated Q(n-1) times using all possible independent (n-1)-tuples. So the number of distinct maximal subgroups of $G_n$ is:

$$R(n) = \frac{Q(n, n-1)}{Q(n-1)} = \frac{\frac{1}{(n-1)!} \prod_{j=0}^{n-2} (2^n - 2^j)}{\frac{1}{(n-1)!} \prod_{j=0}^{n-2} (2^{n-1} - 2^j)} =$$

$$\prod_{j=0}^{n-2} \left( \frac{2^n - 2^j}{2^{n-1} - 2^j} \right) = 2^n - 1 = m$$

Corollary: Each number other than the identity will occur in $\frac{m-1}{2}$ maximal subgroups and in $\frac{m+1}{2}$ complements.

Proof: Since there are m maximal subgroups each number will appear m times, either in a maximal subgroup or its complement. The identity I will appear m times in the maximal subgroups but never in a complement. There are $\frac{m(m-1)}{2}$ remaining places for the non-identity numbers to appear in maximal subgroups and $\frac{m(m+1)}{2}$ places in the complements. Thus, by symmetry, each non-identity number will appear in $\frac{m-1}{2}$ maximal subgroups and in $\frac{m+1}{2}$ complements. (Q.E.D.)

Proposition 21: If $H_i$, $H_j$, $H_k$ are any three dependent maximal subgroups, then $G_n = H_i + H_j + H_k$.

Proof: Each $H_i$ and each $\overline{H}_i$ have $\frac{m+1}{2}$ numbers. Also each $H_i \cap H_j$, $H_i \cap \overline{H}_j$, and $\overline{H}_i \cap \overline{H}_j$ have $\frac{m+1}{4}$ numbers. The set of distinct numbers in $H_i \cup H_j$ is the set $(H_i \cap \overline{H}_j) \cup (\overline{H}_i \cap H_j) \cup (H_i \cap H_j)$ and consists of $\frac{3(m+1)}{4}$ numbers. The missing $\frac{m+1}{4}$ numbers are those contained in $\overline{H}_i \cap \overline{H}_j$. $H_k = H_i + H_j = (H_i \cap H_j) \cup (\overline{H}_i \cap \overline{H}_j)$. So $G_n = H_i \cup H_j \cup H_k$ and $G_n = H_i + H_j + H_k$.  (Q.E.D)

Corollary: The set of any three dependent numbers $\{x_i, x_j, x_k\}$, none of which is I, contain at least one number from each of the m maximal subgroups.

Proof: In the proof of proposition 20, for a set of generators of $G_n$, $\{x_1, x_2, \cdots, x_n\}$, a set of maximal subgroups was generated. The generators can be written in terms of these subgroups:

$$\{x_1\} = \overline{H}_1 \cap H_2 \cap \cdots \cap H_n$$
$$\{x_2\} = H_1 \cap \overline{H}_2 \cap \cdots \cap H_n$$
$$\vdots$$
$$\{x_n\} = H_1 \cap H_2 \cap \cdots \cap \overline{H}_n$$

$|H_k| = |\overline{H}_k| = 2^{n-1}$, $|H_j \cap H_k| = |\overline{H}_j \cap \overline{H}_k| = |H_j \cap \overline{H}_k| = |\overline{H}_j \cap H_k| = 2^{n-2}$. By induction these n-fold intersections have $2^0 = 1$ elements and are singleton sets. As an example, take $x_1$, $x_2$, and $x_k = x_1 \oplus x_2$. $H_k = H_1 + H_2$ is a dependent set in the sense of proposition 20, $x_k$ is the number associated with $H_k$, and by proposition 21, $G_n = H_1 + H_2 + H_k$. By proposition 13, $$\{x_k\} = \overline{H}_1 \cap \overline{H}_2 \cap H_3 \cap \cdots \cap H_n$$

of course, $k \notin \{1, 2, \cdots, n\}$. Any maximal subgroup is of the form $\sum H_i$ where i ranges over some subset of $\{1, 2, \cdots, n\}$. If $i \neq 1, 2$, then $\{x_1, x_2, x_k\} \in \sum H_i$. Otherwise, there are three possible cases:

1. $i \neq 1, \neq 2$   $x_1 \in \sum H_i$

2. $i = 1, \neq 2$   $x_2 \in \sum H_i$

3. $i = 1, = 2$   $x_k \in \sum H_i$      (Q.E.D.)

This is different from the situation with vector spaces where an independent set of vectors spans the space.

Proposition 22: A one-to-one transformation of $G_n$ onto itself is unbiased, if and only if, it can be represented by a replicative array.

Proof: As shown in the introduction, any transformation $TG_n \rightarrow G_n$, where $Tx_i = Z_i$, can be written in the form $y_i \oplus x_i = z_i$. This can be represented by the addition modulo 2 of two column matrices to obtain a third:

$$\begin{pmatrix} y_1 \\ y_2 \\ \vdots \end{pmatrix} \oplus \begin{pmatrix} x_1 \\ x_2 \\ \vdots \end{pmatrix} = \begin{pmatrix} z_1 \\ z_2 \\ \vdots \end{pmatrix}$$

The $y_i$ matrix represents the transformation T. Each matrix will have $2^n$ entries. For the $x_i$ and $z_i$ matrices, each of the $2^n$ n-bit binary numbers will appear exactly once since T is 1 to 1 onto it. Assume that T is unbiased and that the $y_i$ matrix may have some of the n-bit numbers repeated so that the $2^n$ numbers are not all distinct.

There are $m = 2^n - 1$ maximal subgroups $H_1, H_2, \cdots, H_m$. Since T is unbiased, it will map each $H_i$ such that $$\left| TH_i \cap H_i \right| = \left| TH_i \cap \overline{H_i} \right| = \frac{1}{2} \left| H_i \right|.$$

-35-

From proposition 13, we can arrange the matrices in blocks that correspond to the maximal subgroup $H_i$ and its complement blocks $$\begin{pmatrix} H_i \\ \overline{H}_i \\ \overline{H}_i \\ H_i \end{pmatrix}_y \oplus \begin{pmatrix} H_i \\ H_i \\ \overline{H}_i \\ \overline{H}_i \end{pmatrix}_x = \begin{pmatrix} H_i \\ \overline{H}_i \\ H_i \\ \overline{H}_i \end{pmatrix}_z$$

Since T is unbiased, each of the four blocks must consist of $2^{n-2}$ numbers. The n-bit numbers may be designated $y_0 = I$, $y_1$, $y_2$, $\ldots$, $y_n$ in the y matrix, and each will appear with some multiplicity $p_j \geq 0$. Let $a_{ij} = 1$ if $y_j \in H_i$ and $a_{ij} = 0$ if $y_j \in \overline{H}_i$. Clearly $a_{i0} = 1$ for all i since the identity I belongs to each subgroup. For each $H_i$ and $\overline{H}_i$ the following equations hold:

$$H_i : \quad p_0 + \sum_{j=1}^{m} a_{ij} p_j = \frac{m+1}{2}$$

$$\overline{H}_i : \quad \sum_{j=1}^{m} (1 - a_{ij}) p_j = \frac{m+1}{2}$$

These two sets of equations are consistent since $$p_0 + \sum_{j=1}^{m} p_j = \sum_{j=0}^{m} p_j = m + 1.$$

The m equations corresponding to the m maximal subgroups can be written in matrix form:

$$\begin{pmatrix} a_{11} & a_{12} & \cdots & a_{1m} \\ a_{21} & a_{22} & \cdots & a_{2m} \\ \vdots & & & \\ a_{m1} & a_{m2} & \cdots & a_{mm} \end{pmatrix} \begin{pmatrix} p_1 \\ p_2 \\ \vdots \\ p_m \end{pmatrix} = \begin{pmatrix} \frac{m+1}{2} - p_0 \\ \frac{m+1}{2} - p_0 \\ \vdots \\ \frac{m+1}{2} - p_0 \end{pmatrix}$$

Using the determinant of the m x m matrix on the left, we can use Cramer's rule to solve for the $p_i$. For example, $$p_1 = \frac{\begin{vmatrix} \frac{m+1}{2} - p_0 & a_{12} & a_{13} & \cdots & a_{1m} \\ \frac{m+1}{2} - p_0 & a_{22} & a_{23} & \cdots & a_{2m} \\ \vdots & \vdots & \vdots & & \vdots \\ \frac{m+1}{2} - p_0 & a_{m2} & a_{m3} & \cdots & a_{mm} \end{vmatrix}}{\begin{vmatrix} a_{11} & a_{12} & a_{13} & \cdots & a_{1m} \\ a_{21} & a_{22} & a_{23} & \cdots & a_{2m} \\ \vdots & \vdots & \vdots & & \vdots \\ a_{m1} & a_{m2} & a_{m3} & \cdots & a_{mm} \end{vmatrix}}$$

-37-

From the corollary to proposition 20, each row of the determinant in the denominator will have $\frac{m-1}{2}$ entries which are 1 and $\frac{m+1}{2}$ which are 0. Adding columns 2 through m to column 1 will not change the value of the determinant, so that:

$$p_1 = \frac{\begin{vmatrix} \frac{m+1}{2} - p_0 & a_{12} & a_{13} & \cdots & a_{1m} \\ \frac{m+1}{2} - p_0 & a_{22} & a_{23} & \cdots & a_{2m} \\ \vdots & \vdots & \vdots & & \vdots \\ \frac{m+1}{2} - p_0 & a_{m2} & a_{m3} & \cdots & a_{mm} \end{vmatrix}}{\begin{vmatrix} \frac{m-1}{2} & a_{12} & a_{13} & \cdots & a_{1m} \\ \frac{m-1}{2} & a_{22} & a_{23} & \cdots & a_{2m} \\ \vdots & & & & \vdots \\ \frac{m-1}{2} & a_{m2} & a_{m3} & \cdots & a_{mm} \end{vmatrix}}$$

Factoring out the constant first column in each determinant and noting that the same result holds for the ith column, yields:

$$p_i = \frac{\frac{m+1}{2} - p_0}{\frac{m-1}{2}} \quad \text{for } 1 \leq i \leq m.$$

-38-

$p_0 \leq 1$ since $p_0 > 1$ implies more than one fixed word, contrary to the definition of an unbiased substitution. If $p_0 = 0$ then $p_i = \frac{m+1}{m-1}$ which is not an integer.

The only remaining posibility is $p_0 = 1$, in which case:

$$p_i = \frac{\frac{m+1}{2} - 1}{\frac{m-1}{2}} = 1 \text{ for all } i.$$

Thus if the transformation is unbiased, all the $p_i = 1$ which, by definition, is a replicative array.

NOTE: One does not need to appeal to the definition of an unbiased substitution to restrict the value of $p_0$. If $p_0 \geq 2$, than $0 < p_i < 1$ which is also impossible.

Assume now that the transformation is replicative. Consider any arbitrary maximal subgroup H. Each column matrix will have $2^{n-1}$ entries in H and $2^{n-1}$ entries in $\overline{H}$. The matrices can be written in blocks, as follows, using proposition 13:

$$\begin{pmatrix} y \\ 2^{n-1} \in H \\ \hline 2^{n-1} \in \overline{H} \end{pmatrix} \oplus \begin{pmatrix} x \\ b \in H \\ \hline 2^{n-1} - b \in \overline{H} \\ \hline 2^{n-1} - b \in H \\ \hline b \in \overline{H} \end{pmatrix} = \begin{pmatrix} z \\ b \in H \\ \hline 2^{n-1} - b \in \overline{H} \\ \hline 2^{n-1} - b \in H \\ \hline b \in \overline{H} \end{pmatrix}$$

where b entries from H and $2^{n-1} - b$ entries from $\overline{H}$ in the x matrix are added to the $2^{n-1}$ entries from H in the y matrix. This yields a total of 2b entries from H and $2^n - 2b$ entries from $\overline{H}$ in the z matrix. Since the transformation is replicative, the z column matrix has $|H| = 2^{n-1}$ entries from H. Thus $2b = 2^{n-1}$ and $b = 2^{n-2} = 2^{n-1} - b$. So $|TH \cap H| = |\overline{TH} \cap \overline{H}| = 2^{n-2}$ and T is unbiased.

Q.E.D.

Proposition 14 is really included in proposition 22, but the proof of the former reveals more about the structure of the transformations and the additional property resulting from linearity.

Thus, any unbiased substitution of the n-bit binary numbers will fall into one of three categories:

1. It is replicative but not additive. Its powers are in general not replicative. It is a non-linear transformation which is also not affine.

2. It is additive with fixed point other than the identity. Its powers are also additive. This group of transformations are all affine.

3. It is additive with the identity fixed. Its powers are also additive. This group of transformations are all linear. They have the further property that they split all subgroups and not just the maximal ones.

APPENDIX II

NON-LINEAR DYNAMIC SUBSTITUTION DEVICES AS MECHANISMS FOR BLOCK SUBSTITUTIONS

PREPARED BY:

BLAKELY, SOKOLOFF, TAYLOR & ZAFMAN
12400 Wilshire Boulevard
Seventh Floor
Los Angeles, California 90025
(213) 207-3800

*I hereby certify that this correspondence is being deposited with the United States Postal Service as Express Mail (Label No. RB984587912US) in an envelope addressed to: Commissioner of Patents and Trademarks, Washington, D.C. 20231 on May 31, 1994*

Krystle P. DiPaolo          May 31, 1994
                            Date

TABLE OF CONTENTS

| Section | Title | Page |
|---|---|---|
| 1. | INTRODUCTION | 3 |
| 2. | BACKGROUND WORK WITH LINEAR AND AFFINE ORTHOMORPHISMS | 4 |
| 3. | NONLINEAR ORTHOMORPHISMS AND DYNAMIC SUBSTITUTION DEVICES (DSD) | 5 |
| | 3-1   General Considerations | 5 |
| | 3-2   Conversion of Linear Orthomorphisms | 7 |
| | 3-3   Nonlinearization Summary | 7 |
| | 3-4   Application of Nonlinearization Techniques | 10 |
| | 3-5   Selection of Equations for Nonlinearization | 11 |
| | 3-6   Nonlinearization Techniques Summary | 12 |
| 4. | MEASURES OF CRYPTOGRAPHIC FREEDOM FROM BIAS | 13 |
| | 4-1   Avalanching and Bit Independence | 13 |
| | 4-2   Other Criteria for Lack of Bias | 15 |
| | 4-3   Applications to Orthomorphisms | 16 |
| REFERENCES | | 19 |
| APPENDIX | | A1 |

1. INTRODUCTION

The term Dynamic Substitution Device (DSD) was coined at Teledyne Electronics to designate a block substitution device, or $S$-box, in which the mappings or substitutions of clear text blocks of binary numbers to encrypted blocks of binary numbers, or vice versa, are accomplished by means of so-called *orthomorphisms*.

Any block substitution can be described in terms of look-up tables, permutations, or Boolean functions. A look-up table is simply a tabulation of corresponding clear text and cipher text pairs. A permutation is an orderly way of describing a look-up table and has the advantage of showing any cycles or subsets of numbers mapped onto themselves. Permutations also have some algebraic properties which can be considered in the design of $S$-boxes. Boolean functions (commonly used) are functions of $n$-bit binary numbers or blocks whose dependent variables are individual bits of another $n$-bit number. Thus, $n$ Boolean functions are needed to describe a block substitution for $n$-bit numbers.

Orthomorphisms are another method of describing block substitutions, albeit a special class of them because most block substitutions are not orthomorphisms. As shown in ref. 2, there are many orthomorphisms existing. When they are described by look-up tables or Boolean functions, their special properties tend to be obscured.

Letting $G_n$ be the group of $n$-bit binary numbers under coordinatewise addition modulo 2 (denoted by the symbol $\oplus$), an orthomorphism of $G_n$ is a 1 to 1 mapping $R: G_n \to G_n$ such that $\{x \oplus R(x)\}_{x \epsilon G_n} = G_n$. This is equivalent to pairing each $n$-bit binary number with another in such a way that in the collection of $2^n$ pairs, each number appears exactly once in each of the two sets of numbers and in such a way that the sums modulo 2 of the pairs is again $G_n$. (It is not obvious that this can ever be done.) This constitutes a bijective mapping with a single fixed point since some number must be added modulo 2 to the all-zero additive identity.

2. BACKGROUND WORK WITH LINEAR AND AFFINE ORTHOMORPHISMS

Linear (automorphic) and affine orthomorphisms are described in some detail in Appendix 1. A linear orthomorphism can be represented by a set of $2^n$ equations, for block size $n$, where each $x_i$ is an $n$-bit binary number:

$$\Theta \oplus \Theta = \Theta$$
$$x_m \oplus x_1 = x_{1-p}$$
$$x_1 \oplus x_2 = x_{2-p}$$
$$\vdots$$
$$x_{k-1} \oplus x_k = x_{k-p}$$
$$\vdots$$
$$x_{m-1} \oplus x_m = x_{m-p}$$

where $m = 2^n - 1$ and $p$ is an integer determined by the generating function but independent of the initial conditions or key variable $\{x_1, x_2, \cdots, x_n\}$. This set of equations can be thought of as a set of $2^n$ vectors on a three-dimensional space. These vectors can be added componentwise modulo 2.

In the linear case, the set of vectors forms an additive group, but this is both a strength and a weakness. Knowing any set of $n$ linearly independent vectors (equations) one could construct the remaining equations from the group property. As in every block substitution, the mapping can be represented by a permutation. In this case, there are three permutations depending on which pair of columns is chosen. As a convention, we typically consider the mapping to be from column 1, $x_{k-1}$ to column 3, $x_{k-p}$. The compensating quality described in Appendix 1 is that if column 1 is shifted with respect to column 2, column 3 is also shifted by a corresponding amount and represents a new linear orthomorphism.

The permutation representing the new orthomorphism is a power of the permutation representing the original orthomorphism. In App.1 it is shown that these permutations form a cyclic permutation group of order $2^n - 1$ which is transitive, i.e., each number other than the fixed number is mapped on every other number by the family of orthomorphisms.

The affine orthomorphisms can be converted to or derived from linear orthomorphisms by adding vectorially to each of the $2^n$ original equations an equation of the form $S \oplus S = \Theta$ where $S$ is a fixed number.

In practice, a linear DSD has been used with a continual change of shift position, or equivalently, a different member of the permutation group. Employed in this way, the $S$-box is nonlinear.

There is another aspect to linearity vs. nonlinearity, namely, the level at which it is described. Orthomorphic block substitutions have been derived by linear recursive generating functions applied to a maximal set of linearly independent n-bit numbers. The mappings of numbers from one column to another in the set of equations is also linear under the operation of modulo 2 addition bitwise; however, if the same mapping is now considered under the operation modulo $m$, where $m = 2^n - 1$, the mappings, in general, are nonlinear. Here, linearity is defined by the property of a mapping $F$, such that $F(ax + by) = aFx + bFy$ for all vectors $x, y$, and scalars $a, b$.

In ref. 1, $S$-boxes or mappings are defined in terms of Boolean functions, i.e., a set of $n$ functions which map an n-bit number (clear text) to one bit of an $n$-bit (cipher text) number. Because orthomorphisms are block substitutions, although of a special type, they can also be represented this way. In ref. 1, it is proven that a sufficient condition for the mapping or block substitution to be nonlinear at the integer level (presumably under modulo $m$ addition) is that all $n$ Boolean functions (at the bit level) be nonlinear. This is not claimed to be a necessary condition. In the appendix, an example is given of a linear orthomorphism (under modulo 2 addition) with linear Boolean functions which is nonlinear at the integer level modulo $m$.

3. NONLINEAR ORTHOMORPHISMS & DYNAMIC SUBSTITUTION DEVICES

3.1 General Considerations

In view of the comments in the last section on different definitions of nonlinearity, this section is concerned specifically with block substitutions using nonlinear orthomorphisms in the sense that they are nonlinear mappings from $G_n$ onto $G_n$ under the operation of bitwise addition modulo 2. The motivation to look at nonlinear orthomorphisms is twofold:

a. There are many more nonlinear than linear orthomorphisms.

b. Nonlinear orthomorphisms should be more resistant to cryptanalysis than the linear or affine versions because of the lack of group symmetries.

There is a trade-off, however, in that the nonlinear orthomorphisms do not generate an automorphism group and the corresponding dynamic substitution devices no longer can change substitutions by shifting.

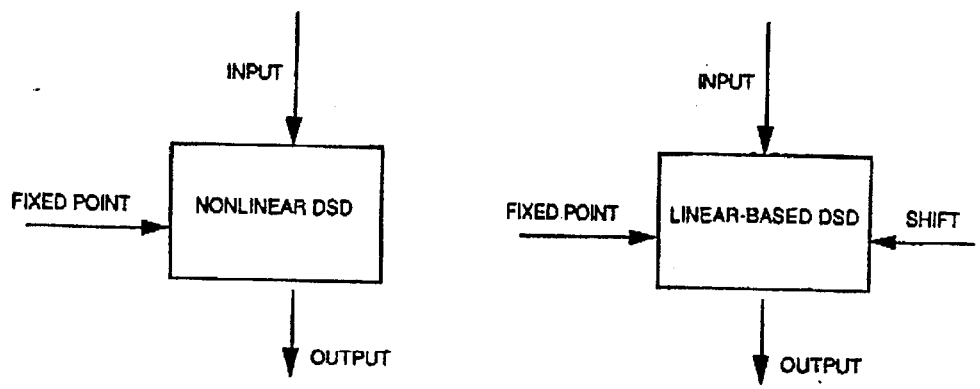

Figure 1.

The first problem is to find a way of routinely generating nonlinear orthomorphisms. In one approach, it is tempting to try a variation of the process used in App.1prop. 1, relaxing the requirement that successive sets of $n$ numbers in each column be linearly independent, while constructing a set of equations to represent an orthomorphism. Select $n$ linearly independent numbers, and start the array of equations as follows:

$$\begin{array}{ccccc}
--- & \oplus & x_1 & = & --- \\
x_1 & \oplus & x_2 & = & z_2 \\
& & \cdot & & \\
& & \cdot & & \\
& & \cdot & & \\
x_{n-1} & \oplus & x_n & = & z_n \\
x_n & \oplus & \underline{\phantom{xx}} & = & \underline{\phantom{xx}}
\end{array}$$

The choice of the linearly independent set $(x_1, \cdots, x_n)$ specifies $n - 1$ equations of the budding orthomorphism. Choosing a candidate for $x_{n+1}$, such that $(x_2, \cdots, x_{n+1})$ and $(z_2, \cdots, z_{n+1})$ are linearly independent, yields a linear or affine orthomorphism if successive steps can continue to $x_m$. If the restriction on linear independence is removed, the only restriction is that neither $x_{n+1}$ nor $z_{n+1}$ duplicate a predecessor.

The problem experienced with this procedure is that one almost always runs out of choices before reaching $x_m$ where $m = 2^n - 1$. Without loss of generality, one can assume that the fixed point is given by the equation $\Theta \oplus \Theta = \Theta$. To avoid lengthy "cut and try" procedures, some additional guidance is needed.

Another approach is to convert a linear orthomorphism to a nonlinear one by taking the set of equations defining the linear orthomorphism and permuting the numbers in two columns in such a manner that the third column of sums is unchanged. In the next section, this approach will be explored.

3.2 Conversion of Linear Orthomorphisms to Nonlinear

Any linear orthomorphism can be expressed as an additive group of equations which can be treated as vectors and added componentwise modulo 2 to obtain another equation (vector) in the same array or group of equations representing the orthomorphic block substitution. Omitting the identity equation, $\Theta \oplus \Theta = \Theta$, the orthomorphism can be written:

$$x_m \oplus x_1 = x_{1-p}$$
$$x_1 \oplus x_2 = x_{2-p}$$
$$\vdots$$
$$x_{j-1} \oplus x_j = x_{j-p}$$
$$\vdots$$
$$x_{m-1} \oplus x_m = x_{m-p}$$

If numbers in columns 1 and 2 could be rearranged within themselves so that the sums in column 3 are preserved, a nonlinear orthomorphism would result. Since the orthomorphism is based on the relationship between three columns, it is intuitively tempting to seek some relationship among triples of rows. Because of the group structure, the vector sum of the first three equations will be another equation which already occurs at position $q$, where $q$ is given by:

$$x_1 \oplus x_2 \oplus x_3 = x_q$$
$$x_{2\text{-}p} \oplus x_3 = x_q$$
$$x_{3\text{-}(p+1)} \oplus x_3 = x_q$$

This last equation is from the array representing a shift of $p + 1$ in column 1 or the $(p + 1)$st power of the basic permutation.

Thus:

$$x_{3\text{-}(p+1)} \oplus x_3 = x_{3\text{-}p_{(p+1)}}$$

and $$q = 3 - p_{(p+1)} \text{ modulo } m$$

where $p_{(p+1)}$ is the shift in column 3 corresponding to a shift of $p + 1$ in column 1.

Without loss of generality, we take the first $j$ rows in the linear orthomorphic array and take successive triple sums of adjacent rows. The first of these will be:

$$(x_m \oplus x_1 \oplus x_2) \oplus (x_1 \oplus x_2 \oplus x_3) = (x_{1\text{-}p} \oplus x_{2\text{-}p} \oplus x_{3\text{-}p})$$

which is the row in the $q$th position in the array of equations and can be written:

$$x_{q\text{-}1} \oplus x_q = x_{q\text{-}p}$$

The remaining rows generated in this way are:

$$x_q \oplus x_{q+1} = x_{q+1\text{-}p}$$
$$\vdots$$
$$x_{q+j\text{-}4} \oplus x_{q+j\text{-}3} = x_{q+j\text{-}3\text{-}p}$$

for a total of $j - 2$ adjacent rows in the original array separated by $q - j$ rows from the set of $j$ equations. The second group of $j - 2$ rows lend themselves to a natural transformation by cancelling the common numbers in columns 1 and 2, yielding:

$$x_m \oplus x_3 = x_{q\text{-}p}$$
$$x_1 \oplus x_4 = x_{q+1\text{-}p}$$
$$\vdots$$
$$x_{j\text{-}3} \oplus x_j = x_{q+j\text{-}3\text{-}p}$$

In these $j - 2$ modified rows, column 1 duplicates all but $x_{j\text{-}2}$ and $x_{j\text{-}1}$ in column 1 of the first set and all but $x_1$ and $x_2$ from column 2. If this process is to succeed, a mechanism must be found to replace the duplicates in the first set with $j - 2$ original numbers in columns 1 and 2 of the second set. The first question, however, is whether or not this is possible.

Let $S$ be the set of numbers in column 1 of the first $j$ equations and $T$ be the corresponding set of numbers in column 2. These sets must be replaced, respectively, by the sets $S'$ and $T'$ consisting of the original numbers in columns 1 and 2 of the second set of $j-2$ equations plus those two numbers left over in each of $S$ and $T$.

$$S = (x_m, x_1, \cdots, x_{j-1}) \to S' = (x_{j-2}, x_{j-1}, x_{q-1}, \cdots, x_{q+j-4})$$
$$T = (x_1, x_2, \cdots, x_j) \to T' = (x_1, x_2, x_q, \cdots, x_{q+j-3})$$

The conditions on transforming from one set to another are interrelated. If $x_k \in S$ and $x_k \to x'_k \in S'$, then, $x_{k+1} \in T$ and $x_{k+1} \to x'_{k+1} \in T'$. $x_k \oplus x_{k+1} = x_{k+1-p} = x'_k \oplus x'_{k+1}$, so that $x'_{k+1} = x_k \oplus x_{k+1} \oplus x'_k$.

Let $x_m \to x'_m \in S'$, then, from $T$, $x_1 \to x_m \oplus x_1 \oplus x'_m = x'_1 \in T'$. There is only one possible choice of $x'_m \in S'$ so that $x'_1 \in T'$, i.e., $x'_m = x_{q-1} = x_m \oplus x_1 \oplus x_2$, in which case, $x_1 \to x'_1 = x_2$.

Similarly, at the other end, $x_{j-1} \in S$ and $x_{j-1} \to x'_{j-1} \in S'$. $x_j \in T$ and $x_j \to x_{j-1} \oplus x_j \oplus x'_{j-1} = x'_j \in T'$. Again, there is only one possible choice for $x'_{j-1} = x_{j-2}$ so that $x_j \in T'$, namely, $x'_j = x_{j-2} \oplus x_{j-1} \oplus x_j = x_{q+j-3} \in T'$. Thus, the first and last modified rows of the first set of $j$ equations are uniquely specified:

$$x_m \oplus x_1 = x_{1-p} \text{ becomes } x_{q-1} \oplus x_2 = x_{1-p}$$

and:

$$x_{j-1} \oplus x_j = x_{j-p} \text{ becomes } x_{j-2} \oplus x_{q+j-3} = x_{j-p}.$$

Next, consider the second original equation:

$$x_1 \oplus x_2 = x_{2-p}$$

$x_1 \to x'_1 \in S'$. $x'_1 \neq x_{q-1}$ or $x_{j-2}$ since these have been used. $x_2 \to x'_2 \in T'$ where $x'_2 = x_1 \oplus x_2 \oplus x'_1$ If $x'_1 = x_q, x_{q+1}, \cdots, x_{q+j-4}$, then, $x'_2 \notin T'$. So, the only possibility is $x'_1 = x_{j-1} \in S'$. In that case, $x'_2 = x_1 \oplus x_2 \oplus x_{j-1}$. $j \geq 3$:

if $j = 3$    $x'_1 = x_2$    and    $x'_2 = x_1$    $x_2 \oplus x_1 = x_{2-p}$.
if $j = 4$    $x'_1 = x_3$    and    $x'_2 = x_q$    $x_3 \oplus x_q = x_{2-p}$.
if $j > 4$    $x'_2 \notin T'$.

If $j = 4$, there is one more equation of the first set of four to be modified: the third. Because $j = 4$, $S' = (x_2, x_3, x_{q-1}, x_q)$ and $T' = (x_1, x_2, x_q, x_{q+1})$. The only unused pair is $x_q \in S'$ and $x_1 \in T'$. Fortunately, $x_q \oplus x_1 = x_{3-p}$, and the transformation is complete.

3.3 Nonlinearization Summary

Nonlinearization by taking sums of consecutive triples of rows works, if and only if, a set of three or four consecutive rows is used. If three consecutive rows are selected, the result is:

| | | Original | | | | Modified | |
|---|---|---|---|---|---|---|---|
| 1. | $x_m$ | $\oplus$ | $x_1$ | $= x_{1-p}$ | $x_{q-1}$ $\oplus$ $x_2$ | $= x_{1-p}$ |
| 2. | $x_1$ | $\oplus$ | $x_2$ | $= x_{2-p}$ | $x_2$ $\oplus$ $x_1$ | $= x_{2-p}$ |
| 3. | $x_2$ | $\oplus$ | $x_3$ | $= x_{3-p}$ | $x_1$ $\oplus$ $x_q$ | $= x_{3-p}$ |
| q | $x_{q-1}$ | $\oplus$ | $x_q$ | $= x_{q-p}$ | $x_m$ $\oplus$ $x_3$ | $= x_{q-p}$ |

The modification can be obtained by adding vectorially to each of the four rows:

$$(x_1 \oplus x_2) \oplus (x_1 \oplus x_2) = \Theta$$

If four consecutive rows are selected, the result is:

| | | Original | | | | Modified | |
|---|---|---|---|---|---|---|---|
| 1. | $x_m$ | $\oplus$ | $x_1$ | $= x_{1-p}$ | $x_{q-1}$ $\oplus$ $x_2$ | $= x_{1-p}$ |
| 2. | $x_1$ | $\oplus$ | $x_2$ | $= x_{2-p}$ | $x_3$ $\oplus$ $x_q$ | $= x_{2-p}$ |
| 3. | $x_2$ | $\oplus$ | $x_3$ | $= x_{3-p}$ | $x_q$ $\oplus$ $x_1$ | $= x_{3-p}$ |
| 4. | $x_3$ | $\oplus$ | $x_4$ | $= x_{4-p}$ | $x_2$ $\oplus$ $x_{q+1}$ | $= x_{4-p}$ |
| q | $x_{q-1}$ | $\oplus$ | $x_q$ | $= x_{q-p}$ | $x_m$ $\oplus$ $x_3$ | $= x_{q-p}$ |
| q+1 | $x_q$ | $\oplus$ | $x_{q+1}$ | $= x_{q+1-p}$ | $x_1$ $\oplus$ $x_4$ | $= x_{q+1-p}$ |

The modification can be obtained by adding vectorially:

to rows 1 and q   $(x_1 \oplus x_2) \oplus (x_1 \oplus x_2) = \Theta$
to rows 2 and 3   $(x_1 \oplus x_3) \oplus (x_1 \oplus x_3) = \Theta$
to rows 4 and q + 1   $(x_2 \oplus x_3) \oplus (x_2 \oplus x_3) = \Theta$

3.4 Application of Nonlinearization Techniques

It is often tempting to try to speak of levels of nonlinearity as if such levels were measurable quantities. Somehow, piecewise linear functions seem less nonlinear than transcendental functions. In cryptography, one refers to the *Hamming distance* of nonlinear Boolean functions from linear ones. While linearity is well defined, and nonlinear functions are simply everything left over when the linear, and perhaps affine functions are deleted, in what follows we will succumb to the tendency to ascribe measurability to levels of nonlinearity.

In the last section, two means were described to nonlinearize four or six rows at a time of an arbitrary linear orthomorphism. Because those methods could be applied, starting with any row in the orthomorphic array, each could yield $2^n - 1$ different, nonlinear orthomorphisms from one linear orthomorphism; however, they would not "be very nonlinear" in the sense that for large $n$, a big chunk of the original array of equations would be left intact. So it is natural to use one or both of these processes repeatedly. The limitation, short of running out of rows, is having chunks of rows overlap. The fraction of original rows, modified, might be considered a measure of nonlinearity, so the next question is how to select efficiently clumps of non-overlapping rows.

3.5. Selection of Rows or Equations for Nonlinearization

There are many ways to choose sets of triples or quadruples of consecutive equations for this nonlinearization process. The only essential criterion is that no rows derived as triple sums from some triple or quadruple sets overlap with another triple or quadruple set. In addition to this, it seems obvious that as many rows as possible from the linear orthomorphism be modified and with a reasonably uniform distribution so as to avoid any piecewise linear portions in the new orthomorphism. First, consider the case in which $m = 2^n - 1$ is a composite number. Let $d$ be a factor of $m$. From the linear orthomorphisms, select rows number 1, 2, 3 and 4 along with the corresponding sum rows $q$ and $q + 1$. We can then select successive sextuples of rows to be modified as in the preceding section. The row numbers of these successive sextuples will be:

| 1 | 2 | 3 | 4 | $q$ | $q+1$ |
|---|---|---|---|---|---|
| $1+d$ | $2+d$ | $3+d$ | $4+d$ | $q+d$ | $q+1+d$ |
| . | | | | | |
| . | | | | | |
| . | | | | | |
| $1+ad$ | $2+ad$ | $3+ad$ | $4+ad$ | $q+ad$ | $q+1+ad$ | where $a$ takes on successive values $0, 1, 2, \cdots$. This process can terminate in two ways. First of all, one of the equations in a quadruple set may be duplicated in another set, i.e., overlapping quadruplets and the same may happen between the sets of equations which are the triple sums. This will occur when for some integer $a$:

$$1 + ad, 2 + ad, 3 + ad \text{ or } 4 + ad \equiv 1, 2, 3 \text{ or } 4 \text{ modulo } m$$

$$q + ad \text{ or } q + 1 + ad \equiv q \text{ or } q + 1 \text{ modulo } m.$$

This is equivalent to:

$$ad \equiv 0, \pm 1, \pm 2 \text{ or } \pm 3 \text{ modulo } m.$$

The minimum separation between successive initial rows, i.e., 1 and $1 + d$, must be at at least 4 for quadruples. Since $m = 2^n - 1$ is odd, and $d$ divides $m$, $d$ is also odd and, thus, $d \geq 5$. this also means that $ad \neq \pm 1, \pm 2, \pm 3$ modulo $m$.

The second means of potential overlap is when:
$$1, 2, 3, \text{ or } 4 \equiv q + ad \text{ or } q + 1 + ad \text{ modulo } m$$
$$1 + ad, 2 + ad, 3 + ad, \text{ or } 4 + ad \equiv q \text{ or } q + 1 \text{ modulo } m.$$
This is equivalent to:
$$ad \equiv \pm q, \pm(q - 1), \pm(q - 2), \pm(q - 3), \text{ or } \pm(q - 4) \text{ modulo } m.$$
To avoid this, $d$ must be relatively prime to $q, \cdots, q - 4$; however, one of these numbers must be a multiple of 5 so that we require $d \geq 7$. If triples rather than quadruples of rows are selected, then the conditions $ad \neq \pm q$ or $\pm(q - 4)$ are eliminated. In that case, $d \geq 5$ satisfies the conditions above. (Note: All integers here are positive, so the condition $ad \neq -q$ modulo $m$, etc, means $ad \neq bm - q$. Since $d$ divides $m$, if it is relatively prime to $q$, it must also be relatively prime to $bm - q$ for any integer $b$.)

3.5 Nonlinearization Techniques Summary

If $m = 2^n - 1$ is not a prime, seek a factor $d$ of $m$, relatively prime to $q$, $q - 1, \cdots, q - 4$ to space successive quadruples of equations (relatively prime to $q - 1$, $q - 2$, $q - 3$ to space successive triples of equations) for the nonlinearization process.

When such a number $d$ can be found, it leads a uniformly spaced, dense set of equations in the linear array for nonlinearization. Some examples are given in the appendix.

3.6 Other Selections of Rows

When the above method does not appear to be rewarding, another obvious possibility is to take successive quadruples of rows, defined by a triple and its sum, in which the first row of a subsequent quadruple follows immediately after the last row (triple sum) of the previous quadruple. For example:

| 1 | 2 | 3 | $q$ |
| $q + 1$ | $q + 2$ | $q + 3$ | $2q$ |
| . | | | . |
| | . | | |
| | | . | |
| . | | | . |
| $bq + 1$ | $bq + 2$ | $bq + 3$ | $(b + 1)q$ |

- 12 -

This process terminates when any one of three conditions occurs:
1. $bq \equiv 0, \pm 1, \pm 2$ modulo $m$
2. $(b-1)q \equiv -1, -2, -3$ modulo $m$
3. $(b+1) \equiv 1, 2, 3$ modulo $m$ If $q$ is a prime, or at least not a divisor of $m \pm 1$, $m \pm 2$, or $m \pm 3$, this process can yield a large number of nonoverlapping quadruples for nonlinearization. This process can also be done with sextuples of rows, but the conditions for termination are more complex.

In general, these two methods, under proper conditions, can select nonoverlapping sets of equations from the linear orthomorphism for nonlinearization. Only a relatively small number of equations, evenly distributed, are left unmodified.

There are many other ways to go about this process, e.g., fitting sets of quadruples and sextuples of rows together without overlapping. This becomes a topological problem. The important point is that it is possible in this way to generate nonlinear orthomorphisms which are not piecewise linear.

4. MEASURES OF CRYPTOGRAPHIC BIAS

The author is unaware of any generally accepted measurable standard for freedom from bias in block substitutions of binary numbers. Two widely used criteria are *avalanching* (good or strict) and *bit independence*. In what follows, two other possible criteria are suggested: (1) balance, which is related to properties of the $n$-bit binary numbers as an algebraic group, and (2) transitivity, which is a property of certain permutation groups that in not commonly applied to block substitutions. Of the four, it appears to be possible to meet, at most, three criteria simultaneously.

4.1 Avalanching and Bit Independence

The strict avalanche criterion (SAC) is defined as the property that changing the $i$th bit in the input block causes a change in the $j$th bit in the output block one half of the time for all $1 \leq i, j \leq n$, where $n$ is the block size. The bit independence criterion (BIC) is defined as the property that changing the $i$th bit in the input block of the averages changes half the bits in the output block. (See ref. 1.) These properties can also be described in terms of the algebraic properties of the binary numbers of arbitrary block size.

$G_n$ is the additive group of all $n$-bit binary numbers, where the symbol $\oplus$ means modulo 2 addition bitwise.

There are $n$ maximal subgroups $H_i$ which may be termed "basic" which are defined by the property that each block in $H_i$ has 0 in the $i$th position. Numbering from left to right, $H_n$ consists of all even numbers, and $H_1$, consists of all lower half numbers. In general:

$$H_i = \{x \in G_n \mid x = \underset{1}{\_} \_ \cdots \_ \underset{i}{0} \_ \_ \cdots \underset{n}{\_}\}$$

Clearly, $H_i$ is characterized by the property that:

$$x_i H_i = 0 \text{ where } x_i = \underset{1}{0} \cdots 0 \underset{i}{1} 0 \cdots \underset{n}{0}$$

$$|H_i| = \frac{1}{2}|G_n| = 2^{n-1}.$$

There are a total of $2^n - 1$ maximal subgroups (MSG) which can be generated from these basic MSG's by the operation:

$$H_k = H_i + H_j \equiv (H_i \cap H_j) \cup (\bar{H}_i \cap \bar{H}_j)$$

This is somewhat analogous to the Boolean rings described in ref. 2, section 9.4; however, the multiplicative semi-groups property defined by the intersection of sets does not apply here because the intersections of MSG's are not MSG's. The addition operation is actually the complement of that defined above, which would, in effect, define the sum of two MSG's to be the complement of another.

Changing the $i$th bit in some number $x$ to obtain a new number $y$ is equivalent to choosing $y$ such $x \oplus y = 0 \ 0 \cdots 0 \underset{i}{1} 0 \cdots 0$. For a given $i$ there are $2^{n-1}$ such pairs.

SAC is equivalent to requiring that for $1 \leq i, j \leq n$ $Tx \oplus Ty$ has 0 as the $j$th bit one half of the time (no change) and 1 as the $j$th $n$-bit one half of the time (change). More formally, define:

$$P_i = \{Tx \oplus Ty \mid x \oplus y = 0 \cdots 0 \ 1 \ 0 \cdots 0\} \text{ where 1 is at the } i\text{th bit position.}$$

Note: This implies that $x \in H_i$ and $y \in \bar{H}_i$ or vice versa. $|P_i| \leq 2^{n-1}$ since there are $2^{n-1}$ such pairs but the sums may not be distinct. Thus, SAC is equivalent to:

$$|P_i \cap H_j| = |P_i \cap \bar{H}_j| = \frac{1}{2}|P_i| \text{ for } 1 \leq i, j \leq n \quad n^2 \text{ conditions.}$$

$P_i$ consists of $2^{n-1}$ $n$-bit numbers which may range from all the same to all different. Each bit results from adding a (unordered) pair (0,1), (0,0), (1,1). If the number of such pairs is, respectively, $a, b, c$, then $a + b + c = 2^{n-1}$, the number of pairs defining $P_i$. The number of zeroes in the pairs is $a + 2b = 2^{n-1}$ and the number of one's is $a + 2c = 2^{n-1}$; therefore, $a$ is even and the number of 1's and 0's appearing in each bit position of the $2^{n-1}$ numbers in $P_i$ is even. For example, if $n = 4$, $P_i$ will contain eight 4-bit numbers, perhaps not distinct but each bit position will contain 0, 2, 4, 6 or 8 one's. If they are not evenly divided (avalanching), the closest approximation will be 2:6.

Considering $P_i$ a set of $2^{n-1}$ numbers, including multiple occurrences, a measure of approximate avalanching is $\frac{|P_i \cap H_j|}{2^{n-1}}$ averaged over all $n^2$ $i,j$ pairs.

The bit independence criterion is related to avalanching. Consider the set $P_i$ including the multiplicity of each member. To meet BIC, the number of zeroes and ones should be approximately equal in each block. For $n$ odd, of course, this can never occur in an individual block. There are $2^{n-1}$ $n$-bit numbers (including duplicates) in $P_i$ with a total of $n2^{n-1}$ binary bits. Let $NP_i$ be the number of zeroes in the set $P_i$, including duplicates or multiple appearances. $\frac{NP_i}{n2^{n-1}}$ is a measure of BIC for a given bit position. Overall, BIC specifies that:

$$\frac{\sum_{i=1}^{n} NP_i}{n^2 2^{n-1}} \approx \frac{1}{2}$$

For a given $P_i$, let the numbers be enumerated as follows, where $Z_{ij}$ is the $j$th position of the $i$th number and $l = 2^{n-1}$.

$$Z_{11} \quad Z_{12} \quad \cdots \quad Z_{1n}$$
$$\vdots$$
$$Z_{i1} \quad Z_{i2} \quad \cdots \quad Z_{im}$$
$$\vdots$$
$$Z_{l1} \quad Z_{l2} \quad \cdots \quad Z_{ln}$$

Then, avalanching specifies that the zeroes and ones in each column will be approximately evenly divided, and BIC specifies the equivalent condition on the rows.

Both SAC and BIC are usually referred to as bit level properties because they refer to relations between individual bits in the same and different $n$-bit numbers for a given $S$-box or mapping. Thus, if applied to orthomorphic mappings, these properties depend on the key variable or the particular set of $n$ linearly independent numbers acted on by the generating functions.

4-2. Other Criteria for Lack of Bias

The previous section briefly described the maximal subgroups (MSG's) of the group $G_n$ of $n$-bit binary numbers where the group operation ($\oplus$) is bitwise addition modulo 2. There are $m = 2^n - 1$ such MSG's $H_1, \cdots, H_m$ which themselves form a group under the operation of Boolean addition:

$$H_k = H_i + H_j \equiv (H_i \cap H_j) \cup (\bar{H}_i \cap \bar{H}_j)$$

The $n$ MSG's which are characterized by all having zero in a given bit position, e.g., the even numbers, are easy to visualize conceptually. They are implicitly used in the definition of avalanching; however, the other $m - n$ MSG's are of equal significance algebraically, and any $n$ linearly independent MSG's can be used to generate the entire set.

<u>Definition</u>: A bijective mapping on $G_n$ is said to be balanced if it maps each maximal subgroup, i.e., each subgroup of order $2^n - 1$, half into itself and half into its complement.

If $T$ is the bijective mapping, this means $|TH_i \cap H_i| = |TH_i \cap \bar{H}_i| = 2^{n-2}$ $1 \leq i \leq 2^n - 1$. $T$ is an orthomorphism if and only if it is balanced. Thus, balance is a unique and universal property of orthomorphic block substitutions at the integer level, independent of linearity or key variable. A practical consequence is that in design of an orthomorphic $S$-box, no special effort need be made to incorporate or verify this property.

Transitivity is not an obvious quality to attribute to $S$-boxes since it is a property of certain permutation groups. If we are considering permutations on $m = 2^n - 1$ numbers (or letters) of which block substitutions are an example, then the definition from ref. 6, pg. 82, is pertinent:

<u>Definition</u>: A group of permutations is said to be transitive if it contains at least one permutation which transforms any one of the $m$ letters (numbers) into any other letter (number).

However, by prop. 6 of App. 1 linear orthomorphisms form a transitive group on the $2^n - 1$ nonfixed numbers. In fact, this is also true for affine orthomorphisms. This property, which implies a thorough mixing at the integer level is, of course, a property not of a single block substitution but of a group of them.

The collection of all possible block substitutions or bijective mappings on $G_n$, viewed as permutations, constitute a transitive group, namely $P_m$, the symmetric group on $m$ elements and of order $m!$. Other transitive subgroups can be generated by taking all powers of a maximal permutation, that is, one with no proper subcycles.

In the case of linear or automorphic orthomorphisms, this is particularly easy because of the property of being able to shift columns in the array of equations defining the automorphisms. Maximal nonlinear orthomorphisms could be used to generate a transitive subgroup but, in general, the other members would not be orthomorphisms.

4-3. Applications to Orthomorphisms

If $T$ is a linear (automorphic) or affine orthomorphism, it is clear that strict avalanching is not possible. In this case, $Tx \oplus Ty = T(x \oplus y) + S$ where $S$ is a fixed number ($S = 00\cdots0$ if $T$ is linear). Thus, $P_i$ consists of a single number and $|P_i \cap H_j| = 0$ or $1$ and $|P_i \cap \bar{H}_j| = 1$ or $0$. However, the $n$ numbers $P_i$ may have an equal distribution of zeros and ones so that bit independence is possible.

On the other hand, the nonlinear orthomorphisms constructed from linear ones have shown good avalanching and BIC. An example is given in the appendix of a nonlinear orthomorphism with strict avalanching and a BIC ratio of exactly $\frac{1}{2}$.

All orthomorphisms and only orthomorphisms have balance as defined in App. 1. Linear and affine orthomorphisms are represented by transitive groups of permutations. Thus, over the family of block substitutions, each clear text block is mapped to each possible cipher text block except for the fixed point which may be varied. This can be summarized as follows:

| | | |
|---|---|---|
| a. | SAC and BIC: | Bit level properties depending on the key variable |
| b. | Balance: | A universal integer level property of all orthomorphisms |
| c. | Transitivity: | A universal integer level property for groups of linear or affine orthomorphisms | and also:

|  | Orthomorphisms | | Other |
| Property | Nonlinear | Linear/Affine | Substitutions |
| --- | --- | --- | --- |
| Avalanching | Yes | No | Yes |
| Bit independence | Yes | Yes | Yes |
| Balance | Yes | Yes | No |
| Transitivity | No | Yes | Possibly* |

*This is a group property and depends on selecting a block substitution which is maximal, i.e., no cycles, and then taking all powers of it.

REFERENCES

1. "The Structured Design of Cryptographically Good S-Boxes," Adams and Tavares, J, Cryptology (1990) 3:27-41

2. "Fundamentals of Mathematics," Vol 1, Behnke, Bachman, *et. al.*, MIT Press 1986.

6. "Introduction to the Theory of Finite Groups," W. Ledermann, Oliver and Boyd, 1964.

7. "Shift Register Sequences," S.W. Golomb, Aegean Park Press, 1982.

APPENDIX

A. LINEAR ORTHOMORPHISMS VIEWED FROM VARIOUS PERSPECTIVES

As pointed out in section 2, a linear orthomorphism can be viewed and represented in several ways. For example, consider $n = 4$, with generating function $x_k = x_{k-4} \oplus x_{k-3}$ for which $p = 12$, and with base set or linearly independent set:

$$x_1 = 0001, x_2 = 0010, x_3 = 0100, x_4 = 1000.$$

This defines the table:

| Column 1 |   | Column 2 |   | Column 3 |
|----------|---|----------|---|----------|
| 0000     | ⊕ | 0000     | = | 0000     |
| 1001     | ⊕ | 0001     | = | 1000     |
| 0001     | ⊕ | 0010     | = | 0011     |
| 0010     | ⊕ | 0100     | = | 0110     |
| 0100     | ⊕ | 1000     | = | 1100     |
| 1000     | ⊕ | 0011     | = | 1011     |
| 0011     | ⊕ | 0110     | = | 0101     |
| 0110     | ⊕ | 1100     | = | 1010     |
| 1100     | ⊕ | 1011     | = | 0111     |
| 1011     | ⊕ | 0101     | = | 1110     |
| 0101     | ⊕ | 1010     | = | 1111     |
| 1010     | ⊕ | 0111     | = | 1101     |
| 0111     | ⊕ | 1110     | = | 1001     |
| 1110     | ⊕ | 1111     | = | 0001     |
| 1111     | ⊕ | 1101     | = | 0010     |
| 1101     | ⊕ | 1001     | = | 0100     |

It is easily verified that the mapping from column 1 to column 3 (or any other pair of columns) is linear under addition modulo 2. That same mapping could be represented by a table in which y (column 3) is a function f(x) of x (column 1). In decimal notation this becomes:

| x | | y |
|---|---|---|
| 0 | → | 0 |
| 1 | | 3 |
| 2 | | 6 |
| 3 | | 5 |
| 4 | | 12 |
| 5 | | 15 |
| 6 | | 10 |
| 7 | | 9 |
| 8 | | 11 |
| 9 | | 8 |
| 10 | | 13 |
| 11 | | 14 |
| 12 | | 7 |
| 13 | | 4 |
| 14 | | 1 |
| 15 | | 2 |

It is easy to see that this is nonlinear under addition modulo 16 or by representing it in graphical form. The mapping can also be represented as a permutation:

(0) (1, 3, 5, 15, 2, 6, 10, 13, 4, 12, 7, 9, 8, 11, 14)

It can also be written in terms of Boolean functions by rewriting column 1 in the natural order of the numbers and correspondingly rearranging column 3. The Boolean functions describe bits in column 3 as functions of blocks in column 1.

| Column 1 | Column 3 |
|---|---|
| $b_1\ b_2\ b_3\ b_4$ | $f_1\ f_2\ f_3\ f_4$ |
| 0 0 0 0 | 0 0 0 0 |
| 0 0 0 1 | 0 0 1 1 |
| 0 0 1 0 | 0 1 1 0 |
| 0 0 1 1 | 0 1 0 1 |
| 0 1 0 0 | 1 1 1 0 |
| 0 1 0 1 | 1 1 0 1 |
| 0 1 1 0 | 1 0 0 0 |
| 0 1 1 1 | 1 0 0 1 |
| 1 0 0 0 | 1 0 1 1 |
| 1 0 0 1 | 1 0 0 0 |
| 1 0 1 0 | 1 1 0 1 |
| 1 0 1 1 | 1 1 1 0 |
| 1 1 0 0 | 0 1 1 1 |
| 1 1 0 1 | 0 1 0 0 |
| 1 1 1 0 | 0 0 0 1 |
| 1 1 1 1 | 0 0 1 0 |

From this, the Boolean functions can be written:

$$f_1 = b_1 \oplus b_2$$
$$f_2 = b_2 \oplus b_3$$
$$f_3 = b_1 \oplus b_3 \oplus b_4$$
$$f_4 = b_1 \oplus b_4$$

The generating function $x_k = x_{k-4} \oplus x_{k-3}$ operates universally on any set of 4 linearly independent 4-bit numbers; however, the Boolean functions depend on the specific mapping. For example, consider the same generating function but applied to the base:

$$x_1 = 0011, x_2 = 0110, x_3 = 1100, x_4 = 1000$$

This defines a new table.

| Column 1 | | Column 2 | | Column 3 |
|---|---|---|---|---|
| 0000 | ⊕ | 0000 | = | 0000 |
| 1011 | ⊕ | 0011 | = | 1000 |
| 0011 | ⊕ | 0110 | = | 0101 |
| 0110 | ⊕ | 1100 | = | 1010 |
| 1100 | ⊕ | 1000 | = | 0100 |
| 1000 | ⊕ | 0101 | = | 1101 |
| 0101 | ⊕ | 1010 | = | 1111 |
| 1010 | ⊕ | 0100 | = | 1110 |
| 0100 | ⊕ | 1101 | = | 1001 |
| 1101 | ⊕ | 1111 | = | 0010 |
| 1111 | ⊕ | 1110 | = | 0001 |
| 1110 | ⊕ | 1001 | = | 0111 |
| 1001 | ⊕ | 0010 | = | 1011 |
| 0010 | ⊕ | 0001 | = | 0011 |
| 0001 | ⊕ | 0111 | = | 0110 |
| 0111 | ⊕ | 1011 | = | 1100 |

As in the first example, to obtain the Boolean functions, it is convenient to rearrange columns 1 and 3:

| Column 1 | | | | Column 3 | | | |
|---|---|---|---|---|---|---|---|
| $b_1$ | $b_2$ | $b_3$ | $b_4$ | $f_1$ | $f_2$ | $f_3$ | $f_4$ |
| 0 | 0 | 0 | 0 | 0 | 0 | 0 | 0 |
| 0 | 0 | 0 | 1 | 0 | 1 | 1 | 0 |
| 0 | 0 | 1 | 0 | 0 | 0 | 1 | 1 |
| 0 | 0 | 1 | 1 | 0 | 1 | 0 | 1 |
| 0 | 1 | 0 | 0 | 1 | 0 | 0 | 1 |
| 0 | 1 | 0 | 1 | 1 | 1 | 1 | 1 |
| 0 | 1 | 1 | 0 | 1 | 0 | 1 | 0 |
| 0 | 1 | 1 | 1 | 1 | 1 | 0 | 0 |
| 1 | 0 | 0 | 0 | 1 | 1 | 0 | 1 |
| 1 | 0 | 0 | 1 | 1 | 0 | 1 | 1 |
| 1 | 0 | 1 | 0 | 1 | 1 | 1 | 0 |
| 1 | 0 | 1 | 1 | 1 | 0 | 0 | 0 |
| 1 | 1 | 0 | 0 | 0 | 1 | 0 | 0 |
| 1 | 1 | 0 | 1 | 0 | 0 | 1 | 0 |
| 1 | 1 | 1 | 0 | 0 | 1 | 1 | 1 |
| 1 | 1 | 1 | 1 | 0 | 0 | 0 | 1 |

From this, the Boolean functions can be written:

$$f_1 = b_1 \oplus b_2$$
$$f_2 = b_1 \oplus b_4$$
$$f_3 = b_3 \oplus b_4$$
$$f_4 = b_1 \oplus b_2 \oplus b_3$$

Except for $f_1$, these differ from the previous example.

B. SELECTION OF EQUATIONS OR ROWS IN AN AUTOMORPHIC (LINEAR) ORTHOMORPHISM FOR NONLINEARIZATION

Section 3.5 suggested various ways to choose nonoverlapping quadruples or sextuples of equations for nonlinearization. The idea is to nonlinearize a large fraction of the $m = 2^n - 1$ equations in the array which defines the orthomorphic mapping. Since $2^n - 1$ is odd, it will never be possible by the methods of section 3.2 to modify all the equations because the process is applied to sets with four or six members. There is no optimal process for all block sizes or even for different generating functions with the same block size. Following are some examples for block sizes $n = 4, 5, 6, 7,$ and $8$.

For $n = 4$, there is just one pair of conjugate generating functions with $p = 4$, $q = 8$ and $p = 12$, $q = 11$, respectively. The corresponding maximal density of rows is given by:

| 1 | 2 | 3 | 4 | 8 | 9 |
|---|---|---|---|---|---|
| 5 | 6 | 7 |   | 12 |   | and

| 1 | 2 | 3 | 4 | 11 | 12 |
|---|---|---|---|----|----|
| 5 | 6 | 7 |   | 15 |    | for a modification of 10 of the 15 rows.

For $n = 5$, the optimum again is a hybrid mix. For example, for $x_k = x_{k-5} \oplus x_{k-2}$, $p = 18, q = 23$, and $m = 31$. Twenty-four rows out of 31 can be modified, selecting:

| 1 | 2 | 3 | 4 | 23 | 24 |
|---|---|---|---|----|----|
| 7 | 8 | 9 | 10 | 29 | 30 |
| 14 | 15 | 16 |  | 5 |  |
| 20 | 21 | 22 |  | 11 |  |
| 25 | 26 | 27 |  | 6 |  |

For $p = 19, q = 11$ corresponding to $x_k = x_{k-5} \oplus x_{k-4} \oplus x_{k-2} \oplus x_{k-1}$ one can do a little better with 28 rows out of 31 for modification by selecting:

| | | | | | |
|---|---|---|---|---|---|
| 1 | 2 | 3 | 4 | 11 | 12 |
| 7 | 8 | 9 | 10 | 17 | 18 |
| 13 | 14 | 15 | 16 | 23 | 24 |
| 19 | 20 | 21 | 22 | 29 | 30 |
| 26 | 27 | 28 | | 5 | |

For $n = 6$ and $x_k = x_{k-6} \oplus x_{k-1}$, the shift $p = 6$ and $q = 40$. Since $m = 63$ of which 7 is a factor, $d = 7$ is a candidate for a spacing as described in section 3.5. Also, for $q = 40$, 7 is not a divisor of $q, q - 1, \cdots, q - 4$. This yields 54 out of 63 rows for modification as follows:

| | | | | | |
|---|---|---|---|---|---|
| 1 | 2 | 3 | 4 | 40 | 41 |
| . | | | | | |
| . | | | | | |
| . | | | | | |
| $1 + a7$ | $2 + a7$ | $3 + a7$ | $4 + a7$ | $40 + a7$ | $41 + a7$ |
| . | | | | | |
| . | | | | | |
| . | | | | | |
| 57 | 58 | 59 | 60 | 33 | 34 |

Once again, the selection of sets of equations or rows for modification depends on the generating function. This particular selection will not work for most other values of q corresponding to $n = 6$.

For $n = 7$, $m = 127$ is a Mersenne prime, so the previous shortcut is not available; however, for certain generating functions, one can do quite well. Consider $n = 7, x_k = x_{k-7} \oplus x_{k-5} \oplus x_{k-4} \oplus x_{k-3} \oplus x_{k-2} \oplus x_{k-1}$ for which $p = 19$ and $q = 9$. Take rows as follows:

| | | | | |
|---|---|---|---|---|
| 1 | 2 | 3 | | 9 | then,

| | | | | | |
|---|---|---|---|---|---|
| 5 | 6 | 7 | 8 | 13 | 14 |
| 10 | 11 | 12 | | 18 | |
| 15 | 16 | 17 | | 23 | |

Following the same pattern of a sextuple followed by two quadruples, through:

| | | | | | |
|---|---|---|---|---|---|
| 103 | 104 | 105 | 106 | 111 | 112 |
| 108 | 109 | 110 | | 116 | |
| 113 | 114 | 115 | | 121 | | and then completing with rows:

| | | | | |
|---|---|---|---|---|
| 118 | 119 | 120 | | 126 |
| 123 | 124 | 125 | | 4 |

124 out of 127 equatio... can thus be modified, omitting only 117, 122, and 127. Other variations on this will work just as well omitting only th Also for $n = 7$, $x_k = x_{k-7} \oplus x_{k-6} \oplus x_{k-4} \oplus x_{k-2}$, $p = $
system works taking two sextuples and one quadru
among the last rows. Again, 124 out of 127 equations ca
however, this density or efficiency does not appea:
functions.

For $n = 8$, consider the generating function $x_k$
which $p = 16$, $q = 54$, and $m = 2^n - 1 = 255$. We w
consisting of successive triples, starting with the first row other than the identity,
plus the row which is the triple sum of the first three. Referring to section 3.5,
choose the row spacing $d = 5$. 5 is a factor of $m$ and relatively prime to $q - 1 = 53$, $q - 2 = 52$, and $q - 3 = 51$. This will lead to selection of the following rows:

| 1 | 2 | 3 | 54 |
| 6 | 7 | 8 | 59 |
| . | . | . | . |
| . | . | . | . |
| . | . | . | . |
| $1 + 5a$ | $2 + 5a$ | $3 + 5a$ | $54 + 5a$ |
| . | . | . | . |
| . | . | . | . |
| . | . | . | . |
| 251 | 252 | 253 | 49 | where $0 \leq a \leq 50$. This selects $51 \times 4 = 204$ rows or equations for nonlinearization from the total of 255 in the orthomorphic array. Left out are row 5 and all multiples of 5.

This spacing, however, will not work efficiently if we choose sextuples of rows because $q - 4 = 50$, a multiple of 5. In fact, when $a = 10$, $4 + 10a = 54$, so that the process will terminate with just $6 \times 10 = 60$ rows. However, there are several ways in which the remaining 195 rows can be divided into quadruples or sextuples, more or less piecemeal.

The spacing $d = 17$ is also a divisor of $m = 255$, but it is also a divisor of $q - 3 = 51$ and, hence, is not an efficient spacing.

Again, for $n = 8$ but with the generating function $x_k = x_{k-8} \oplus x_{k-4} \oplus x_{k-3} \oplus x_{k-2}$ for which $p = 25$, $q = 60$, and $m = 255$, $d = 17$ is a factor of $m$ but now it is not a divisor of $q = 60$, $q - 1 = 59$, ..., $q - 4 = 56$. Sextuples of rows can be selected as follows:

| 1 | 2 | 3 | 4 | 60 | 61 |
| 18 | 19 | 20 | 21 | 77 | 78 |
| . | | . | | | |
| . | | . | | | |
| 1 + 17a | 2 + 17a | 3 + 17a | 4 + 17a | 60 + 17a | 61 + 17a |

This process terminates when $a = 14$, for a total of $15 \times 6 = 90$ rows. For $a = 15$, $1 + 17a = 256 \equiv 1$ modulo $m$, and, so, the process repeats; however, one can start again as follows:

| 5 | 6 | 7 | 8 | 64 | 65 |
| 22 | 23 | 24 | 25 | 81 | 82 |
| . | | . | | | |
| . | | . | | | |
| 5 + 17a | 6 + 17a | 8 + 17a | 9 + 17a | 64 + 17a | 65 + 17a |

This process again terminates when $a = 14$ for $15 \times 6 = 90$ additional rows. Again, at $a = 15$ the process repeats. This gives a total of 180 rows. None of the remaining 75 rows contain triples with corresponding sums.

However, as in $p = 16$, $q = 54$, quadruples can be selected with a spacing of $d = 5$ again because 5 is relatively prime to $q - 1 = 59$, $q - 2 = 58$, and $q - 3 = 57$.

This is easy to apply for suitable combinations of $m$ and $q$, that is, for cooperative generating functions; however, it is not obvious how many equations representing the linear orthomorphism must be modified to get a "good" nonlinear mapping.

C. THE DEPENDENCE OF AVALANCHING AND BIT INDEPENDENCE ON SYSTEM PARAMETERS

In section 4-1 it was pointed out that avalanching and bit independence depend on the actual numbers in the block substitution and not just the algebraic structure. Ti illustrate this, we take an $n = 4$ bit family of block substitutions defined by a linear orthomorphism with generating function $x_k = x_{k-4} \oplus x_{k-3}$ for which the shift $p = 12$ and $q = 11$.

As the first example, we generate a nonlinear orthomorphism using rows:

| 1 | 2 | 3 | 11 |
| 5 | 6 | 7 | 15 | and with base or linearry independent set $x_1 = 0001$, $x_2 = 0010$, $x_3 = 0100$, $x_4 = 1000$. This is a nonlinearized version of the first linear orthomorphic mapping in section A of this appendix. As modified, it becomes:

| | | | | |
|---|---|---|---|---|
| 0000 | ⊕ | 0000 | = | 0000 |
| 1010 | ⊕ | 0010 | = | 1000 |
| 0010 | ⊕ | 0001 | = | 0011 |
| 0001 | ⊕ | 0111 | = | 0110 |
| 0111 | ⊕ | 1110 | = | 1001 |
| 1110 | ⊕ | 1111 | = | 0001 |
| 1111 | ⊕ | 1101 | = | 0010 |
| 1101 | ⊕ | 0110 | = | 1011 |
| 0110 | ⊕ | 0011 | = | 0101 |
| 0011 | ⊕ | 1001 | = | 1010 |
| 1001 | ⊕ | 0100 | = | 1101 |
| 0100 | ⊕ | 1000 | = | 1100 |
| 1000 | ⊕ | 1100 | = | 0100 |
| 1100 | ⊕ | 1011 | = | 0111 |
| 1011 | ⊕ | 0101 | = | 1110 |
| 0101 | ⊕ | 1010 | = | 1111 |

To measure avalanching and bit independence as described in section 4-1, we first enumerate the set $P_1 = \{Tx \oplus Ty | x \oplus y = 1000\}$, that is, pairs $x, y$ which differ only in the first bit position. For $n = 4$, the sixteen 4-bit number pairs form eight pairs, not necessarily distinct. So, including multiplicity of appearance, $|P_1| = |P_2| = |P_3| = |P_4| = 8$. Also recall that $H_i$ is the maximal subgroup of $n$-bit numbers with 0 in the $i$th bit position. Here, for $n = 4$, $H_4$ is the subgroup of even numbers, and $H_1$ is the subgroup of lower half numbers, etc. For $P_1$, the tabulation is on the following worksheet. Each $|P_1 \cap H_j| = 4$ which means that 4 out of 8, or one half of the bits in each member of $P_1$ is 0 in the $j$th bit position, i.e., in the columnar tabulation, each column is comprised of half 0's and half 1's. The number of 0's in each member of $P_1$ is tabulated, i.e., horizontal tabulation. The total number of 0's, $NP_1 = 16$ out of 32 bits, so that half are 0's.

When the same tabulation is made for $P_1, P_3, P_4$, it turns out that $|P_1 \cap H_j| = 4$ for all 16 pairs, $NP_1 = 16$ for each $p_1$ so that the avalanching is strict and $$\frac{\sum NP_i}{n^2 2^{n-1}} = \frac{64}{128} = \frac{1}{2}$$

- A9 -

WORKSHEET
COMPUTATION OF AVALANCHING AND BIT INDEPENDENCE

|   | Clear Bits 1 | 2 | 3 | 4 |    | Cipher Bits 1 | 2 | 3 | 4 | $P_1 = \{Tx \oplus Ty\}$ 1 | 2 | 3 | 4 | No. of 0 Bits |
|---|---|---|---|---|---|---|---|---|---|---|---|---|---|---|
| $x$ | 0 | 0 | 0 | 0 | $Tx$ | 0 | 0 | 0 | 0 | 0 | 1 | 0 | 0 | 3 |
| $y$ | 1 | 0 | 0 | 0 | $Ty$ | 0 | 1 | 0 | 0 |   |   |   |   |   |
|   | 0 | 0 | 0 | 1 |   | 0 | 1 | 1 | 0 | 1 | 0 | 1 | 1 | 1 |
|   | 1 | 0 | 0 | 1 |   | 1 | 1 | 0 | 1 |   |   |   |   |   |
|   | 0 | 0 | 1 | 0 |   | 0 | 0 | 1 | 1 | 1 | 0 | 1 | 1 | 1 |
|   | 1 | 0 | 1 | 0 |   | 1 | 0 | 0 | 0 |   |   |   |   |   |
|   | 0 | 0 | 1 | 1 |   | 1 | 0 | 1 | 0 | 0 | 1 | 0 | 0 | 3 |
|   | 1 | 0 | 1 | 1 |   | 1 | 1 | 1 | 0 |   |   |   |   |   |
|   | 0 | 1 | 0 | 0 |   | 1 | 1 | 0 | 0 | 1 | 0 | 1 | 1 | 1 |
|   | 1 | 1 | 0 | 0 |   | 0 | 1 | 1 | 1 |   |   |   |   |   |
|   | 0 | 1 | 0 | 1 |   | 1 | 1 | 1 | 1 | 0 | 1 | 0 | 0 | 3 |
|   | 1 | 1 | 0 | 1 |   | 1 | 0 | 1 | 1 |   |   |   |   |   |
|   | 0 | 1 | 1 | 0 |   | 0 | 1 | 0 | 1 | 0 | 1 | 0 | 0 | 3 |
|   | 1 | 1 | 1 | 0 |   | 0 | 0 | 0 | 1 |   |   |   |   |   |
|   | 0 | 1 | 1 | 1 |   | 1 | 0 | 0 | 1 | 1 | 0 | 1 | 1 | 1 |
|   | 1 | 1 | 1 | 1 |   | 0 | 0 | 1 | 0 |   |   |   |   |   |

$|P_1 \cap H_1| = 4$ $|P_1 \cap H_2| = 4$ $|P_1 \cap H_3| = 4$ $|P_1 \cap H_4| = 4$ $\quad NP_1 = 16$ For comparison, we can now use the second example in section A, nonlinearized with the same set of equations, and differing only in that a new base set is used:

$$x_1 = 0011, x_2 = 0110, x_3 = 1100, x_4 = 1000$$

This second nonlinear orthomorphism can be written as follows:

| | | | | |
|---|---|---|---|---|
| 0000 | ⊕ | 0000 | = | 0000 |
| 1110 | ⊕ | 0110 | = | 1000 |
| 0110 | ⊕ | 0011 | = | 0101 |
| 0011 | ⊕ | 1001 | = | 1010 |
| 1001 | ⊕ | 0010 | = | 1011 |
| 0010 | ⊕ | 0001 | = | 0011 |
| 0001 | ⊕ | 0111 | = | 0110 |
| 0111 | ⊕ | 1010 | = | 1101 |
| 1010 | ⊕ | 0101 | = | 1111 |
| 0101 | ⊕ | 1011 | = | 1110 |
| 1011 | ⊕ | 1100 | = | 0111 |
| 1100 | ⊕ | 1000 | = | 0100 |
| 1000 | ⊕ | 0100 | = | 1100 |
| 0100 | ⊕ | 1101 | = | 1001 |
| 1101 | ⊕ | 1111 | = | 0010 |
| 1111 | ⊕ | 1110 | = | 0001 |

Making the same computation as on the sample worksheet, the results are as follows:

$$|P_1 \cap H_1| = |P_1 \cap H_2| = 0, |P_1 \cap H_3| = 8$$

and $|P_i \cap H_j| = 4$ for the remaining 13. $NP_1 = 12$, and $NP_2 = NP_3 = NP_4 = 16$. Thus:

$$\frac{\sum NP_i}{128} = \frac{60}{128} = 0.47$$

The avalanching is no longer strict but since almost half the time there is a bit change, it might be called "good".

For the third example, we again return to the same linear orthomorphism with $p = 12$ and $q = 11$, but this time nonlinearize it with a partially different collection of rows, that is, a sextuple and a quadruple:

| 1 | 2 | 3 | 4 | 11 | 12 |
|---|---|---|---|----|----|
| 13 | 14 | 15 | | 8 | |

However, the same base or linearly independent set is used as in the first example, that is, $x_1 = 0001$, $x_2 = 0010$, $x_3 = 0100$, $x_4 = 1000$. The third nonlinear orthomorphism can be written as follows:

| | | | | |
|---|---|---|---|---|
| 0000 | $\oplus$ | 0000 | = | 0000 |
| 1010 | $\oplus$ | 0010 | = | 1000 |
| 0010 | $\oplus$ | 1110 | = | 1100 |
| 1110 | $\oplus$ | 1001 | = | 0111 |
| 1001 | $\oplus$ | 0100 | = | 1101 |
| 0100 | $\oplus$ | 0111 | = | 0011 |
| 0111 | $\oplus$ | 0001 | = | 0110 |
| 0001 | $\oplus$ | 1000 | = | 1001 |
| 1000 | $\oplus$ | 0011 | = | 1011 |
| 0011 | $\oplus$ | 0110 | = | 0101 |
| 0110 | $\oplus$ | 1100 | = | 1010 |
| 1100 | $\oplus$ | 1101 | = | 0001 |
| 1101 | $\oplus$ | 1111 | = | 0010 |
| 1111 | $\oplus$ | 1011 | = | 0100 |
| 1011 | $\oplus$ | 0101 | = | 1110 |
| 0101 | $\oplus$ | 1010 | = | 1111 |

The results now are:

$|P_2 \cap H_3| = 0$    $|P_i \cap H_j| = 4$ for the other 15 sets $NP_2 = 12$ and $NP_1 = NP_3 = NP_4 = 16$ Thus:    $\dfrac{\sum NP_i}{128} = \dfrac{60}{128} = 0.47$ and the avalanching, while not strict, is closer to it by some visceral measure than in the second example.

APPENDIX III

METHODS OF NON-LINEAR DYNAMIC SUBSTITUTION

PREPARED BY:

BLAKELY, SOKOLOFF, TAYLOR & ZAFMAN
12400 Wilshire Boulevard
Seventh Floor
Los Angeles, California 90025
(213) 207-3800

*I hereby certify that this correspondence is being deposited with the United States Postal Service as Express Mail (Label No. RB984587912US) in an envelope addressed to: Commissioner of Patents and Trademarks, Washington, D.C. 20231 on May 31, 1994*

_____ May 31, 1994
Krystle P. DiPaolo                Date

METHODS OF NON-LINEAR DYNAMIC SUBSTITUTION

1. Using the Generating Function and Base Set, generate the set of Linear Orthomorphism Equations:

| Equation # | | | | | |
   |---|---|---|---|---|---|
   | 1 | $x_m$ | $\oplus$ | $x_1$ | = | $x_{1-p}$ |
   | 2 | $x_1$ | $\oplus$ | $x_2$ | = | $x_{2-p}$ |
   | . | . | . | . | . | . |
   | . | . | . | . | . | . |
   | j | $x_{j-1}$ | $\oplus$ | $x_j$ | = | $x_{j-p}$ |
   | . | . | . | . | . | . |
   | . | . | . | . | . | . |
   | m | $x_{m-1}$ | $\oplus$ | $x_m$ | = | $x_{m-p}$ |

Where $m = 2^n - 1$

2. Determine q such that $x_q = x_1 \oplus x_2 \oplus x_3$

3. Based on q and the factors of m determine:

a) Which of the following two sets of Equations to be nonlinearized for each iteration of a = 0, 1, 2, .. I:

Set 1 = B+ad, B+1+ad, B+2+ad and B+q-1+ad

Set 2 = B+ad, B+1+ad, B+2+ad, B+3+ad, B+q-1+ad, B+q+ad

Where B is the Beginning Equation and may be any number between 1 and m, inclusive, and d is defined below.

b) The spacing, d, between successive sets of nonlinearized equations (e.g., equations B+3d, B+1+3d, B+2+3d and B+q-1+3d will be nonlinearized in one

--1--

APPENDIX 3 iteration and then, in the next iteration, equations B+4d, B+1+4d, B+2+4d and B+q-1+4d will be nonlinearized).

Note: In some instances, both Set 1 and Set 2 will be used alternately or in some other pattern.

4. Starting with $a = 0$ and stopping when either $a = I$ (the input number of iterations) or when the process attempts to work on rows already nonlinearized, iteratively perform the nonlinearizing algorithm defined below:

If Set 1 is being nonlinearized, add vectorially to each of the Set 1 equations,
$(x_{B+ad} \oplus x_{B+1+ad}) \oplus (x_{B+ad} \oplus x_{B+1+ad}) = \theta$.

If Set 2 is being nonlinearized,
add vectorially to equations B+ad and B+g-1+ad,
$(x_{B+ad} \oplus x_{B+1+ad}) \oplus (x_{B+ad} \oplus x_{B+1+ad}) = \theta$;
add vectorially to equations B+1+ad and B+2+ad,
$(x_{B+ad} \oplus x_{B+2+ad}) \oplus (x_{B+ad} \oplus x_{B+2+ad}) = \theta$; and
add vectorially to equations B+3+ad and B+Q+ad,
$(x_{B+1+ad} \oplus x_{B+2+ad}) \oplus (x_{B+1+ad} \oplus x_{B+2+ad}) = \theta$.

Note: In all cases, if any equation number or index to x is greater than m, the value of m minus that number will be used instead of that number (e.g., if B+1+ad is greater than m, m - (B+1+ad) will be used instead).

5. Generate the naturally ordered Encryption Look-up Table and De-encryption Look-up Table which reflect the Orthomorphic Encryption Permutation and the Orthomorphic De-encryption Permutation resulting from the Nonlinear Orthomorphism Equations generated in step 4. The Nonlinear Dynamic Substitution Device is comprised of these look-up tables plus mechanisms for changing the transformation fixed point.

As an alternative to the Look-up Table, two sets of modified equations can be used:

For encryption, the clear text is column 1, which is encrypted into the cipher text in column 3:

| 1 | | 2 | | 3 |
|---|---|---|---|---|
| $y_m$ | $\oplus$ | $y_1$ | = | $z_1$ |
| $y_1$ | $\oplus$ | $y_2$ | = | $z_2$ |
| . | . | . | . | . |
| . | . | . | . | . |
| $y_{j-1}$ | $\oplus$ | $y_j$ | = | $z_j$ |
| . | . | . | . | . |
| . | . | . | . | . |
| $y_{m-1}$ | $\oplus$ | $y_m$ | = | $z_m$ |

Columns 1 and 2 are in the same order but shifted by one position. The numbers in column 3 are in a different order.

--3--

For decryption, the cipher text in column 3 is de-encrypted into the clear text in column 1

| 1 | | 2 | | 3 |
|---|---|---|---|---|
| $v_1$ | = | $w_1$ | $\oplus$ | $w_m$ |
| $v_2$ | = | $w_2$ | $\oplus$ | $w_1$ |
| . | . | . | . | . |
| . | . | . | . | . |
| $v_j$ | = | $w_j$ | $\oplus$ | $w_{j-1}$ |
| . | . | . | . | . |
| . | . | . | . | . |
| $v_m$ | = | $w_m$ | $\oplus$ | $w_{m-1}$ |

The order of the rows of equations have now been arranged leaving the individual equations unchanged, so that columns 2 and 3 are in the same order, but shifted by one position, the numbers in column 1 are now in a different order from those in columns 2 and 3.

APPENDIX IV

**CONSTRUCTIVE CORRUPTION:
A METHOD FOR GENERATING NONLINEAR
DYNAMIC SUBSTITUTIONS**

PREPARED BY:

BLAKELY, SOKOLOFF, TAYLOR & ZAFMAN
12400 Wilshire Boulevard
Seventh Floor
Los Angeles, California 90025
(213) 207-3800

*I hereby certify that this correspondence is being deposited with the United States Postal Service as Express Mail (Label No. RB984587912US) in an envelope addressed to: Commissioner of Patents and Trademarks, Washington, D.C. 20231 on: May 31, 1994*

_____  May 31, 1994
Krystle P. DiPaolo          Date

TELEDYNE PROPRIETARY

CONSTRUCTIVE CORRUPTION:
A Method for Generating Nonlinear Dynamic Substitutions

1. INTRODUCTION

The dynamic substitution device or DSD, a term coined at Teledyne Electronics, uses orthomorphic mappings as a mechanism for block substitutions or so-called pseudorandom permutations of $n$-bit binary numbers.

DEFINITION: Let $Z_2^n$ be the group of $n$-bit binary numbers under bitwise addition modulo 2. An orthomorphism is a 1-to-1 mapping $R: Z_2^n \to Z_2^n$ such that $$\{x \oplus R(x) \mid x \in Z_2^n\} = Z_2^n.$$

Orthomorphisms have been used in the construction of Latin squares in experimental design, and they have been examined in a limited way in mathematical literature. Up to now, the use of orthomorphisms for cryptographic purposes apparently has been limited to Teledyne Electronics. As in other mappings, the orthomorphisms may be linear (automorphisms), affine, or nonlinear. The linear and affine forms have been examined in some detail in ref. 1. Nonlinear orthomorphisms were investigated at Teledyne Electronics in ref. 2. Attempts to construct nonlinear orthomorphisms directly have not been very rewarding. Such constructions are difficult to do randomly except for very small block size, and even then they have been rather disappointing in the sense of being piece-wise linear. However, since orthomorphisms have a number of desirable properties for use in cryptography, such as, great flexibility, ease of implementation, and some measures of cryptographic strength which are independent of key variables, work has continued. The approach in ref. 2 was to convert linear orthomorphisms to nonlinear. Two methods were found to nonlinearize small sets of equations representing the linear orthomorphism and then to combine them without overlapping. However, this was a cut and try process without any real understanding of the underlying mechanism. The present report is intended to remedy this and to generalize the construction of nonlinear orthomorphisms and DSD's.

TELEDYNE PROPRIETARY

Any orthomorphism, viewed as a block substitution or a permutation, can be expressed as a set of equations in which the $n$-bit numbers, $x_i$, are written in the left and middle columns in the same order as the defining permutation:

$$\begin{array}{ccccc}
\Theta & \oplus & \Theta & = & \Theta \\
x_m & \oplus & x_1 & = & z_1 \\
x_1 & \oplus & x_2 & = & z_2 \\
\cdot & & \cdot & & \cdot \\
\cdot & & \cdot & & \cdot \\
\cdot & & \cdot & & \cdot \\
x_{m-1} & \oplus & x_m & = & z_m
\end{array}$$

Figure 1.

where $m = 2^n - 1$, $n$ is the block size, and $\Theta = (0,0,\cdots,0)$, the additive identity. In the linear orthomorphism, the right column of numbers also has the same order as the other two:

$$\begin{array}{ccccc}
\Theta & \oplus & \Theta & = & \Theta \\
x_m & \oplus & x_1 & = & x_{1-p} \\
x_1 & \oplus & x_2 & = & x_{2-p} \\
\cdot & & \cdot & & \cdot \\
\cdot & & \cdot & & \cdot \\
\cdot & & \cdot & & \cdot \\
x_{m-1} & \oplus & x_m & = & x_{m-p}
\end{array}$$

Figure 2.

The conversion of the set of equations representing the linear orthomorphism into a nonlinear version consists of altering the equations by rearranging the order of the numbers in columns 1 (left) and 2 (middle) among themselves. The new set of equations, like the original set, must have each $n$-bit number occurring exactly once in each column. For convenience, and without loss of generality, we can leave column 3 (right) unaltered and seek to rearrange columns 1 and 2 with the essential condition that the triples of numbers in each row be a valid equation. If rows (equations) of index or position $a, b, c$ in the set of equations representing the linear orthomorphism are used, this nonlinearization process takes the form:

<u>Linear Set</u> <u>Nonlinear Set</u>

$$x_{a-1} \oplus x_a = x_{a-p} = x_{c-1} \oplus x_b \qquad (1)$$

i.e., an equation, $x_{a-1} \oplus x_a = x_{a-p}$, in the set of equations representing the linear orthomorphism, is replaced by $x_{c-1} \oplus x_b = x_{a-p}$ in the new set of equations which will represent the nonlinear orthomorphism. There are two problems to be solved in doing this, however.

Consider that there are $2^n - 1 = m$ equations, other than the identity $\Theta \oplus \Theta = \Theta$, representing the orthomorphism, whether linear or nonlinear:

Index
$$1 \quad x_m \oplus x_1 = x_{1-p}$$
$$\vdots$$
$$j \quad x_{j-1} \oplus x_j = x_{j-p}$$
$$\vdots$$
$$m \quad x_{m-1} \oplus x_m = x_{m-p}$$

Figure 3.

The above represents a linear orthomorphism. The first problem, then, is to find some subset $\{a, b, c, \cdots\}$ of the complete set of indices $\{1, 2, \cdots m\}$ such that the numbers in columns 1 and 2 can be rearranged, respectively, among themselves in such a way that new valid equations are created. So, we cannot have:

$$x_{c-1} \oplus x_b \neq x_{a-p}$$

Now, having determined the set $\{a, b, c, \cdots\}$, the second problem is to find a rearrangement which will work. This is not possible for all subsets $\{a, b, c, \cdots\}$, but when a valid one is found, there may be more than one rearrangement capable of producing a nonlinear set.

Equation (1) above represents the transformation from the linear set to nonlinear set. That is:

$$x_{a-1} \oplus x_a = x_{a-p} \rightarrow x_{c-1} \oplus x_b = x_{a-p}$$

From this, $x_{a-1} \oplus x_{c-1} = x_a \oplus x_b \equiv w$. Once again, considering these equations vectors, the equation from the linear orthomorphism can be transformed into the nonlinear version by adding to it, vectorially, $w \oplus w = \Theta$, i.e.:

$$
\begin{array}{ccc}
x_{a-1} & \oplus \quad x_a & = x_{a-p} \\
(x_{a-1} \oplus x_{c-1}) & \oplus \quad (x_a \oplus x_b) & = \Theta \\
\hline
x_{c-1} & \oplus \quad x_b & = x_{a-p}
\end{array}
$$

So, the second problem reduces to finding a proper transformation equation to add vectorially to each equation in the set $\{a, b, c, \cdots\}$ selected from the linear orthomorphism.

TELELDYNE PROPRIETAP

To avoid confusion, the following definitions are made:

a.    DEFINITION 1: The process of converting a linear orthomorphism to a nonlinear version by rearranging the orders of the left (1) and middle (2) columns, while preserving equality in each row, is termed *constructive corruption*.

b.    DEFINITION 2: A subset of equations in the linear orthomorphism which can be nonlinearized by constructive corruption is called a *corruptible set*.

c.    DEFINITION 3: A transformation which modifies an equation in the linear orthomorphism into a corresponding equation in the nonlinear orthomorphism is a *mixing transformation*.

2.    FINDING A CORRUPTIBLE SET

If equation $a$ in the array of equations defining the linear orthomorphism is to be transformed:

$$x_{a-1} \oplus x_a = x_{a-p} \rightarrow x_{c-1} \oplus x_b = x_{a-p}$$

Then the mixing transformation is:

$$w \oplus w = \Theta \quad \text{where } w = x_{a-1} \oplus x_{c-1} = x_a \oplus x_b$$

Clearly, equations with indices $b$ and $c$ must also be transformed to avoid duplication of entries in column 1 (left) and column 2 (middle). Let $x_d = x_a \oplus x_b \oplus x_c$, defining a fourth equation with index $d$. Applying the mixing transformation to each of the four equations by component-wise addition, modulo 2:

$$\begin{array}{ccccc}
x_{i-1} & \oplus & x_i & = & x_{i-p} \\
w & \oplus & w & = & \Theta \\
\hline
x_{j-1} & \oplus & x_k & = & x_{i-p}
\end{array}$$

where $i, j,$ and $k$ take on all values in $\{a, b, c, d\}$. The result is:

$$\begin{array}{ccccc}
x_{c-1} & \oplus & x_b & = & x_{a-p} \\
x_{d-1} & \oplus & x_a & = & x_{b-p} \\
x_{a-1} & \oplus & x_d & = & x_{c-p} \\
x_{b-1} & \oplus & x_c & = & x_{d-p}
\end{array}$$

In a simple way, rows $a$, $b$, and $c$ generated this set of four equations in the linear array by taking all odd sums of the first three including singleton set $s$. Taking the even sums as well, plus the identity equation, specifies four more equations in the linear array:

$$\Theta \oplus \Theta = \Theta$$
$$x_{e-1} \oplus x_e = x_{e-p}$$
$$x_{f-1} \oplus x_f = x_{f-p}$$
$$x_{g-1} \oplus x_g = x_{g-p}$$

where $$x_e = x_a \oplus x_b$$
$$x_f = x_a \oplus x_c$$
$$x_g = x_b \oplus x_c$$

This last set of four equations or four numbers, $\{\Theta, x_e, x_f, x_g\}$, constitutes a group of order 4, which is a subgroup of the group of all eight equations, or the eight numbers $\{\Theta, x_a, x_b, x_c, x_d, x_e, x_f, x_g\}$. Thus, the set of four linear equations with indices $a$, $b$, $c$, $d$ is the relative component of the subgroup of order 4 in the group of order 8.

This procedure can be generalized to taking relative complements of any subgroup. In the limit, one can take $n$ linearly independent rows, viewed as vectors, in the array of equations defining an automorphic (linear) orthomorphism on $Z_2^n$, the group of $n$-bit numbers.

$$x_{k_1-1} \oplus x_{k_1} = x_{k_1-p}$$
$$\vdots$$
$$x_{k_n-1} \oplus x_{k_n} = x_{k_n-p}$$

As usual, these equations, viewed as vectors, can be added modulo 2 to obtain any other equation in the array of $2^n$ equations which define the linear orthomorphism.

These $n$ rows are constructed from three complete sets of linearly independent $n$-bit numbers, $\{x_{k_1-1}, \cdots, x_{k_n-1}\}$, $\{x_{k_1}, \cdots, x_{k_n}\}$, and $\{x_{k_1-p}, \cdots, x_{k_n-p}\}$. A generating function can be applied recursively to these sets to generate the entire array, or all possible sums of these $n$ base equations will generate the entire array which is a group isomorphic to $Z_2^n$. In the same way, taking all even sums of the base equations will generate a maximal subgroup of the array consisting of $2^{n-1}$ equations, including $\Theta \oplus \Theta = \Theta$. Taking all odd sums will generate a different set of $2^{n-1}$ equations comprising the complement of the maximal subgroup.

The linear array can thus be broken into two chunks of $2^{n-1}$ equations, each $$
\begin{array}{cccccl}
\underline{L} & & \underline{M} & & \underline{R} & \\
\ominus & \oplus & \ominus & = & \ominus & \\
x_{i_1-p} & \oplus & x_{i_1} & = & x_{i_1-p} & \text{maximal subgroup } L \times M \times R \\
\cdot & & \cdot & & \cdot & \\
\cdot & & \cdot & & \cdot & \\
\cdot & & \cdot & & \cdot & \\
x_{i_s-1} & \oplus & x_{i_s} & = & x_{i_s-p} & \\
\end{array}
$$

$$
\begin{array}{cccccl}
\underline{\bar{L}} & & \underline{\bar{M}} & & \underline{\bar{R}} & \\
x_{j_1-1} & \oplus & x_{j_1} & = & x_{j_1-p} & \\
\cdot & & \cdot & & \cdot & \\
\cdot & & \cdot & & \cdot & \\
\cdot & & \cdot & & \cdot & \\
x_{j_t-1} & \oplus & x_{j_t} & = & x_{j_t-p} & \text{complement } \bar{L} \times \bar{M} \times \bar{R} \\
\end{array}
$$

where $s = 2^{n-1} - 1$ and $t = 2^{n-1}$, $s + t = 2^n - 1 = m$. The index $i$ runs over $s$ values in the set $\{1, 2, 3, \cdots, m\}$ and the index $j$ runs over the remaining $t$ values. The sets $L, M$, and $R$ are, respectively, the sets of $n$-bit numbers in column 1 (left), column 2 (middle), and column 3 (right) of the maximal subgroup array. $\bar{L}, \bar{M}$, and $\bar{R}$ are the corresponding sets of $n$-bit numbers in the complement. $L, M$, and $R$ are clearly maximal subgroups of $Z_2^n$, the group of $n$-bit numbers. $L \cup \bar{L} = M \cup \bar{M} = R \cup \bar{R} = Z_2^n$.

Because of these relationships there is an even easier way to break the linear array into a maximal subgroup and its complement. For $R$, select any maximal subgroup of $Z_2^n$. There are $m$ such subgroups, mostly complex to define, but $n$ of them are characterized by having all zeros in a given bit position. Without loss of generality, let $R$ be the even numbers so that $\bar{R}$ is the set of odd numbers. From the linear array, one can read off the set of rows or their indices $\{i_1, i_2, \cdots, i_s\}$ in the maximal subgroup $L \times M \times R$.

TELELDYNE PROPRIETAR·

In the linear array, if one row or equation is written as the sum of two others:
$$x_c = x_a \oplus x_b$$
then it is also true that $x_{c+d} = x_{a+d} \oplus x_{b+d}$ for any integer $d$. This is because the array of equations can be generated recursively by the generating function. Now we can modify the maximal subgroup array as follows:

| $L'$ | | $M'$ | | $R'$ |
|---|---|---|---|---|
| $\Theta$ | $\oplus$ | $\Theta$ | $=$ | $\Theta$ |
| $x_{i_1+d-1}$ | $\oplus$ | $x_{i_1+d}$ | $=$ | $x_{i_1+d-p}$ |
| . | | . | | . |
| . | | . | | . |
| . | | . | | . |
| $x_{i_s+d-1}$ | $\oplus$ | $x_{i_s+d}$ | $=$ | $x_{i_s+d-p}$ |

The algebraic structure of the maximal subgroup is preserved so that the new set of rows can again be generated by taking even sums of a complete linearly independent set. Thus, a new maximal subgroup $L' \times M' \times R'$ is formed. Clearly, $d$ can take on $2^n - 1$ values. Since there are exactly $2^n - 1$ maximal subgroups (ref. 1, prop. 17), this process gets them all, which proves:

PROPOSITION 1. All maximal subgroups and their complements in a linear (automorphic) orthomorphic array of equations can be obtained from any one such pair by shifting the indices or row numbers by an arbitrary integer $d$ mod $m$.

From the complementary set $\bar{L} \times \bar{M} \times \bar{R}$, choose three linearly independent equations with indices $a, b, c$ such that
$$x_{a-1} \oplus x_a = x_{a-p} = x_{c-1} \oplus x_b$$
It will be shown later that for any $x_{a-p} \in \bar{R}$, it is possible to choose an $x_b \in \bar{M}$ such that $x_{c-1} \in \bar{L}$. This defines a mixing transformation:
$$w \oplus w = \Theta$$
and
$$w = x_{a-1} \oplus x_{c-1} = x_a \oplus x_b$$

This will obviously transform rows $a, b, c$ and $d$ where $x_d = x_a \oplus x_b \oplus x_c \in \bar{M}$. Now, choose any row $k$ where $x_{k-1} \oplus x_k = x_{k-p}$ is in $\bar{L} \times \bar{M} \times \bar{R}$. Then:
$$x_k = x_a \oplus x_b \oplus x_c \oplus \Sigma x_i$$
where the set $\{x_i\}$ is an even number of elements from of the remaining members of a complete linearly independent set in $Z_2^n$. This is true because $\bar{M}$ is the complement of a maximal subgroup and thus each number in $\bar{M}$ is the sum of an odd number of these generators. The same holds for $\bar{L}$ and $\bar{R}$. Thus, one can write:
$$w = x_a \oplus x_b = x_k \oplus [x_c \oplus \Sigma x_i] = x_k \oplus x_l$$
where $x_l = x_c \oplus \Sigma x_i \in \bar{M}$. Similarly, $w = x_{a-1} \oplus x_{c-1} = x_{k-1} \oplus [x_{b-1} \oplus \Sigma x_{i-1}]$ $= x_{k-1} \oplus x_{m-1}$. Applying this transformation to row $k$:
$$x_{k-1} \oplus x_k = x_{k-p} \rightarrow x_{m-1} \oplus x_l = x_{k-p}$$
This proves:

PROPOSITION 2: Any mixing transformation which transforms one equation or row in the complement of a maximal subgroup in the array of equations defining an automorphic orthomorphism, transforms all rows in that complement and thus the complement is corruptible set.

This is a sufficient but not necessary condition. Examples can be shown of proper subsets of complements which are corruptible but by applying more than one mixing transformation, *i.e.*, not all can be transformed by the same mixing transformation.

3. MIXING TRANSFORMATIONS

We now want to find all mixing transformations defined by a given $x_{a-p} \in \bar{R}$. First of all, the following sets can be defined:
$$Q = \{x_{k-1} \in \bar{L} \mid x_j \in \bar{M} \text{ and } x_{k-1} \oplus x_j = x_{a-p}\}$$
$$P = \{x_{k-1} \in L \mid x_j \in \bar{M} \text{ and } x_{k-1} \oplus x_j = x_{a-p}\}$$
$$\bar{N} = Q \cup P$$
$|\bar{N}| = |\bar{M}| = 2^{n-1}$ Next, define the mapping $S$: $Sx_j = x_{k-1} = x_j \oplus x_{a-p}$ This is an affine mapping. As shown in prop. 15, ref. 1, if $S$ is an affine mapping on $Z_2^n$, and $M$ is a subgroup, then $SM$ is a subgroup. As a corollary, if $\bar{M}$ is the complement of a maximal subgroup, then $S\bar{M} = \bar{N}$ is also the complement of a maximal subgroup. $Q = \bar{N} \cap \bar{L}$ the intersection of the complements of two maximal subgroups. Thus, $|Q| = 2^{n-2}$. Of these, $x_{a-1} \in Q$ for $x_a \in \bar{M}$.

TELELDYNE PROPRIETAR

The next question is whether or not further mixing transformations can be generated by using a different number $x_{d-p} \varepsilon \bar{R}$. A corresponding mixing transformation is, e.g.:

$$x_{l-1} \oplus x_e = x_{d-p}$$

where $x_{l-1} \varepsilon \bar{L}$ and $x_e \varepsilon \bar{M}$. As in the proof of prop. 2, $$x_{d-p} = x_{a-p} \oplus \Sigma x_{i-p}$$

where $\{x_{i-p}\}$ is an even collection from $\bar{R}$. So the mixing transformation reduces to:

$$(x_{l-1} \oplus \Sigma x_{i-1}) \oplus (x_e \oplus \Sigma x_i) = x_{a-p}$$

where $\{x_{i-1}\}$ and $\{x_i\}$ are even collections from $\bar{L}$ and $\bar{M}$, respectively. Thus, the mixing transformation is equivalent to:

$$x_{h-1} \oplus x_j = x_{a-p}$$

for some $x_{h-1} \varepsilon \bar{L}$ and $x_j \varepsilon \bar{M}$. This must be one of the mixing transformations already defined by $x_{a-p}$. This proves:

PROPOSITION 3: There are a total of $2^{n-2} - 1$ mixing transformations on the complement $\bar{L} \times \bar{M} \times \bar{R}$ of a maximal subgroup in a linear orthomorphic array, all of which can be generated by any number in $\bar{R}$.

4.  ADDITIONAL NONLINEARIZATION

From prop. 3, there are $2^{n-2} - 1$ mixing transformations $w_i \oplus w_i = \Theta$ besides an identity transformation $w_0 = \Theta$, where $\Theta \oplus \Theta = \Theta$ leaves each equation $x_{a-1} \oplus x_a = x_{a-p}$ from the linear orthomorphism unchanged. If we take the vector sum of two mixing transformations, where $x_{h-1} \varepsilon \bar{L}$ and $x_j \varepsilon \bar{M}$:

$$\begin{array}{r} w_1 = x_{a-1} \oplus x_{c-1} = x_a \oplus x_b \\ w_2 = x_{a-1} \oplus x_{h-1} = x_a \oplus x_j \\ \hline w_1 \oplus w_2 = x_{c-1} \oplus x_{h-1} = x_b \oplus x_j \end{array}$$

As in the proof of prop. 3, there exists some $x_{k-1} \varepsilon \bar{L}$ and some $x_l \varepsilon \bar{M}$ such that $x_{c-1} \oplus x_{h-1} = x_{a-1} \oplus x_{k-1}$ and $x_b \oplus x_j = x_a \oplus x_l$. Thus, $w_1 \oplus w_2 = x_{a-1} \oplus x_{k-1} = x_a \oplus x_l$ is another mixing transformation and is from the set of $2^{n-2} - 1$ such transformations generated by $x_{a-p}$. This proves the following:

PROPOSITION 4: For a given complement to a maximal subgroup, the mixing transformations, viewed as vectors, under addition modulo 2, form a group of order $2^{n-2}$. As a result of this, it is necessary only to determine $n-2$ independent mixing transformations to obtain the entire group of them.

After the $2^{n-1}$ equations in $\bar{L} \times \bar{M} \times \bar{R}$ have been mixed or nonlinearized, there still remain the $2^{n-1}$ equations, unmolested in $L \times M \times R$. A subgroup of order $2^{n-2}$ can be chosen in $L \times M \times R$, and the same method applied to nonlinearize the $2^{n-2}$ equations in its complement with a choice of $2^{n-3} - 1$ mixing transformations. This process can continue until just four equations, including $\Theta \oplus \Theta = \Theta$, remain which cannot be nonlinearized. The number of ways that various sized subgroups can be selected for this process from one linear orthomorphism is:

$$SG(n) = \prod_{k=3}^{n} (2^k - 1)$$

and the number of mixing transformations possible for all subgroups is:

$$MX(n) = \prod_{k=2}^{n-1} (2^k - 1)$$

The number of nonlinear orthomorphisms derivable this way is the product. Of course, many of these will have various sized partial mappings in common. However, this is by no means the totality of nonlinear orthomorphisms derivable from one linear version. Subsets of complements can be nonlinearized and a mix of mixing transformations can be used.

5. MIXING THE MIXERS

The mixing transformation of any equation can be represented by the indices or row numbers. For example:

$$x_{a-1} \oplus x_a = x_{a-p} = x_{c-1} \oplus x_b$$

can be represented as $a \to c, b$. More generally, all possible transformations of the $2^{n-1}$ equations in a given maximal subgroup complement can be represented in a $2^{n-1} \times 2^{n-2}$ table. For simplicity of notation, the indices of rows of equations in the complementary set will be relabeled from 1 to $2^{n-1}$. In the following table, the mixing transformations, $T_j$, are shown as columns, and $j \in \{0, 1, 2, \cdots, 2^{n-2} - 1\}$. $T_0$ is the identity mixing transformation which leaves an equation unchanged. $T_j$ consists of a column of ordered pairs of integers $l_{ij}, m_{ij}$ where $l_{ij}$ is an integer which replaces the $i$ in $x_{i-1}$ and $m_{ij}$ is an integer which replaces the $i$ in $x_i$ from the original equation: $x_{i-1} \oplus x_i = x_{i-p}$.

TELELDYNE PROPRIETARY

Mixing Transformations

|  |  | $T_0$ | $T_1$ | ........ | $T_j$ | ........ |
|---|---|---|---|---|---|---|
| Row | 1 | 1,1 | $l_{11}, m_{11}$ | ........ | $l_{ij}, m_{ij}$ | ........ |
| Indices | 2 | 2,2 | $l_{21}, m_{21}$ | ........ | $l_{2j}, m_{2j}$ | ........ |
|  | 3 | 3,3 | $l_{31}, m_{31}$ | ........ | $l_{3j}, m_{3j}$ | ........ |
|  | ⋮ | ⋮ | ⋮ |  | ⋮ |  |
|  | $i$ | $i,i$ | $l_{i1}, m_{i1}$ | ........ | $l_{ij}, m_{ij}$ | ........ |
|  | ⋮ | ⋮ | ⋮ |  | ⋮ |  |

Table 1.

Considering each subcolumn separately, i.e., $l_{ij}$ and $m_{ij}$, this table is a $2^{n-1} \times 2^{n-1}$ table of integers. There are several properties of the table which are clear:

1. Each subcolumn is a permutation of the integers $\{1, 2, \cdots, 2^{n-1}\}$.
2. Except for $j = 0$, $i \neq l_{ij} \neq m_{ij}$.
3. For $j \neq 0$ and for any $i$, there exists a $k$ such that $l_{ij} = m_{kj}$ and $l_{kj} = m_{ij}$, which means that in each column, every ordered pair reappears in inverse order.
4. Each row is a permutation of the integers $\{1, \cdots, 2^{n-1}\}$.
5. No pair, ordered or unordered, will appear in more than one column.

Disregarding order, of the $2^{n-1}$ indices, the number of distinct pairs appearing in columns 1 thru $2^{n-2} - 1$ will be $2^{n-2}(2^{n-2} - 1)$. However, the total possible numbers of such pairs is:

$$\binom{2^{n-1}}{2} = \frac{2^{n-1}(2^{n-1}-1)}{2} = 2^{n-2}(2^{n-1}-1)$$

Thus, the number of missing pairs is:

$$2^{n-2}(2^{n-1} - 1) - 2^{n-2}(2^{n-2} - 1) = (2^{n-2})^2 = 2^{2n-4}$$

So, for large $n$, approximately one half of the possible pairs occur in the table.

To use the table, one must find a path that passes through each row exactly once, i.e., connecting $2^{n-1}$ $(l_{ij}, m_{ij})$ pairs in such a way that $l_{ij}$ and $m_{ij}$ each take on all values, but $j$ need not. The simplest solution is to fix $j$, i.e., run down one column. While other solutions have been found by trial and error, no general method has been found.

APPENDIX V

**CONSTRUCTIVE CORRUPTION II:
MORE GENERAL METHODS FOR GENERATING NONLINEAR
DYNAMIC SUBSTITUTIONS**

PREPARED BY:

BLAKELY, SOKOLOFF, TAYLOR & ZAFMAN
12400 Wilshire Boulevard
Seventh Floor
Los Angeles, California 90025
(213) 207-3800

*I hereby certify that this correspondence is being
deposited with the United States Postal Service as
Express Mail (Label No. RB984587912US) in an envelope
addressed to: Commissioner of Patents and Trademarks,
Washington, D.C. 20231 on: May 31 1994*

Krystle P. DiPaolo     May 31, 1994
                                Date

CONSTRUCTIVE CORRUPTION II:
More General Methods for Generating Nonlinear Dynamic Substitutions

1. INTRODUCTION

The dynamic substitution device or DSD, a term coined at Teledyne Electronics, uses orthomorphic mappings as a mechanism for block substitutions or so-called pseudorandom permutations of $n$-bit binary numbers.

DEFINITION: Let $Z_2^n$ be the group of $n$-bit binary numbers under bitwise addition modulo 2. An orthomorphism is a 1-to-1 mapping $T: Z_2^n \to Z_2^n$ such that $$\{x \oplus T(x) \mid x \in Z_2^n\} = Z_2^n.$$

Orthomorphisms have been used in the construction of Latin squares in experimental design, and they have been examined in a limited way in mathematical literature. Up to now, the use of orthomorphisms for cryptographic purposes apparently has been limited to Teledyne Electronics. As in other mappings, the orthomorphisms may be linear (automorphisms), affine, or nonlinear. The linear and affine forms have been examined in some detail in ref. 1. Nonlinear orthomorphisms were investigated at Teledyne Electronics in ref. 2. Attempts to construct nonlinear orthomorphisms directly have not been very rewarding. Such constructions are difficult to do randomly except for very small block size, and even then they have been rather disappointing in the sense of being piece-wise linear. However, since orthomorphisms have a number of desirable properties for use in cryptography, such as, great flexibility, ease of implementation, and some measures of cryptographic strength which are independent of key variables, work has continued. The approach in ref. 2 was to convert linear orthomorphisms to nonlinear. Two methods were found to nonlinearize small sets of equations representing the linear orthomorphism and then to combine them without overlapping. However, this was a cut and try process without any real understanding of the underlying mechanism. The present report is intended to remedy this and to generalize the construction of nonlinear orthomorphisms and DSD's.

TELELDYNE PROPRIETARY

Any orthomorphism, viewed as a block substitution or a permutation, can be expressed as a set of equations in which the $n$-bit numbers, $x_i$, are written in the left and middle columns in the same order as the defining permutation:

$$\begin{array}{ccccc}
\Theta & \oplus & \Theta & = & \Theta \\
x_m & \oplus & x_1 & = & z_1 \\
x_1 & \oplus & x_2 & = & z_2 \\
\cdot & & \cdot & & \cdot \\
\cdot & & \cdot & & \cdot \\
\cdot & & \cdot & & \cdot \\
x_{m-1} & \oplus & x_m & = & z_m
\end{array}$$

Figure 1.

where $m = 2^n - 1$, $n$ is the block size, and $\Theta = (0,0,\cdots,0)$, the additive identity. In the linear orthomorphism, the right column of numbers also has the same order as the other two:

$$\begin{array}{ccccc}
\Theta & \oplus & \Theta & = & \Theta \\
x_m & \oplus & x_1 & = & x_{1-p} \\
x_1 & \oplus & x_2 & = & x_{2-p} \\
\cdot & & \cdot & & \cdot \\
\cdot & & \cdot & & \cdot \\
\cdot & & \cdot & & \cdot \\
x_{m-1} & \oplus & x_m & = & x_{m-p}
\end{array}$$

Figure 2.

The conversion of the set of equations representing the linear orthomorphism into a nonlinear version consists of altering the equations by rearranging the order of the numbers in columns 1 (left) and 2 (middle) among themselves. The new set of equations, like the original set, must have each $n$-bit number occurring exactly once in each column. For convenience, and without loss of generality, we can leave column 3 (right) unaltered and seek to rearrange columns 1 and 2 with the essential condition that the triples of numbers in each row be a valid equation. If rows (equations) of index or position $a, b, c$ in the set of equations representing the linear orthomorphism are used, this nonlinearization process takes the form:

$$\underline{\text{Linear Set}} \qquad\qquad \underline{\text{Nonlinear Set}}$$
$$x_{a-1} \oplus x_a \;=\; x_{a-p} \;=\; x_{c-1} \oplus x_b \qquad (1)$$

i.e., an equation, $x_{a-1} \oplus x_a = x_{a-p}$, in the set of equations representing the linear orthomorphism, is replaced by $x_{c-1} \oplus x_b = x_{a-p}$ in the new set of equations which will

TELEDYNE PROPRIETARY represent the nonlinear orthomorphism. There are two problems to be solved in doing this, however.

Consider that there are $2^n - 1 = m$ equations, other than the identity $\Theta \oplus \Theta = \Theta$, representing the orthomorphism, whether linear or nonlinear:

Index
1     $x_m \oplus x_1 = x_{1-p}$ $\quad\quad\quad \vdots$ $j \quad\quad x_{j-1} \oplus x_j = x_{j-p}$ $\quad\quad\quad \vdots$ $m \quad x_{m-1} \oplus x_m = x_{m-p}$

Figure 3.

The above represents a linear orthomorphism. The first problem, then, is to find some subset $\{a, b, c, \cdots\}$ of the complete set of indices $\{1, 2, \cdots m\}$ such that the numbers in columns 1 and 2 can be rearranged, respectively, among themselves in such a way that new valid equations are created. So, we cannot have:

$$x_{c-1} \oplus x_b \neq x_{a-p}$$

Now, having determined the set $\{a, b, c, \cdots\}$, the second problem is to find a rearrangement which will work. This is not possible for all subsets $\{a, b, c, \cdots\}$, but when a valid one is found, there may be more than one rearrangement capable of producing a nonlinear set.

Equation (1) above represents the transformation from the linear set to nonlinear set. That is:

$$x_{a-1} \oplus x_a = x_{a-p} \rightarrow x_{c-1} \oplus x_b = x_{a-p}$$

From this, $x_{a-1} \oplus x_{c-1} = x_a \oplus x_b \equiv w$. Once again, considering these equations vectors, the equation from the linear orthomorphism can be transformed into the nonlinear version by adding to it, vectorially, $w \oplus w = \Theta$, i.e.:

$$\begin{array}{ccc} x_{a-1} & \oplus \quad x_a & = x_{a-p} \\ (x_{a-1} \oplus x_{c-1}) & \oplus \quad (x_a \oplus x_b) & = \Theta \\ \hline x_{c-1} & \oplus \quad x_b & = x_{a-p} \end{array}$$

So, the second problem reduces to finding a proper transformation equation to add vectorially to each equation in the set $\{a, b, c, \cdots\}$ selected from the linear orthomorphism.

TELEDYNE PROPRIETARY

To avoid confusion, the following definitions are made:

a. DEFINITION 1: The process of converting a linear orthomorphism to a nonlinear version by rearranging the orders of the left (1) and middle (2) columns, while preserving equality in each row, is termed *constructive corruption*.

b. DEFINITION 2: A subset of equations in the linear orthomorphism which can be nonlinearized by constructive corruption is called a *corruptible set*.

c. DEFINITION 3: A transformation which modifies an equation in the linear orthomorphism into a corresponding equation in the nonlinear orthomorphism is a *mixing transformation*.

2. FINDING A CORRUPTIBLE SET

If equation $a$ in the array of equations defining the linear orthomorphism is to be transformed:
$$x_{a-1} \oplus x_a = x_{a-p} \rightarrow x_{c-1} \oplus x_b = x_{a-p}$$
Then the mixing transformation is:
$$w \oplus w = \Theta \quad \text{where } w = x_{a-1} \oplus x_{c-1} = x_a \oplus x_b$$
Clearly, equations with indices $b$ and $c$ must also be transformed to avoid duplication of entries in column 1 (left) and column 2 (middle). Let $x_d = x_a \oplus x_b \oplus x_c$, defining a fourth equation with index $d$. Applying the mixing transformation to each of the four equations by component-wise addition, modulo 2:

$$\begin{array}{ccccc} x_{i-1} & \oplus & x_i & = & x_{i-p} \\ w & \oplus & w & = & \Theta \\ \hline x_{j-1} & \oplus & x_k & = & x_{i-p} \end{array}$$

where $i, j$, and $k$ take on all values in $\{a, b, c, d\}$. The result is:

$$\begin{array}{ccccc} x_{c-1} & \oplus & x_b & = & x_{a-p} \\ x_{d-1} & \oplus & x_a & = & x_{b-p} \\ x_{a-1} & \oplus & x_d & = & x_{c-p} \\ x_{b-1} & \oplus & x_c & = & x_{d-p} \end{array}$$

TELEDYNE PROPRIETARY

In a simple way, rows $a$, $b$, and $c$ generated this set of four equations in the linear array by taking all odd sums of the first three including singleton set $s$. Taking the even sums as well, plus the identity equation, specifies four more equations in the linear array:

$$\begin{aligned} \Theta \oplus \Theta &= \Theta \\ x_{e-1} \oplus x_e &= x_{e-p} \\ x_{f-1} \oplus x_f &= x_{f-p} \\ x_{g-1} \oplus x_g &= x_{g-p} \end{aligned}$$

where $$\begin{aligned} x_e &= x_a \oplus x_b \\ x_f &= x_a \oplus x_c \\ x_g &= x_b \oplus x_c \end{aligned}$$

This last set of four equations or four numbers, $\{\Theta, x_e, x_f, x_g\}$, constitutes a group of order 4, which is a subgroup of the group of all eight equations, or the eight numbers $\{\Theta, x_a, x_b, x_c, x_d, x_e, x_f, x_g\}$. Thus, the set of four linear equations with indices $a, b, c, d$ is the relative component of the subgroup of order 4 in the group of order 8.

This procedure can be generalized to taking relative complements of any subgroup. In the limit, one can take $n$ linearly independent rows, viewed as vectors, in the array of equations defining an automorphic (linear) orthomorphism on $Z_2^n$, the group of $n$-bit numbers.

$$\begin{aligned} x_{k_1-1} \oplus x_{k_1} &= x_{k_1-p} \\ &\vdots \\ x_{k_n-1} \oplus x_{k_n} &= x_{k_n-p} \end{aligned}$$

As usual, these equations, viewed as vectors, can be added modulo 2 to obtain any other equation in the array of $2^n$ equations which define the linear orthomorphism.

These $n$ rows are constructed from three complete sets of linearly independent $n$-bit numbers, $\{x_{k_1-1}, \cdots, x_{k_n-1}\}$, $\{x_{k_1}, \cdots, x_{k_n}\}$, and $\{x_{k_1-p}, \cdots, x_{k_n-p}\}$. A generating function can be applied recursively to these sets to generate the entire array, or all possible sums of these $n$ base equations will generate the entire array which is a group isomorphic to $Z_2^n$. In the same way, taking all even sums of the base equations will generate a maximal subgroup of the array consisting of $2^{n-1}$ equations, including $\Theta \oplus \Theta = \Theta$. Taking all odd sums will generate a different set of $2^{n-1}$ equations comprising the complement of the maximal subgroup.

TELELDYNE PROPRIETARY

The linear array can thus be broken into two chunks of $2^{n-1}$ equations, each $$
\begin{array}{cccc}
L & M & & R \\
\ominus & \oplus \quad \ominus & = & \ominus \\
x_{i_1-p} & \oplus \quad x_{i_1} & = & x_{i_1-p} \\
\vdots & \vdots & & \vdots \\
x_{i_s-1} & \oplus \quad x_{i_s} & = & x_{i_s-p}
\end{array}
\qquad \text{maximal subgroup } L \times M \times R
$$

$$
\begin{array}{cccc}
\overline{L} & \overline{M} & & \overline{R} \\
x_{j_1-1} & \oplus \quad x_{j_1} & = & x_{j_1-p} \\
\vdots & \vdots & & \vdots \\
x_{j_t-1} & \oplus \quad x_{j_t} & = & x_{j_t-p}
\end{array}
\qquad \text{complement } \overline{L} \times \overline{M} \times \overline{R}
$$

where $s = 2^{n-1} - 1$ and $t = 2^{n-1}$, $s + t = 2^n - 1 = m$. The index $i$ runs over $s$ values in the set $\{1, 2, 3, \cdots, m\}$ and the index $j$ runs over the remaining $t$ values. The sets $L$, $M$, and $R$ are, respectively, the sets of $n$-bit numbers in column 1 (left), column 2 (middle), and column 3 (right) of the maximal subgroup array. $\overline{L}$, $\overline{M}$, and $\overline{R}$ are the corresponding sets of $n$-bit numbers in the complement. $L$, $M$, and $R$ are clearly maximal subgroups of $Z_2^n$, the group of $n$-bit numbers. $L \cup \overline{L} = M \cup \overline{M} = R \cup \overline{R} = Z_2^n$.

Because of these relationships there is an even easier way to break the linear array into a maximal subgroup and its complement. For $R$, select any maximal subgroup of $Z_2^n$. There are $m$ such subgroups, mostly complex to define, but $n$ of them are characterized by having all zeros in a given bit position. Without loss of generality, let $R$ be the even numbers so that $\overline{R}$ is the set of odd numbers. From the linear array, one can read off the set of rows or their indices $\{i_1, i_2, \cdots, i_s\}$ in the maximal subgroup $L \times M \times R$.

In the linear array, if one row or equation is written as the sum of two others:
$$x_c = x_a \oplus x_b$$
then it is also true that $x_{c+d} = x_{a+d} \oplus x_{b+d}$ for any integer $d$. This is because the array of equations can be generated recursively by the generating function. Now we can modify the maximal subgroup array as follows:

$$
\begin{array}{ccccc}
L' & & M' & & R' \\
\Theta & \oplus & \Theta & = & \Theta \\
x_{i_1+d-1} & \oplus & x_{i_1+d} & = & x_{i_1+d-p} \\
\cdot & & \cdot & & \cdot \\
\cdot & & \cdot & & \cdot \\
\cdot & & \cdot & & \cdot \\
x_{i_s+d-1} & \oplus & x_{i_s+d} & = & x_{i_s+d-p}
\end{array}
$$

The algebraic structure of the maximal subgroup is preserved so that the new set of rows can again be generated by taking even sums of a complete linearly independent set. Thus, a new maximal subgroup $L' \times M' \times R'$ is formed. Clearly, $d$ can take on $2^n - 1$ values. Since there are exactly $2^n - 1$ maximal subgroups (ref. 1, prop. 17), this process gets them all, which proves:

PROPOSITION 1. All maximal subgroups and their complements in a linear (automorphic) orthomorphic array of equations can be obtained from any one such pair by shifting the indices or row numbers by an arbitrary integer $d$ mod $m$.

As shown above, transforming any equation in a linear orthomorphism by altering the numbers in the left and middle columns while maintaining equality with the original number in the right column is equivalent to defining a mixing transformation. Clearly, the entire linear orthomorphism trivially is a corrupting set since any mixing transformation, $w \oplus w = \Theta$, applied to all $2^n$ equations, transforms the set from a linear to an affine mapping. To be useful, we need a more complex transformation.

PROPOSITION 2. Any complement of a maximal subgroup in a linear orthomorphism is corruptible and the corresponding set of mixing transformations, $W = L \cap M$, is a group of order $2^{n-2}$.

PROOF: Consider any equation in the complement,
$$x_{k-1} \oplus x_k = x_{k-p} \text{ in } \overline{L} \times \overline{M} \times \overline{R}.$$

$x_{k-1} \oplus w \in \overline{L}$ and $x_k \oplus w \in \overline{M}$ if, and only if, $w \in L \cap M$ since $x_{k-1} \in \overline{L}$ and $x_k \in \overline{M}$. Since $L \cap M$ is the intersection of two maximal subgroups of $Z_2^n$, $W = L \cap M$ is a group of order $2^{n-2}$. This group of mixing transformations, of course, includes the identity,

- 7 -

TELELDYNE PROPRIETARY $\Theta \oplus \Theta = \Theta$. As $x_{k-1}$ and $x_k$ range over the $2^{n-1}$ numbers in $\overline{L}$ and $\overline{M}$, each sum $x_{k-1} \oplus w$ and $x_k \oplus w$ is distinct and, thus, $\overline{L}$ and $\overline{M}$ are regenerated in permuted form. The numbers in the right column, $\overline{R}$, are unchanged. None of the equations in $L \times M \times R$ have been altered. Thus, in the overall modified orthomorphism, the left and middle columns no longer have the same order as the right column. By prop. 4, ref. 1, the orthomorphism cannot be linear. □

If the mapping $T: Z_2^n \to Z_2^n$ is defined from the left to the right columns, i.e., $T: (L \cup \overline{L}) \to R \cup \overline{R}$, then the restriction $T|L \to R$ is still linear. The same mixing transformation $w \in L \cap M$ could be applied to $L$ and $M$, but this would reduce to a trivial nonlinearization. The maximal subgroup will be treated separately. Also, more than one mixing transformation can be applied to different subsets of $\overline{L} \times \overline{M} \times \overline{R}$. As was shown earlier, some small sets of rows or equations can be corrupted so that being the complement of a maximal subgroup is a sufficient but not necessary condition for nonlinearization. The task of finding mixing transformations is simplified by the fact that it is only necessary to $n - 2$ linearly independent values of $w$.

3. ADDITIONAL NONLINEARIZATION

So far, a method has been outlined for transforming one half of the equations in a linear orthomorphism. Remaining unmodified is a maximal subgroup $L \times M \times R$. This being isomorphic to $Z_2^{n-1}$, it is tempting to extend the same procedure to the relative complement of a subgroup of order $2^{n-2}$. However, one must be careful. The complete linear orthomorphism is an array of numbers over $Z_2^n \times Z_2^n \times Z_2^n$ or a mapping $Z_2^n \to Z_2^n$. Looking only at the maximal subgroup, it is an array over $L \times M \times R$ or a mapping $L \to R$ where $L \neq R$ although $L \equiv R$.

PROPOSITION 3: Any maximal subgroup of a linear orthomorphic array will have a set of $n - 1$ consecutive rows but no set of $n$ consecutive rows. Any complement of such a subgroup will have $n$ consecutive rows from the original array.

PROOF: From prop. 7, ref. 1, any $k \leq n$ consecutive rows in a linear orthomorphic array are linearly independent. Since a maximal subgroup (MSG) is a group of order $2^{n-1}$, isomorphic to $Z_2^{n-1}$, it cannot have more than $n-1$ linearly independent elements. Any $n-1$ consecutive rows are linearly independent and will generate a group of order $2^{n-1}$, i.e., an MSG. There are $2^n - 1$ ways in which $n-1$ consecutive rows can be chosen. By prop. 17, ref. 1, there are $2^n - 1$ MSG's. So there must be a one-to-one correspondence. Similarly, taking all odd combinations of $n$ linearly independent rows will generate the complement of an MSG. This can be done $2^n - 1$ ways taking $n$ consecutive rows. this generates $2^n - 1$ complements and, thus, all that exist. □

The maximal subgroup can be split into a subgroup and relative complement. This will take the form:

$$
\begin{array}{cccccc}
L_1 & & M_1 & & R_1 & \\
\Theta & \oplus & \Theta & = & \Theta & \text{subgroup} \\
& & \cdot & & & \\
& & \cdot & & & \\
& & \cdot & & & \\
x_{i-1} & \oplus & x_i & = & x_{i-p} & \\
& & \cdot & & & \\
& & \cdot & & & \\
\overline{L}_1 & & \overline{M}_1 & & \overline{R}_1 & \\
& & \cdot & & & \text{relative complement} \\
x_{j-1} & \oplus & x_j & = & x_{j-p} & \\
& & \cdot & & & \\
\end{array}
$$

$L_1 \cup \overline{L}_1 = L$, $M_1 \cup \overline{M}_1 = M$, and $R_1 \cup \overline{R}_1 = R$.

The indices $i$ and $j$ will take on $2^{n-2} - 1$ and $2^{n-2}$ values which are subsets of those taken on in the maximal subgroup $L \times M \times R$. Once again, the set of mixing transformations is $W_1 = \{w\} = (L_1 \cap M_1) \subset (L \cap M)$. However, since $L \neq M$, $1 \leq |L_1 \cap M_1| \leq 2^{n-2}$. Thus, it is necessary to choose $L_1 \times M_1 \times R_1$ in such a way as to avoid $L_1 \cap M_1 = \{\Theta\}$ where no non-trivial mixing transformation is possible.

As shown in prop. 3, $L \times M \times R$ has a set of $n-1$ consecutive rows from the array of equations representing the complete linear orthomorphism. These $n-1$ rows can be used to generate $L_1 \times M_1 \times R_1$ and $\overline{L}_1 \times \overline{M}_1 \times \overline{R}_1$ by taking all even sums and odd sums, respectively. As shown in the proof of prop. 1, ref. 1, this will generate $2^{n-2}$ rows in each. Further, the $n-2$ sums of successive pairs of the $n-1$ consecutive rows in $L \times M \times R$ will yield $n-2$ rows in $L_1 \times M_1 \times R_1$ which are consecutive in the complete linear orthomorphisms. Each pair of consecutive rows:

$$x_{i-1} \oplus x_i = x_{i-p}$$
$$x_i \oplus x_{i+1} = x_{i+1-p}$$

yields one mixing transformation, $x_i = w \; \varepsilon \; L_1 \cap M_1$. As shown in prop. 2, these generate a group $W_1$ of $2^{n-3}$ mixing transformations.

$$W_1 = L_1 \cap M_1 \subset L \cap M = (L \cap M \cap R) \cup (L \cap M \cap \overline{R}).$$
$$|L \cap M \cap R| = |L_1 \cap M_1| = 2^{n-3}$$

and since $L_1 \cap M_1$ is a group, $L_1 \cap M_1 = L \cap M \cap R$. This proves the following:

PROPOSITION 4: If $L \times M \times R$ is a maximal subgroup of a linear orthomorphic array of equations with $W$ the group of associated mixing transformations, and if $L_1 \times M_1 \times R_1$ is the subgroup in $L \times M \times R$ of order $2^{n-2}$ which is generated from all even sums of the $n-1$ consecutive rows in $L \times M \times R$, then the associated group of mixing transformations $W_1 = L \cap M \cap R$ and $W = W_1 \cup \overline{W}_1$, where $\overline{W}_1 = (L \cap M \cap \overline{R})$.

The applications of this are twofold. As will be shown later, if using multiple mixing transformations on $\overline{L} \times \overline{M} \times \overline{R}$, it is simpler if they come from either $W_1$ of $\overline{W}_1$ rather than a combination. More importantly, if mixing transformations from $\overline{W}_1$ are used on $\overline{L} \times \overline{M} \times \overline{R}$ there is no possibility of using the same ones a second time on $\overline{L}_1 \times \overline{M}_1 \times \overline{R}_1$.

This process can be applied successively. There will be $n-1-i$ rows in $L_i \times M_i \times R_i$ which are consecutive in the complete linear orthomorphic array. This will establish a group $W_i$ of mixing transformations of order $2^{n-2-i}$ with the property that $W_{i-1} = W_i \cup \overline{W}_i$ where $W_i = L_{i-1} \times M_{i-1} \times R_{i-1} = L_i \cap M_i$. Finally, when $n-1-i = 2$, $L_{n-3} \times M_{n-3} \times R_{n-3}$ consists of four equations of the form:

$$\Theta \oplus \Theta = \Theta$$
$$x_{a-1} \oplus x_a = x_{a-p}$$
$$x_a \oplus x_{a+1} = x_{a+1-p}$$
$$x_{c-1} \oplus x_c = x_{c-p}$$

For some index $a$, and where $x_c = x_a \oplus x_{a+1}$. $W_{n-3} = \{\Theta, x_a\}$. If desired, $x_a \oplus x_a = \Theta$ can be applied to transform this group of order 4 into an affine map.

This produces a nested sequence of subgroups:

$$L \supset L_1 \supset L_2 \supset \cdots \supset L_{n-3}, \quad M \supset M_1 \supset \cdots \supset M_{n-3}, \quad R \supset R_1 \supset \cdots \supset R_{n-3}$$

with the property that the maximum number of mixing transformations are available at each level, i.e., $2^{n-2-i}$. However, other sequences of subgroups can be found and used if a maximal group of mixing transformations is not required.

This process can be reversed by starting with any two consecutive equations from the complete linear array, their sum and the identity $$\begin{array}{ccccc}
\Theta & \oplus & \Theta & = & \Theta \\
x_{a-1} & \oplus & x_a & = & x_{a-p} \\
x_a & \oplus & x_{a+1} & = & x_{a+1-p} \\
x_{c-1} & \oplus & x_c & = & x_{c-p}
\end{array}$$

At the next level up, one can find three consecutive equations from the complete array:

$$\begin{array}{ccccc}
x_{b-1} & \oplus & x_b & = & x_{b-p} \\
x_b & \oplus & x_{b+1} & = & x_{b+1-p} \\
x_{b-1} & \oplus & x_{b+2} & = & x_{b+2-p}
\end{array}$$

such that, $x_a = x_b \oplus x_{b+1}$ and $x_{a+1} = x_{b+1} \oplus x_{b+2}$. These three equations can be used to generate a group of order 8, of which the original four comprise a subgroup. The mixing transformations are defined and applied as before. This process can be extended all the way to the complete orthomorphic array of $2^n$ equations. However, in practice, it appears to be more cumbersome than working down from the top.

4. MIXING THE MIXERS

A single mixing transformation can be use to nonlinearize a set of equations by constructive corruption if the set is a group complement, that is, closed under modulo 2 addition of any odd subset. This is simple and unambiguous to apply, but there are some disadvantages. The first is that sets of consecutive equations will not be broken up:

becomes:

$$x_{a-1} \oplus x_a = x_{a-p}$$
$$x_a \oplus x_{a+1} = x_{a+1-p}$$
$$x_{a+1} \oplus x_{a+2} = x_{a+2-p}$$
$$\vdots$$
$$(x_{a-1} \oplus w) \oplus (x_a \oplus w) = x_{a-p}$$
$$(x_a \oplus w) \oplus (x_{a+1} \oplus w) = x_{a+1-p}$$
$$(x_{a+1} \oplus w) \oplus (x_{a+2} \oplus w) = x_{a+2-p}$$
$$\vdots$$

A second disadvantage is that pairs of equations in the resulting nonlinearized orthomorphism will come from a single pair of equations in the original linear orthomorphism. Consider the following:

Choose an arbitrary mixing transformation, $w \; \varepsilon \; L \cap M$, and $w \oplus w = \Theta$.

Let $x_{a-1} \oplus x_a = x_{a-p} \; \varepsilon \; \overline{L} \times \overline{M} \times \overline{R}$, then $x_{a-1} \oplus w = x_{c-1} \; \varepsilon \; \overline{L}$ and $x_a \oplus w = x_d \; \varepsilon \; \overline{M}$ for some indices $c$ and $d$. Using shorthand notation to indicate the change in indices:

$a, a \to c, d$ meaning that $x_{a-1} \oplus x_a = x_{a-p} \Rightarrow x_{c-1} \oplus x_d = x_{a-p}$.

For some $x_e \; \varepsilon \; \overline{M}$, $x_e \oplus w = x_c$ by definition of a mixing transformation.

$$(x_{e-1} \oplus w) \oplus (x_e \oplus w) = x_{e-p}$$

Therefore, $w = x_a \oplus x_d$ and $w = x_c \oplus x_e$ so that $x_a \oplus x_d = x_c \oplus x_e$ or $x_e = x_a \oplus x_c \oplus x_d$. Because of the group structure of the linear array, $x_{e-1} = x_{a-1} \oplus x_{c-1} \oplus x_{d-1}$, but $w = x_{a-1} \oplus x_{c-1}$ so $x_{e-1} \oplus w = x_{d-1}$ and the mapping becomes:

$e, e \to d, c$

Thus, under a single mixing transformation, all mappings of indices occur in symmetrical pairs. These two factors are partial motivations for using multiple mixing transformations on different equations in the complement set. The first step will be to use two mixing transformations alternately. It turns out that on the complement of a maximal subgroup, constructive corruption using two mixing transformations can be achieved in a mindless fashion.

The mixing transformations are defined by $W = L \cap M$ where $|L \cap M| = 2^{n-2}$. Within this is a subgroup $L \cap M \cap R$. We wish to apply two mixing transformations alternately, or in some pattern to the maximal subgroup $\overline{L} \times \overline{M} \times \overline{R}$. There will be a conflict if in either the left or middle column, two numbers in the linear array are transformed to the same number in the nonlinear array.

TELELDYNE PROPRIETARY $$\begin{array}{ccc} \overline{L} & \overline{M} & = & \overline{R} \\ \cdot & \cdot & & \cdot \\ \cdot & \cdot & & \cdot \\ \cdot & \cdot & & \cdot \\ x_{a-1} \oplus & x_a & = & x_{a-p} \\ \cdot & \cdot & & \cdot \\ \cdot & \cdot & & \cdot \\ \cdot & \cdot & & \cdot \\ x_{b-1} \oplus & x_b & = & x_{b-p} \\ \cdot & \cdot & & \cdot \\ \cdot & \cdot & & \cdot \\ \cdot & \cdot & & \cdot \end{array}$$

and $x_{a-1} \oplus w_1 = x_{b-1} \oplus w_2$ or $x_a \oplus w_1 = x_b \oplus w_2$.

$$W = L \cap M = (L \cap M \cap R) \cup (L \cap M \cap \overline{R}).$$

We wish to use $w_1, w_2 \varepsilon L \cap M \cap \overline{R}$ because these cannot be used at the next lower level, that is, for $\overline{L}_1 \times \overline{M}_1 \times \overline{R}_1$ where $L_1 \cup \overline{L}_1 = L, M_1 \cup \overline{M}_1 = M$, and $R_1 \cup \overline{R}_1 = R$. Thus, a conflict will occur if either $x_{a-1} \oplus x_{b-1} \varepsilon L \cap M \cap R$ or $x_a \oplus x_b \varepsilon L \cap M \cap R$. This can never occur if the members of each pair $x_{a-1}, x_{b-1}$ belong to alternate sets $R$ or $\overline{R}$ since $x_{a-1} \oplus x_{b-1}$ and $x_a \oplus x_b \varepsilon \overline{R}$ in that case, while $w_1 \oplus w_2 \varepsilon R$.

Consider the complement of a maximal subgroup of the linear array, $\overline{L} \times \overline{M} \times \overline{R}$. $|\overline{L} \cap \overline{R}| = |\overline{M} \cap \overline{R}| = \frac{1}{2}|\overline{R}| = 2^{n-2}$. So half of the entries in the left and middle columns will be in $R$ and $\overline{R}$, respectively. In each equation either $x_{a-1} \varepsilon R$ and $x_a \varepsilon \overline{R}$ or vice versa.

The array will consist of sets of equations, consecutive in the full orthomorphic array, and individual isolated equations. The consecutive sets are of the form:

$$\begin{array}{ccc} \overline{L} & \overline{M} & & \overline{R} \\ x_{a-1} \oplus & x_a & = & x_{a-p} \\ x_a \oplus & x_{a+1} & = & x_{a+1-p} \\ \cdot & \cdot & & \cdot \\ \cdot & \cdot & & \cdot \\ \cdot & \cdot & & \cdot \\ x_{a+d} \oplus & x_{a+d+1} & = & x_{a+d+1-p} \end{array}$$

If $x_a \varepsilon \overline{R}$, then $x_{a+1} \varepsilon R, x_{a+2} \varepsilon \overline{R}$, etc., alternating through the set of equations. The symmetric situation occurs if $x_a \varepsilon R$.

- 13 -

TELEDYNE PROPRIETARY

TELELDYNE PROPRIETARY

Gaps between rows in the complement $\overline{L} \times \overline{M} \times \overline{R}$, are sets of consecutive equations in $L \times M \times R$. This pattern takes the form:

$$\begin{array}{ll} \underline{x_{a-1} \oplus x_a = x_{a-p}} & \varepsilon \ \overline{L} \times \overline{M} \times \overline{R} \\ x_a \oplus x_{a+1} = x_{a+1-p} & \\ \quad . \quad . \quad . & \left.\vphantom{\begin{array}{c}.\\.\\.\end{array}}\right\} \ \varepsilon \ L \times M \times R \\ \underline{x_{a+d-1} \oplus x_{a+d} = x_{a+d-p}} & \\ x_{a+d} \oplus x_{a+d+1} = x_{a+d+1-p} & \varepsilon \ \overline{L} \times \overline{M} \times \overline{R} \end{array}$$

$x_{a+1-p}, \ldots, x_{a+d-p} \varepsilon R$, thus $x_a, x_{a+1}, \ldots, x_{a+d} \varepsilon R$ or $\overline{R}$.

If the last equation in the first set of equations in $\overline{L} \times \overline{M} \times \overline{R}$ has $x_a \varepsilon R$, then $x_{a+d} \varepsilon R, x_{a+d+1} \varepsilon \overline{R}$ in the first equation of the next set in $\overline{L} \times \overline{M} \times \overline{R}$, and correspondingly for $x_a \varepsilon \overline{R}$. Thus, the alternation is preserved over gaps between consecutive sets of equations in $\overline{L} \times \overline{M} \times \overline{R}$. This proves:

PROPOSITION 5: If $\overline{L} \times \overline{M} \times \overline{R}$ is the complement of a maximal subgroup of a linear orthomorphic array, then any two mixing transformations $w_1, w_2 \varepsilon L \cap M \cap \overline{R}$ or $w_1, w_2 \varepsilon L \cap M \cap R$ can be applied alternately to the rows of $\overline{L} \times \overline{M} \times \overline{R}$ to nonlinearize it (constructive corruption).

The proof of prop. 5 does not hold without modification for the relative complement of a subgroup which is not maximal. As shown in the discussion following prop. 3, we can split the maximal subgroup $L \times M \times R$ to obtain a set of $2^{n-2}$ equations $L_1 \times M_1 \times R_1$ and relative complement $\overline{L}_1 \times \overline{M}_1 \times \overline{R}_1$. Unlike the maximal case $M_1 \cup \overline{M}_1 = M \neq R = R_1 \cup \overline{R}_1$ and similarly for $L_1 \cup \overline{L}_1$. Thus, it is possible for $x_a \varepsilon \overline{M}_1$ but $x_a \varepsilon \overline{R}$, and, thus, is in neither of $R_1$ nor $\overline{R}_1$. However, all is not lost. Each pair of the maximal subgroups $L, M$, and $R$ are isomorphic, as mentioned in the introduction to section 3. $L \equiv M \equiv R \equiv Z_2^{n-1}$. Thus, the maximal subgroup $L \times M \times R$ of an orthomorphism on $Z_2^{n-1}$ is isomorphic to an orthomorphism on $Z_2^{n-1}$. It is merely necessary to rearrange the order of the

- 14 -

TELEDYNE PROPRIETARY equations in $L \times M \times R$ to represent the normal form of the orthomorphic array, i.e., column $L$ the same as column $M$, but displaced downward by one position. Each of the isomorphisms $L \cong Z_2^{n-1}$, etc., will be different since $L \neq M \neq R$, but it is not necessary to find the isomorphisms. If one takes the $n - 1$ consecutive rows of $L \times M \times R$ as specified in prop. 3, and uses these as a complete linearly independent set, one can apply any generating function for maximal length linear orthomorphisms (see ref. 4) on $Z_2^{n-1}$ to these $n - 1$ equations and regenerate $L \times M \times R$ but in a different order. This revised order will be that of an orthomorphism on $Z_2^{n-1}$. Now $L_1 \times M_1 \times R_1$ and its relative complement $\overline{L}_1 \times \overline{M}_1 \times \overline{R}_1$ can be determined as shown in the discussion after prop. 3. If $\overline{L}_1 \times \overline{M}_1 \times \overline{R}_1$ is now arranged in the revised order which it has in the regenerated $L \times M \times R$, then prop. 5 can be applied to $\overline{L}_1 \times \overline{M}_1 \times \overline{R}_1$.

More generally, it is possible to make a table of all possible transformations of equations in the complement of a maximal subgroup in the linear array, making use of the relationship: $x_{a-1} \oplus x_a = x_{a-p} = x_{c-1} \oplus x_b$ for some pair of indices $c, b$. We could then construct a matrix or table of indices:

$$
\begin{array}{c|cccc}
 & \multicolumn{4}{c}{x_j} \\
 & j_1 & j_2 & \cdots & j_t \\
\hline
j_1 & a_{11} & a_{12} & \cdots & a_{1t} \\
j_2 & a_{21} & & & . \\
x_{j-1} \quad . & . & & & . \\
. & . & & & \\
. & . & & & \\
j_t & a_{t1} & & & a_{tt}
\end{array}
$$

where $t = 2^{n-1}$ and the integers $\{j\}$ are a subset of $\{1, 2, 3, \cdots, 2^n - 1\}$ corresponding to the indices of rows which are in the complement. $a_{ik}$ does not exist for all $i, k \in \{1, 2, \cdots, t\}$, but where it does, the symbology means:

$$x_{a_{ik}-1} \oplus x_{a_{ik}} = x_{a_{ik}-p} = x_{j_i-1} \oplus x_{j_k}$$

representing the complement $\overline{L} \times \overline{M} \times \overline{R}$ as on page 6 The table can be broken into blocks of compatible numbers from relations between subsets of n-bit numbers in $\overline{L}$, $\overline{M}$, and $\overline{R}$. For example: $\{\overline{L} \cap M \cap R\} \oplus \{\overline{L} \cap \overline{M} \cap \overline{R}\} = \{L \cap \overline{M} \cap \overline{R}\}$

TELELDYNE PROPRIETARY

|  | $x_j$ | | | |
|---|---|---|---|---|
|  | $\overline{L} \cap \overline{M} \cap \overline{R}$ | $L \cap \overline{M} \cap \overline{R}$ | $\overline{L} \cap \overline{M} \cap R$ | $L \cap \overline{M} \cap R$ |
| $\overline{L} \cap M \cap R$ | $x_{a-p} \varepsilon L \cap \overline{M} \cap \overline{R}$ | $x_{a-p} \varepsilon \overline{L} \cap \overline{M} \cap \overline{R}$ |  |  |
| $\overline{L} \cap \overline{M} \cap R$ | $x_{a-p} \varepsilon L \cap M \cap \overline{R}$ | $x_{a-p} \varepsilon \overline{L} \cap M \cap \overline{R}$ |  |  |
| $x_{j-1}$ $\overline{L} \cap \overline{M} \cap \overline{R}$ |  |  | $x_{a-p} \varepsilon L \cap M \cap \overline{R}$ | $x_{a-p} \varepsilon \overline{L} \cap M \cap \overline{R}$ |
| $\overline{L} \cap M \cap \overline{R}$ |  |  | $x_{a-p} \varepsilon L \cap \overline{M} \cap \overline{R}$ | $x_{a-p} \varepsilon \overline{L} \cap \overline{M} \cap \overline{R}$ |

Figure 4

Regardless of block size there are four pairs of subsets of indices $a_{ij}$ where the respective pairs are disjoint. A typical subset will have $2^{n-3} \times 2^{n-3}$ entries. Each set $|\overline{L} \cap M \cap R| = |\overline{L} \cap M \cap \overline{R}|$, etc., $= 2^{n-3}$ so that each entry in the $2^{n-3} \times 2^{n-3}$ blocks is repeated $2^{n-3}$ times. Also, for example, if a fixed number from $\overline{L} \cap M \cap R$ is selected and added modulo 2 to each number in $\overline{L} \cap \overline{M} \cap \overline{R}$, it will generate all $2^{n-3}$ numbers in $L \cap \overline{M} \cap \overline{R}$. A similar result holds if a number (column) in $\overline{L} \cap \overline{M} \cap \overline{R}$ is fixed and added modulo 2 to all $2^{n-3}$ numbers in $\overline{L} \cap M \cap R$. Thus, each of the eight subsets is a $2^{n-3} \times 2^{n-3}$ Latin square, that is, each row and column is a permutation of the same $2^{n-3}$ numbers.

Consider any entry in one of these $2^{n-3} \times 2^{n-3}$ subsets, for example, $x_{a-p} \varepsilon L \cap \overline{M} \cap \overline{R}$, and $$x_{a-1} \oplus x_a = x_{a-p} = x_{b-1} \oplus x_c$$

where $x_{b-1} \varepsilon \overline{L} \cap M \cap R, x_c \varepsilon \overline{L} \cap \overline{M} \cap \overline{R}$.

If $x_a \varepsilon \overline{R}$, then $x_{a-1} \varepsilon R$ and $w = x_a \oplus x_c \varepsilon R$. As shown in prop. 5, this occurs for half of the numbers in $\overline{R}$. The other half are of the form $x_a \varepsilon R, x_{a-1} \varepsilon \overline{R}$. If only mixing transforms $w \varepsilon L \cap M \cap \overline{R}$ are to be used, then one can further subdivide the subsets.

Let $U = \{x_{a-p} \varepsilon \overline{R} | x_a \varepsilon R\}$ and $V = \{x_{a-p} \varepsilon \overline{R} | x_a \varepsilon \overline{R}\}$. Then $U \cup V = \{x_{a-p} \varepsilon \overline{R}\}$ and $|U| = |V| = 2^{n-2}$. Referring to Fig. 4, the four sets in the upper left, $L \cap M \cap \overline{R}$, etc., will be replaced by $L \cap M \cap \overline{R} \cap U$, etc., and for those in the lower right, $L \cap M \cap \overline{R}$ becomes $L \cap M \cap \overline{R} \cap V$, etc. Each subset in the form of a $2^{n-3} \times 2^{n-3}$ square array of numbers will now have half the entries vacant in each row and column with the elimination of those mixing transformations $w \varepsilon L \cap M \cap R$. Thus, the former pairs of subsets, each with $2^{n-3}$ identical numbers will now become disjoint sets each with $2^{n-4}$ numbers, each appearing $2^{n-3}$ times in

- 16 - its respective square array. The four subsets in the upper left, by suitable rearrangement of the rows and columns, can now be written in two $2^{n-3} \times 2^{n-3}$ blocks and similarly on the lower right. Figure 4 is thus replaced by:

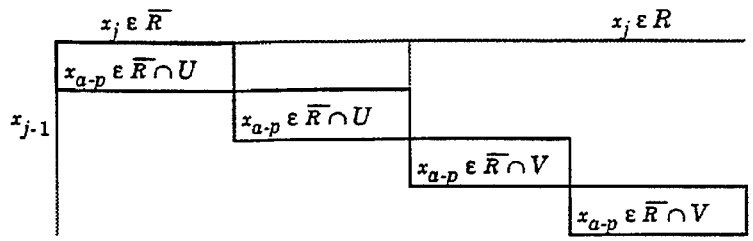

Figure 5.

Thus, the process of selecting a set of compatible mixing transformations can be reduced to considering disjoint subsets of indices of rows.

5. NONLINEARITY

One of the fundamental properties sought in a block substitution is nonlinearity. In ref. 2, section 2, this property is discussed with reference to orthomorphic mappings. If $T$ is the orthomorphism mapping $x$ in the left column to $z$ in the right column, and $T(x_1 \oplus x_2) = T(x_1) \oplus T(x_2) = z_1 \oplus z_2$ then $T$ is linear for at least that subset. Using the method of section 3 for constructive corruption over a nested sequence of subgroups, there are two possibilities for partial linearity to remain. Suppose that $x_i$ and $x_j$ belong to the same complement $\overline{M}_1$, that is, part of the linear array is:

$$\begin{array}{ccc} \overline{L}_1 & \overline{M}_1 & \overline{R}_1 \\ x_{i-1} \oplus & x_i & = x_{i-p} \\ \cdot & \cdot & \cdot \\ \cdot & \cdot & \cdot \\ \cdot & \cdot & \cdot \\ x_{j-1} \oplus & x_j & = x_{j-p} \\ \cdot & \cdot & \cdot \\ \cdot & \cdot & \cdot \\ \cdot & \cdot & \cdot \end{array}$$

The corresponding set of mixing transformations is $W_1 = W_2 \cup \overline{W}_2$ Suppose $x_k = x_i \oplus x_j$, then $x_k \notin \overline{M}_1$ since it is a group complement. Without loss of generality, assume that $x_k \in \overline{M}_2 \subset M_1$. If a single mixing transformation $w \in L_1 \cap M_1 \cap \overline{R}_1 = \overline{W}_2$ is applied to rows $i$ and $j$ then $(x_i \oplus w) \oplus (x_j \oplus w) = x_k$ and similarly for the other two columns. However, if all rows are modified, then $x_{k-1} \oplus x_k = x_{k-p}$ will no longer be a row or equation in the orthomorphism. If two mixing transformations $w_1$ and $w_2 \in W_2$ are used, then $w_1 \oplus w_2 = w_3 \in W_2$. In that case it is important that $w_3$ not be used on $\overline{M}_2$ or subsequent complements. If $x_i$ and $x_j$ belong to complements at different levels, e.g., $x_i \in \overline{M}_1$, and $x_j \in \overline{M}_2 \subset M$, which is equivalent to saying that rows $i$ and $j$ are modified at different levels in the ascending or descending sequence of subgroups and complements, then by our convention, the corresponding mixing transformations $w_1 \in \overline{W}_2$ is applied to $x_i$ and $w_2 \in W_2$ is applied to $x_j$. Once again the hazard of a linear triplet occurs if $x_k = x_i \oplus x_j$ and $x_k$ is transformed by $w_3 = w_1 \oplus w_2$ where $w_3 \in \overline{W}_2$. As a rule of thumb, all traces of linearity can be avoided by using two mixing transformations on the larger group complements and just one on the smaller group complements, chosen so as not to be the sum of previous mixing transforms.

6. COSET DECOMPOSITION

A slightly different but equivalent approach is to decompose the group of equations representing the linear oprthomorphism into cosets. The set of four equations in $L_{n-3} \times M_{n-3} \times R_{n-3}$ referred to on page 10 just after prop. 4, constitute a subgroup of order 4 in the product geoup $Z_2^n \times Z_2^n \times Z_2^n$ which is the linear orthomorphic array, that is:

$$\begin{array}{ccccc} \Theta & \oplus & \Theta & = & \Theta \\ x_{a-1} & \oplus & x_a & = & x_{a-p} \\ x_a & \oplus & x_{a+1} & = & x_{a+1-p} \\ x_{c-1} & \oplus & x_c & = & x_{c-p} \end{array}$$

The set of numbers in the right column, $G = \{\Theta, x_{a-p}, x_{a+1-p}, x_{c-p}\}$ is a subgroup of order 4 in $Z_2^n$. The group of mixing transformations, referred to after prop. 1, $W = L \cap M$ is a subgroup of $Z_2^n$ of order $2^{n-2} = g$. By LaGrange's theorem, $Z_2^n$ can be decomposed into cosets:

$$Z_2^n = G \cup Gw_1 \cup Gw_2 \cup \cdots \cup Gw_{g-1}$$

TELELDYNE PROPRIETARY where $Gw_i$ is the coset consisting of $\{w_i \oplus x | x \in G\}$. These cosets also define a coset decomposition of $Z_2^n \times Z_2^n \times Z_2^n$ by specifiying a complete equation for each number $w_i \oplus x$ in the right column. The various subgroup complements $\overline{L}_k \times \overline{M}_k \times \overline{R}_k$ can be expressed in terms of these cosets and the mixing transformations can be applied to various collections of cosets.

7. CONCLUSIONS

Using the method outlined above, an arbitrary maximal length linear orthomorphism used as a block substitution, can be converted to a great variety of nonlinear orthomorphisms. Among the variables are the choice of maximal subgroups and the number and selection of mixing transformations at each level. Alternating pairs of mixing transformations on the larger complements breaks up the pattern of consecutive numbers in the left and middle columns. Judicious choice of mixing transformation in the smaller complements avoids residual islands of linearity . Another important feature is that each pattern of nonlinearization is independent of the key variable just as transitivity of the families of linear orthomorphisms and balance of all orthomorphic block substitutions are invariant properties.

$\infty$

8. REFERENCES

1. Teledyne Electronics Report, "Orthomorphic Block Substitutions," June 1991.

2. Teledyne Electronics Report,. "Nonlinear Dynamic Substitution Devices As Mechanisms for Block Substitutions," July 1991, PROPRIETARY.

3. Teledyne Electronics Report, "Constructive Corruption: A Method for Generating Nonlinear Dynamic substitutions," February 1992, PROPRIETARY.

4. L. Mittenthal, "Block Substitutions Using Orthomorphic Mappings," *Advances in Mathematics* (to appear).

APPENDIX VI

THE ALGEBRAIC STRUCTURE OF
NONLINEAR ORTHOMORPHISMS OF
BINARY NUMBERS

PREPARED BY:

BLAKELY, SOKOLOFF, TAYLOR & ZAFMAN
12400 Wilshire Boulevard
Seventh Floor
Los Angeles, California 90025
(213) 207-3800

I hereby certify that this correspondence is being deposited with the United States Postal Service as Express Mail (Label No. HB984587912US) in an envelope addressed to: Commissioner of Patents and Trademarks, Washington, D.C. 20231 on: May 31, 1994

Krystle P. DiPaolo          May 31, 1994
                            Date

TELEDYNE PROPRIETARY

1. INTRODUCTION

By now, the theory of linear (or automorphic) orthomorphisms on blocks of binary numbers is reasonably well developed. Letting $Z_2^n$ be the group of $n$-bit binary numbers under coordinate-wise addition modulo 2, an orthomorphism is a 1-to-1 mapping:

$R: Z_2^n \to Z_2^n$ such that $\{x \oplus R(x) | x \varepsilon Z_2^n\} = Z_2^n$.

Defining $S(x) = (x \oplus Rx)$, then $S(x)$ is a permutation or mapping on $Z_2^n$. It could be linear or nonlinear. Such a permutation will be referred to as orthomorphic and linear or nonlinear, accordingly, as the mapping is. It will have a single fixed point and may have other cycles. We have done some work on possible cycles in a linear orthomorphic permutation, that is, finding allowable partitions of integers of the form $2^n - 1$. However, maximal length linear orthomorphisms are easy to generate and more useful in cryptography than those with cycles. Without loss of generality, and using $\theta$, the additive identity, as the fixed point, any maximal length orthomorphism can be written as a set of equations:

$$\theta \oplus \theta = \theta$$
$$x_m \oplus x_1 = z_1$$
$$x_1 \oplus x_2 = z_2$$
$$\vdots$$
$$x_{k-1} \oplus x_k = z_k$$
$$\vdots$$
$$x_{m-1} \oplus x_m = z_m$$

Figure 1 where $m = 2^n - 1$. $R(x_{k-1}) = x_k$ and $S(x_{k-1}) = z_k$ are two of three possible mappings. By convention, $S(x)$ has been used as our cryptographic mapping or block substitution.

In the case of a linear orthomorphism, $\theta$, must be the fixed point, and if maximal, the representing equations take a very simple form:

$$\theta \oplus \theta = \theta$$
$$x_m \oplus x_1 = x_{1-p}$$
$$x_1 \oplus x_2 = x_{2-p}$$
$$\vdots$$
$$x_{k-1} \oplus x_k = x_{k-p}$$
$$\vdots$$
$$x_{m-1} \oplus x_m = x_{m-p}$$

Figure 2 where $p$ is an integer, $n \le p \le 2^n - n$, and $k - p$ is a positive integer modulo $m$. In the linear case, $R^s(x)$ defined by any power $s$ of the orthomorphic permutation $(\theta)(x_1, x_2, \cdots x_m)$ is another linear orthomorphic permutation, represented by equations of the form:

$$\theta \oplus \theta = \theta$$
$$x_{1-s} \oplus x_1 = x_{1-p_s}$$
$$x_{2-s} \oplus x_k = x_{2-p_s}$$
$$\vdots$$
$$x_{k-s} \oplus x_k = x_{k-p_s}$$
$$\vdots$$
$$x_{m-s} \oplus x_m = x_{m-p_s}$$

Figure 3 where $1 \le p_s \le m - 1$. The integer $p_s$ is a function of $s$, and $k - s$ and $k - p_s$ are positive integers modulo $m$. The family of orthomorphic permutations so defined is a transitive group and the $2^n - 2$ block

1.
TELEDYNE PROPRIETARY substitutions so defined have no common mapping except for the fixed point.

There is a convenient connection between linear orthomorphisms and Linear Feedback Shift Registers (LFSR). Both are generated by irreducible polynominals in $GF(2^n)$, and if the polynomials are primitive, both the orthomorphisms and the shift register sequences are of maximal length. In the shift register, the generating functions act upon a set of $n$ binary numbers. In generating the linear orthomorphism, the generating functions act upon a set of $n$ linearly independent $n$-bit numbers. The columns of $2^n-1$ bits, determined by extracting bits all in the same position from the $2^n-1$ equations in the linear orthomorphism form a LFSR sequence. In fact, the linear orthomorphism has $3n$ such sequences, all the same, but with different initial states. Conversely, an LFSR sequence can be used to construct a linear orthomorphism by taking as the set $\{x_1, x_2, \cdots, x_m\}$ the consecutive $n$-bit blocks in the LFSR sequence obtained by shifting one bit position at a time. These constitute the central column of *Fig. 2*; however, this will be a very special orthomorphism as each of the three columns of $n$-bit numbers will have a characteristic diagonal pattern in the bit positions. Thus, in a sense, a linear orthomorphism is a generalization of a linear feedback shift register sequence.

A linear orthomorphism has another property which is both a convenience and a liability. The orthomorphism, as represented in *Fig. 2*, can be shown to be an additive group in $Z_2^n \times Z_2^n \times Z_2^n$. The individual equations, viewed as 3-dimensional vectors with coefficients in $Z_2^n$, form the elements. The group operation is componentwise addition modulo 2, and $\theta \oplus \theta = \theta$ is the additive identity. It can be shown that any $n$ consecutive rows are linearly independent and that any $n$ rows which are uniformly separated by some spacing $d$ that is not a divisor of $m$, are also linearly independent. Thus, for a single, fixed, linear orthomorphism, a chosen plain text attack using $n$ linearly independent $n$-bit inputs would determine a complete linearly independent set of rows or equations in *Fig. 2* from which the entire linear orthomorphism could be constructed. Thus, a linear orthomorphism would yield to cryptanalysis with properly chosen $n^2$ bits vs. $2n$ bits for an LFSR sequence. For this reason, it is highly desirable to look to nonlinear orthomorphisms as tools for secure block substitutions.

2. COMPARISON OF LINEAR & NONLINEAR ORTHOMORPHISMS

A useful property of the linear orthomorphisms is illustrated in *Fig. 3*. The ability to change block substitutions by taking a power of an orthomorphic permutation has been used practically in the so-called linear-based Dynamic Substitution Device (DSD). In addition to the clear text input to the DSD, another parameter termed the shift, would select the actual table in the DSD by determining the power $s$ of the basic permutation. This was used as an S-box with variable substitution tables. This property does not generally hold for nonlinear orthomorphisms other than affine ones. Typically, a power of the nonlinear orthomorphic permutation produces a many-1 mapping. A few isolated exceptions have been found.

Another property of orthomorphisms, used as block substitutions, which is very useful is that of balance. $Z_2^n$ has $m = 2^n - 1$ maximal subgroups. A permutation or block substitution on $Z_2^n$

TELEDYNE PROPRIETARY is said to be balanced if it maps each maximal subgroup half into itself and half into its complement. (This definition of balance is a generalization of that used in describing Boolean functions with an equal number of 0's and 1's.) It has been shown that this property holds if and only if the permutation is an orthomorphism. Unlike the transitive groups, this property holds for nonlinear as well as linear orthomorphisms. This provides some further incentive for looking at nonlinear orthomorphisms (see Ref. 7).

3. GENERATION OF NONLINEAR ORTHOMORPHISMS WITH NLFSR TECHNIQUES

It is tempting to look for a parallel between shift registers and orthomorphisms in the nonlinear case as an extension of the linear case. However, the connection appears to break down. In the theory of Nonlinear Feedback Shift Registers (NLFSR), the primitive polynomials used as generating functions are replaced by nonlinear logic, e.g., Logic II of Ref. 3, pg. 146:

$$a_k = 1 \oplus a_{k-n} \oplus y \oplus z \oplus xy \oplus xz \oplus yz$$

where $a_k$ is the value 0 or 1 in the $k$th bit position in the NLFSR sequence and $x, y,$ and $z$ are the values at other arbitrary bit positions $a_i$ where $k < i < k - n$. To apply these recursive functions to $n$-bit blocks requires a definition of multiplication $xy$ and addition of "1". There are obvious ways to try this but, in general, they do not produce orthomorphisms. In the linear case, the LFSR sequence is an orthomorphism if it is written in the form of successive $n$-bit blocks, i.e., the mapping obtained by adding modulo 2, each block in the sequence to its successor is a 1-to-1 mapping on $Z_2^n$. Of course, as pointed out in Section 2, the resulting orthomorphism has a very restricted form. It is natural to extend this to the nonlinear case. Clearly, any NLFSR sequence generated with a "1⊕..." in the logic cannot be an orthomorphism since no $n$-bit block could have an identical block as its successor, i.e., nothing is mapped on $\theta = 00\cdots0$. While logic of this form is conducive to generating shift register sequences of length $2^n$, it is a guarantee that the sequence will <u>not</u> be an orthomorphism.

The situation is somewhat different for other nonlinear logic, such as Logic I of Ref. 3, pg. 142:

$$a_k = a_{k-n} \oplus y \oplus z \oplus xy \oplus xz \oplus yz$$

where $x, y,$ and $z$ are as before. Some NLFSR sequences of block size 4 or 5, generated with Logic I, have turned out to be orthomorphisms. However, in addition to having the restriction of the characteristic diagonal bit pattern in the a sequence of blocks, the resulting orthomorphism still has linear chunks. The example in *Fig. 4* is a nonlinear orthomorphism of block size 4 generated with Logic I.

```
0000 ⊕ 0000 = 0000
0111 ⊕ 1111 = 1000
1111 ⊕ 1110 = 0001
1110 ⊕ 1101 = 0011
1101 ⊕ 1011 = 0110
1011 ⊕ 0110 = 1101
0110 ⊕ 1100 = 1010
1100 ⊕ 1001 = 0101
1001 ⊕ 0010 = 1011
0010 ⊕ 0101 = 0111
0101 ⊕ 1010 = 1111
1010 ⊕ 0100 = 1110
0100 ⊕ 1000 = 1100
1000 ⊕ 0001 = 1001
0001 ⊕ 0011 = 0010
0011 ⊕ 0111 = 0100
```

Figure 4

TELEDYNE PROPRIETARY

Each of the 12 columns of bits is a deBruijn sequence, i.e., each of the 4-bit numbers occurs exactly once. The eight sequences in the left and middle columns are the same, and the four sequences in the right column are the same. The next example in *Fig.* 5 is also a nonlinear orthomorphism of block size 4, but generated now by modification of a linear orthomorphism as described in Section 5.

```
0000 ⊕ 0000 = 0000
1010 ⊕ 0010 = 1000
0010 ⊕ 0001 = 0011
0001 ⊕ 0111 = 0110
0111 ⊕ 1110 = 1001
1110 ⊕ 1111 = 0001
1111 ⊕ 1101 = 0010
1101 ⊕ 0110 = 1011
0110 ⊕ 0011 = 0101
0011 ⊕ 1001 = 1010
1001 ⊕ 0100 = 1101
0100 ⊕ 1000 = 1100
1000 ⊕ 1100 = 0100
1100 ⊕ 1011 = 0111
1011 ⊕ 0101 = 1110
0101 ⊕ 1010 = 1111
```

Figure 5

*Fig.* 5 represents a nonlinear orthomorphism which no longer has the diagonal pattern in the columns of blocks and which has eight distinct sequences in the 12 columns of bits, none of which is a deBruijn sequence. Thus, the connection between orthomorphisms and feedback shift register sequences has disappeared in the general nonlinear case.

4. DIRECT GENERATION OF ORTHOMORPHISMS

In the linear case, the fact that the individual orthomorphism is an additive group can be used for direct generation (Ref. 4, Prop. 3). The rows in the array can be thought of as three-dimensional vectors with coefficients in $Z_2^n$. The group operation is componentwise addition modulo 2 and $\theta = 00\cdots 0$ is the identity. Choosing any complete linearly independent set $\{x_1, x_2, \cdots, x_n\}$ one can write a portion of the linear orthomorphism in the form of *Fig. 1* without use of a generating function:

$$\theta \oplus \theta = \theta$$
$$- \oplus x_1 = -$$
$$x_1 \oplus x_2 = z_2$$
$$x_2 \oplus x_3 = z_3$$
$$\vdots$$
$$x_{n-1} \oplus x_n = z_n$$
$$x_n \oplus - = -$$

Figure 6

From the group property, one can generate a total of $2^n - 1$ rows from those in *Fig.* 6, i.e., a maximal subgroup of the orthomorphism (Ref. 10, pg. 6). To complete the orthomorphism it is only necessary to choose a single $n$-bit number $x_{n+1}$ which is independent of $\{x_2, x_3, \cdots, x_n\}$ and such that $x_n \oplus x_{n+1} = z_{n+1}$ is independent of $\{z_2, z_3, \cdots, z_n\}$. The resulting equation will permit generation of the remaining $2^{n-1}$ equations of the full orthomorphism. Of course, the resulting orthomorphism may not be maximal. This also shows that two linear orthomorphisms on $Z_2^n$ with different generating functions may share one of their $2^n - 1$ maximal subgroups.

In the nonlinear case, the group structure disappears and so does the requirement for starting with a complete linearly independent set. A straightforward approach, and without loss of generality, is to begin with the identity as fixed point and select an arbitrary first equation and slightly constrained second equation:

$$\theta \oplus \theta = \theta$$
$$x_1 \oplus x_2 = z_2$$
$$x_2 \oplus x_3 = z_3$$

where $x_3 \neq x_1, x_2$ and $x_3 \neq x_1 \oplus x_2$. For the next equation:

$$x_3 \oplus x_4 = z_4$$

where $x_4 \neq x_1, x_2, x_3$ and $x_4 \neq x_1 \oplus x_2 \oplus x_3$.

One can attempt to continue in this fashion, randomly and with constraints, until $x_m$ is selected where $m = 2^n - 1$. However, in most cases an irresolvable conflict occurs before the process is completed. Some help can be given by the balance property (Ref. 9, Section 5), i.e., if $H_i$ is any one of the $2^n - 1$ maximal subgroups of $Z_2^n$, then $|SH_i| = \frac{1}{2}|H_i|$. Thus, e.g., if there has been a run of even numbers $x_{i-1}$ in the left column being mapped on even numbers $z_i$ in the right column, then future pairs $(x_i, z_i)$ with $x_{i-1}$ even and more likely to have $z_i$ odd. Some orthomorphisms of small block size have been constructed this way in computer runs, but aside from the inefficiency, the product was mostly piecewise linear.

5. MODIFICATIONS OF LINEAR ORTHOMORPHISMS

It is tempting to consider the construction of nonlinear orthomorphisms by suitably modifying the linear versions. This is easy to do in a trivial way. Choose any $n$-bit number $w \neq \theta$ and consider the equation $w \oplus w = \theta$ as a vector as in Section 4. This can be added vectorially to each of the equations representing the linear orthomorphism in Fig. 2 to obtain:

$$w \oplus w = \theta$$
$$(x_m \oplus w) \oplus (x_1 \oplus w) = x_{1-p}$$
$$(x_1 \oplus w) \oplus (x_2 \oplus w) = x_{2-p}$$
$$\vdots \qquad \vdots$$
$$(x_{k-1} \oplus w) \oplus (x_k \oplus w) = x_{k-p}$$
$$\vdots \qquad \vdots$$
$$(x_{m-1} \oplus w) \oplus (x_m \oplus w) = x_{m-p}$$

Figure 7

Clearly, each column consists of all possible $n$-bit numbers and the mapping $S(x_{k-1} \oplus w) = x_{k-p}$ is easily seen to be affine. To be more generally nonlinear, the linear array of equations would have to be broken into subsets and modified in different ways. An individual equation from the $a$th row in the linear orthomorphism:

$$x_{a-1} \oplus x_a = x_{a-p}$$

must be modified to become:

$$x_{c-1} \oplus x_b = x_{a-p} \qquad (1)$$

where $x_{c-1}$ occurs in the left column, row $c$, and $x_b$ occurs in the middle column, row $b$ in the original linear orthomorphism. In this case, we can define:

$$w = (x_{a-1} \oplus x_{c-1}) = (x_a \oplus x_b)$$

which can be applied to transform the equation in row $a$ in the same way as those in Fig. 7.

The following definitions were made in Ref. 12:

a. Definition 1: The process of converting a linear orthomorphism to a nonlinear version by rearranging the orders of the left (1) and middle (2) columns, while preserving equality in

TELEDYNE PROPRIETARY each row, is termed *constructive corruption*.

b. Definition 2: A subset of equations in the linear orthomorphism which can be nonlinearized by constructive corruption is called a *corruptible set*.

c. Definition 3: A transformation which modifies an equation in the linear orthomorphism into a corresponding equation in the nonlinear orthomorphism is a *mixing transformation*.

The entire set of $2^n$ equations in the linear orthomorphism is corruptible, and from *Eq. (1)*, the smallest candidate for a corruptible set consists of three rows or equations. However, it turns out that a linear orthomorphism containing a corruptible set of three equations would not be appealing in cryptography because it would not be maximal.

Proposition 1: A linear orthomorphism on $Z_2^n$ which has a corruptible set of three equations has a 3-cycle in the permutation which it represents.

Proof: A corruptible set of three equations in a linear orthomorphism:

$$x_{a-1} \oplus x_a = x_{a-p}$$
$$x_{b-1} \oplus x_b = x_{b-p}$$
$$x_{c-1} \oplus x_c = x_{c-p}$$

can be shown by a matrix of indices:

$$\begin{pmatrix} a & a & a \\ b & b & b \\ c & c & c \end{pmatrix}$$

After nonlinearization (corruption), only two matrices of indices are possible since the order of the rows is immaterial:

$$\begin{pmatrix} c & b & a \\ a & c & b \\ b & a & c \end{pmatrix} \text{ or } \begin{pmatrix} b & c & a \\ c & a & b \\ a & b & c \end{pmatrix}$$

Taking the matrix on the left, the corresponding corrupted equations are:

$$x_{c-1} \oplus x_b = x_{a-p}$$
$$x_{a-1} \oplus x_c = x_{b-p}$$
$$x_{b-1} \oplus x_a = x_{c-p} \qquad (2)$$

Any two equations with indices $a$ and $b$ can be selected but there are three conditions on equation $c$ which may be conflicting. In what follows, we assume that such an equation exists in the linear array. Since the linear array of equations is a group, there exists a fourth equation in the group of index $d$ which is the sum of the original three:

$$x_d = x_a \oplus x_b \oplus x_c$$

and $$x_{d-1} \oplus x_d = x_{d-p}.$$

These four equations in the linear array form a coset derived from a subgroup of order 4 in the linear array. The subgroup can be found by adding one of the four equations in the coset to the other three, e.g., to equation $a$ to obtain:

$$\theta \quad \oplus \quad \theta = \quad \theta$$
$$(x_{a-1} \oplus x_{b-1}) \oplus (x_a \oplus x_b) = (x_{a-p} \oplus x_{b-p})$$
$$(x_{a-1} \oplus x_{c-1}) \oplus (x_a \oplus x_c) = (x_{a-p} \oplus x_{c-p})$$
$$(x_{b-1} \oplus x_{c-1}) \oplus (x_b \oplus x_c) = (x_{b-p} \oplus x_{c-p})$$

Using *Eq. 2*, the subgroup becomes:

$$\theta \quad \oplus \quad \theta = \quad \theta$$
$$(x_{a-1} \oplus x_{b-1}) \oplus (x_a \oplus x_b) = (x_{a-p} \oplus x_{b-p})$$
$$(x_a \oplus x_b) \oplus (x_{a-p} \oplus x_{b-p}) = (x_{a-1} \oplus x_{b-1})$$
$$(x_{a-p} \oplus x_{b-p}) \oplus (x_{a-1} \oplus x_{b-1}) = (x_a \oplus x_b)$$

The last three equations appear consecutively in the normalized form of the linear

TELEDYNE PROPRIETARY array (*Fig. 2*) and form a 3-cycle. If the other matrix of indices is used, the left and middle columns can be interchanged, still maintaining equality and the same result is obtained. □

- This proposition also follows from Ref. 9, Prop. 3 which states that in a maximal linear array of block size $n$, any $n$ consecutive rows are linearly independent. Since a subgroup of order 4 cannot have three linearly independent rows, the array cannot be maximal.

If we consider the coset of four rows $a$, $b$, $c$, and $d$ and modify the first three as above, the net result is:

$$x_{c-1} \oplus x_b = x_{a-p}$$
$$x_{a-1} \oplus x_c = x_{b-p}$$
$$x_{b-1} \oplus x_a = x_{c-p}$$
$$x_{d-1} \oplus x_d = x_{d-p}$$

Figure 8

Comparing these equations with the linear versions, we can write down the mixing transformations:

$$w_a = x_{a-1} \oplus x_{c-1} = x_a \oplus x_b$$
$$w_b = x_{a-1} \oplus x_{b-1} = x_b \oplus x_c$$
$$w_c = x_{b-1} \oplus x_{c-1} = x_a \oplus x_c$$
$$w_d = \Theta$$

Since $w_c = w_a \oplus w_b$, the set of mixing transformations $\{\theta, w_a, w_b, w_c\}$ is a group.

In Ref. 10, Section 3.2, it was shown that any three consecutive rows plus their sum constituted a corruptible set. In Ref. 12, Section 2, this was generalized to taking any two non-zero rows:

$$x_{a-1} \oplus x_a = x_{a-p}$$
$$x_{b-1} \oplus x_b = x_{b-p}$$

Finding the third row $c$, specified by:

$$x_{c-1} \oplus x_{a-p} = x_b$$

and, the fourth row $d$, specified by:

$$x_d = x_a \oplus x_b \oplus x_c$$

Thus, any two arbitrarily selected non-zero rows in the linear orthomorphic array of equations specify two corruptible sets of four equations. The second of these sets is specified by selecting the third row $c$ by:

$$x_{c-1} \oplus x_a = x_{b-p}$$

In either, as shown in Ref. 12, the mixing transformation $w = x_a \oplus x_b$ transforms this set of four equations into a 4-equation segment of a nonlinear orthomorphism. The original four equations are clearly the relative complement of a subgroup of order 4, or equivalently, a coset derived from such a subgroup. As in *Prop. 1*, the subgroup can be derived by adding one of the four equations to each of them, e.g., row $a$:

$$\theta \quad \oplus \quad \theta \quad = \quad \theta$$
$$(x_{a-1} \oplus x_{b-1}) \oplus (x_a \oplus x_b) = x_{a-p} \oplus x_{b-p}$$
$$(x_{a-1} \oplus x_{c-1}) \oplus (x_a \oplus x_c) = x_{a-p} \oplus x_{c-p}$$
$$(x_{a-1} \oplus x_{d-1}) \oplus (x_a \oplus x_d) = x_{a-p} \oplus x_{d-p}$$

Figure 9

In the first case, since $x_{a-1} \oplus x_{c-1} = x_a \oplus x_b$, the second and third equations are consecutive in the linear array. A similar result holds in the second case. Thus, the process of finding four corruptible equations reduces to finding any coset in the coset decomposition of $Z_2^n \times Z_2^n \times Z_2^n$ defined by a subgroup of order 4 with two consecutive rows. More generally, let $G^n = Z_2^n \times Z_2^n \times Z_2^n$ be a maximal linear orthomorphism and let $G_0^k = L_k \times M_k \times R_k$ be a subgroup of order $2^k$. It has the form:

$$\begin{array}{ccc} L_k & M_k & R_k \\ \theta \oplus & \theta & = \theta \\ x_{i_1-1} \oplus & x_{i_1} & = x_{i_1-p} \\ & \vdots & \\ x_{i_t-1} \oplus & x_{i_t} & = x_{i_t-p} \end{array}$$

Figure 10 where $s = 2^k - 1$. A coset can be formed by taking any row in $G^n \setminus G_0^k$, e.g., $x_{s-1} \oplus x_s = x_{s-p}$ and adding it to each row of $G_0^k$ to obtain:

$$G_a^k = (x_{a-1}L_k) \times (x_a M_k) \times (x_{a-p}R_k)$$

where $x_a M_k = \{x_a \oplus x_i | x_i \varepsilon M_k\}$. As shown in Ref. 12, Section 2, if $w$ is a mixing transformation and row $i$ is in $G_a^k$, then:

$$(x_{i-1} \oplus w) \oplus (x_i \oplus w) = x_{i-p}$$

$x_{i-1} \varepsilon x_{a-1} L_k$ and $x_i \varepsilon x_a M_k$. It must also be true that $x_{i-1} \oplus w \varepsilon x_{a-1} L_k$ and $x_i \oplus w \varepsilon x_a M_k$. This occurs if and only if $w \varepsilon L_k \cap M_k$. Similarly, if row $i$ is in $G_0^k$, since in that case $x_{i-1} \varepsilon L_k$ and $x_i \varepsilon M_k$. The group of mixing transformations determined by $G_a^k$ is $W_k = L_k \cap M_k$. In some circumstances $W_k = \{\theta\}$ and no constructive corruption is possible. More will be said about this in the next section.

There are corruptible sets which are not cosets or relative complements of subgroups, e.g., in Ref. 10, Section 3.3, a corruptive set is generated by taking four consecutive equations plus the sum of the first three and last three:

$$x_m \oplus x_1 = x_{1-p}$$
$$x_1 \oplus x_2 = x_{2-p}$$
$$x_2 \oplus x_3 = x_{3-p}$$
$$x_3 \oplus x_4 = x_{4-p}$$
$$x_{q-1} \oplus x_q = x_{q-p}$$
$$x_q \oplus x_{q+1} = x_{q+1-p}$$

where $x_q = x_1 \oplus x_2 \oplus x_3$, etc., and the mixers are $w_1 = x_1 \oplus x_2$, $w_2 = x_1 \oplus x_3$, and $w_3 = w_1 \oplus w_2$. Two more rows can be added using:

$$x_e = x_1 \oplus x_3 \oplus x_4$$
$$x_f = x_1 \oplus x_2 \oplus x_4$$

The resulting eight equations constitute a coset which can easily be shown to be derived from a subgroup of order 8 with one set of three consecutive rows and one set of two consecutive rows.

While constructive corruption provides nonlinear segments which can be assembled to form a nonlinear orthomorphism, a natural question is whether or not there are some nonlinear orthomorphisms which cannot be obtained this way.

Proposition 2: Any maximal length nonlinear orthomorphism can be derived from a linear (automorphic) orthomorphism by the process of constructive corruption.

Proof: Without loss of generality, we can assume that $\theta$ is the fixed point. The normalized form for any maximal length nonlinear orthomorphism is shown in *Fig. 1*. The $n$-bit numbers in the right column can be permuted so that the new order of permutation is a linear orthomorphism:

$$(\theta)(z_1, z_2, \cdots, z_m) \rightarrow (\theta)(u_1, u_2, \cdots, u_m)$$

This can be done many ways by applying a linear generation function, i.e., primitive polynomial, to a complete linearly independent set of the $z_i$. Thus, $u_i = z_j$ where $i = f(j)$ represents the permutation above. This same permutation can be applied to the array of equations in *Fig. 1* without changing the nonlinear orthomorphic mapping $S(x_{k-1}) = z_k$. However, the $\{u_i\}$ permutation now defines a linear orthomorphism. The net result is a dual set of $m = 2^n - 1$ equations of the form:

$$x_{j-1} \oplus x_j = z_j = u_i = u_{i+p-1} \oplus u_{i+p} \quad (3)$$

The corresponding mixing transformations are:

$$w_i = u_{i+p-1} \oplus x_{j-1} = u_{i+p} = \oplus x_j \qquad \square$$

The principal results of this section are that coset decomposition using special subgroups is an effective and methodical means of finding candidates for piecewise nonlinearization and that no class of nonlinear orthomorphisms is overlooked this way. The remaining questions are what size pieces to corrupt and how to assemble them into a nonlinear orthomorphism with desirable properties.

6. CONSTRUCTION OF COMPLETE NONLINEAR ORTHOMORPHISMS

In Section 5 we have considered how to find pieces of a linear orthomorphism (corruptible sets of equations) which can be nonlinearized among themselves. The next question is: How can we assemble these pieces into a complete nonlinear orthomorphism of $2^n-1$ equations, besides the identity equation? A second question is: What constitutes a good nonlinear orthomorphism, or for that matter, a good nonlinear substitution in general? Much has been written on the nonlinearity of the Boolean functions (see Ref. 1, Section 6.2); however, we are not using Boolean functions to define the block substitutions. At one extreme, we could modify a coset of order 4, leaving the remaining $2^n-4$ equations as is. At the other extreme, we could modify all $2^n$ equations with a single mixing transformation. Neither a piecewise linear nor an affine mapping would be satisfactory. For any mapping $S$ we could look at the triple sum:

$$N(x,y) = S(x) \oplus S(y) \oplus S(x \oplus y) = ?$$

If $S$ is an affine mapping, this sum will be some fixed number $c$ for all pairs $x$, $y$, and $c = \theta$ if $S$ is linear. Thus, a seemingly natural measure of nonlinearity would be the range and distribution of $N(x,y)$.

Before proceeding further, we need some additional information on the groups of mixing transforms.

Proposition 3: For a subgroup of order $2^k$ in a maximal length linear orthomorphism, the order of the corresponding group of mixing transformations, $W_k$, will be:

$$2^{2k-n} \le |W_k| \le 2^{k-1}$$

Proof: The subgroup of the orthomorphism is $G_0^k = L_k \times M_k \times R_k$ where $L_k$, $M_k$ and $R_k$ are subgroups of $Z_2^n$, each of order $2^k$. $W_k = L_k \cap M_k$. If $|W_k| = 2^k$, then $L_k = M_k$. This would imply that $G_0^k$ is a cycle in the orthomorphism. Since it is maximal, $|W_k| \le 2^{k-1}$. $L_k$ and $M_k$ each have a set of $k$ linearly independent numbers. Let them be $\{x_1, x_2, \cdots, x_k\} \varepsilon L_k$ and $\{x_{k+1}, x_{k+2}, \cdots, x_{2k}\} \varepsilon M_k$. (The indices here do not refer to rows as in Fig. 1.) There are most $n$ linearly independent numbers in any subset of $Z_2^n$. So, if $2k > n$, there is a subset of $2k-n$ numbers in $\{x_1, \cdots, x_k, x_{k+1}, \cdots, x_{2k}\}$ dependent on the others. Without loss of generality, assume that $\{x_{k+1}, x_{k+2}, \cdots, x_n\}$ are independent of $\{x_1, \cdots, x_k\}$. The remaining numbers $\{x_{n+1}, \cdots, x_{2k}\}$ must be dependent on $\{x_1, \cdots, x_k\} \varepsilon L_k$. There are $2k-n$ such numbers, independent of each other, and so, $\{x_{n+1}, \cdots, x_{2k}\} \varepsilon L_k \cap M_k$. □

An immediate corollary of this is that if a subgroup $G_0^k$ of a maximal linear orthomorphism $G^n$ has order $|G_0^k| > \frac{n}{2}$, then $G_0^k$ and its cosets are corruptible.

Definition 4: A coset of order $2^k$ will be termed completely corruptible if the corresponding group of mixing transforms is of order $2^{k-1}$.

Let $G^n$ be a set of $2^n$ equations representing a linear orthomorphism on $Z_2^n$. Fig. 2 is an example of this. Let $G_0^k$ be the subgroup of $G^n$ consisting of $2^k$ equations as in Fig. 10. Assume that $|W_k| = 2^{k-1}$. A coset decomposition will take the form:

$$G^n = G_0^k + G_1^k + \cdots + G_c^k$$

where $c = 2^{n-k} - 1$ and where $G_i^k$ is a coset derived by adding equations (vectors) $x_{i-1} \oplus x_i = x_{i-p}$ to each of the $2^k$ equations in $G_0^k$. Each successive equation must not have appeared in $G_0^k$ or any of the preceding cosets in the decomposition. For our purposes, we are only interested in decomposition into corruptible sets. Each of these cosets will have the same group of mixing transforms available.

In Ref. 12, Section 4, it was shown that a maximal subgroup of equations representing a linear orthomorphism could be broken into disjoint subsets which can be transformed into a nonlinear orthomorphism by consecutive steps. This can be generalized to any completely corruptible coset.

A practical problem in constructive corruption is the size of the set of equations in the linear orthomorphic array to be nonlinearized and how to assign the mixing transforms without conflict. If $G_0^k = L_k \times M_k \times R_k$ is a subgroup of the array of equations of order $2^k$, and if it is completely corruptible, the order of the set of mixing transforms is $|W_k| = 2^{k-1}$. Any coset $G_i^k$ is obtained by vectorially adding some equation $x_{i-1} \oplus x_i = x_{i-p}$, which is not in $G_0^k$, to all equations in $G_0^k$. This coset can be corrupted by applying some or all of the mixing transforms in $W_k$. If only one $w \in W_k$ is used, the result is an affine set. If one attempts to use all the $w$'s, there is a problem of assigning them without conflict. One can always take a completely corruptible subgroup $G_0^{k-1} \subset G_0^k$, and divide $G_i^k$ into two cosets of $G_0^{k-1}$, $G_i^{k-1} \cup G_j^{k-1} = G_i^k$, and then corrupt these two smaller cosets separately. The problem is that the order of the set of mixing transforms $|W_{k-1}| = 2^{k-2}$, so there are only half as many mixing transforms available to apply to the same number of equations. In the limit for $k = 2$ and cosets of order 4, $W_2 = \{\theta, w\}$, and so, there is just one mixing transform that can be applied to all $2^{n-2} - 1$ cosets. Ref. 12 addressed the problem of assigning mixing transforms in an orderly way, but only for maximal subgroups, i.e., $k = 2^{n-1}$. In what follows, the intent is to find a subset of a coset $G_i^k = \overline{L}_k \times \overline{M}_k \times \overline{R}_k$ derived from the subgroup $G_0^k = L_k \times M_k \times R_k$, such that the numbers in the left and middle columns of the subset can be combined among themselves but with their sums ranging over all of $\overline{R}_k$, the right column.

This would simplify the assignment of multiple mixing transformations to an orderly process rather than by the cut and try methods of Ref. 11, Section 5. Ref. 12, pp. 15 thru 17, outlines such a method for maximal subgroups. What follows is an effort to generalize this process to subgroups of all orders $|G_0^k| = 2^k$ for $k \le n - 1$. In effect, it is a search for subgroups that act like maximal subgroups.

Proposition 4: A completely corruptible subgroup of order $k$ has $k$ consecutive rows of equations from the complete array of equations representing the maximal linear orthomorphism.

Proof: Let $G_0^k$ be a completely corruptible subgroup of order $2^k$. Then $|W_k| = 2^{k-1}$ by definition. $G_0^k$ has a maximal set of $k$ linearly independent equations. $W_k$ has maximal linearly independent sets of $k-1$ numbers. Find the set with the largest collection of consecutive numbers from columns $L$ or $M$ in the complete linear array. If there are $k-1$ such numbers $x_a, x_{a+1}, \cdots, x_{a+k-2}$, they correspond to the following rows in $G_0^k$ and they are $k$ consecutive rows:

$$x_{a-1} \oplus x_a = x_{a-p}$$
$$x_a \oplus x_{a+1} = x_{a+1-p}$$
$$\vdots$$
$$x_{a+k-2} \oplus x_{a+k-1} = x_{a+k-1-p}$$

If there are less than $k-1$ consecutive numbers in the set of $k-1$ linearly independent numbers, they can be collected into smaller sets of consecutive numbers. The largest such set is $x_a, x_{a+1}, \cdots, x_{a+k_a-2}$; the second largest set is $x_b, x_{b+1}, \cdots, x_{b+k_b-2}$, etc, until a set of $k-1$ independent numbers in $W_k$ is assembled. $(k_a - 1) + (k_b - 1) + \cdots = k - 1$. Each such set will define a set of equations in $G_0^k$, all consecutive, of the form:

$$x_{a-1} \oplus x_a = x_{a-p}$$
$$x_a \oplus x_{a+1} = x_{a+1-p} \qquad k_a \text{ equations}$$
$$\vdots \qquad \vdots$$
$$x_{a+k_a-2} \oplus x_{a+k_a-1} = x_{a+k_a-1-p}$$

$$x_{b-1} \oplus x_b = x_{b-p} \qquad k_b \text{ equations}$$
$$\vdots \qquad \vdots$$
$$x_{b+k_b-2} \oplus x_{b+k_b-1} = x_{b+k_b-1-p}$$
$$etc.$$

Figure 11

These $k_a + k_b + \cdots > k$ equations are linearly independent since the $x$'s are. Thus, $|G_0^k| > 2^k$, a contradiction. □

Completely corruptible subgroups and cosets are not only useful for deriving nonlinear orthomorphisms but they also affect the structure of smaller subgroups as shown in the next proposition.

Proposition 5: For any completely corruptible subgroup of order $2^k$, where $k \geq 4$, each subgroup of order $2^{k-1}$ is corruptible.

Proof: Let $G_0^k$ be such a subgroup. By Prop. 4, it has $k$ consecutive equations from the complete orthomorphic array. It also has another set of $k-1$ consecutive equations which are sums of adjacent pairs of the $k$ consecutive equations, since the latter are a set of generators of $G_0^k$. There is a sequence of successively smaller $k$ tuples of consecutive rows. The indices will have the following form:

Consecutive Rows

| $k$ | $k-1$ | $k-2$ |
|---|---|---|
| $a$ | $b$ | $c$ |
| $a+1$ | $b+1$ | $c+1$ |
| $a+2$ | $b+2$ | $c+2$ etc→ |
| $\vdots$ | $\vdots$ | $\vdots$ |
| $a+k-1$ | $b+k-2$ | $c+k-3$ | where $x_a \oplus x_{a+1} = x_b$ and $x_b \oplus x_{b+1} = x_c$, etc. Since $k \geq 4$, there are at least four consecutive $a$ rows, three $b$'s, and two $c$'s. Clearly, the three consecutive sets of $k-1$ rows each:

$$(a, a+1, \cdots, a+k-2),$$
$$(a+1, a+2, \cdots, a+k-1),$$
and
$$(b, b+1, \cdots, b+k-2)$$

are linearly independent sets and can be used to generate a $G_0^{k-1}$ with $k-1$ consecutive rows. In a like manner, $(b, a+2, a+3, \cdots, a+k-1)$ would generate $G_0^{k-1}$ with $k-2$ consecutive rows, noting that $x_b$ is independent of $x_{a+2}, \cdots, x_{a+k-1}$. To ensure that $G_0^{k-1}$ is not corruptible, it would be necessary to eliminate all pairs from the above indices. If one eliminates all but one of the $a$'s, e.g., $a$ thru $a+k-2$, then $x_a, \cdots, x_{a+k-2}$ define rows which will be in the relative complement $\overline{G}_0^{k-1} = G_0^k \setminus G_0^{k-1}$, but $x_a \oplus x_{a+1} = x_b$, etc. At the least, $\frac{k}{2}$ or $\frac{k-1}{2}$ of the $b$'s must also be eliminated. Thus, some additive triple would be in $\overline{G}_0^{k-1}$, a contradiction for a complement. Depending on whether $k$ is even or odd, $\frac{k}{2}$ or $\frac{k-1}{2}$ alternate $a$ rows could also be left to the subgroup complement, but $x_a \oplus x_{a+2} = x_c$, etc. Again, to eliminate the consecutive rows with $c$ indices, some of such rows would be in the complement, thus resulting in triple sums. □

For $n \geq 5$, this implies that any subgroup of order $2^{n-2}$ is corruptible, and, of course, by Prop. 4, any subgroup of order $2^{n-1}$ is completely corruptible.

Proposition 6: Any maximal orthomorphism on $Z_2^3$ is linear or affine.

Proof: A nonlinear orthomorphism can be derived by constructive corruption from a linear one. If one applies $w \oplus w = \theta$ vectorially to all eight rows, where $w \neq \theta$, the mapping becomes affine. Since the orthomorphism has no 3 cycle, the smallest corruptible coset has order 4.

Let $G^3 = Z_2^3 \times Z_2^3 \times Z_2^3$ be the orthomorphism and $G^2 \cup \overline{G}^2 = G^3$ be a corruptible subgroup with corresponding single coset (complement). Because $|G^2| = 2^2$, $W = \{\theta, w\}$ where $w$ is the single nontrivial mixer. If $S(x) = z$ is the original linear mapping, then $S'(x \oplus w) = S(x)$ on the coset, and $S'(y) = S(y)$ on the subgroup. $w \varepsilon G^2$, so $S'(w) = S(w)$. If $x \varepsilon \overline{G}_2$, so does $x \oplus w \varepsilon \overline{G}^2$. $S'(x) = S'(x \oplus w \oplus w) = S(x \oplus w) = S(x) \oplus S(w)$.

There are three cases:

a. $x, y \varepsilon G^2$. $x \oplus y \varepsilon G^2$.
Also, $S'(x) \oplus S'(y) \oplus S'(x \oplus y)$
$= S(x) \oplus S(y) \oplus S(x \oplus y)$
$= \theta$.

b. $x, y \varepsilon \overline{G}^2$. $x \oplus y \varepsilon G^2$.
Also, $S'(x) \oplus S'(y) \oplus S'(x \oplus y)$
$= S(x) \oplus S(w) \oplus S(y) \oplus S(w) \oplus S(x \oplus y)$
$= \theta$ c. $x \varepsilon G^2$ and $y \varepsilon \overline{G}^2$.
Then $x \oplus y \varepsilon \overline{G}^2$
$S'(x) \oplus S'(y) \oplus S'(x \oplus y)$
$= S(x) \oplus S(y) \oplus S(w) \oplus S(x \oplus y) \oplus S(w)$
$= \theta$ □

The same result holds for any block size if the complement of a maximal subgroup is corrupted with a single mixing transformation. The next step is to further refine the process of constructive corruption by finding completely corruptible subgroups which have the additional property that pairs of cosets or subsets thereof can be modified with minimum interaction, even though using the full group of mixing transforms.

Proposition 7: Any completely corruptible coset $G_i^k$ of order $2^k$, $k > 2$, in the group of equations representing a maximal linear orthomorphism on $Z_2^n$, can be divided into two cosets of order $2^{k-1}$ such that the numbers in the left and middle columns of each such smaller coset can be rearranged among themselves but the resulting sums will be distributed over the entire column of the parent coset $G_i^k$.

Proof: The completely corruptible subgroup $G_0^k$ and coset $G_l^k$ can be represented as follows:

$$\begin{array}{ccc} L_k & M_k & R_k \\ \theta & \oplus\ \theta = \theta & \\ x_{i_1-1} \oplus x_{i_1} = x_{i_1-p} & & \\ \vdots & \vdots & \quad G_0^k \\ x_{i_s-1} \oplus x_{i_s} = x_{i_s-p} & & \end{array}$$

$$\begin{array}{ccc} \overline{L}_k & \overline{M}_k & \overline{R}_k \\ x_{j_1-1} \oplus x_{j_1} = x_{j_1-p} & & \\ \vdots & \vdots & \quad G_l^k \\ x_{j_t-1} \oplus x_{j_t} = x_{j_t-p} & & \end{array}$$

Figure 12 where $s = 2^k - 1$ and $t = 2^k$. If $G_0^k$ is not a maximal subgroup, then:

$$L_k \cup \overline{L}_k \neq M_k \cup \overline{M}_k \neq R_k \cup \overline{R}_k \neq Z_2^n.$$

By Prop. 4, since the subgroup $G_0^k$ of order $2^k$ is completely corruptible, it contains a set of $k$ consecutive rows or equations from the full orthomorphic set. By Prop. 7, Ref. 9, these are a linearly independent set. The subgroup generated by taking all even sums of these $k$ rows is a subgroup $G_0^{k-1}$ of order $2^{k-1}$, $G_0^{k-1} \subset G_0^k$, with columns $L_{k-1} \subset L_k$, $M_{k-1} \subset M_k$ and $R_{k-1} \subset R_k$. It is easy to see that $L_{k-1} \subset R_k$ and $M_{k-1} \subset R_k$ since the same sums of numbers will occur within $L_{k-1}$ and $M_{k-1}$ and between $L_{k-1}$ and $M_{k-1}$. Since the orthomorphism is maximal, there are no proper cycles and, thus, $L_{k-1} \neq R_{k-1}$ and $M_{k-1} \neq R_{k-1}$. So, $L_{k-1} \cap R_k \setminus R_{k-1}$ and $M_{k-1} \cap R_k \setminus R_{k-1}$ are not empty, where $R_k \setminus R_{k-1}$ is the set of numbers in $R_k$ but not in $R_{k-1}$. Since $L_{k-1}$ and $M_{k-1}$ are subgroups of $R_k$, for any $x \in L_{k-1}$ and $y \in M_{k-1}$, $x \oplus y \in R_k$. Some such sums must be in $R_k \setminus R_{k-1}$ because, e.g., if $x \in L_{k-1} \cap R_k \setminus R_{k-1}$, then $x \oplus \theta \in R_k$. Thus, any rearrangement of pairs of numbers in $L_{k-1}$ and $M_{k-1}$ will yield corrupted equations in $L_{k-1} \times M_{k-1} \times R_k$.

$G_l^k$ can be divided into two distinct cosets of $G_0^{k-1}$, $G_a^{k-1} \cup G_b^{k-1} = G_l^k$. Consider one of the cosets $G_a^{k-1}$. It is obtained by adding vectorially some equation $x_{a-1} \oplus x_a = x_{a-p}$ to all equations in $G_0^{k-1} = L_{k-1} \times M_{k-1} \times R_{k-1}$. The coset $G_a^{k-1}$ can be expressed as a direct product of three cosets in $Z_2^n$, i.e.:

$$G_a^{k-1} = (x_{a-1} L_{k-1}) \times (x_a M_{k-1}) \times (x_{a-p} R_{k-1}).$$

Thus, if $u \in x_{a-1} L_{k-1}$ and $v \in x_a M_{k-1}$, where $u = x_{a-1} \oplus x$ and $v = x_a \oplus y$ for some $x \in L_{k-1}$ and $y \in M_{k-1}$, then by the first part of the proof, $x \oplus y = z \in R_{k-1}$. Correspondingly:

$$u \oplus v = (x_{a-1} \oplus x) \oplus (x_a \oplus y)$$
$$= (x_{a-p} \oplus z) \in x_{a-p} R_{k-1}$$

So, for any pair of numbers, $u,v$ where $u \in x_{a-1} L_{k-1}$ and $v \in x_a M_{k-1}$ there exists a $w \in x_{a-p} R_{k-1}$ such that $u \oplus v = w$. The same holds for the other coset $G_b^{k-1}$. □

The above may seem to be a tedious bore and hardly worth the bother, but the following illustrates the application of this proposition.

As an example, consider a block size 8 maximal length linear orthomorphism defined by the generating function $x_k = x_{k-8} \oplus x_{k-6} \oplus x_{k-3} \oplus x_{k-2}$. Let $\{A,B,C,D,E,F,G,H\}$ be a complete, linearly independent set of 8-bit binary numbers. For convenience and compactness, let the notation $ABC$ stand for $A \oplus B \oplus C$. Applying the generating function to the above complete linearly independent set in that order will define the $2^8 = 256$ equations or rows representing the orthomorphism. These, in part, are:

| | $L$ | | $M$ | | $R$ |
|---|---|---|---|---|---|
| 0 | $\theta$, | $\oplus$ | $\theta$ | = | $\theta$ |
| 1 | BEFH | $\oplus$ | A | = | ABEFH |
| 2 | A | $\oplus$ | B | = | AB |
| 3 | B | $\oplus$ | C | = | BC |
| 4 | C | $\oplus$ | D | = | CD |
| 5 | D | $\oplus$ | E | = | DE |
| 6 | E | $\oplus$ | F | = | EF |
| 7 | F | $\oplus$ | G | = | FG |
| 8 | G | $\oplus$ | H | = | GH |
| ⋮ | ⋮ | | ⋮ | | |
| 254 | BCDEH | $\oplus$ | ADEG | = | ABCGH |
| 255 | ADEG | $\oplus$ | BEFH | = | ABDFGH |

Figure 13

In our convention, the orthomorphic mapping which we are using for encryption, e.g., would be $S(D) = DE$, from row 5. For simplicity, choose a subgroup $G_0^3$ of order 8 defined by eight equations:

| | $L_3$ | | $M_3$ | | $R_3$ | |
|---|---|---|---|---|---|---|
| 0 | $\theta$ | $\oplus$ | $\theta$ | = | $\theta$ | |
| 2 | A | $\oplus$ | B | = | AB | |
| 3 | B | $\oplus$ | C | = | BC | |
| 4 | C | $\oplus$ | D | = | CD | $G_0^3$ |
| 176 | ABC | $\oplus$ | BCD | = | AD | |
| 213 | AC | $\oplus$ | BD | = | ABCD | |
| 235 | AB | $\oplus$ | BC | = | AC | |
| 236 | BC | $\oplus$ | CD | = | BD | |

Figure 14

One can read off the mixing transforms $W_3 = \{\Theta, B, C, BC\}$ from $W_3 = L_3 \cap M_3$.

$|W_3| = 2^2 = 4$, so $G_0^3$ is completely corruptible. Now, one can construct a coset, e.g., using row 6:

| | $\overline{L}_3$ | | $\overline{M}_3$ | | $\overline{R}_3$ | |
|---|---|---|---|---|---|---|
| 6 | E | $\oplus$ | F | = | EF | |
| 169 | AE | $\oplus$ | BF | = | ABEF | |
| 155 | BE | $\oplus$ | CF | = | BCEF | |
| 215 | CE | $\oplus$ | DF | = | CDEF | $G_6^3$ |
| 91 | ABCE | $\oplus$ | BCDF | = | ADEF | |
| 95 | ACE | $\oplus$ | BDF | = | ABCDEF | |
| 121 | ABE | $\oplus$ | BCF | = | ACEF | |
| 209 | BCE | $\oplus$ | CDF | = | BDEF | |

Figure 15

One example of a corruptible subgroup of order 2, $G_0^2$ is:

| | $L_2$ | | $M_2$ | | $R_2$ |
|---|---|---|---|---|---|
| 0 | $\theta$, | $\oplus$ | $\theta$, | = | $\theta$, |
| 2 | A | $\oplus$ | B | = | AB |
| 3 | B | $\oplus$ | C | = | BC |
| 235 | AB | $\oplus$ | BC | = | AC |

Figure 16

$W_2 = \{\Theta, B\}$. From this, $G_6^3$ can be decomposed into two cosets:

| 6 | E | $\oplus$ | F | = | EF |
|---|---|---|---|---|---|
| 169 | AE | $\oplus$ | BF | = | ABEF |
| 155 | BE | $\oplus$ | CF | = | BCEF |
| 121 | ABE | $\oplus$ | BCF | = | ACEF | and

| 215 | CE | $\oplus$ | DF | = | CDEF |
|---|---|---|---|---|---|
| 91 | ABCE | $\oplus$ | BCDF | = | ADEF |
| 95 | ACE | $\oplus$ | BDF | = | ABCDEF |
| 209 | BCE | $\oplus$ | CDF | = | BDEF |

Figure 17

Using this coset decomposition, the only non-trivial mixing transform that can be used on the separate cosets is $B$.

Now, applying Prop. 7 to the $k = 3$ consecutive rows in $G_0^3$, one obtains a different subgroup which is also completely corruptible:

| | $L_2$ | | $M_2$ | | $R_2$ |
|---|---|---|---|---|---|
| 0 | $\theta$, | $\oplus$ | $\theta$, | = | $\theta$, |
| 213 | AC | $\oplus$ | BD | = | ABCD |
| 235 | AB | $\oplus$ | BC | = | AC |
| 236 | BC | $\oplus$ | CD | = | BD |

Figure 18

TELEDYNE PROPRIETARY

Unlike the subgroup in *Fig. 15*, here $L_2 \subset R_3$ and $M_2 \subset R_3$. This gives a different coset decomposition of $G_6^3$:

|     | $\bar{L}_3$ | | $\bar{M}_3$ | $\bar{R}_3$ | |
| --- | --- | --- | --- | --- | --- |
| 6   | E    | $\oplus$ | F    | = EF    | |
| 95  | ACE  | $\oplus$ | BDF  | = ABCDEF | |
| 121 | ABE  | $\oplus$ | BCF  | = ACEF  | $G_6^2$ |
| 209 | BCE  | $\oplus$ | CDF  | = BDEF  | |
|     |      | and      |      |         | |
| 169 | AE   | $\oplus$ | BF   | = ABEF  | |
| 155 | BE   | $\oplus$ | CF   | = BCEF  | |
| 215 | CE   | $\oplus$ | DF   | = CDEF  | $G_{91}^2$ |
| 91  | ABCE | $\oplus$ | BCDF | = ADEF  | |

Figure 19

From Prop. 7, when constructive corruption is applied, $G_6^2$ and $G_{91}^2$ will be closed in $\bar{L}_3$ and $\bar{M}_3$ but not in $\bar{R}_3$, that is, for example, no number in $\bar{L}_3$ of $G_6^2$ will be combined with a number from $\bar{M}_3$ in $G_{91}^2$. This information can be used to employ varied mixing transforms without conflict. See *Table 1* at the top of the following page.

The ordinate lists row numbers of binary blocks in the left column of *Fig. 14*, and the abscissa lists row numbers of binary blocks in the middle column of *Fig. 14*. The table entries are the row numbers of equations in the linear array, *Fig. 14*, along with the mixing transformation which would convert that equation to another in a nonlinear array with the corresponding $\bar{L}_3$ block added to the corresponding $\bar{M}_3$ block. For example, the entry corresponding to $\bar{L}_3$ 95, $\bar{M}_3$ 121 means that row 169: $AE \oplus BF = ABEF$ by application of mixing transformation $C \oplus C = \theta$ is converted to $ACE \oplus BCF = ABEF$ where the $\bar{L}_3$ row 95 block is $ACE$, and the $\bar{M}_3$ row 121 block is $BCF$. Where there is no entry, the combination is impossible. Note that each of the eight rectangles contains rows from one of two cosets $G_6^2$ and $G_{91}^2$. Each column and each row can be visited only once and no table entry (row number) can be repeated. If this were a 3-dimensional table, it would mean that each row, column, and axis could be visited once, at most.

This table can be used to select a pattern of constructive corruption. For example, choose $\bar{L}_3$ 6, $\bar{M}_3$ 121 transformed from row 155 with mixer B. Next, choose $\bar{L}_3$ 95, $\bar{M}_3$ 6 from 121/BC. Two choices remain for $\bar{L}_3$ 121. Choose $\bar{M}_3$ 209 from 95/BC. There is now only one possibility for $\bar{L}_3$ 209, i.e., pairing with $\bar{M}_3$ 95 from 215/B. Next, going to the $G_{91}^2$ block, unless we accept the identity transform, there is one choice: $\bar{L}_3$ 91, $\bar{M}_3$ 155 from 169/BC. For the remainder now, there is no choice: $\bar{L}_3$ 155, $\bar{M}_3$ 169 from 6/B, $\bar{L}_3$ 169, $\bar{M}_3$ 215 from 91/BC and $\bar{L}_3$ 215, $\bar{M}_3$ 91 from 209/B. We have used two mixing transforms.

Another approach is to include the identity transform, i.e., leave some rows unmodified. For example, $\bar{L}_3$ 6, $\bar{M}_3$ 6 from 6/$\Theta$; $\bar{L}_3$ 95, $\bar{M}_3$ 121 from 169/C; $\bar{L}_3$ 121, $\bar{M}_3$ 209 from 95/BC; and $\bar{L}_3$ 209, $\bar{M}_3$ 95 from 215/B; $\bar{L}_3$ 91, $\bar{M}_3$ 169 from 121/C; $\bar{L}_3$ 155, $\bar{M}_3$ 155 from 155/$\theta$; $\bar{L}_3$ 169, $\bar{M}_3$ 215 from 91/BC; and, $\bar{L}_3$ 215, $\bar{M}_3$ 91 from 209/B. In this case, all mixing transforms have been used, but two, rows 6 and 155, are left unmodified. They may be transformed later as parts of some other cosets or their sum, row 3, may be modified.

This can be applied to subgroups and cosets of any size, and then to successively smaller subgroups for an

TELEDYNE PROPRIETARY orderly process of nonlinearization. It is not necessary to modify all rows in the linear array to ensure that:

$$N(x,y) = S(x) \oplus S(y) \oplus S(x \oplus y) \neq \theta \quad (4)$$

most of the time, and to have an even distribution of values.

Table 1. Possible Corruption Combinations

|  |  Row #'s | $G_6^2$ Row 6 | $G_6^2$ Row 95 | $G_6^2$ Row 121 | $G_6^2$ Row 209 | $\overline{M}_3$ Row 91 | $\overline{M}_3$ Row 155 | $G_{91}^2$ Row 169 | $G_{91}^2$ Row 215 |
|---|---|---|---|---|---|---|---|---|---|
| $L_3$ | 6 | 6/θ | 209/BC | 155/B | 215/C | | | | |
| $L_3$ | 95 | 121/BC | 95/θ | 169/C | 91/B | | | | |
| $G_6^2$ | 121 | 169/B | 91/C | 121/θ | 95/BC | | | | |
| $G_6^2$ | 209 | 155/C | 215/B | 6/BC | 209/θ | | | | |
| $G_{91}^2$ | 91 | | | | | 91/θ | 169/BC | 121/C | 95/B |
| $G_{91}^2$ | 155 | | | | | 215/BC | 155/θ | 6/B | 209/C |
| $G_{91}^2$ | 169 | | | | | 95/C | 121/B | 169/θ | 91/BC |
| $G_{91}^2$ | 215 | | | | | 209/B | 6/C | 155/BC | 215/θ |

7. NESTED SEQUENCES OF SUBGROUPS

Ref. 12, Section 3 outlined an orderly method of nonlinearization by starting with a maximal subgroup of equations in the linear array of $2^n$ equations. $G^{n-1}$ is one of $2^n - 1$ such subgroups and $|G^{n-1}| = 2^{n-1}$. All such maximal subgroups can be specified by selecting $n$-bit numbers in any one of the three columns which are a maximal subgroup of $Z_2^n$. As shown in Ref. 9, Section 5, these can all be determined from the $n$ maximal subgroups of $Z_2^n$ which are specified by numbers which all have zero in a given bit position. It was also shown in Ref. 12, Prop. 1, that all of these maximal subgroups of the orthomorphic array $G^n$ are essentially images of each other in that they have the same row spacing and can be obtained from each other by changing the indices of the member rows, all by the same increment. Thus, maximal subgroups, both of the $n$-bit numbers and of the linear orthomorphic arrays of equations are easy to find and easy to work with.

$G^{n-1} = L_{n-1} \times M_{n-1} \times R_{n-1}$ is a set of $2^{n-1}$ equations where $L_{n-1}$, $M_{n-1}$, and $R_{n-1}$ are the left, middle, and right columns, respectively. $\overline{G}^{n-1} = \overline{L}_{n-1} \times \overline{M}_{n-1} \times \overline{R}_{n-1}$ is the complement. The set of mixing transforms $W_{n-1} = L_{n-1} \cap M_{n-1}$ is a group, and $|W_{n-1}| = 2^{n-2}$. From $G^{n-1}$ one can construct a nested sequence of completely corruptible subgroups:

$$G^2 \subset G^3 \subset \cdots \subset G^{n-2} \subset G^{n-1}$$

and a similar sequence of relative complements:

$$\overline{G}^2 \subset \overline{G}^3 \subset \cdots \subset \overline{G}^{n-2} \subset \overline{G}^{n-1}$$

where $\overline{G}^k = G^{k+1} \setminus G^k$, each with an associated group of mixing transforms:

$$|W_{n-k}| = 2^{n-k-1}$$

These also form a nested sequence:

TELEDYNE PROPRIETARY $$W_2 \subset W_3 \subset \cdots \subset W_{n-2} \subset W_{n-1}$$

In the limit, $G^2$ has middle column $M_2 = \{\theta, x_i, x_{i+1}, x_i \oplus x_i\}$ for some index $i$ and the corresponding $W_2 = \{\theta, x_i\}$. Also, for each $1 \leq k \leq n-2$:

$$W_{n-k} = W_{n-k-1} \cup \overline{W}_{n-k-1}$$

where $\overline{W}_{n-k-1} = W_{n-k} \setminus W_{n-k-1}$ i.e., $\overline{W}_{n-k-1}$ is the relative complement of $W_{n-k-1}$ in $W_{n-k}$. A simple and orderly procedure of nonlinearization is as follows (and is illustrated in *Fig. 20*):

a. Apply the $2^{n-3}$ mixing transforms in $\overline{W}_{n-1}$ to $\overline{G}^{n-1}$. None of these mixing transforms are in $W_{n-k}$ for $k > 1$, so they will not be used on subsequent cosets $\overline{G}^{n-k}$.

b. Apply the $2^{n-4}$ mixing transforms in $\overline{W}_{n-2}$ to $\overline{G}^{n-2}$.

c. Continue this process sequentially until reaching $\overline{G}^3$ where two mixing transforms are applied to eight equations.

d. For the last subgroup $G^2$ of order 4, the sole $x_i$ could be applied to $\overline{G}^2$ or it simply could be left alone, i.e., apply $w = \theta$.

Besides simplicity, this process has the merit of using up to $2^{n-2} - 1$ nontrivial mixing transforms. Also, at least $2^n - 4$ equations are transformed; however, the orderly structure leaves something to be desired. $G^{n-1}$ has a single set of $n-1$ consecutive rows, and because of the group structure, another set of $n-2$ consecutive rows. Thus, there are three ways that one can construct $G^{n-2}$ as a completely corruptible subgroup, from Prop. 4, i.e., using the set of $n-2$ rows as generators, or omitting the first or last of the set of $n-1$ consecutive rows in $G^{n-1}$. There is a choice of $2^n - 1$ maximal subgroups to begin with and a choice of three subgroups at each subsequent level. So

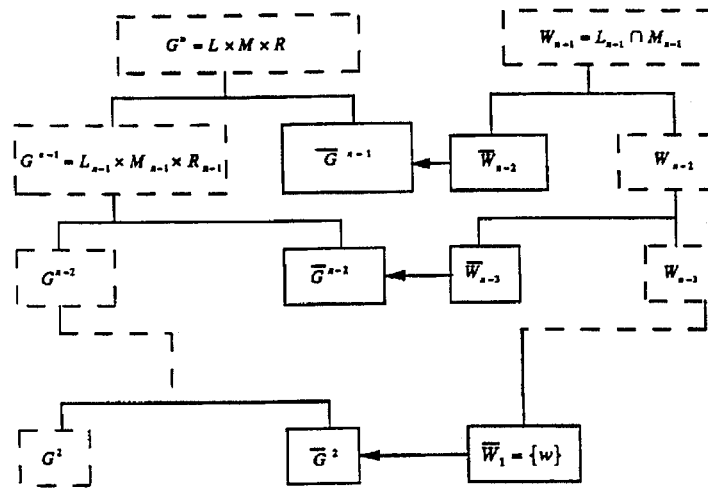

Solid-line boxes indicate cosets which are corrupted and corresponding cosets of mixing transforms
Figure 20 the total possible number of such nested sequences is $(2^n-1)(3^{n-2})$.

Now, consider two numbers $x, y$ in the left column of $\overline{G}^{n-1}$, i.e., $x,y \varepsilon \overline{L}_{n-1}$. $x \oplus y \notin \overline{L}_{n-1}$ since it is a group complement. So $x \oplus y \varepsilon \overline{L}_{n-k}$ for some $k > 1$. Let $w_a$ and $w_b$ be mixing transforms applied to $x$ and $y$, respectively. $w_a, w_b \varepsilon \overline{W}_{n-1}$. The set of mixers on $\overline{L}_{n-k}$ is $\overline{W}_{n-k} \subset \overline{W}_{n-1}$. Thus, in some instances $w_a \oplus w_b \varepsilon \overline{W}_{n-k}$. In that case:

$$S(x \oplus w_a) \oplus S(y \oplus w_b) = S(x \oplus y \oplus w_a \oplus w_b),$$

and despite the constructive corruption, there are linear subgroups remaining.

8. FITTED COSETS FROM DIFFERENT SUBGROUPS

The next approach is to seek cosets from different subgroups and, hence, with different groups of mixing transforms, but which still can be fitted together somewhat like a jigsaw puzzle.

If $G_0^k$ and $H_0^k$ are two disjoint corruptible subgroups of order $2^k$ where $k < \frac{n}{2}$, of a maximal linear orthomorphism on the $n$-bit numbers, they can be combined into one subgroup of order $2^{2k}$ with two different coset decompositions and two different groups of mixing transformations. Let $M_0^{2k}$ be the subgroup generated by the combined generators of $G_0^k$ and $H_0^k$. $M_0^{2k}/G_0^k$ and $M_0^{2k}/H_0^k$ are two coset decompositions, each isomorphic to a subgroup of $Z_2^n$ of order $2^k$, and, hence, to each other. Pairs of cosets consisting of one each from $M_0^{2k}/G_0^k$ and $M_0^{2k}/H_0^k$ will share exactly one row. If they had more than one in common, then it would not be possible for $G_0^k \cap H_0^k = \{\theta\}$ as the sum of a shared pair would be in $G_0^k \cap H_0^k$. If one pair of cosets shared no row, another pair would have to share more than one row. Since $G_0^k$ and $H_0^k$ are disjoint, so are the corresponding groups of mixers although the group of mixing transformations corresponding to $M_0^{2k}$ would have additional members if some rows in $G_0^k$ are adjacent to some in $H_0^k$. Next, the complete orthomorphism $Z_2^n \times Z_2^n \times Z_2^n$ could be decomposed into cosets of $M_0^{2k}$ which, in turn, can be decomposed into alternate collections of cosets from $G_0^k$ and $H_0^k$. Depending on the block size $n$, this can be extended to more than two coset decompositions.

The following is an example for $n = 8$, where the maximal length linear orthomorphism contains 255 equations or rows besides the identity. (See *Figs. 21* and *22* on the following pages.) Select three disjoint corruptible subgroups of order 4: $G_0^4$, $H_0^4$, and $I_0^4$. Each has two consecutive rows, their sum and the identity row. Each subgroup establishes a unique coset decomposition of the complete linear array consisting of the subgroup and 63 cosets, each consisting of four equations. These subgroups of order 4 can be combined to define three subgroups of order 16, $M_0^{16}$ from $G_0^4 \cup H_0^4$, $N_0^{16}$ from $G_0^4 \cup I_0^4$, and $P_0^{16}$ from $H_0^4 \cup I_0^4$. These subgroups of order 16 will not be disjoint. Finally, these can be combined into a subgroup $Q_0^{64}$ of order 64 from $G_0^4 \cup H_0^4 \cup I_0^4$. This subgroup and its three cosets $Q_1^{64}$, $Q_2^{64}$, Multiple coset decomposition for a maximal length linear orthomorphism on binary nos. of block size $n = 8$ Decomposition of 16-row cosets into 4-row cosets for a maximal length linear orthomorphism of block size 8

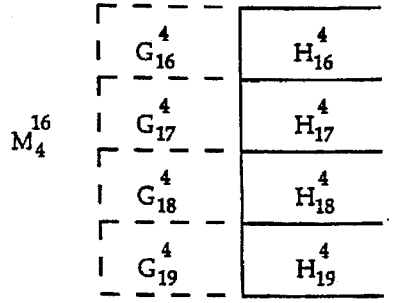

Figure 22 and $Q_3^{64}$ form a decomposition of the complete linear orthomorphism. As shown in *Fig. 21*, each of the 64-row Q cosets can be decomposed three ways into four cosets each of 16 rows. For example, the 64 rows of $Q_1^{64}$ can be decomposed into $\{M_4^{16}, M_5^{16}, M_6^{16}, M_7^{16}\}$, or $\{N_4^{16}, \cdots, N_7^{16}\}$, or $\{P_4^{16}, \cdots, P_7^{16}\}$. If the $M$ decomposition is chosen, then, for example, $M_4^{16}$ can be decomposed into four cosets of four rows each, either $\{G_{16}^4, G_{17}^4, G_{18}^4, G_{19}^4\}$ or $\{H_{16}^4, H_{17}^4, H_{18}^4, H_{19}^4\}$. (See *Fig. 22*) Finally, mixing transformations can be applied to complete the process of constructive corruption.

If desired, all equations in the linear array can be modified this way. While somewhat more complicated than the sequential approach in Section 7, it has produced better results in terms of nonlinearity as measured by *Eq. (4)*.

9. COSETS OF DISJOINT, CORRUPTIBLE SUBGROUPS

If two subgroups are disjoint, except for the identity row, then they will also have disjoint subgroups of mixing transformations. Considering a pair of subgroups of order 4, then a corresponding pair of cosets can have, at most, one row in common. If a collection of such disjoint cosets is assembled, each will be corrupted with a different mixing transformation. Two fundamental questions are:

a. How many such disjoint corruptible cosets can be found in a given linear orthomorphism?

b. What group structure is there in the corresponding set of mixing transformations?

To make a good nonlinear orthomorphism, that is, to ensure that *Eq. (4)*, $N(x, y)$ has a uniform distribution over $Z_2^n$, it is necessary to corrupt enough equations and to have a set of mixing transformations that do not frequently cancel each other out.

Definition 5: In a maximal length linear orthomorphic array of equations, two subsets of $k$ equations, each having the same relative spacings, are termed similar. The middle columns of two such subsets would have the form:

$$\left.\begin{array}{cc} x_a & x_{a+l} \\ x_b & x_{b+l} \\ x_c & x_{c+l} \\ \vdots & \vdots \end{array}\right\} k \text{ rows}$$

for some integer $l$. Maximal subgroups are examples of similar subsets.

Proposition 8. Let $G_i^2$ be a coset of order $2^2 = 4$ in the coset decomposition defined by a corruptible subgroup $G_0^2$ of order 4. Let $H_{i+d}^2$ be a set of four equations similar to, but disjoint from, $G_i^2$. Then, $H_{i+d}^2$ is a coset in the decomposition defined by another corruptible subgroup $H_0^2$ where $G_0^2 \cap H_0^2 = \{\theta\}$.

Proof: A corruptible subgroup of order 4 has the form:

$$\theta \oplus \theta = \theta$$
$$x_{j-1} \oplus x_j = x_{j-p}$$
$$x_j \oplus x_{j+1} = x_{j+1-p}$$
$$x_{q-1} \oplus x_q = x_{q-p}$$

where $x_q = x_j \oplus x_{j+1}$. The corresponding mixing transform is $x_j \oplus x_j = \theta$. A coset is generated by adding a row, not in the subgroup, to each row in the subgroup, to obtain:

$$x_{a-1} \oplus x_a = x_{a-p}$$
$$(x_{j-1} \oplus x_{a-1}) \oplus (x_j \oplus x_a) = (x_{j-p} \oplus x_{a-p})$$
$$(x_j \oplus x_{a-1}) \oplus (x_{j+1} \oplus x_a) = (x_{j+1-p} \oplus x_{a-p})$$
$$(x_{q-1} \oplus x_{a-1}) \oplus (x_q \oplus x_a) = (x_{q-p} \oplus x_{a-p})$$

The sum of the first two numbers in the middle column of the coset, $x_a \oplus (x_j \oplus x_a) = x_j$, regains the mixing transform. $x_j \oplus x_a = x_b$ for some row of index $b$. Similarly, $x_{j+1} \oplus x_a = x_c$ and $x_q \oplus x_a = x_d$ for some indices $c$ and $d$. If all the indices are shifted by some integer $l$, a similar set of equations is formed:

$$x_{a+l-1} \oplus x_{a+l} = x_{a+l-p}$$
$$x_{b+l-1} \oplus x_{b+l} = x_{b+l-p}$$
$$x_{c+l-1} \oplus x_{c+l} = x_{c+l-p}$$
$$x_{d+l-1} \oplus x_{d+l} = x_{d+l-p}$$

Before shifting the indices, $x_a \oplus x_b = x_j$, the original mixer; but, because of the structure of the linear orthomorphic array which is generated by a linear recursive function, $x_{a+l} \oplus x_{b+l} = x_k \neq x_j$, for some index $k$. Adding row $a + l$ to each of the other three will produce a new corruptible subgroup:

$$\theta \oplus \theta = \theta$$
$$x_{k-1} \oplus x_k = x_{k-p}$$
$$x_k \oplus x_{k+1} = x_{k+1-p}$$
$$x_{r-1} \oplus x_r = x_{r-p}$$

where $x_r = x_k \oplus x_{k+1}$. The three non-zero rows will be displaced from their counterparts in $G_0^2$ by a difference in index of $k-j$. □

As an example, consider the orthomorphism in *Fig. 13*. Let $G_0^2$ be:

| 0 | $\theta \oplus \theta$ | $= \theta$ |
|---|---|---|
| 1 | $BEFH \oplus A$ | $= ABEFH$ |
| 2 | $A \oplus B$ | $= AB$ |
| 234 | $ABEFH \oplus AB$ | $= EFH$ |

The mixing transform is $A$. Use row 7 to generate a coset:

| 7 | $F \oplus G$ | $= FG$ |
|---|---|---|
| 50 | $BEH \oplus AG$ | $= ABEGH$ |
| 226 | $AF \oplus BG$ | $= ABFG$ |
| 139 | $ABEH \oplus ABG$ | $= EGH$ |

From the middle column, the mixer is $x_7 \oplus x_{50} = G \oplus AG = A$. Let us now displace the indices by $l = 5$ to obtain:

| 12 | $AEFGH \oplus ABCH$ | $= BCEFG$ |
|---|---|---|
| 55 | $AFGH \oplus ABCFH$ | $= BCG$ |
| 231 | $AEGH \oplus ABCGH$ | $= BCE$ |
| 144 | $AGH \oplus ABCFGH$ | $= BCF$ |

The corresponding subgroup can be found by adding row 12 to the other 3:

| 0 | $\theta \oplus \theta$ | $= \theta$ |
|---|---|---|
| 6 | $E \oplus F$ | $= EF$ |
| 7 | $F \oplus G$ | $= FG$ |
| 239 | $EF \oplus FG$ | $= EG$ |

From either the new coset or the corresponding subgroup, the new mixing transform is $F \oplus F = \theta$.

This process can be applied to subgroups of larger order but is particularly easy to use for constructive corruption with cosets of order 4. The procedure is as follows: Choose an arbitrary corruptible subgroup of order 4. Without loss of generality, it could be:

$$\theta \oplus \theta = \theta$$
$$x_m \oplus x_1 = x_{1-p}$$
$$x_1 \oplus x_2 = x_{2-p}$$
$$x_{q-1} \oplus x_q = x_{q-p}$$

Figure 23

Assume initially that $m = 2^n - 1$ is not a prime (i.e., not a Mersenne prime). Choose some integer $l$ which divides $m$ and use this as the shift of indices as in the proof of Prop. 8. As in that same proof, choose an equation with some index $a$, which is not in the subgroup. Adding it vectorially to each equation in Fig. 23, one obtains a coset:

$$x_{a-1} \oplus x_a = x_{a-p}$$
$$x_{b-1} \oplus x_b = x_{b-p}$$
$$x_{c-1} \oplus x_c = x_{c-p}$$
$$x_{d-1} \oplus x_d = x_{d-p}$$

Figure 24

Next, determine the four values $a \bmod l$, $b \bmod l$, $c \bmod l$, and $d \bmod l$. If there is any duplication, reject this coset and try another, since finding successive similar cosets by using multiples of $l$ as an increment to the indices would lead to a conflict. For example, assume that $a = b \bmod l$. Then, for some integer $g$, $a = b + gl$ so that some subsequent coset would have the same row as a previous coset. Assume now that $a$, $b$, $c$, and $d$ are distinct mod $l$. We can generate $\frac{m}{l}$ similar cosets of the form:

$$x_{a+kl-1} \oplus x_{a+kl} = x_{a+kl-p}$$
$$x_{b+kl-1} \oplus x_{b+kl} = x_{b+kl-p}$$
$$x_{c+kl-1} \oplus x_{c+kl} = x_{c+kl-p}$$
$$x_{d+kl-1} \oplus x_{d+kl} = x_{d+kl-p}$$

Figure 25 where $0 \le k \le \frac{m}{l} - 1$. This will give a total of $\frac{4m}{l}$ equations in the linear orthomorphism as candidates for constructive corruption. In each coset, the mixing transform is $w_{kl} \oplus w_{kl} = \theta$ where $w_{kl} = x_{a+kl} \oplus x_{b+kl}$. From Figs. 23 and 24, $w_0 = x_a \oplus x_b = x_1$ and thus $w_{kl} = x_{1+kl}$. Thus, the set of mixers is $W = \{x_i | i = 1 \bmod l\}$ and $|W| = \frac{m}{l}$.

Proposition 9. For a set of $\frac{m}{l}$ similar corruptible cosets of order 4, if $3|m$, then for any pair $x_i, x_j \in W$ $x_i \oplus x_j \notin W$. If $3|m$ and $x_i \oplus x_j = x_k$ where all are in $W$, then $j - 1 = k - j = \frac{m}{3} \bmod m$.

Proof. $W \cup \theta$ is not a group. If it were, being a subgroup of $Z_n^2$, $|W \cup \theta| = \frac{m}{l} + 1 = 2^k$ for some positive integer $k$. In that case, $\frac{2^n - 1}{l} + 1 = 2^k$ and $2^k = \frac{l-1}{l-2^{n-k}}$. Even if $l - 2^{n-k} | l - 1$ the ratio must be odd while $2^k$ is even for $k > 0$. Without loss of generality, assume $x_1 \oplus x_{1+gl} = x_{1+hl}$ for some integers $g$ and $h$, that is, $x_1$, $x_{1+gl}$ and $x_{1+hl} \in W$. If $hl > m$, then $hl = cl \bmod m$, and $cl < m$ since $l | m$. Keeping in mind that the subscripts are indices of rows in the linear orthomorphic array, it is also true that $x_{1+gl} \oplus x_{1+2gl} = x_{1+gl+hl}$. Assuming that $3|m$, we can combine this equation with the previous one to obtain:

$$x_1 \oplus x_{1+2gl} = x_{1+hl} \oplus x_{1+gl+hl} = x_{1+2hl}$$

More generally, for all integers $j$:

$$x_1 \oplus x_{1+jgl} = x_{1+jhl} \qquad (5)$$

Thus, $x_1 \oplus x_k \varepsilon W$ for all $x_k \varepsilon W$. The same reasoning can be applied to any other $x_i \varepsilon W$ in place of $x_1$. This would imply that $W \cup \theta$ is a group which is a contradiction. Now, suppose $3|m$. Consider a possible sum:

$$x_1 \oplus x_{1+\frac{m}{3}} = x_{1+\frac{2m}{3}}$$

If we use the same procedure which led to Eq. 5:

$$x_{1+\frac{m}{3}} \oplus x_{1+\frac{2m}{3}} = x_{1+\frac{3m}{3}} = x_1$$

Thus, we obtain the same equation. So this cannot be used to generate a group. □

The practical consequences of this are that if two equations are in the same coset, their sum will be elsewhere. They will have a common mixer, say $w_i$, for constructive corruption. That sum will be one of the three nontrivial equations in the subgroup shown on pg. 22. Noting that $S(x) = S'(x) \oplus w_i$ where $S'(x)$ is the original mapping, and $S(x)$ is the resultant mapping after constructive corruption. If that sum equation is not in one of the other corruptible cosets, then from Eq. 4, pg. 17:

$$N(x,y) = w_i \oplus w_i \oplus \theta = \theta$$

and the triple will be linear. If the sum equation is in another of the corruptible cosets, it will have as mixer some $w_j \neq w_i$ so that:

$$N(x,y) = w_i \oplus w_i \oplus w_j = w_j$$

If two equations from different cosets are added, with respective mixers $w_i$ and $w_j$, then there are three possibilities, accordingly as the sum equation is not in a coset, is in one of the original cosets, or is in a third coset:

$$N(x,y) = w_i \oplus w_j \oplus \theta = w_i \oplus w_j \neq \theta$$

$$N(x,y) = w_i \oplus w_j \oplus w_i = w_j \neq \theta$$

$$N(x,y) = w_i \oplus w_j \oplus w_k \neq \theta \quad \text{if } 3 \text{ or } l|m$$

If two equations, one from a coset and one not in any of the cosets, are added, there are three possibilities as in the previous case:

$$N(x,y) = w_i \oplus \theta \oplus \theta = w_i \neq \theta$$

$$N(x,y) = w_i \oplus \theta \oplus w_i = \theta$$

$$N(x,y) = w_i \oplus \theta \oplus w_j = w_i \oplus w_j \neq \theta$$

Lastly, if two equations are added, neither of which is in one of the corruptible cosets, then there are two possibilities, accordingly as their sum is not/or is in a coset:

$$N(x,y) = \theta \oplus \theta \oplus \theta = \theta$$

$$N(x,y) = \theta \oplus \theta \oplus w_i = w_i \neq \theta$$

To minimize residual linearity, it is clear from the above that two conditions are required, namely, that the residual set of equations not included in the cosets be small and contain no subgroups. As an example, consider the same linear orthomorphism in *Fig. 13* on 8-bit binary numbers, and the subgroup and coset on pg. 22:

Row

Index

| 7 | $F \oplus G$ | $= FG$ |
| --- | --- | --- |
| 50 | $BEH \oplus AG$ | $= ABEGH$ |
| 226 | $AF \oplus BG$ | $= ABFG$ |
| 139 | $ABEH \oplus ABG$ | $= EGH$ |

Again we will apply $l = 5$ as the increment to the row indices to generate a sequence of cosets. Note that:

| 7 | = | 2 mod 5 |
| 50 | = | 0 mod 5 |
| 226 | = | 1 mod 5 |
| 139 | = | 4 mod 5 |

Since $m = 2^n - 1 = 255 = 5 \cdot 51$, $l|m$ and the set of row indices above, when incremented by $l = 5$, will never overlap, i.e., $7 + 5i \neq 50 + 5j$ for all integers $i, j$ and the same for the other pairs. Thus, this process will yield 51 cosets of four equations each, a total of 204 equations for modification by constructive corruption. As shown in the proof of Prop. 8, the mixer for the above coset is $G \oplus AG = A$, that is, the sum of the middle terms of the first two equations in the coset. That is the middle term of the first non-zero row in the linear orthomorphism:

$$x_m \oplus x_1 = x_{1-p}$$

or $$BEFH \oplus A = ABEFH$$

Thus, designating coset $5k$ as the coset whose first equation is:

$$x_{6+5k} \oplus x_{7+5k} = x_{7+5k-p}$$

The corresponding mixing transform is:

| Row Index | Coset |
|---|---|
| 4 | $C \oplus D = CD$ |
| 75 | $CDEFGH \oplus ACDEH = AFG$ |
| 37 | $AEH \oplus ABCG = BCEGH$ |
| 142 | $ADFG \oplus BEGH = ABDEFH$ |
| | |
| 9 | $H \oplus ACFG = ACFGH$ |
| 80 | $BEF \oplus CFG = BCEG$ |
| 42 | $AH \oplus ABCFG = BCFGH$ |
| 147 | $ABEF \oplus BCFG = ACEG$ |
| | |
| 14 | $ABDFG \oplus BCEGH = ACDEFH$ |
| 85 | $ABDEFG \oplus BCEFGH = ACDH$ |
| 47 | $ABDG \oplus BCEH = ACDEGH$ |
| 152 | $ABDEG \oplus BCEFH = ACDFGH$ |

$$w_{5k} = x_{7+5k} \oplus x_{50+5k} = x_{1+5k}.$$

So, including the additive identity, $W = \{\theta, x_1, x_6, \cdots, x_{251}\}$ and $|W| = 52$. Since $m = 255 = 3 \cdot 85$, $3|m$, and $x_1 \oplus x_{86} = x_{171}$. As in the proof of Prop. 9, this is the only such triple of numbers all in $W$. In this example:

$$x_1 = A, \; x_{86} = ADH, \text{ and } x_{171} = DH.$$

There are, of course, many ways to select cosets from different subgroups. For example, choose $l = 17$ in the same linear orthomorphism since $m = 255 = 15 \cdot 17$. Consider three cosets (shown below) from three distinct subgroups:

| Row Index | Subgroup |
|---|---|
| 0 | $\theta \oplus \theta = \theta$ |
| 251 | $DEFGH \oplus ACEH = ACDFG$ |
| 252 | $ACEH \oplus ABCDG = BDEGH$ |
| 229 | $ACDFG \oplus BDEGH = ABCEFH$ |
| | |
| 0 | $\theta \oplus \theta = \theta$ |
| 1 | $BEFH \oplus A = ABEFH$ |
| 2 | $A \oplus B = AB$ |
| 234 | $ABEFH \oplus AB = EFH$ |
| | |
| 0 | $\theta \oplus \theta = \theta$ |
| 6 | $E \oplus F = EF$ |
| 7 | $F \oplus G = FG$ |
| 239 | $EF \oplus FG = EG$ |

TELEDYNE PROPRIETARY

|   |   |   |        | Mixers |
|---|---|---|--------|--------|
| 4  | ≡ | 4  | mod 17 | $x_{251} = ACEH$ |
| 75 | ≡ | 7  | mod 17 |   |
| 37 | ≡ | 3  | mod 17 |   |
| 142| ≡ | 6  | mod 17 |   |
|    |   |    |        |   |
| 9  | ≡ | 9  | mod 17 | $x_1 = A$ |
| 80 | ≡ | 12 | mod 17 |   |
| 42 | ≡ | 8  | mod 17 |   |
| 147| ≡ | 11 | mod 17 |   |
|    |   |    |        |   |
| 14 | ≡ | 14 | mod 17 | $x_6 = F$ |
| 85 | ≡ | 0  | mod 17 |   |
| 47 | ≡ | 13 | mod 17 |   |
| 152| ≡ | 16 | mod 17 |   |

Since all row indices are different mod 17, there will be no overlap using increment $l = 17$. This process will generate $3 \times 15 = 45$ cosets or 180 equations as candidates for constructive corruption. The set of mixers $$W = \{\theta, x_1, x_{18}, \cdots, x_{239}; x_6 x_{23}, \cdots, x_{244};$$
$$x_{13}, x_{30}, \cdots, x_{251}\}$$

and $$|W| = 46.$$

There are many other possibilities. For example, one could use the subgroup of order 8 in *Fig. 14*. Its cosets are completely corruptible, *i.e.*, they have a group a four mixing transformations (see Definition 4 pg. 11). Applying Prop. 7 and using the second ex-ample on pg. 16, one can select a coset of eight equations of which six are to be nonlinearized, as follows:

| Row Index |   |   |   |   |   | Mixer |
|---|---|---|---|---|---|---|
| 6   | E    | ⊕ | F   | = | EF     | $x_0 = \theta$ |
| 169 | AE   | ⊕ | BF  | = | ABEF   | $x_3 = C$ |
| 95  | ACE  | ⊕ | BDF | = | ABCDEF | $x_{235} = BC$ |
| 215 | CE   | ⊕ | DF  | = | CDEF   | $x_2 = B$ |
| 121 | ABE  | ⊕ | BCF | = | ACEF   | $x_3 = C$ |
| 155 | BE   | ⊕ | CF  | = | BCEF   | $x_0 = \theta$ |
| 91  | ABCE | ⊕ | BCDF| = | ADEF   | $x_{235} = BC$ |
| 209 | BCE  | ⊕ | CDF | = | BDEF   | $x_2 = B$ |

Using an increment $l = 17$, we can obtain 15 disjoint sets of six rows each from:

TELEDYNE PROPRIETARY

| Row Index | | Mixer |
|---|---|---|
| 169 = 16 mod 17 | | $x_3$ |
| 95 = 10 mod 17 | | $x_{235}$ |
| 215 = 11 mod 17 | | $x_2$ |
| 121 = 2 mod 17 | | $x_3$ |
| 91 = 13 mod 17 | | $x_{235}$ |
| 209 = 5 mod 17 | | $x_2$ |

Shifting row indices by 7, one can obtain 15 more disjoint sets of six rows each from:

| Row Index | | Mixer |
|---|---|---|
| 176 = 6 mod 17 | | $x_{10}$ |
| 102 = 0 mod 17 | | $x_{242}$ |
| 222 = 1 mod 17 | | $x_9$ |
| 128 = 9 mod 17 | | $x_{242}$ |
| 98 = 3 mod 17 | | $x_{10}$ |
| 216 = 12 mod 17 | | $x_9$ |

The combination will provide 180 rows or equations for nonlinerization, but the set of mixing transformations $W$ will no longer be free of additive triples, so that there will be some group structure among the mixers.

The process of obtaining corruptible cosets from disjoint subgroups is slightly more complicated when $2^n - 1 = m$ is a prime since there is a discontinuity when shifting the row indices across $m$. As an example, consider the block size 7 maximal length linear orthomorphism defined by the generating function:

$$x_k = x_{k-7} \oplus x_{k-5} \oplus x_{k-4} \oplus x_{k-3} \oplus x_{k-2} \oplus x_{k-1}.$$

As in *Fig. 13* and on pg. 15, we can let $\{A,B,C,D,E,F,G\}$ be an arbitrary, complete, linearly independent set of 7-bit binary numbers. As before, the notation $ABC$ is shorthand for $A \oplus B \oplus C$. A partial listing of the resulting equations is as follows:

| Row Index | | | |
|---|---|---|---|
| 0 | $\theta \oplus \theta$ | = | $\theta$ |
| 1 | $BCDEFG \oplus A$ | = | $ABCDEFG$ |
| 2 | $A \oplus B$ | = | $AB$ |
| 3 | $B \oplus C$ | = | $BC$ |
| 4 | $C \oplus D$ | = | $CD$ |
| 5 | $D \oplus E$ | = | $DE$ |
| 6 | $E \oplus F$ | = | $EF$ |
| 7 | $F \oplus G$ | = | $FG$ |
| 8 | $G \oplus ACDEFG$ | = | $ACDEF$ |
| ⋮ | ⋮ | | ⋮ |
| 126 | $AFG \oplus ABCDEF$ | = | $BCDEG$ |
| 127 | $ABCDEF \oplus BCDEFG$ | = | $AG$ |

Figure 26

A typical corruptible subgroup of order 4 is:

| Row Index | | | |
|---|---|---|---|
| 0 | $\theta \oplus \theta$ | = | $\theta$ |
| 1 | $BCDEFG \oplus A$ | = | $ABCDEFG$ |
| 2 | $A \oplus B$ | = | $AB$ |
| 110 | $ABCDEFG \oplus AB$ | = | $CDEFG$ |

From this we can construct the following coset:

TELEDYNE PROPRIETARY

Row
Index
| | | | |
|---|---|---|---|
| 8 | G | $\oplus$ ACDEFG | = ACDEF |
| 91 | BCDEF | $\oplus$ CDEFG | = BG |
| 109 | AG | $\oplus$ ABCDEFG | = BCDEF |
| 127 | ABCDEF | $\oplus$ BCDEFG | = AG |

Although $5 \nmid 127$ it is a possibility for incremental spacing if we find a coset with different row indices mod 5. In this case:

8 ≡ 3 mod 5
91 ≡ 1 mod 5
109 ≡ 4 mod 5
127 ≡ 2 mod 5

Displacing these indices by 5, we obtain:

13 ≡ 3 mod 5
96 ≡ 1 mod 5
114 ≡ 4 mod 5
5 ≡ 0 mod 5

Displacing these indices by another 15, we obtain:

28 ≡ 3 mod 5
111 ≡ 1 mod 5
2 ≡ 2 mod 5
20 ≡ 0 mod 5

Displacing these indices by another 20, we obtain:

48 ≡ 3 mod 5
4 ≡ 4 mod 5
22 ≡ 2 mod 5
40 ≡ 0 mod 5

Displacing these indices by another 80, we obtain:

1 ≡ 1 mod 5
84 ≡ 4 mod 5
102 ≡ 2 mod 5
120 ≡ 0 mod 5

We can go one step further with a final increment of 10:

11 ≡ 1 mod 5
94 ≡ 4 mod 5
112 ≡ 2 mod 5
3 ≡ 3 mod 5

This process has produced 27 disjoint cosets or 104 out of 127 rows for the constructive corruption process. The above procedure has used up all rows of indices 0 or 3 mod 5. So no further corruptible cosets exist with all different row indices. However, 15 rows of index 1 mod 5, 2 of index 2 mod 5, and 2 of index 4 mod 5 remain. The mixing transforms are the sums of the numbers in the middle columns of the first two rows in each coset, that is:

$x_8 \oplus x_{91} = x_1, x_{13} \oplus x_{96} = x_6, \cdots, x_6 \oplus x_{89} = x_{126}$ and $x_{11} \oplus x_{94} = x_4$.

Thus the set of mixing transforms is $W = \{\theta, x_{1+5k}, x_4\}$ for $0 \le k \le 25$ and $|W| = 28$. Note that in this case, the conditions of Prop. 9 do not hold, that is, $l \nmid m$ and there are some pairs in $W$ whose sums are also in $W$.

The issue of maximality has not been addressed here. However, in many cases the nonlinear orthomorphisms generated by constructive corruption of disjoint cosets (and by other methods) have been maximal. So far it is still an open question as to the necessary conditions to achieve this. However, the coset decomposition patterns which give maximality as well as nonlinearity do so independently of the key variable, that is, independently of the complete linearly independent set acted on by the generating function as in the example in Fig. 13.

There are many other ways of selecting corruptible cosets for the nonlinearization process. Mixing cosets of different orders can provide a mechanism for including almost all of the equations in the linear array but

TELEDYNE PROPRIETARY this must be balanced against the structure of the set of mixing transforms. The total number of orthomorphisms on $n$-bit numbers is not known.

REFERENCES

1. C. Adams and S. Tavares, "The Structured Design of Cryptographically Good S-Boxes," *J. of Cryptology* (1990) 3:27 - 41.

2. S. Even and Y. Mansour, "A Construction of A Cipher from A Single Pseudorandom Permutation," ASIACRYPT '91.

3. Solomon W. Golomb, "Shift Register Sequences," Aegean Park Press, 1982.

4. Marshall Hall and L.J. Paige, "Complete Mappings of Finite Groups," *Pacific Journal of Mathematics*, 5 (1955), 541 - 549.

5. N. Jacobson, "Lectures in Abstract Algebra," Vol. 1, D, Van Nostrand Co., 1964.

6. D.M. Johnson, A.L. Dulmage, and N.S. Mendelsohn, "Orthomorphisms of Groups and Orthogonal Latin Squares," *Canadian Journal of Mathematics*, 13 (1961), 356 - 372.

7. L. Mittenthal, "Block Substitutions Using Orthomorphic Mappings," *Advances in Mathematics* (to appear).

8. Henk C.A. Van Tilborg, "An Introduction to Cryptology," Kluwer Academic Publishers, 1988.

9. Teledyne Electronics report, "Orthomorphic Block substitutions," July 1988.

10. Teledyne Electronics report, "Nonlinear Dynamic Substitution Devices As Mechanisms for Block Substitutions," July 1991, Teledyne Proprietary.

11. Teledyne Electronics report, "Constructive Corruption," February 1992, Teledyne Proprietary.

12. Teledyne Electronics report, "Constructive Corruption II," June 1992, Teledyne Proprietary.

TELEDYNE PROPRIETARY

Appendix 1, Glossary of Special Terms

All the following definitions are specialized to $n$-bit binary numbers, under the operation of bitwise addition modulo 2 (XORing) and to bijective mappings on these numbers.

Affine Mapping: A bijective mapping, $T$ on $Z_2^n$ such that $T(x) \oplus T(y) = T(x \oplus y) \oplus c$ for some constant $c$ and all $x, y, \varepsilon\, Z_2^n$. In engineering, this is frequently referred to as linear. Here, the term linear is reserved for the case where $c = \theta$, the additive identity.

Balanced Mapping: Let $H_i$ be a maximal subgroup of $Z_2^n$, i.e., $H_i$ is a subgroup of order $|H_i| = 2^{n-1}$. $Z_2^n = H_i \cup \overline{H}_i$. If a bijective mapping $T$ has the property $|TH_i| = |T\overline{H}_i| = 2^{n-1}$ for all maximal subgroups, $T$ is said to be a balanced mapping. (See Section 2, pg. 2.)

Completely Corruptible: It is a corruptible coset with a maximal number of mixing transformations. If the order of the completely corruptible coset is $2^k$, then the order of the corresponding set of mixing transforms is $2^{k-1}$. (See Section 6, pg. 9.)

Constructive Corruption: It is the process of converting a linear orthomorphism to a nonlinear orthomorphism by rearranging the order of the blocks in two columns of the linear array of equations (*Fig. 2*), holding the third column fixed, while preserving equality in each row. (See Section 5, Definition 1.)

Corruptible Set: A set of equations, usually a coset or a subgroup, which can be nonlineraized as a self-contained set, by the process of constructive corruption. (See Section 5, Definition 2.)

Dynamic Substitution Device: A locally-coined term for a block substitution device or S-box, which uses an orthomorphism on $Z_2^n$, the $n$-bit binary numbers, for encryption or decryption.

Generating Function: A recursive function of the form:
$$x_k = x_{k-n} \oplus x_{k-i} \oplus \cdots$$
which, when applied to a complete linearly independent set of $n$-bit numbers, defines a linear orthomorphism as in *Fig. 2*. These are the same as generating functions of linear feedback shift registers but with domain $Z_2^n$ rather then individual binary bits. They are primitive polynomials in the Galois field $GF(2^n)$.

Linear Array: An array of $2^n$ equations which represents a linear (automorphic) orthomorphism on $Z_2^n$. (See *Fig. 2*.)

TELEDYNE PROPRIETARY

Linear Orthomorphism: An orthomorphism where the mapping $Z_2^n \to Z_2^n$ is linear.

Maximal Orthomorphism: An orthomorphism on $Z_2^n$ which can be represented as a permutation of $Z_2^n$ with no cycles except for a single fixed point.

Mixer: See Mixing Transformation.

Mixing Transformation/Transform: An equation of the form $w \oplus w = \theta$ used in the process of constructive corruption. It is added vectorially modulo 2 to a corruptible set of equations in a linear orthomorphism to obtain a nonlinear orthomorphism. (See Section 5, Definition 3.)

Orthomorphism: A one-to-one mapping on $Z_2^n$ such that each number added modulo 2 to its image, generates all of $Z_2^n$, that is, $R: Z_2^n \to Z_2^n$ such that:

$$\{x \oplus R(x) | x \varepsilon Z_2^n\} = Z_2^n.$$

Orthomorphic Permutation: The permutation on $Z_2^n$ defined by an orthomorphism.

Row: A single equation in the array of equations representing an orthomorphism on $Z_2^n$. (See *Fig. 1*.)

Shift: The displacement between columns of n-bit numnbers in the array of equations representing a linear orthomorphism. Each column has the same order but a different starting point. (See *Figs. 2* and *3*.)

Similar Sets: Subsets of equations in a linear array that have the same relative spacing. (See Section 9, Definition 5.)

Vector: A row or equation in a linear array. It can be thought of as a vector in three dimensions with coefficients in $Z_2^n$.

TELEDYNE PROPRIETARY

Appendix 2, Symbols Used Frequently

| | |
|---|---|
| $\oplus$ | Addition modulo 2 (XORing) |
| $\theta = 00\cdots0$ | Additive identity |
| $Z_2^n$ | Group of all $n$-bit binary numbers |
| $GF(2^n)$ | Galois field of polynomials of degree $n$ with binary coefficients |
| $G^n$ | A set of $2^n$ equations representing a linear orthomorphism on $Z_2^n$. $G^n$ is a group (*Fig. 2*). |
| $G_0^k$ | A subgroup of $G^n$ of order $2^k$. |
| $G_i^k$ | A coset of $G_0^k$. |
| $R_k \setminus R_{k-1}$ | $R_k \cap \overline{R}_{k-1}$ |
| $a \nmid b$ | $a$ does not divide $b$. |
| $W_k$ | The group of mixing transforms associated with $G_0^k$. |
| $\overline{G}^k$ | A particular coset of $G_0^k$, defined as the relative complement $G_0^{k+1} \setminus G_0^k$. |

APPENDIX VII

**BLOCK SUBSTITUTIONS
USING ORTHOMORPHIC MAPPINGS**

PREPARED BY:

BLAKELY, SOKOLOFF, TAYLOR & ZAFMAN
12400 Wilshire Boulevard
Seventh Floor
Los Angeles, California 90025
(213) 207-3800

*I hereby certify that this correspondence is being deposited with the United States Postal Service as Express Mail (Label No. RB984587912US) in an envelope addressed to: Commissioner of Patents and Trademarks, Washington, D.C. 20231 on: May 3, 1994*

Krystle P. DiPaolo          May 3, 1994
                            Date

ABSTRACT

Block substitutions, or bijective mappings of $n$-bit binary $n$-tuples, are widely used in cryptography. There is a continuing interest in finding such mappings which are resistant to cryptanalysis. Orthomorphisms can be used for this purpose, and they are shown to be characterized by the property that each maximal subgroup of the group of binary $n$-tuples is mapped half into itself and half into its complement.

1. INTRODUCTION

The applications of modern cryptography have expanded from securing governmental communications to uses in business, personal communications, and the entertainment industry. The problem of maintaining security has been exacerbated by the application of modern computing technology to cryptanalysis. For reasons of convenience, much data is translated into the form of binary digits before encryption. A commonly used tool in cryptography is a block substitution device or $S$-box which effects a 1-to-1 mapping of binary n-tuples onto themselves. There are many ways in which such mappings can be defined, but a common goal is to employ mappings which are resistant to cryptanalysis. It is also frequently useful to perform the encryption/decryption processes at high data rates. Orthomorphisms turn out to have useful properties when used as block substitutions.

Let $G_n$ be the group of binary n-tuples under coordinatewise addition modulo 2. An orthomorphism[1] of $G_n$ is a 1-to-1 mapping $R:G_n \to G_n$ such that $\{x + R(x)\}_{x \varepsilon G_n} = G_n$.

The term orthomorphism, as used here, was apparently originated by Johnson, Dulmage, and Mendelsohn in 1960 [4]. The application was to the construction of mutually orthogonal Latin squares which are widely used in experimental design and is a subject with a long history. Since then a number of other people working in this field, such as Bose, Roth, Federer, Peters, Parker, et. al., have adopted this term but it has hardly become a public watchword. Paige and Hall used almost the same definition for the term *complete mapping* around 1950 [2]. Their work was more concerned with the abstract group theory aspects. This work in turn, without the name, goes back to H. B. Mann in 1942. As will emerge below, orthomorphisms, or complete mappings, are also closely connected to shift register sequences and the efficient construction of block substitutions. The main result of this paper is a characterization of orthomorphisms by a kind of balance property.

2. CONSTRUCTING ORTHOMORPHISMS OF BINARY N-TUPLES

Let $R:G_n \to G_n$ be an orthomorphism. Let $S(x) = x + R(x)$. By definition, $S(x)$ is a permutation of $G_n$ and, so, can be described in terms of its cycles:

$$(x_1, x_2, ... x_a) (x_b, ... x_{b+c}) ...$$

where $S(x_1) = x_2$, etc. It is helpful to picture the basic equations $S(x) + x = R(x)$ in an array arranged in order of the cycles. Suppose (as will often be the case in examples) that S fixes the identity $\Theta$ of $G_n$, and suppose the cycles are:

$$(\Theta) (x_1, x_2, ... x_a) (x_b, ... x_{b+c}) ... .$$

The equation $S(x) + x = R(x)$ can be displayed as shown in Fig. 1 where the symbol $\oplus$ means coordinatewise addition modulo 2. This gives one method of displaying an orthomorphism. The next step is to select a systematic process of generating orthomorphisms on $G_n$.

The set of equations representing the orthomorphism can be thought of as a set of rows in a $3 \times 2^n$ matrix or a set of $2^n$ vectors on a three-dimensional space. As an

---

[1] There are at least three other definitions of the term orthomorphism, one each in cartography, rheology, and the theory of function algebras.

example, an orthomorphism can be constructed from any set of n linearly independent n-bit numbers. Designate these as $\{x_1, ..., x_n\}$. Using this standardized format, these define $n - 1$ equations on which to build an orthomorphism as shown in Fig.2

$$
\begin{array}{ccccc}
\ominus & \oplus & \ominus & = & \ominus \\
x_a & \oplus & x_1 & = & z_1 \\
x_1 & \oplus & x_2 & = & z_2 \\
& & \vdots & & \\
x_{a-1} & \oplus & x_a & = & z_a \\
x_{b+c} & \oplus & x_b & = & z_b \\
x_b & \oplus & x_{b+1} & = & z_{b+1} \\
& & \vdots & & \\
x_{b+c-1} & \oplus & x_{b+c} & = & z_{b+c} \\
& & \vdots & &
\end{array}
$$

Figure 1

$$
\begin{array}{ccccc}
\ominus & \oplus & \ominus & = & \ominus \\
-- & \oplus & x_1 & = & -- \\
x_1 & \oplus & x_2 & = & z_2 \\
x_2 & \oplus & x_3 & = & z_3 \\
& & \vdots & & \\
x_{n-1} & \oplus & x_n & = & z_n \\
x_n & \oplus & -- & = & --
\end{array}
$$

Figure 2

The next step is to select a candidate for $x_{n+1}$ such that $\{x_2, x_3, ..., x_{n+1}\}$ and $\{z_2, z_3, ..., z_{n+1}\}$ are each linearly independent sets. To construct the remaining rows of the array, take modulo 2 sums of pairs of rows 2 thru $n + 1$, sums of triples of these rows, *etc*, and, finally, the sum of all these $n$ rows. The number of additional rows constructed in this manner is:

$$\binom{n}{2} + \binom{n}{3} + \cdots + \binom{n}{n} = \sum_{k=0}^{n} \binom{n}{k} - \binom{n}{1} - \binom{n}{0} = 2^n - (n+1)$$

Figure 3

So, the array is completely specified by this process shown. Because each of the $z_i$, and $x_i$ for $i > n + 1$ are different linear combinations of the generators, they will all be distinct, and the sets of $2^n$ elements of $\{z_i\}$, and $\{x_i\}$ will each be a permutation of the $n$-digit binary numbers.

As mentioned above, each equation could be thought of as a vector over $G_n \times G_n \times G_n$ with addition defined by:

$$\begin{array}{c} x_{k-1} \oplus x_k = z_k \\ \underline{x_{j-1} \oplus x_j = z_j} \\ (x_{k-1} \oplus x_{j-1}) \oplus (x_k \oplus x_j) = (z_k \oplus z_j) \end{array}$$

In this sense, the set of vectors (equations) also form an additive group. An orthomorphism could also be constructed in this way with some n-tuple other than $\Theta$ fixed, but the set of vectors (equations) would no longer form a group. In either case, for convenience, the newly generated set of equations representing the orthomorphism could be arranged in the order of the permutation $S(x)$ as illustrated in Fig. 1.

Using the construction described above, in selecting $x_{n+1}$, there is some linear function $x_{n+1} = f(x_1, x_2, ..., x_n) = x_1 \oplus g(x_2, ..., x_n)$ because, if $x_{n+1}$ does not depend on $x_1$, the set $\{x_2, ..., x_{n+1}\}$ could not be linearly independent. This leads to the following:

<u>Definition:</u> If the function defined by $x_{n+1} = f(x_1, ..., x_n)$ can be applied recursively, $x_k = f(x_{k-n}, ..., x_{k-1})$ to generate the entire orthomorphic mapping, it is termed maximal.

Clearly, this is equivalent to specifying that $S$, considered a permutation, has a fixed point and a single cycle of length $m = 2^n - 1$. The function of $f(x_{k-n}, ..., x_{k-1})$ can be thought of as a generating function for a maximal orthomorphism.

3. ORTHOMORPHISMS WHICH ARE AUTOMORPHISMS

<u>Proposition 1:</u> A maximal orthomorphism $S$ on $G_n$ is an automorphism if and only if it can be represented by a set of equations which, when viewed as vectors and added componentwise, form a group.

Proof: Assume that $S$ is a maximal orthomorphism represented by such a set of equations. $\Theta \oplus \Theta = \Theta$ is the identity. The other equations are of the form:
$$x_{i-1} \oplus x_i = x_{i-p}.$$
Assume $x_i = x_k \oplus x_j$; then, by the group property $x_{i-1} = x_{k-1} \oplus x_{j-1}$.
$$Sx_k \oplus Sx_j = x_{k-1} \oplus x_{j-1} = x_{i-1} = Sx_i = S(x_k \oplus x_j)$$
Thus, $S$ is a linear bijective mapping and, hence, an automorphism.

Conversely, if S is an automorphism, it is linear. Any mapping $G_n \to G_n$ can be represented by a set of equations. Because it is linear, $S\Theta = \Theta$ and $\Theta \oplus \Theta = \Theta$ is one of the equations. Assuming that as a permutation, $S$ is maximal in the sense that it has no cycles except $\Theta \to \Theta$, $S = (\Theta)(x_1, x_2, ..., x_m)$ for some arrangement of the $n$-bit numbers, and $Sx_i = x_{i-1}$. This defines equations of the form:
$$x_{i-1} \oplus x_i = z_i.$$
Let $x_k = x_i \oplus x_j$. By linearity, $x_{k-1} = Sx_k = S(x_i \oplus x_j) = Sx_i \oplus Sx_j = x_{i-1} \oplus x_{j-1}$.
Then, $z_i \oplus z_j = (x_{i-1} \oplus x_i) \oplus (x_{j-1} \oplus x_j) = x_{k-1} \oplus x_k = z_k$. Thus, the set of equations, viewed as vectors and under the operation of componentwise addition modulo 2, form a group. □

Maximality is not a requirement. The set of equations representing $S$ may be composed of subsets which are subgroups and correspond to cycles in the permutation $S$. Since the set of automorphisms form a group, $S^k$ is also an automorphic orthomorphism. In this case, the orthogonal orthomorphism $Rx = z$ has special properties.

Proposition 2: If $S$ is a maximal automorphic orthomorphism on $G_n$ then the orthogonal orthomorphism $R$ defined by $Rx_i = z_i$ is also an automorphic orthomorphism and has the form $R = S^p$ for some integer $p$.

Proof: $S$ is defined by $Sx_i = x_{i-1}$ in the array of equations:

$$\begin{array}{ccccc}
\Theta & \oplus & \Theta & = & \Theta \\
x_m & \oplus & x_1 & = & z_1 \\
x_1 & \oplus & x_2 & = & z_2 \\
& & \vdots & & \\
x_{m-1} & \oplus & x_m & = & z_m
\end{array}$$

Because the array is a group, it can be regenerated by taking sums of successive pairs of rows to obtain:

$$
\begin{array}{ccccc}
\ominus & & \oplus & & \ominus & = & \ominus \\
(x_1 \oplus x_m) & & \oplus & & (x_1 \oplus x_2) & = & (z_1 \oplus z_2) \\
(x_1 \oplus x_2) & & \oplus & & (x_2 \oplus x_3) & = & (z_2 \oplus z_3) \\
& & & & \cdot & & \\
& & & & \cdot & & \\
(x_{m-1} \oplus x_m) & & \oplus & & (x_m \oplus x_1) & = & (z_m \oplus z_1)
\end{array}
$$

The rows in the new array must be the same (but rearranged) as those in the original. From the diagonal structure on the left, the order of the rows must be the same although the starting point in the sequence of rows has been shifted by some unspecified number of positions. Column 2 in the new array is:

$$
\begin{array}{c}
z_2 \\
z_3 \\
\cdot \\
\cdot \\
\cdot \\
z_1
\end{array}
$$

which is the same as column 3 in the original array. So column 3 in the original array is the same as column 2 in the original array but shifted by some unspecified number of positions $p$. Thus it takes the form shown in Fig. 3 below:

$$
\begin{array}{ccccc}
x_m & \oplus & x_1 & = & x_{1-p} \\
x_1 & \oplus & x_2 & = & x_{2-p} \\
& & \cdot & & \\
& & \cdot & & \\
& & \cdot & & \\
x_{m-1} & \oplus & x_m & = & x_{m-p}
\end{array}
$$

Figure 3

By the same method, it can be shown that if $S$ is replaced by some power $S^k$, $R$ is replaced by another power $S^p k$, and the array of equations, omitting the identity, takes the form shown in Fig. 4.

$$
\begin{array}{ccccc}
x_{1-k} & \oplus & x_1 & = & x_{1-p_k} \\
x_{2-k} & \oplus & x_2 & = & x_{2-p_k} \\
x_{m-k} & \oplus & x_m & = & x_{m-p_k}
\end{array}
$$

Figure 4

It can be shown that $p$ is determined by the generating function $x_k = f(x_{k-n}, ..., x_{k-1})$, that $n \leq p \leq 2^n - n$, and that $p_k$ takes on all integer values from 1 to $2^n - 2$ because k varies over the same range. The relationship of $p_k$ to $p$ depends, in part, on the generating function. (The details are omitted here.) It also results that these generating functions are associated with those of linear feedback shift registers as described in [1].

Proposition 3: Generating functions of maximal automorphic orthomorphisms on $G_n$ are identical to generating functions for $n$-stage, maximal length linear feedback shift registers.

Proof: A generating function for a maximal automorphic orthomorphism has the form:

$$x_k = f(x_{k-n}, ..., x_{k-1}) = a_n x_{k-n} \oplus ... \oplus a_1 x_{k-1}$$

and each $a_j = 0$ or 1 except that $a_n = 1$ because otherwise, the set $\{x_2, x_3, ..., x_{n+1}\}$ is not linearly independent. Because the orthomorphism is maximal, this generating function recursively generates all the remaining $2^n - 1 - n$, non-zero, $n$-bit numbers from the first set of $n$ linearly independent numbers $\{x_1, ..., x_n\}$. Because $f$ is a linear function on $G_n = Z_2^1 \times Z_2^2 \times ... \times Z_2^n$, $x_k = f | Z_2^1 \times f | Z_2^2 \times ..., \times f | Z_2^n$ where $f$ restricted to $Z_2^j$ means $f$ acting on the digits of $\{x_{k-n}, ..., x_{k-1}\}$ in the $j$th binary place. Thus, the function $f$ acting on $n$ binary digits generates recursively a sequence of binary digits of length $2^n - 1$ including the original $n$. This is a maximal length linear feedback shift register (LFSR) sequence for $n$ stages. Conversely, a maximal length LFSR generating function acting on any n binary digits which are not all zero generates the same sequence of $2^n - 1$ binary digits but with individual starting positions. Beyond $2^n - 1$ it will repeat the same sequence in each column of digits, and, thus, repeat the first $2^n - 1$ $n$-bit numbers. Assume that the $n$-bit numbers are not all distinct, in particular $x_k = x_j$ for $k \neq j$. $x_k = f(x_{k-n}, ..., x_{k-1})$ and $x_j = f(x_{j-n}, ..., x_{j-1})$. Because each number is generated recursively, working backwards, there are linear functions $g$ and $h$ such that $x_k = g(x_1, ..., x_n)$ and $x_j = h(x_1, ..., x_n)$. Because the set $\{x_1, ..., x_n\}$ is linearly independent, $g(x_1, ..., x_n) = h(x_1, ..., y_n)$ implies $g = h$ and $k = j$. □

4. CHARACTERIZATION OF ORTHOMORPHISMS OF BINARY NUMBERS

Of course, there are many orthomorphisms on $G_n$ which are not automorphisms. Some, at least, can be generated systematically from the automorphisms. For example, consider an automorphic orthomorphism defined by a set of equations as in Fig. 3. To each equation considered a vector, add componentwise modulo 2 the equation $x_j \oplus x_j = \Theta$ for any $x_j \neq \Theta$. This replaces the mapping $Sx_i = x_{i-1}$ with $S'(x_i \oplus x_j) = x_{i-1} \oplus x_j$. It has the single fixed point $S'(\Theta \oplus x_j) = S(x_j) = x_j$. Correspondingly, $R'(x_i \oplus x_j) = x_{i-p}$.

Let $x_k = x_i \oplus x_j$.

Then:

$$R'x_k = R'(x_i \oplus x_j) = x_{i-p} = Rx_i = R(x_k \oplus x_j) = Rx_k \oplus Rx_j$$

and $$S'x_k = Sx_i \oplus x_j = S(x_k \oplus x_j) \oplus x_j = Sx_k \oplus [Sx_j \oplus x_j] = Sx_k \oplus Rx_j.$$

Since $Rx_j$ is a constant, both $S'$ and $R'$ are affine mappings and, thus, orthogonal orthomorphisms, neither of which is an automorphism. If this same modification is applied to the set of equations in Fig. 4, then $S^k$ and $S^{p_k}$ are also replaced by a pair of affine orthogonal orthomorphisms.

There are non-linear orthomorphisms that are not affine. A simple example is:

| | | | | |
|---|---|---|---|---|
| 0000 | ⊕ | 0000 | = | 0000 |
| 1010 | ⊕ | 0010 | = | 1000 |
| 0010 | ⊕ | 1110 | = | 1100 |
| 1110 | ⊕ | 1111 | = | 0001 |
| 1111 | ⊕ | 1101 | = | 0010 |
| 1101 | ⊕ | 0110 | = | 1011 |
| 0110 | ⊕ | 0011 | = | 0101 |
| 0011 | ⊕ | 1001 | = | 1010 |
| 1001 | ⊕ | 0100 | = | 1101 |
| 0100 | ⊕ | 0111 | = | 0011 |
| 0111 | ⊕ | 0001 | = | 0110 |
| 0001 | ⊕ | 1000 | = | 1001 |
| 1000 | ⊕ | 1100 | = | 0100 |
| 1100 | ⊕ | 1011 | = | 0111 |
| 1011 | ⊕ | 0101 | = | 1110 |
| 0101 | ⊕ | 1010 | = | 1111 |

Figure 5

It is easy to verify that the orthogonal orthomorphisms defined by Fig. 5 are not affine and that squares of those orthomorphisms, viewed as permutations, are not orthomorphisms.

It is straightforward to enumerate the number of maximal automorphisms on $G_n$. The generating functions can be represented as polynomials of degree $n$ with coefficients in $Z_2$. By Theorem 3.16 of [5] these are primitive polynomials since they also generate maximal length LFSR sequences. The number of such primitive polynomials is related to Euler's totient function $\Phi(m)$ where $m = 2^n - 1$. In addition, it is then necessary only to calculate the number of linearly independent sets in $G_n$ taking into account the order.

It is not clear how to enumerate the general non-linear orthomorphisms, to generate all of them, or to fully account for their properties. However, there is at least one common thread. The orthomorphisms on $G_n$, whether automorphisms or not can be characterized by a simple property. For convenience, the following definition is made:

Definition: A bijective mapping on $G_n$ is said to be balanced if it maps each maximal subgroup, that is, each subgroup of order $2^{n-1}$, half into itself and half into its complement.

Theorem: A bijective mapping on $G_n$ is an orthomorphism if and only if it is balanced.

Proof: As shown in the introduction, any bijective mapping $TG_n \to G_n$, where $Tx_i = z_i$, can be written in the form $y_i \oplus x_i = z_i$. This can be represented by the addition modulo 2 of two column matrices to obtain a third:

$$\begin{pmatrix} y_1 \\ y_2 \\ \cdot \\ \cdot \\ \cdot \end{pmatrix} \oplus \begin{pmatrix} x_1 \\ x_2 \\ \cdot \\ \cdot \\ \cdot \end{pmatrix} = \begin{pmatrix} z_1 \\ z_2 \\ \cdot \\ \cdot \\ \cdot \end{pmatrix}$$

The $y_i$ matrix represents the mapping $T$. Each matrix will have $2^n$ entries. For the $x_i$ and $z_i$ matrices, each of the $2^n$ $n$-bit binary numbers will appear exactly once because $T$ is bijective. Assume that $T$ is balanced. It is necessary only to show that the $2^n$ entries $y_i$ are all distinct.

By the fundamental theorem of homomorphisms [3], the mapping $G_n \to G_n/N$ where $N$ is an invariant subgroup of $G_n$, is the natural homomorphism of $G_n$ onto the quotient group $G_n/N$. Each $N_i = \{\Theta, x_i\}$ is an invariant subgroup of two elements. There are $m = 2^n - 1$ such subgroups $N_i$. Each $G_n/N_i$ is isomorphic to a subgroup in $G_n$ of order $2^{n-1}$, i.e., a maximal subgroup. Thus, there are $m = 2^n - 1$ maximal subgroups $H_1, H_2, ..., H_m$. Since $T$ is balanced, it will map each $H_i$ such that:

$$|TH_i \cap H_i| = |TH_i \cap \overline{H}_i| = \frac{1}{2}|H_i|,$$

where $\overline{H}$ is the complement of $H_i$. Since $H_i$ is isomorphic to $G_{n-1}$, $$x, y \ \varepsilon \ H_i \rightarrow x \oplus y \ \varepsilon \ H_i, x, y \ \varepsilon \ \overline{H}_i \rightarrow x \oplus y \ \varepsilon \ H_i,$$

and $$x \ \varepsilon \ H_i, y \ \varepsilon \ \overline{H}_i \rightarrow x \oplus y \ \varepsilon \ \overline{H}_i.$$

Thus, we can arrange the matrices in blocks that correspond to the maximal subgroup $H_i$ and its complement.

$$\overset{y}{\begin{pmatrix} H_i \\ \overline{H}_i \\ \overline{H}_i \\ H_i \end{pmatrix}} \oplus \overset{x}{\begin{pmatrix} H_i \\ H_i \\ \overline{H}_i \\ \overline{H}_i \end{pmatrix}} = \overset{z}{\begin{pmatrix} H_i \\ \overline{H}_i \\ H_i \\ \overline{H}_i \end{pmatrix}}$$

Since $T$ is balanced, each of the four blocks must consist of $2^{n-2}$ numbers. The $n$-bit numbers may be designated $y_0 = \Theta, y_1, y_2, ..., y_m$ in the $y$ matrix, and each will appear with some multiplicity $p_j \geq 0$. Let $a_{ij} = 1$ if $y_j \ \varepsilon \ H_i$ and $a_{ij} = 0$ if $y_j \ \varepsilon \ \overline{H}_i$. Clearly, $a_{i0} = 1$ for all $i$ since the identity $\Theta$ belongs to each subgroup. For each $H_i$ and $\overline{H}_i$ the following equations hold:

$$H_i : p_0 + \sum_{j=1}^{m} a_{ij}p_j = \frac{m+1}{2}$$

$$\overline{H}_i : \sum_{j=1}^{m} (1-a_{ij})p_j = \frac{m+1}{2}$$

These two sets of equations are consistent because $$p_0 + \sum_{j=1}^{m} p_j = \sum_{j=0}^{m} p_j = m + 1.$$

The m equations corresponding to the $m$ maximal subgroups can be written in matrix form as follows:

$$\begin{pmatrix} a_{11} & a_{12} & \cdots & a_{1m} \\ a_{21} & a_{22} & \cdots & a_{2m} \\ \vdots & \vdots & & \vdots \\ a_{m1} & a_{m2} & \cdots & a_{mm} \end{pmatrix} \begin{pmatrix} p_1 \\ p_2 \\ \vdots \\ p_m \end{pmatrix} \begin{pmatrix} \frac{m+1}{2} - p_0 \\ \frac{m+1}{2} - p_0 \\ \vdots \\ \frac{m+1}{2} - p_0 \end{pmatrix}$$

Using the determinant of the $m \times m$ matrix on the left, we can use Cramer's rule to solve for the $p_i$. For example:

$$p_1 = \frac{\begin{vmatrix} \frac{m+1}{2} - p_0 & a_{12} & a_{13} & \cdots & a_{1m} \\ \frac{m+1}{2} - p_0 & a_{22} & a_{23} & \cdots & a_{2m} \\ \vdots & \vdots & \vdots & & \vdots \\ \frac{m+1}{2} - p_0 & a_{m2} & a_{m3} & \cdots & a_{mm} \end{vmatrix}}{\begin{vmatrix} a_{11} & a_{12} & a_{13} & \cdots & a_{1m} \\ a_{21} & a_{22} & a_{23} & \cdots & a_{2m} \\ \vdots & \vdots & \vdots & & \vdots \\ a_{m1} & a_{m2} & a_{m3} & \cdots & a_{mm} \end{vmatrix}}$$

Since there are m maximal subgroups each number will appear $m$ times, either in a maximal subgroup or its complement. The identity $\Theta$ will appear $m$ times in the maximal subgroups but never in a complement. There are $\frac{m(m-1)}{2}$ remaining places for the non-identity numbers to appear in maximal subgroups and $\frac{m(m+1)}{2}$ places in the complements. Thus, by symmetry, each non-identity numbers will appear in $\frac{m-1}{2}$ maximal subgroups and in $\frac{m+1}{2}$ complements. Thus, each row of the determinant in the denominator will have $\frac{m-1}{2}$ entries which are 1 and $\frac{m+1}{2}$ which are 0. Adding columns 2 thru $m$ to column 1 will not change the value of the determinant so that:

$$p_1 = \frac{\begin{vmatrix} \frac{m+1}{2} - p_0 & a_{12} & a_{13} & \cdots & a_{1m} \\ \frac{m+1}{2} - p_0 & a_{22} & a_{23} & \cdots & a_{2m} \\ \vdots & \vdots & \vdots & & \vdots \\ \frac{m+1}{2} - p_0 & a_{m2} & a_{m3} & \cdots & a_{mm} \end{vmatrix}}{\begin{vmatrix} \frac{m-1}{2} & a_{12} & a_{13} & \cdots & a_{1m} \\ \frac{m-1}{2} & a_{22} & a_{23} & \cdots & a_{2m} \\ \vdots & \vdots & \vdots & & \vdots \\ \frac{m-1}{2} & a_{m2} & a_{m3} & \cdots & a_{mm} \end{vmatrix}}$$

Factoring out the constant first column in each determinant and noting that the same results hold for the $i$th column, yields:

$$p_i = \frac{\frac{m+1}{2} - p_0}{\frac{m-1}{2}} \quad \text{for } 1 \leq i \leq m$$

If $p_0 \geq 2$, then $0 < p_i < 1$, which is impossible. If $p_0 = 0$, then $p_i = \frac{m+1}{m-1}$ which is not an integer. The only remaining possibility is $p_0 = 1$, in which case:

$$p_i = \frac{\frac{m+1}{2} - 1}{\frac{m-1}{2}} = 1 \text{ for all } i.$$

Thus, if the mapping $T$ is balanced, all the $p_i = 1$ which defines an orthomorphism.

Assume now that the mapping is an orthomorphism. Consider any arbitrary maximal subgroup $H$. Each column matrix will have $2^{n-1}$ entries in $H$ and $2^{n-1}$ entries in $\overline{H}$. The matrices can be written in blocks as before:

$$\overset{y}{\begin{pmatrix} 2^{n-1} \varepsilon\ H \\ \hline 2^{n-1} \varepsilon\ \overline{H} \end{pmatrix}} \oplus \overset{x}{\begin{pmatrix} b\ \varepsilon\ H & \overline{\phantom{xx}} \\ \hline 2^{n-1} - b\ \varepsilon\ \overline{H} \\ \hline 2^{n-1} - b\ \varepsilon\ H \\ \hline b\ \varepsilon\ \overline{H} \end{pmatrix}} = \overset{z}{\begin{pmatrix} b\ \varepsilon\ H & \overline{\phantom{xx}} \\ \hline 2^{n-1} - b\ \varepsilon\ \overline{H} \\ \hline 2^{n-1} - b\ \varepsilon\ \overline{H} \\ \hline b\ \varepsilon\ H \end{pmatrix}}$$

where $b$ entries from $H$ and $2^{n-1} - b$ entries from $\overline{H}$ in the x matrix are added to the $2^{n-1}$ entries from $H$ in the $y$ matrix. This yields a total of $2b$ entries from $H$ and $2^n - 2b$ entries from $\overline{H}$ in the $z$ matrix. Since the mapping is an orthomorphism, the $z$ column matrix has $|H| = 2^{n-1}$ entries each from $\overline{H}$ and from $H$. Thus, $2b = 2^n - 2b = 2^{n-1}$. So $|TH \cap H| = |T\overline{H} \cap \overline{H}| = 2^{n-2}$ and $T$ is balanced. □

5. FINAL QUESTIONS

There are a number of interesting but apparently unanswered questions resulting from this paper. They are as follows:

REVISED    SEPTEMBER 15, 199_

1. Referring to Fig. 4, the integer $p$ is completely determined by the generating function described in Proposition 3. For simple generating functions, $p$ can be found immediately. In the general case, it has proved to be elusive.

2. Powers of non-linear orthomorphisms, viewed as permutations, rarely have powers which are also orthomorphisms. When will they?

3. Referring to Fig. 5, the 12 columns of individual binary numbers are not all the same and, in general, are not deBruijn sequences. In the case of automorphic orthomorphisms, these columns of 0's and 1's are linear deBruijn sequences. In nonlinear orthomorphisms, there are special cases where they are nonlinear deBruijn sequences. What are the properties of these sequences in general?

4. Under what circumstances is a non-linear orthomorphism maximal, that is, without cycles except for a fixed point?

5. How many non-linear orthomorphisms are there?

6. REFERENCES

1. Solomon W. Golomb, "Shift Register Sequences," Aegean Park Press, 1982.

2. Marshall Hall and L.J. Paige, "Complete Mappings of Finite Groups," Pacific Journal of Mathematics, 5 (1955), 541-549.

3. N. Jacobson, "Lectures in Abstract Algebra," Vol. 1, D, Van Nostrand Co., 1964.

4. D.M. Johnson, A.L. Dulmage, and N.S. Mendelsohn, "Orthomorphisms of Groups and Orthogonal Latin Squares," Canadian Journal of Mathematics, 13 (1961), 356-372.

5. Henk C.A. Van Tilborg, "An Introduction to Cryptology," Kluwer Academic Publishers, 1988.

APPENDIX VIII

ORTHOMORPHIC BLOCK SUBSTITUTIONS

PREPARED BY:

BLAKELY, SOKOLOFF, TAYLOR & ZAFMAN
12400 Wilshire Boulevard
Seventh Floor
Los Angeles, California 90025
(213) 207-3800

*I hereby certify that this correspondence is being deposited with the United States Postal Service as Express Mail (Label No. RB984587912US) in an envelope addressed to: Commissioner of Patents and Trademarks, Washington, D.C. 20231 on: May 31, 1994*

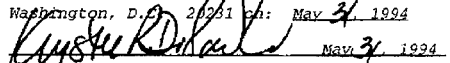

_____  May 31, 1994
Krystle P. DiPaolo            Date

ABSTRACT

A block substitution is a 1-to-1 mapping of the $n$-bit binary numbers onto themselves. Such a substitution or transformation can be represented by a permutation. It is shown that certain permutations of the $n$-bit binary numbers define a block substitution by modulo 2 addition of one permuted set of numbers to another. Such permutations are orthomorphisms. A subset of these have an additional feature which is that the equations which they define have an additive relationship when viewed as vectors. Such permutations are linear orthomorphisms. Also, a perfectly balanced block substitution is defined. It is shown that substitutions defined by orthomorphisms are balanced and that any perfectly balanced block substitution can be represented by an orthomorphism. Permutations representing linear or automorphic orthomorphisms are shown to form groups which retain the same properties. The conditions for the existence of these permutations are established, some properties of the groups are determined, and the number of such groups is enumerated and compared with all possible permutations of the $n$-bit numbers.

1. INTRODUCTION

A block substitution is the term usually applied to a 1-to-1 mapping of the $n$-bit binary numbers onto themselves. This mapping can be written as a pairing of the $2^n$ $n$-bit numbers:

$$\begin{array}{ccc} x_1 & & z_1 \\ x_2 & & z_2 \\ \cdot & & \cdot \\ \cdot & & \cdot \\ x_k & \rightarrow & z_k \\ \cdot & & \cdot \\ \cdot & & \cdot \end{array}$$

where each column is the set of the same $2^n$ distinct $n$-bit numbers but written in different orders. Thus, this mapping can be thought of as a permutation of the $n$-bit numbers written as:

$$\begin{pmatrix} x_1 & x_2 & \cdots & x_k & \cdots \\ z_1 & z_2 & \cdots & z_k & \cdots \end{pmatrix}$$

or $(x_1\, x_i\, x_j \cdots)$ for some set of indices. This usual notation for permutations simply means that $x_1 \rightarrow x_i, x_i \rightarrow x_j$, etc.

Going back to the column notation, one could define a set of simple equations from the original set and its image:

$$\begin{array}{ccccc} y_1 & \oplus & x_1 & = & z_1 \\ y_2 & \oplus & x_2 & = & z_2 \\ & & \cdot & & \cdot \\ & & \cdot & & \cdot \\ y_k & \oplus & x_k & = & z_k \\ & & \cdot & & \cdot \\ & & \cdot & & \cdot \end{array}$$

where the symbol $\oplus$ means modulo 2 addition (*i.e.*, addition of corresponding digits without carrying). In general, the set $\{y_1, y_2 \cdots\}$ will not all be distinct, but in certain circumstances they will be. When they are distinct, block substitutions can be generated by modulo 2 addition rather than by conventional means. The main tasks are: (1) determine the circumstances, if any, in which this scheme works, (2) determine how the substitutions can be changed quickly, and (3) determine the lack of bias.

It is not obvious that block substitutions can ever be generated by modulo 2 addition, e.g., consider the attempt to substitute one arrangement of 3-bit binary numbers for another by modulo 2 addition. This is shown in Figure 1. In column 3, on the right, 011 and 100 each appear twice, while 001 and 110 never appear. The numbers in column 1, on the left, acting on the numbers in column 2, in the center, constitute a transformation of the set of 3-bit binary words into themselves. This is a many-1 transformation and is useless for block substitutions.

$$
\begin{array}{rcrcr}
000 & \oplus & 000 & = & 000 \\
001 & \oplus & 011 & = & 010 \\
010 & \oplus & 110 & = & 100 \\
011 & \oplus & 100 & = & 111 \\
100 & \oplus & 111 & = & 011 \\
101 & \oplus & 001 & = & 100 \\
110 & \oplus & 101 & = & 011 \\
111 & \oplus & 010 & = & 101 \\
\end{array}
$$

Figure 1. Modulo 2 Addition, Many-1 Transformation

Trying another arrangement shown in Figure 2 gives a different result. In this case, the transformation is 1-to-1 from the 3-bit binary numbers onto themselves. Each column consists of all the 3-bit numbers exactly once.

$$
\begin{array}{rcrcr}
000 & \oplus & 000 & = & 000 \\
001 & \oplus & 111 & = & 110 \\
010 & \oplus & 011 & = & 001 \\
011 & \oplus & 100 & = & 111 \\
100 & \oplus & 110 & = & 010 \\
101 & \oplus & 001 & = & 100 \\
110 & \oplus & 101 & = & 011 \\
111 & \oplus & 010 & = & 101 \\
\end{array}
$$

Figure 2. Modulo 2 Addition, 1-to-1 Transformation

Definition: An orthomorphism of the $n$-bit binary numbers is a 1-to-1 mapping $R(x)$ with the property that for any $z$ in $G_n$, the group of $n$-bit binary numbers, there is another $x$ in $G_n$, such that $x \oplus R(x) = z$. This can be represented by an array of $2^n = m + 1$ equations where $y_i = R(x_i)$:

$$y_1 \oplus x_1 = z_1$$
$$\vdots$$
$$y_{m+1} \oplus x_{m+1} = z_{m+1}$$

The sets $\{y_k\}$, $\{x_k\}$, and $\{z_k\}$ each consist of the $2^n$ distinct $n$-bit binary numbers.

The set $\{y_k\}$ also defines a mapping $x_k \to z_k$. Since the $y_k$ take on all values, exactly one member of the set $y_j = \Theta = (0 \cdots 0)$ the identity. Thus, $x_j = z_j$ is a fixed point and there is no other. Because each column consists of the distinct $n$-bit numbers, it is a permutation of each of the other two columns.

The first question is how to construct such an orthomorphism. The equations can be thought of as three-dimensional vectors, the scalar components of which are $n$-bit binary numbers. These vectors (equations) can be added componentwise modulo 2 to obtain new vectors (equations).

Proposition 1: An orthomorphism of $n$-bit binary numbers can be constructed from sums of any set of $n + 1$ rows, each column of which contains the identity and $n$ generators of $G_n$, the group of $n$-bit binary numbers.

Proof: Without loss of generality we can assume that the first $n + 1$ rows have this property. Either one row is $\Theta = \Theta \oplus \Theta$ or the identity occurs in three different rows. Assume that $z_1 = x_1 = y_1 = \Theta$. Then, each set $\{z_2, \cdots, z_{n+1}\}$, $\{x_2, \cdots, x_{n+1}\}$, and $\{y_2, \cdots, y_{n+1}\}$ is composed of $n$ distinct generators of $G_n$. To construct the remaining rows of the array, take modulo 2 sums of pairs of rows 2 thru $n + 1$, sums of triples of these rows, etc, and finally:

$$\sum_{i=0}^{n+1} z_i$$

The number of additional rows constructed in this manner is:

$$\binom{n}{2} + \binom{n}{3} + \cdots + \binom{n}{n} = \sum_{k=0}^{n} \binom{n}{k} - \binom{n}{1} - \binom{n}{0} = 2^n - (n + 1)$$

So the array is completely specified by this process. Because each of the $z_i$, $x_i$, and $y_i$ for $i > n+1$ are different linear combinations of the generators, they will all be distinct, and the sets of $2^n$ elements of $\{z_i\}$, $\{x_i\}$ and $\{y_i\}$ will each be a permutation of the $n$-bit digit binary numbers.

Now, assume that $z_1 = x_2 = y_3 = \Theta$. No pair of rows from the first three could be added together because this would cause a duplication of $z_1$, $x_2$, or $y_3$ in one of the columns. We avoid this problem by adding together odd numbers of rows from the initial $n+1$ rows. Thus, we have:

$$n + 1 = \frac{(n+1)!}{(n+1)!1!} = \binom{n+1}{1} \quad \text{single rows}$$

$$\frac{(n+1)!}{3!(n-2)!} = \binom{n+1}{3} \quad \text{triple sums of rows}$$

$$\frac{(n+1)!}{5!(n-4)!} = \binom{n+1}{5} \quad \text{quintuple sums, etc.}$$

Keeping in mind the general identity for binomial coefficients:

$$\binom{n+1}{k} = \binom{n}{k-1} + \binom{n}{k}$$

we can sum the number of rows generated this way, for $n$ odd:

$$\binom{n+1}{1} + \binom{n+1}{3} + \cdots + \binom{n+1}{n}$$
$$= \binom{n}{0} + \binom{n}{1} + \binom{n}{2} + \binom{n}{3} + \cdots + \binom{n}{n-1} + \binom{n}{n}$$
$$= 2^n$$

For $n$ even, the final term in the sum on the left is:

$$\binom{n+1}{n+1} = \binom{n}{n}$$

so that it again adds to $2^n$ rows.

As in the first case, the column elements are $2^n$ distinct linear combinations of the generators and the identity. □

Proposition 1 gives a method of generating orthomorphisms but does not imply that all can be generated this way. These particular orthomorphisms have the property that the vector sum modulo 2 of any odd number of rows is again another row in the original array. This is not a general property of orthomorphisms.

Proposition 2: Any orthomorphism of $n$-bit numbers, generated as in proposition 1 and with fixed row $\Theta \oplus \Theta = \Theta$, has a maximal set of $n$ linearly independent rows.

Proof: Let $k$ be the maximal number of independent rows and assume $k < n$. The array has exactly $2^n$ rows including the identity. By proposition 1, these $k$ rows generate an array of $2^k$ rows. Thus, the remaining $2^n - 2^k$ rows must be duplicates and the array cannot be an orthomorphism.

If $k = n + q$, where $q$ is a positive integer, then a maximal set of independent rows will generate $2^{n+q}$ rows. In each column, each of the $2^n$ distinct n-bit numbers will appear $2^q$ times. This $2^n$ array is embedded in the array with $2^{n+q}$ rows. One can extract it by making a proper selection of rows from the larger array. Choose the first row for the orthomorphic array, for example, $x_1 \oplus y_1 = z_1$. $x_1$ will appear $2^{q-1}$ more times in column 1, similarly for $y_1$ in column 2 and $z_1$ in column 3. Since the same combination of $x_1$ and $y_1$ will not occur again, $3(2^q - 1)$ rows must be eliminated from further consideration for the array. From the second choice, $z_2$, one must eliminate $2^q - 1$ rows containing $z_2$ in column 3, but since $x_2$ or $y_2$ may have appeared in a row already eliminated, we can only say that in the second step the number of rows eliminated is $\geq 2^q - 1$. For each succeeding step, $\geq 2^q - 1$ rows are eliminated. The process is complete after $2^n$ steps. $2^n$ rows have been selected and the number of rows eliminated is:

$$\geq 3(2^q - 1) + (2^n - 1)(2^q - 1) = (2^n + 2)(2^q - 1)$$

Thus, the total number of rows selected and eliminated is:

$$\geq 2^n + (2^n + 2)(2^q - 1) + 2^{n+q} + 2(2^q - 1) > 2^{n+q}.$$

So, there are not sufficient rows to complete this process. This contradiction implies $k = n$. □

Proposition 3: An orthomorphism, generated as in proposition 1 and with fixed identity row, is a group. It defines a linear transformation.

Proof: Rows of equations in the array can be thought of as vectors and added by respective components:

| $x_i$ | $\oplus$ | $y_i$ | = | $z_i$ |
|---|---|---|---|---|
| $x_j$ | $\oplus$ | $y_j$ | = | $z_j$ |
| $x_k$ | $\oplus$ | $y_k$ | = | $z_k$ | where $x_i \oplus x_j = x_k$, etc. This is the group operation. Each row in the array is the sum of some subset of the $n$ generators. The sum of two rows is also the sum of some subset of the generators and, thus, is in the array which consists of all possible such sums. Thus, the array is closed under the group operation. The group identity is the row $\Theta = \Theta \oplus \Theta$.

A row is of the general form $x_{k-1} \oplus x_k = x_{k-p}$.

Let $T$ be the transformation mapping column 2 on column 3, $Tx_k = x_{k-p}$.

Let
$$x_k \oplus x_j = x_i.$$
$$T(x_k \oplus x_j) = Tx_i = x_{i-p}.$$
$$Tx_k \oplus Tx_j = x_{k-p} \oplus x_{j-p}.$$

Since the array is an additive group:

$$x_{k-p} \oplus x_{j-p} = (x_k \oplus x_j) \oplus (x_{k-1} \oplus x_{j-1}) = x_i \oplus x_{i-1} = x_{i-p}$$

and $$T(x_k \oplus x_j) = Tx_k \oplus Tx_j \quad \text{which defines a linear transformation.} \quad \square$$

This property is not generally true for 1-to-1 transformations on $G_n$.

Each pair of columns defines a permutation as follows: take a number in one column, e.g., $y_1$ in column 2, and find the same number in column 1. It will have a partner, say $y_2$, in column 2. Again, locating $y_2$ in column 1, there will be a partner $y_3$ in column 2. This defines a permutation $y_1 \to y_2 \to y_3 \to \cdots$ from column 2 to column 1. Six such permutations, three of which are distinct, are defined by the orthomorphism.

Definition: A permutation defined by an orthomorphism will be called an orthomorphic permutation.

Initially, consider the case in which the fixed point is $\Theta$, and, let $y_{m+1} = x_{m+1} = z_{m+1} = \Theta$. The order of rows in the array is arbitrary. For the second row, one could select that row in which $y_j = x_1$ and for the third row, that row in which $y_k = x_j$, etc. Redesignating the indices, one obtains:

$$\begin{array}{ccccc}
\Theta & \oplus & \Theta & = & \Theta \\
x_m & \oplus & x_1 & = & z_1 \\
x_1 & \oplus & x_2 & = & z_2 \\
x_2 & \oplus & x_3 & = & z_3 \\
& & \vdots & &
\end{array}$$

The order of the numbers in columns 1 and 2 now represents the permutation defined by those two columns which leads to the following definition.

Definition: An array of equations representing an orthomorphism with rows that are arranged in the order defined by the permutation between columns 1 and 2 will be said to be normalized.

Proposition 4: A linear orthomorphism can be written in the form:

$$\begin{array}{ccccc}
\Theta & \oplus & \Theta & = & \Theta \\
x_m & \oplus & x_1 & = & x_{1-p} \\
x_1 & \oplus & x_2 & = & x_{2-p} \\
& & \vdots & & \\
x_{m-1} & \oplus & x_m & = & x_{m-p}
\end{array}$$

where $p$ is an integer.

Proof: In normalized form, the array can be written:

$$\begin{array}{ccccc}
\Theta & \oplus & \Theta & = & \Theta \\
x_m & \oplus & x_1 & = & z_1 \\
x_1 & \oplus & x_2 & = & z_2 \\
& & \vdots & & \\
x_{m-1} & \oplus & x_m & = & z_m
\end{array}$$

Since the array is a group, it can be regenerated by taking sums of successive pairs of rows to obtain:

$$\begin{array}{ccccc}
\Theta & \oplus & \Theta & = & \Theta \\
(x_1 \oplus x_m) & \oplus & (x_1 \oplus x_2) & = (z_1 \oplus z_2) \\
(x_1 \oplus x_2) & \oplus & (x_2 \oplus x_3) & = (z_2 \oplus z_3) \\
& & \vdots & & \\
(x_{m-1} \oplus x_m) & \oplus & (x_m \oplus x_1) & = (z_m \oplus z_1)
\end{array}$$

The rows in the new array must be the same (but rearranged) as those in the original. From the diagonal structure on the left, the order of the rows must be the same although the starting point in the sequence of rows has been shifted by some unspecified number of positions. Column 2 in the new array is:

$$\begin{array}{c} z_2 \\ z_3 \\ \vdots \\ z_1 \end{array}$$

which is the same as column 3 in the original array. So, column 3 in the original array is the same as column 2 in the original array but shifted by some unspecified number of positions $p$. □

As will be seen later, the shift $p$ can take on only certain values. So far, no means has been found to determine $p$ in advance, or from a knowledge of $p$ to determine the array, except for special cases. However, there are some rules for eliminating possible values of $p$ and for pairing permissible values. The shift $p$ determines whole classes of arrays and substitutions. So far, all possible values of $p$ have been found for block size $\leq 8$.

An othomorphism must have a fixed point. We will consider an orthomorphism to be maximal if the permutation associated with it has no cycles except the fixed point.

Proposition 5: If $g$ is a maximal length permutation representing a linear orthomorphism, then for any power $s$ of the permutation $g$, $g^s$ also represents a linear orthomorphism.

Proof: $g$ is defined by cols. 1 and 2 of the following array, omitting the identity:

$$x_m \oplus x_1 = x_{1-p}$$
$$x_1 \oplus x_2 = x_{2-p}$$
$$\vdots$$
$$x_{m-1} \oplus x_m = x_{m-p}$$

The array which defines $g^s$ is:

$$x_{1-s} \oplus x_1 = w_1$$
$$x_{2-s} \oplus x_2 = w_2$$
$$\vdots$$
$$x_{m-s} \oplus x_m = w_m$$

As in the proof of proposition 4, from the group structure of the array for $g$, $g$ can be regenerated by taking the sums of the $m$ pairs of rows which are $s$ spaces apart:

$$(x_m \oplus x_s) \oplus (x_1 \oplus x_{s+1}) = w_s \oplus w_{s+1}$$
$$(x_1 \oplus x_{s+1}) \oplus (x_2 \oplus x_{s+2}) = w_{s+1} \oplus w_{s+2}$$
$$\vdots$$
$$(x_{m-1} \oplus x_{s+m-1}) \oplus (x_m \oplus x_{s+m}) = w_{s+m-1} \oplus w_{s+m}$$

From the diagonal structure on the left, it is clear that columns 1 and 2 are in the same order as before but with a different starting point, i.e., the array has been rotated. Noting that $x_{s-s} = x_m$, from the array for $g^s$, $x_m \oplus x_s = w_s$. Thus, column 1

(or column 2) of the rotated array for $g$ consists of the set $\{w_1, \cdots, w_m\}$ which is a displaced or rotated from of $\{x_1, \cdots, x_m\}$. This shows that the general form of a row in the array for $g^s$ is:

$$x_{k-s} \oplus x_k = x_{k-p_s}$$

where $p_s$ is the shift corresponding to the power $s$. The mapping from $g$ to $g^s$, defined by row $k$ in the first array to row $k$ in the second array, is an automorphism. The array of equations thus derived is a group and by propositions 1 and 3 defines an orthomorphism. □

$p_s$ is related to the basic shift $p$ and is different for each value of $s$. It is important to know these shifts and their sequences when changing from one substitution to another in the same permutation group. More will be said about this later.

Examples can be shown of orthomorphic permutations $g$ which are not linear and for which $g^s$ is not an orthomorphisms but a 1-many mapping unusable as a block substitution.

Proposition 5 is also true even if $g$ is not a maximal length permutation. The presence of cycles slightly complicates the proof; however, there is little practical interest in starting with substitutions corresponding to non-maximal permutations because powers will not generate the full group. The permutations which have fixed points other than the identity also form groups; however, the arrays which generate them are not groups.

The next step is to show that these groups of permutations and the corresponding substitutions have the highly desirable property of yielding all possible input/output pairs.

Because each orthomorphic permutation is generated by an array in which pairs of columns keep exactly one element fixed, each permutation will keep one of the $2^n$ binary words fixed. Thus, these permutations not only belong to the symmetric group of all permutations on $2^n$ elements, but they also belong to the subgroup $P_m$ of permutations on $m = 2^n - 1$ elements. All powers of a given permutation will form a group. The order of the permutation is the least common multiple of its cycles, and the order of the group is the number of distinct permutations in it. A permutation is said to be regular if all its cycles are the same length.

An important property for a group of permutations is transitivity. A transitive group has at least one permutation which transforms any element or word into any other.

Proposition 6: If $G$ is a subgroup of $P_m$ which is generated by powers of a linear orthomorphic permutation $g$, where $g$ is of order $m = 2^n - 1$, then $G$ is transitive on the $2^n - 1$ non-fixed words.

Proof: Omitting the single cycle permutation $(j)$ corresponding to the fixed word, $x_j$, $G$ is a subgroup of permutations on the $2^n - 1$ $l$-bit words that are held fixed. Since the $m$ powers of $g$, $\{g, g^2, g^3, \cdots, g^m = \Theta\}$, where $g^n = \Theta$, generate $G$, its order $|G| = m$. Let $G_1$ be the subgroup of $G$ which holds fixed one of the $2^n - 1$ $n$-bit words. Because this is a group of orthomorphic permutations, $G_1 = \{\Theta\}$ the identity permutation only. So $G_1$ has order $|G_1| = 1$ and the index of $G_1$ in $G$ $\frac{|G|}{|G_1|} = m$. So, by theorem 25-11, ref. 1, $G$ is transitive. □

2. AFFINE ORTHOMORPHIC ARRAYS

One can generate orthomorphic arrays with a fixed element other than the identity by simply adding a fixed binary number to each number in column 1 and column 2. For example, let $H$ be the array (and group) as written in proposition 4, and generate a new array $H'$ as follows:

$$
\begin{array}{cccccccccc}
& H & & & & & & H' & & \\
\Theta & \oplus & \Theta & = & \Theta & & w & \oplus & w & = & \Theta \\
x_m & \oplus & x_1 & = & x_{1\text{-}p} & & (x_m \oplus w) & \oplus & (x_1 \oplus w) & = & x_{1\text{-}p} \\
x_1 & \oplus & x_2 & = & x_{2\text{-}p} & & (x_1 \oplus w) & \oplus & (x_2 \oplus w) & = & x_{2\text{-}p} \\
& \cdot & & & & & & \cdot & & \\
& \cdot & & & & & & \cdot & & \\
& \cdot & & & & & & \cdot & & \\
x_{m\text{-}1} & \oplus & x_m & = & x_{m\text{-}p} & & (x_{m\text{-}1} \oplus w) & \oplus & (x_m \oplus w) & = & x_{m\text{-}p}
\end{array}
$$

Clearly, $H'$ has $2^n$ rows and the sum of any pair or even number of rows will be in $H$ since the $w$'s will cancel out. If any odd number of rows in $H'$ are summed, it will result in a row in $H'$ because it is equivalent to the sum of rows in $H$ plus the row $w \oplus w = \Theta$. Thus, $H \cup H'$ has $2^{n+1}$ elements, is closed under addition of rows, and contains the identity $\Theta \oplus \Theta = \Theta$. Thus, $H \cup H'$ is a group, $H$ is a maximal subgroup, and $H' = \bar{H}$ is the relative complement of $H$.

We can shift column 1 in $H'$ to obtain the array corresponding to a power of the permutation defined by columns 1 and 2 of the original array. A typical row is:

$$(x_{k-j} \oplus w) \quad \oplus \quad (x_k \oplus w) \quad = \quad x_k - p_j$$

This is the image of the corresponding row in the $j$th power of $H$. So the array of equations derived from $H'$ by a power of the permutation defining $H$ is also orthomorphic. As in $H'$, the mapping between columns 1 and 2 is linear, and that between columns 1 and 3 is affine.

Now, suppose that we have an additive array with $2^n$ rows for which $\Theta$ is not fixed. Further, assume that the array contains sums of all odd combinations of $n + 1$ linearly independent rows. As in the proof of proposition 1, this generates exactly $2^n$ rows. Thus, no sums of even sets or rows can be in the array. Since $\Theta$ occurs once in column 3, there is one row of the form $w \oplus w = \Theta$. Adding it to each of the single rows, including itself, generates an orthomorphic array of $2^n$ rows with fixed identity.

Thus, there is a 1-to-1 correspondence between orthomorphic arrays with fixed identity and orthomorphic arrays with another fixed number.

3. STRUCTURE OF LINEAR (AUTOMORPHIC) ORTHOMORPHISMS

It is helpful to know something about the distribution of independent rows or generators in the array.

Proposition 7: In a maximal linear orthomorphism, with fixed $\Theta$ on the $n$-bit binary numbers, any $n$ consecutive rows are generators.

Proof: Consider the first $n$ rows:

$$x_m \quad \oplus \quad x_1 \quad = \quad x_{1-p}$$
$$\vdots$$
$$x_{n-1} \quad \oplus \quad x_n \quad = \quad x_{n-p}$$

If these are not independent then:

$$x_n = \sum_{i \in Q} x_i \qquad x_{n-1} = \sum_{i \in Q} x_{i-1} \qquad x_{n-p} = \sum_{i \in Q} x_{i-p}$$

where $Q$ is a subset of $\{1, \cdots, n-1\}$ with $s \leq n - 1$ elements. The next row in the array will be: $x_n \oplus x_{n+1} = x_{n+1-p}$. Since the array is an additive group, it must be true that:

$$x_{n+1} = \sum_{i \in Q} x_{i+1} \quad \text{and} \quad x_{n+1-p} = \sum_{i \in Q} x_{i+1-p}.$$

In that case, applying this to each successive row, one could generate the entire array with $s < n$ generators. □

This is enough for our purposes, but it can also be shown that any $n$ equally spaced rows are generators.

4. THE SHIFT P

In what follows, it is assumed, unless otherwise stated, that the orthomorphic arrays are maximal, normalized, and linear. For brevity, the row $\Theta \oplus \Theta = \Theta$ will be omitted. The general form for the $k$th row if the basic array is:

$$x_{k-1} \oplus x_k = x_{k-p}$$

For the array corresponding to the power $s$ of the basic permutation, the $k$th row is:

$$x_{k-s} \oplus x_k = x_{k-p_s}$$

As usual, $n$ is the block size and $m = 2^n - 1$. By definition, $p_1 = p$. It is important to know something about the values of $p_s$ in order to use the block substitutions which they generate. It is obvious that $p_s \neq p_t$ if $s \neq t$.

Proposition 8: $p \geq n$

Proof: The $(p+1)$st row of the basic array is:

$$x_p \oplus x_{p+1} = x_{p+1-p} = x_1$$

If $p + 1 \leq n$, this implies that the first $n$ rows are dependent, which contradicts proposition 7. □

NOTE: Because $s$ is a power of a permutation $g$, of order $m$, if $s = m + k$:

$$g^{m+k} = g^m \cdot g = \Theta \cdot g^k.$$

So the exponents can be expressed modulo $m$.

Proposition 9: If $p$ is an allowable value for the shift, so is $\bar{p} = 2^n - p$.

Proof: In the normalized array, the first column is displaced down one place with respect to column 2. The third column is displaced down $p$ places (the shift) with respect to column 2 and $p - 1$ places from column 1. If we interchange columns 1 and 2 and turn the resulting array upside down (i.e., reverse the order of the rows) then in the new array, the third column is shifted down $m - (p - 1) = 2^n - p$ places with respect to column 2. Since only the order has been changed, the new array is equivalent to the original in the sense that it will generate permutations from the same group. □

NOTE: Since $\bar{p} > n$, $p < 2^n - n$.

Proposition 10: If the power $s = 2^r$ for some integrer $r \geq 0$, $p_s = sp$.

Proof: If $r = 1$, $s = 2$, and $x_{k-2} \oplus x_k = x_{k-p_2}$.

One can write:

$$x_{k-2} \oplus x_k = x_{k-2} \oplus x_{k-1} \oplus x_{k-1} \oplus x_k.$$

Considering $k - 1$ and $k - p$ indices:

$$x_{k-2} \oplus x_k = x_{k-1-p} \oplus x_{k-p} = x_{k-p-p} = x_{k-2p}.$$

So, $p_2 = 2p$ and the statement is true for $r = 1$.

Assume that for some $s = 2^r$, $p_s = 2^r p$. $2^{r+1} = 2^r + 2^r$ then:

$$x_{k-2^{r+1}} \oplus x_k = x_{k-2^r-2^r} \oplus x_k = x_{k-2^r-2^r} \oplus x_{k-2^r} \oplus x_{k-2^r} \oplus x_k$$

$$= x_{k-2^r-2^r p} \oplus x_{k-2^r p} = x_{k-2^r p - 2^r p} = x_{k-2^{r+1} p}. \quad \square$$

There are other constraints on $p$, the shift in the third column. If $g$ is the permutation defined by columns $2 \to 1$ of the array, then the permutation defined by columns $1 \to 3$ is $g^{p-1}$ and by columns $3 \to 2$ is $g^{m-p}$. These permutations are obviously commutative and $g \circ g^{p-1} \circ g^{m-p} = g^0 = \Theta$, the identity permutation.

The sum of exponents $1 + (p - 1) + (m - p) \equiv 0$ modulo $m$. Clearly, $1 < p < m$. More generally, for a power $g^s$, the corresponding permutations are:

$$g^s \circ g^{p_s - s} \circ g^{m - p_s} = \Theta$$

then:

$$s + (p_s - s) + (m - p_s) \equiv 0 \text{ modulo } m \text{ and } p_s \neq s, m.$$

Proposition 11: If an orthomorphic array generates the power $s$ of the basic permutation in two pairs of columns, it generates this in all three columns and $3s \equiv 0$ modulo $m$.

Proof: If two of the three permutations are of the same power, the array can be arranged so that typical rows are:

$$x_{k-s} \oplus x_k = x_{k+s}$$

$$\vdots$$

$$x_k \oplus x_{k+s} = x_{k+2s}$$

By the group property, adding these together will give another row in the same array:

-14-

$$x_{k+s} \oplus x_{k+2s} = (x_k \oplus x_{k+s}) \oplus (x_k \oplus x_{k-s})$$
$$= x_{k+s} \oplus x_{k-s}$$

which implies that $x_{k+2s} = x_{k-s}$ and that $3s \equiv 0$ modulo $m$. This will occur only if $3 \mid m$, in which case, $p_s = -s \equiv 2s$ modulo $m$, and $p_s - s = 2s - s = s, m - p_s = s$. □

Corollary: If an orthomorphic array generates the same permutation with each pair of columns, the permutation is of order 3.

Proof: If $h = g^s$ is generated as in proposition 11, then $h^3 = g^{3s} = \Theta$. □

If $p_s = 2s, \dfrac{m+s}{2}$ or $m - s$, the same permutation will be generated. So, if $3 \nmid m, p_s \neq \{s, 2s, \dfrac{m+s}{2}, m - s, m\}$.

There are a number of miscellaneous facts to help select or eliminate candidates for the shift, but so far, insufficient rules have been found to fully determine the shift pattern. Some of the facts are:

1.  If $p_s = t$, then $p_t = s$ by symmetry.
2.  If $p = 2^t$, then $x_{k-1} = x_k \oplus x_{k-p} = x_k \oplus x_{k-2^t} = x_{k-2^t p} = x_{k-2 \cdot 2^t}$ which is possible only if $2^{2t} \equiv 1$ modulo $m$.
3.  If $p = 2^t + 1$, then $x_k = x_{k-1} \oplus x_{k-1-2^t} = x_{k-1-2^t p} = x_{k-1-2^t(2^t+1)}$ which is possible only if $2^{2t} + 2^t + 1 \equiv 0$ modulo $m$.
4.  If $p \mid m$, then $\dfrac{m}{p} \neq 2^t - 1$, otherwise, $2^t p = m + p$ and $x_k \oplus x_{k-2^t}$
    $= x_{k-2^t p}$
    $= x_{k-m-p} = x_{k-p} = x_k \oplus x_{k-1}$ and $t = 0$.

4. ENUMERATION OF MAXIMAL AUTOMORPHIC ORTHOMORPHISMS

The arrays representing orthomorphisms, by convention, have been constructed according to the permutation defined by columns 1 and 2. If the permutation is of maximal length (i.e., a permutation of $m = 2^n - 1$ elements with no subcycles), the array will be maximal also in the sense that it has no distinct self-contained blocks. Conversely, the maximal array will generate a maximal permutation; however, powers of a maximal permutation may have cycles. This will be the case unless the maximal length permutation is of prime order. Thus, no general conclusions can be drawn about the permutations generated by other pairs of columns.

If all six of the permutations generated by the array have the same cycles, the array will have corresponding cycles in the form of disjoint subarrays of the same length in which each column has the same elements. If the basic permutation generated by columns 1 and 2 has a cyclical structure not shared by the other permutations, then there will be disjoint subarrays or blocks in the array in which the elements in column 3 will be distinct from those in columns 1 and 2.

It is also obvious that any maximal length orthomorphic permutation can be used to generate a maximal array. Thus, initially considering arrays and permutations with fixed identity, there is a 1-to-1 correspondence between maximal length permutations and columns 1 and 2 of maximal arrays and, hence, with the array as an entity.

<u>Proposition 12:</u> For $n$-bit binary numbers, the number of maximal length automorphic (linear) orthomorphisms for a given value of the shift $p$, is $$M(n) = \prod_{k=1}^{n-1} (2^n - 2^k) \text{ where } m = 2^n - 1$$

<u>Proof:</u> Let $Q(n)$ be the number of distinct sets of generators of the $n$-bit binary numbers. Each set of generators will generate a maximal array. However, the order in which the generators are used makes a difference because the column 1 lead term $x_m = f(x_1, \cdots, x_n)$ depends on the relative orders of the generators. There are $n!$ such orders. Once an array is generated, the starting row of the array or starting point of the permutation is irrelevant. For example, if the first row is $x_m \oplus x_1 = x_{1-p}$ it could be circulated to the bottom and instead start with: $x_1 \oplus x_2 = x_{2-p}$ so the process is redundant by a factor of $m = 2^n - 1$.
Therefore:

$$M(n) = \frac{n!}{m} Q(n)$$

Assume $Q(n,k) = \frac{1}{k!} \prod_{j=0}^{k-1} (2^n - 2^j)$ is the number of independent $k$ tuples which can be selected from $n$-bit words. Clearly, it is true for $k = 1$ or $k = 2$. The $n$ tuples can be constructed by adjoining a single $n$-bit word to an $(n - 1)$ tuple. There are $m$ such words which could be adjoined. However, $m = 2^n - 1$ must be diminished by eliminating the $n - 1 = \binom{n-1}{1}$ words which duplicate those in the $(n - 1)$ tuple, by the $\binom{n-2}{2}$ words which are sums of pairs of words in the $(n - 1)$ tuple, *etc*, and, finally, by the $1 = \binom{n-1}{n-1}$ word which is the sum of all words in the $(n-1)$ tuple.

Thus, $m$ must be diminished by:
$$\sum_{j=1}^{n-1} \binom{n-1}{j} = 2^{n-1} - 1.$$

The number of words to be adjoined to the $(n-1)$ tuples $= 2^n - 1 - (2^{n-1} - 1)$ $= 2^n - 2^{n-1}$. However, each $n$ tuple could be generated by $n$ different $(n-1)$ tuples, so that:

$$Q(n) = Q(n,n) = \frac{2^n - 2^{n-1}}{n} Q(n, n-1) = \frac{2^n - 2^{n-1}}{n} \frac{1}{n-1!} \prod_{k=0}^{n-2}(2^n - 2^k) = \frac{1}{n!} \prod_{k=0}^{n-1}(2^n - 2^k).$$

Thus, $M(n) = \dfrac{1}{m} \prod\limits_{k=0}^{n-1}(2^n - 2^k) = \prod\limits_{k=1}^{n-1}(2^n - 2^k)$ □

$M(n)$ can be rewritten in a form easier to compute:
$$M(n) = \prod_{k=1}^{n-1}(2^n - 2^k) = 2^s \prod_{j=1}^{n-1}(2^j - 1)$$

where
$$s = \frac{n(n-1)}{2}.$$

There is a simple recursive relationship:
$$M(n+1) = 2^n (2^n - 1) M(n)$$

Unless $m$ is prime, the permutation group will contain some permutations which are not maximal and, thus, will have some proper cycles. These will be powers $g^s$ of a maximal permutation $g$ where $s$ is a divisor of $m$. These can be enumerated by counting the number of values of $s$ which are divisors of $m - 1$.

In a group of additive permutations of $n$-bit numbers with fixed $\Theta$ there are $L(n)$ maximal permutations and $S(n)$ non-maximal permutations.
$$L(n) + S(n) = m - 1 = 2^n - 2$$

While there are $2^n!$ permutations on the set of $n$-bit numbers, there are only $2^{n-1}!$ which give distinct substitutions because the starting point in the permutation does not make any difference. In a normalized orthomorphic array, we can cycle the order of the rows, other than the fixed row, and not change the substitution. These arrays generate permutations which are a subset of all possible permutations holding any one of the $2^n$ words fixed, then:

$$F(n) = 2^n(2^n - 2)! = \frac{2^n!}{m}.$$

For convenience, a number of other terms can be defined. They are as follows:

1. $N_p(n)$: The number of distinct values of $p_1$, the basic shift in column 1 of a maximal automorphic orthomorphism of $n$-bit numbers.

2. $M(n)$: The number of maximal permutations representing linear orthomorphic permutations for a given $p$ and a given fixed point. It is derived in proposition 12.

3. $T(n)$: The total number of such permutations for a given $p$ and a given fixed point. If $m = 2^n - 1$ is prime, then $T(n) = M(n)$. In general, $T(n) = \frac{m-1}{L(n)} M(n)$.

4. $H(n)$: The total number of such permutations on $n$-bit numbers:
$H(n) = 2^n N_p(n) T(n)$.

5. $G(n)$: The number of groups of such permutations on $n$-bit numbers:
$G(n) = \frac{H(n)}{m-1} = \frac{2^n N_p(n) M(n)}{L(n)}$.

Table 1 is a tabulation of these parameters for bit size $n \leq 8$. Ratio $\frac{H(n)}{F(n)}$ gives a measure of the relative rarity of linear orthomorphisms and related permutations.

Table 1. Comparison of Linear Orthomorphisms of Various Block Sizes

| $n$ | 3 | 4 | 5 | 6 | 7 | 8 |
|---|---|---|---|---|---|---|
| $2^n$ | 8 | 16 | 32 | 64 | 128 | 256 |
| $m$ | 7 | 15 | 31 | 63 | 127 | 255 |
| $N_p(n)$ | 2 | 2 | 6 | 6 | 18 | 16 |
| $M(n)$ | 24 | 1,344 | 322,560 | $3.20 \times 10^8$ | $1.29 \times 10^{12}$ | $2.097 \times 10^{16}$ |
| $L(n)$ | 6 | 8 | 30 | 36 | 126 | 128 |
| $S(n)$ | 0 | 6 | 0 | 26 | 0 | 126 |
| $T(n)$ | 24 | 2,352 | 322,560 | $5.51 \times 10^8$ | $1.29 \times 10^{12}$ | $4.16 \times 10^{16}$ |
| $H(n)$ | 384 | 75,264 | 61,931,520 | $2.12 \times 10^{11}$ | $2.97 \times 10^{15}$ | $1.70 \times 10^{20}$ |
| $G(n)$ | 64 | 5,376 | 2,064,384 | $3.41 \times 10^9$ | $2.36 \times 10^{13}$ | $6.71 \times 10^{17}$ |
| $F(n)$ | 5760 | $1.39 \times 10^{12}$ | $8.49 \times 10^{33}$ | $2.01 \times 10^{87}$ | $3.04 \times 10^{213}$ | $3.36 \times 10^{504}$ |
| $\frac{H(n)}{F(n)}$ | 0.0667 | $5.40 \times 10^{-8}$ | $7.30 \times 10^{-27}$ | $1.05 \times 10^{-76}$ | $9.79 \times 10^{-199}$ | $2.04 \times 10^{-484}$ |

5. PERFECTLY BALANCED BLOCK SUBSTITUTIONS

In designing a block substitution device, a basic goal is to have an unbiased transformation of the $n$-bit binary numbers onto themselves. Basically, one desires that the ciphertext contain no information on the nature of the cleartext. For example, no subset should be mapped onto itself, and numbers with some characteristic (such as: even, lower half, zero in a binary position) should be equally likely to be images of a number with the same property or the reverse property. To require that all outputs be equally likely for a random input is insufficient and requires only that the transformation be 1-to-1. The following definition is suggested.

Definition: A transformation or substitution of the $n$-bit binary numbers onto themselves is said to be perfectly balanced if every maximal subgroup of the $n$-bit numbers is mapped in two equal parts into itself and into its relative complement.

Before proceeding further, it is necessary to collect some facts on these maximal subgroups. Any set of binary numbers that has zeros in the same binary position is such a subgroup; however, there are others as well. Any subgroup of order $2^k$ is embedded in a subgroup of order $2^{k+1}$ and has a relative complement in the larger subgroup with $2^k$ elements.

Proposition 13: Let $G_n$ be the group of $n$-bit binary numbers with modulo 2 addition as the group operation. Let $H$ be a subgroup of order $2^{n-1}$ and $\bar{H}$, its complement in $G_n$. Then, for $x, y, \varepsilon\, \bar{H}, x \oplus y\, \varepsilon\, H$, and if $x\, \varepsilon\, H$, and $y\, \varepsilon\, \bar{H}, x \oplus y = z\, \varepsilon\, \bar{H}$.

Proof: $\bar{H}$ cannot be a subgroup because it does not contain the identity $\Theta = (0\cdots0)$. By definition, if $x, y\, \varepsilon\, H, x \oplus y\, \varepsilon\, H$.

Let $z = x \oplus y$ where $x\, \varepsilon\, H$ and $y\, \varepsilon\, \bar{H}$. If $z\, \varepsilon\, H$, then $y = z \oplus x\, \varepsilon\, H$ by the group property. This is a contradiction since $H \cap \bar{H} = \emptyset$. So, $z\, \varepsilon\, \bar{H}$. The number of elements in $H$ and $\bar{H}$ is $p = 2^{n-1}$. Each element or binary number in $H$ can be written as the sum of $p$ pairs or numbers belonging to $H$. This gives $p^2$ pairs from $H$ to $H$.

The numbers in $\bar{H}$ which are sums of mixed pairs can be expressed in two ways considering order: $p^2$ pairs in which the $p$ numbers from $H$ are matched with the $p$ numbers from $\bar{H}$. $p^2$ additional pairs are generated by matching the $p$ words from $\bar{H}$ with $p$ words from $H$. This gives a total of $2p^2$ ways of expressing the mixed sums in $\bar{H}$.

Overall, in $G$ there are $2p$ words which can be expressed as $(2p)^2 = 4p^2$ pairs. The remaining $p^2$ pairs are those where the sum of numbers from $\bar{H}$ is taken. So far, $2p^2$ pairs correspond to $\bar{H}$ and $p^2$ pairs to $H$. Since the two sets $H$ and $\bar{H}$ have the same number of elements, the remaining $p^2$ pairs belong to $H$ (i.e., $x, y\, \varepsilon\, \bar{H} \Rightarrow x \oplus y\, \varepsilon\, H$). □

Proposition 14: A transformation of the $n$-bit binary numbers onto themselves, which is linear under the operation of bit-wise modulo 2 addition, is an orthomorphism.

Proof: Without loss of generality, the $n$-bit numbers can be arranged in an order so that each is mapped onto its successor:

$$x_1 \to x_2$$
$$x_2 \to x_3$$
$$\vdots$$
$$x_k \to x_{k+1}$$
$$\vdots$$
$$x_m \to x_1$$

If $T$ is linear, $\Theta = (0\cdots0)$ is a fixed point. Initially, it is assumed that there are no cycles. $Tx_k = x_{k+1}$. Because $T$ is a linear transformation, $$T(x_k \oplus x_j) = Tx_k \oplus Tx_j. \text{ If } x_i = x_k \oplus x_j,$$

then:

$$x_{i+1} = Tx_i = T(x_k \oplus x_j) = Tx_k \oplus Tx_j = x_{k+1} \oplus x_{j+1}.$$

Let $z_k = x_k \oplus x_{k+1}$ for each of the $m = 2^{n-1}$ binary numbers other than $\Theta = (0\cdots0)$. There are $m = 2^{n-1}$ such equations. Either $z_k$ takes on all values of the $n$-bit numbers except $\Theta$, or there are duplicates. Suppose $z_k = z_j$ for some $k \neq j$, then:

$$x_k \oplus x_{k+1} = x_j \oplus x_{j+1} \text{ and } x_i = x_k \oplus x_j = x_{k+1} \oplus x_{j+1} = x_{i+1}, \text{ a contradiction.}$$

If there are cycles or invariant sets, each cycle can be written as above as a self-contained set and the same reasoning applied to each cycle. □

Next, we consider affine transformations. An affine transformation has the property that $T'(x \oplus y) = T'x \oplus T'y \oplus C$ where $C$ is some constant. If $T'$ is an arbitrary affine transformation, it can be written in terms of a linear transformation $T$ as $T'x = Tx \oplus C$. By proposition 14, $T$ is an orthomorphism. Defining $A = T^{-1}C$, a corresponding orthomorphism can be generated to represent $T'$ by adding the row $A \oplus A = \Theta$ to each row in the array for $T$.

Proposition 15: If $H$ is a subgroup of $G_n$, the group of $n$-bit binary numbers, and $T$ is a linear transformation, or $T'x = Tx \oplus TA$ with $A \varepsilon H$ is an affine transformation on $G_n$, then $TH$ and $T'H$ are subgroups of $G_n$.

Proof: Let $G = TH$. By proposition 15, $T$ is an orthomorphism. $\Theta \varepsilon H$, $T\Theta = \Theta$, so $\Theta \varepsilon G$. Let $x, y \varepsilon H$. Since $H$ is an additive group, $x \oplus y = z \varepsilon H$. $Tx, Ty$ and $Tz \varepsilon G$. By linearity, $Tz = T(x \oplus y) = Tx \oplus Ty \varepsilon G$, so $G$ is closed under modulo 2 addition. For any $x \varepsilon G$, $x \oplus x = \Theta \varepsilon G$, so $x$ is its own inverse, and $G$ is a group. In the affine case, $TA \varepsilon G$ and $T'A = TA \oplus TA = \Theta$, so $\Theta \varepsilon G$. $T'x \oplus T'y = T'(x \oplus y \oplus A) \varepsilon G$ because $x \oplus y \oplus A \varepsilon H$. □

Proposition 16: A maximal length linear or affine transformation on $G_n$ is balanced.

Proof: First of all, being of maximal length, the transformation has no cycles other than its fixed point and, thus, has no proper invariant subset.

Let $T$ be linear, and consider a maximal subgroup $H$ of $G_n$. Define two sets:
$$M = \{x \in H \mid Tx \in H\}$$
$$N = \{x \in H \mid Tx \in \bar{H}\}$$
$\Theta \in M, M \cap N = \emptyset$ and $H = M \cup N$.

If $x, y \in M$, $T(x \oplus y) = Tx \oplus Ty \in H$ because $T$ is linear and $H$ is a group. Thus, $x \oplus y \in M$ also. Since each $x$ is a self-inverse, $M$ is a subgroup and $N$ is its complement relative to $H$.

If $x \in M$ and $y \in N$, then $z = x \oplus y \in H$ and, hence, is either in $M$ or $N$. If $z \in M$, then $y = z \oplus x \in M$ by its group property. Thus, $z \in N$.

If $x, y \in N$, $Tx, Ty \in \bar{H}$, complement of a maximal subgroup $H$. By proposition 13, $Tx \oplus Ty \in H$. By linearity, $T(x \oplus y) \in H$ since $x, y \in H$, $x \oplus y \in H$ and since $T(x \oplus y) \in H$, so $x, y \in N \Rightarrow x \oplus y \in M$.

Since $T$ has no proper invariant subset, $TH \neq H$ and $N \neq \emptyset$, the empty set. Select $x \in N$ and consider the group $Q$ generated by $x$ and $M$. $Q \subset H$. $Q$ contains the complex $x \oplus M$ which includes all pairs in the form $x \oplus y$ where $y \in M$. Obviously, $M \subset Q$. Choose any $z \in N$, where $z \neq x$. This is possible since $|M|$ divides $|H| = 2^{n-1}$. So $|N| \geq 2$. $z = x \oplus w$ for some $w$. Since $z, x \in H$, a group, $w \in H$ also. Since $x, z \in N$, $w \in M$. Thus, any element of $N$ or $M$ is an element of $Q$; therefore, $Q = H$ and $M$ is a maximal subgroup of $H$. $H$ is of order $2^{n-1}$ and, thus, the order of the maximal subgroup $M$ is $|M| = 2^{n-2} = \frac{1}{2}|H|$. $|N| = |H| - |M| = \frac{1}{2}|H|$.

Note: $TM$ is a group and $|TM| = |M|$.

Let $T'$ be an affine transformation defined by $T'x = Tx \oplus TA$, and $C = TA$. Again, define two sets:
$$M' = \{x \in H \mid T'x \in H\}$$
$$N' = \{x \in H \mid T'x \in \bar{H}\}$$
Assume $C \in H$. If $x \in M'$, $T'x = Tx \oplus C \in H$. Thus, $Tx \in H$ and $M' \subseteq M$. If $x \in M$, $Tx \in H$. $T'x = Tx \oplus C \in H$, so $x \in M'$, and $M' = M$. Since $M' \cup N' = H$ and $M' \cap N' = \emptyset$, $N' = N$. From here, the proof proceeds as in the first part.

Now, assume $C \, \varepsilon \, \bar{H}$. If $x \, \varepsilon \, M'$, $T'x = Tx \oplus C \, \varepsilon \, H$. Thus, $Tx \, \varepsilon \, \bar{H}$ and $M' \subseteq N$. If $x \, \varepsilon \, N$, $Tx \, \varepsilon \, \bar{H}$. $T'x = Tx \oplus C \, \varepsilon \, H$, $M' = N$ and, consequently, $N' = M$. In this case, $M'$ is not a subgroup but, by the first part of the proof, $|M'| = |N| = \frac{1}{2}|H|$. Because $H$ is maximal, the relative complement $\bar{H}$ is the total complement so that $C \, \varepsilon \, H$ or $C \, \varepsilon \, \bar{H}$. □

We have seen that any linear or affine mapping on $G_n$ is balanced. Next, we consider the necessary properties for a transformation or substitution to be balanced.

Proposition 17: $G_n$ has $m = 2^n - 1$ maximal subgroups.

Proof: By the fundamental theorem of homomorphisms [3], the mapping $G_n \rightarrow G_n/N$ where $N$ is an invariant subgroup of $G_n$ is the natural homomorphism of $G_n$ onto the quotient group $G_n/N$. Each $N_i = \{\Theta, x_i\}$ is an invariant subgroup of two elements. There are $m = 2^n - 1$ such subgroups $N_i$. Each $G_n/N_i$ is isomorphic to a subgroup $G_n$ of order $2^{n-1}$, i.e., a maximal subgroup. Thus, there are $m = 2^n - 1$ maximal subgroups $H_1, H_2, \cdots, H_m$.

Corollary: Each number other than the identity will occur in $\frac{m-1}{2}$ maximal subgroups and in $\frac{m+1}{2}$ complements.

Proof: Since there are $m$ maximal subgroups, each number will appear m times, either in a maximal subgroup or its complement. The identity $\Theta$ will appear $m$ times in the maximal subgroups but never in a complement. There are $\frac{m-1}{2}$ remaining places for the non-identity numbers to appear in maximal subgroups and $\frac{m+1}{2}$ places in the complements. Thus, by symmetry, each non-identity number will appear in $\frac{m-1}{2}$ maximal subgroups and in $\frac{m+1}{2}$ complements. □

$G_n$ is generated by any $n$ independent $n$-bit numbers. Let $\{x_1, x_2, \cdots, x_n\}$ be such a set. Any subset of $n - 1$ of the generators will generate a maximal subset. $\binom{n}{n-1} = n$ maximal subgroups will be generated this way. Let this collection of maximal subgroups be designated $H_1, H_2, \cdots, H_n$ where $H_i$ is generated by $\{x_1, \cdots, x_{i-1}, x_{i+1} \cdots, x_n\}$, i.e., by all except $x_i$. Then, $x_i \, \varepsilon \, \bar{H}_i$ for each $i \leq n$, and $x_i \, \varepsilon \, H_j$ for $i \neq j$. Next, one can define an operation " + " between maximal subgroups as:

$$H_k = H_i + H_j = (H_i \cap H_j) \cup (\bar{H}_i \cap \bar{H}_j).$$

$|H_k| = 2^{n-1}$ since it is a union of disjoint sets and $|H_i \cap H_j| = |\bar{H}_i \cap \bar{H}_j| = 2^{n-2}$. Let $x_c = x_a \oplus x_b$ where $x_a, x_b \in H_k$. There are three possibilities:

1. $x_a, x_b \in H_i \cap H_j$, then, $x_c \in H_i \cap H_j$ since $H_i \cap H_j$ is a group.

2. $x_a, x_b \in \bar{H}_i \cap \bar{H}_j$, then $x_c \in H_i \cap H_j$ by proposition 13.

3. $x_a \in H_i \cap H_j$ and $x_b \in \bar{H}_i \cap \bar{H}_j$, then $x_c \in \bar{H}_i \cap \bar{H}_j$ by proposition 13.

In each case, $x_c \in H_k$, obviously $\Theta \in H_k$, so $H_k$ is also a maximal subgroup.

To each maximal subgroup generated in this fashion, we can associate $x_k = x_i \oplus x_j$, that is, $x_k$ is the sum of generators in the set $\{x_1, x_2, \cdots, x_n\}$ which belong to $\bar{H}_k$. Clearly, the maximal subgroups generated this way total $m$ and are in 1-to-1 correspondence to the $n$-bit numbers.

There is an interesting relationship between the maximal subgroups and the numbers. $G_n$ is trivially a maximal subgroup of itself. $G_n + H_i = H_i + G_n = H_i$ and $H_i + H_i = G_n$. The collection of maximal subgroups $\hat{G} = \{G_n, H_1 \cdots, H_n, H_1 + H_2, \cdots\}$ form a group under the operation " + " with $G_n$ acting as the identity. $\hat{G}$ is isomorphic to $G_n$ under the mapping $x_k \to H_k$ defined above.

Proposition 18: If $H_i, H_j, H_k$ are any three dependent maximal subgroups, then $G_n = H_i + H_j + H_k$.

Proof: If three subsets are dependent, then $H_i = H_j + H_k$, and $H_i + H_j + H_k = H_i + H_i = G_n$. □

Corollary: The set of any three dependent numbers $\{x_i, x_j, x_k\}$, none of which is $\Theta$, contains at least one number from each of the $m$ maximal subgroups.

Proof: From a set of generators of $G_n$, $\{x_1, x_2, \cdots, x_n\}$, a set of maximal subgroups was generated. The generators can be written in terms of these subgroups:

$$\{x_1\} = \bar{H}_1 \cap H_2 \cap \cdots \cap H_n$$

$$\{x_2\} = H_1 \cap \bar{H}_2 \cap \cdots \cap H_n$$

$$\vdots$$

$$\{x_n\} = H_1 \cap H_2 \cap \cdots \cap \bar{H}_n$$

$|H_k| = |\bar{H}_k| = 2^{n-1}, |H_j \cap H_k| = |\bar{H}_j \cap \bar{H}_k| = |H_j \cap \bar{H}_k| = |\bar{H}_j \cap H_k| = 2^{n-2}$. By induction, these $n$-fold intersections have $2^0 = 1$ elements and are singleton sets. As an example, take $x_1, x_2$, and $x_k = x_1 \oplus x_2$. $H_k = H_1 + H_2$ is a dependent set, $x_k$ is the number associated with $H_k$, and $G_n = H_1 + H_2 + H_k$. By proposition 13:

$$\{x_k\} = \bar{H}_1 \cap \bar{H}_2 \cap H_3 \cap \cdots \cap H_n.$$

Of course, $k \notin \{1, 2, \cdots, n\}$. Any maximal subgroup is of the form $\sum H_i$ where $i$ ranges over some subset $Q \subset \{1, 2, \cdots, n\}$. If $1, 2, \notin Q$, then $\{x_1, x_2, x_k\} \in \sum H_i$; otherwise, there are three possible cases:

1. $1 \notin Q, 2 \in Q$    $x_1 \in \sum H_i$

2. $1 \in Q, 2 \notin Q$    $x_2 \in \sum H_i$

3. $1, 2 \notin Q$    $x_k \in \sum H_i$    □

This is different from the situation with vector spaces where an independent set of vectors spans the space.

Proposition 19: A one-to-one transformation of $G_n$ onto itself is balanced if and only if it is an orthomorphism.

Proof: As shown in the introduction, any transformation $TG_n \rightarrow G_n$, where $Tx_i = Z_i$, can be written in the form $y_i \oplus x_i = z_i$. This can be represented by the addition modulo 2 of two column matrices to obtain a third:

$$\begin{pmatrix} y_1 \\ y_2 \\ \cdot \\ \cdot \\ \cdot \end{pmatrix} \oplus \begin{pmatrix} x_1 \\ x_2 \\ \cdot \\ \cdot \\ \cdot \end{pmatrix} = \begin{pmatrix} z_1 \\ z_2 \\ \cdot \\ \cdot \\ \cdot \end{pmatrix}$$

The $y_i$ matrix represents the transformation $T$. Each matrix will have $2^n$ entries. For the $x_i$ and $z_i$ matrices, each of the $2^n$ $n$-bit binary numbers will appear exactly once since $T$ is 1-to-1 onto it. Assume that $T$ is balanced and that the $y_i$ matrix may have some of the $n$-bit numbers repeated so that the $2^n$ numbers are not all distinct.

There are $m = 2^n - 1$ maximal subgroups $H_1, H_2, \cdots, H_m$. Since $T$ is balanced, it will map each $H_i$ such that:

$$|TH_i \cap H_i| = |TH_i \cap \bar{H}_i| = \frac{1}{2} |H_i|.$$

From proposition 13, we can arrange the matrices in blocks that correspond to the maximal subgroup $H_i$ and its complement:

$$
\begin{array}{ccc}
y & x & z \\
\begin{pmatrix} H_i \\ \hline \bar{H}_i \\ \hline \bar{H}_i \\ \hline \bar{H}_i \end{pmatrix} & \oplus \begin{pmatrix} H_i \\ \hline H_i \\ \hline \bar{H}_i \\ \hline \bar{H}_i \end{pmatrix} & = \begin{pmatrix} H_i \\ \hline \bar{H}_i \\ \hline \bar{H}_i \\ \hline \bar{H}_i \end{pmatrix}
\end{array}
$$

Since $T$ is balanced, each of the four blocks must consist of $2^{n-2}$ numbers. The $n$-bit numbers may be designated $y_0 = \Theta, y_1, y_2, \cdots, y_n$ in the $y$ matrix, and each will appear with some multiplicity $p_j \geq 0$. Let $a_{ij} = 1$ if $y_j \in H_i$ and $a_{ij} = 0$ if $y_j \in \bar{H}_i$. Clearly, $a_{i0} = 1$ for all $i$ since the identity $\Theta$ belongs to each subgroup. For each $H_i$ and $\bar{H}_i$, the following equations hold:

$$H_i : p_0 + \sum_{j=1}^{m} a_{ij} p_j = \frac{m+1}{2}$$

$$\bar{H}_i : \sum_{j=1}^{m} (1 - a_{ij}) p_j = \frac{m+1}{2}$$

These two sets of equations are consistent since:

$$p_0 + \sum_{j=1}^{m} p_j = \sum_{j=0}^{m} p_j = m + 1.$$

The $m$ equations corresponding to the $m$ maximal subgroups can be written in matrix form:

$$\begin{pmatrix} a_{11} & a_{12} & \cdots & a_{1m} \\ a_{21} & a_{22} & \cdots & a_{2m} \\ & & \vdots & \\ a_{m1} & a_{m2} & \cdots & a_{mm} \end{pmatrix} \begin{pmatrix} p_1 \\ p_2 \\ \vdots \\ p_m \end{pmatrix} = \begin{pmatrix} \frac{m+1}{2} - p_0 \\ \frac{m+1}{2} - p_0 \\ \vdots \\ \frac{m+1}{2} - p_0 \end{pmatrix}$$

Using the determinant of the $m \times m$ matrix on the left, we can use Cramer's rule to solve for the $p_i$. For example:

$$p_1 = \frac{\begin{vmatrix} \frac{m+1}{2} - p_0 & a_{12} & a_{13} & \cdots & a_{1m} \\ \frac{m+1}{2} - p_0 & a_{22} & a_{23} & \cdots & a_{2m} \\ & & \vdots & & \\ \frac{m+1}{2} - p_0 & a_{m2} & a_{m3} & \cdots & a_{mm} \end{vmatrix}}{\begin{vmatrix} a_{11} & a_{12} & a_{13} & \cdots & a_{1m} \\ a_{21} & a_{22} & a_{23} & \cdots & a_{2m} \\ & & \vdots & & \\ a_{m1} & a_{m2} & a_{m3} & \cdots & a_{mm} \end{vmatrix}}$$

From the corollary to proposition 17, each row of the determinant in the denominator will have $\frac{m-1}{2}$ entries which are $a$ and $\frac{m+1}{2}$ which are 0. Adding columns 2 thru $m$ to column 1 will not change the value of the determinant, so that:

$$p_1 = \frac{\begin{vmatrix} \frac{m+1}{2} - p_0 & a_{12} & a_{13} & \cdots & a_{1m} \\ \frac{m+1}{2} - p_0 & a_{22} & a_{23} & \cdots & a_{2m} \\ & \cdots & & & \\ & \cdots & & & \\ & \cdots & & & \\ & \cdots & & & \\ \frac{m+1}{2} - p_0 & a_{m2} & a_{m3} & \cdots & a_{mm} \end{vmatrix}}{\begin{vmatrix} \frac{m-1}{2} & a_{12} & a_{13} & \cdots & a_{1m} \\ \frac{m-1}{2} & a_{22} & a_{23} & \cdots & a_{2m} \\ & \cdots & & & \\ & \cdots & & & \\ & \cdots & & & \\ & \cdots & & & \\ \frac{m-1}{2} & a_{m2} & a_{m3} & \cdots & a_{mm} \end{vmatrix}}$$

Factoring out the constant first column in each determinant and noting that the same result holds for the $i$th column, yields:

$$p_i = \frac{\frac{m+1}{2} - p_0}{\frac{m-1}{2}} \text{ for } 1 \le i \le m.$$

$p_0 \le 1$ since $p_0 > 1$ implies more than one fixed word, contrary to the definition of an unbiased substitution. If $p_0 = 0$, then $p_i = \frac{m+1}{m-1}$ which is not an integer. The only

-28- remaining possibility is $p_0 = 1$, in which case:

$$p_i = \frac{\frac{m+1}{2} - 1}{\frac{m-1}{2}} = 1 \text{ for all } i.$$

Thus, if the transformation is balanced, all the $p_i = 1$ which, by definition, is an orthomorphism.

Note: One does not need to appeal to the definition of a balanced substitution to restrict the value of $p_0$. If $p_0 \geq 2$, than $0 < p_i < 1$ which is also impossible.

Assume now that the transformation is an orthomorphism. Consider any arbitrary maximal subgroup $H$. Each column matrix will have $2^{n-1}$ entries in $H$ and $2^{n-1}$ entries in $\bar{H}$. The matrices can be written in blocks, as follows, using prop. 13:

$$\begin{matrix} y & & x & & z \end{matrix}$$

$$\begin{pmatrix} 2^{n-1} \varepsilon H \\ \hline 2^{n-1} \varepsilon \bar{H} \end{pmatrix} \oplus \begin{pmatrix} b \varepsilon H \\ \hline 2^{n-1} - b \varepsilon \bar{H} \\ \hline 2^{n-1} - b \varepsilon H \\ \hline b \varepsilon \bar{H} \end{pmatrix} = \begin{pmatrix} b \varepsilon H \\ \hline 2^{n-1} - b \varepsilon \bar{H} \\ \hline 2^{n-1} - b \varepsilon \bar{H} \\ \hline b \varepsilon H \end{pmatrix}$$

where $b$ entries from $H$ and $2^{n-1} - b$ entries from $\bar{H}$ in the $x$ matrix are added to the $2^{n-1}$ entries from $H$ in the $y$ matrix. This yields a total of $2b$ entries from $H$ and $2^n - 2b$ entries from $\bar{H}$ in the $z$ matrix. Since the transformation is an orthomorphism, the $z$ column matrix has $|H| = 2^{n-1}$ entries from $\bar{H}$. Thus, $2b = 2^{n-1}$ and $2^n - 2b = 2^{n-1}$. So, $|TH \cap H| = |T\bar{H} \cap \bar{H}| = 2^{n-2}$ and $T$ is balanced. □

A useful aspect of this result is the generality. It applies to all orthomorphisms whether linear, affine, or nonlinear. Conversely, if a balanced block substitution is desired, then an orthomorphism is essential.

6. REFERENCES

1. W. Lederman, "Introduction to the Theory of Finite Groups," Oliver and Boyd, 1964.

2. Proceedings of Symposia in Applied Mathematics, Vol. 29, "Applied Cryptology, Cryptographic Protocols, and Computer Security Models," American Mathematical Society, 1983.

3. R.B.J.T. Allenby, "Rings, Fields and Groups," Edward Arnold, Ltd., 1983.

4. A.E. Taylor & D. C. Lay, "Introduction to Functional Analysis," John Wiley & Sons, 1989.

What is claimed is:

1. A method of encryption to be performed by a computer, by substituting for any one of the $2^n$ unique clear text blocks of n bit binary numbers an associated unique encrypted block of n bit binary numbers comprising the steps of:

(a) finding a first set $G^n$ of $2^n$ equations, representing a linear orthomorphism, each equation representing the modulo 2 additions of one of the $2^n$ clear text blocks in a left column of the first set $G^n$ of $2^n$ equations, with a unique one of $2^n$ n-bit blocks in a middle column of the first set $G^n$ of $2^n$ equations, to provide an associated unique n-bit block in a right column of the first set $G^n$ of $2^n$ equations, all of the equations in the first set of $2^n$ equations being characterized by the vector sum modulo 2 of any number of the equations also being one of the equations in the first set of equations, the equations including the identity equations $\Theta \oplus \Theta = \Theta$ and the remaining $2^n-1$ equations being orderable as follows:

| Equation # | | | | |
|---|---|---|---|---|
| 1 | $x_m$ | $\oplus$ | $x_1 =$ | $x_{1-p}$ |
| 2 | $x_1$ | $\oplus$ | $x_2 =$ | $x_{2-p}$ |
| . | . | . | . | . |
| . | . | . | . | . |
| . | . | . | . | . |
| j | $x_{j-1}$ | $\oplus$ | $x_j =$ | $x_{j-p}$ |
| . | . | . | . | . |
| . | . | . | . | . |
| . | . | . | . | . |
| m | $x_{m-1}$ | $\oplus$ | $x_m =$ | $x_{m-p}$ | where $m=2^n$, $L_n$, $M_n$ and $R_n$ are the left, middle and right columns respectively, and $G^n = L_n \times M_n \times R_n$ represents the set of equations;

(b) modifying a plurality of the non-zero $2^n-1$ equations in the first set of $2^n$ equations to provide a second set of $2^n$ equations, representing nonlinear orthomorphisms, the plurality of equations being modified so that the resulting set of equations collectively map the clear text blocks in the left column to encrypted n-bit blocks in the right column, but in a nonlinear manner so that each of the equations in the resulting set is not generally the sum modulo 2 of any number of the equations in the resulting set, wherein said modification of said plurality of the non-zero $2^n-1$, equations is achieved by (1) decomposing $G^n$ into a table of corruptible cosets of order 4, said table being generally represented by $$G^2_{a,0} \quad G^2_{a+1,0} \quad \cdots \quad G^2_{i,0} \quad \cdots$$
$$G^2_{a,3} \quad G^2_{a+1,3} \quad \cdots \quad G^2_{i,3} \quad \cdots$$
$$\cdot \quad \cdot \quad \quad \cdot$$
$$\cdot \quad \cdot \quad \quad \cdot$$
$$\cdot \quad \cdot \quad \quad \cdot$$
$$G^2_{a,j} \quad G^2_{a+1,j} \quad \cdots \quad G^2_{i,j} \quad \cdots$$
$$\cdot \quad \cdot \quad \quad \cdot$$
$$\cdot \quad \cdot \quad \quad \cdot$$
$$\cdot \quad \cdot \quad \quad \cdot$$

where each column represents a coset decomposition of the linear orthomorphism based on a different corruptible subgroup of $G^n$, and a, i and j are arbitrary integer indices;

(2) selecting a set of non-overlapping cosets from said table of cosets, with selected cosets in different columns each having a unique mixing transform associated therewith; and (3) applying said unique mixing transforms to said group of non-overlapping cosets to yield the second set of $2^n$ equations; and (c) for each clear text block in the left column to be encrypted, adding modulo 2 to that block, the unique one of the $2^n$ n bit blocks associated therewith in the middle column, in accordance with the associated equation of the second set of $2^n$ equations, to obtain the encrypted block in the right column.

2. The block substitution method of claim 1, wherein said step of selecting a set of nonoverlapping cosets is performed by choosing a first coset within some row, then determining whether the adjacent coset to the right within the same row overlaps the first coset, then selecting successive cosets to the right in the same row if the successive cosets do not overlap with any of the cosets previously selected, then continuing on to the first coset on the left in the next row, proceeding in the same manner until no more non overlapping cosets are found.

3. An encryption method to be performed by a computer using block substitution, comprising the steps of:

generating a set of linear orthomorphic block substitution equations having rows of equations with each row defining a block substitution operation wherein a first binary value is added modulo 2 to a second binary value to yield a third binary value, wherein said rows of equations have a certain order and wherein each binary value is represented only once within each column; and constructively corrupting the linear orthomorphic block substitution equations to yield a set of non-linear orthomorphic block substitution equations by independently rearranging the row order of the first and second binary values while holding the row order of the third binary values fixed and while preserving equality in each row by (1) decomposing said group of equations representing a linear orthomorphism, into coset decompositions of corruptible subgroups of order 4 to yield a collection of ordered coset decompositions;

(2) selecting non-overlapping cosets from said coset decompositions;

(3) determining the mixing transforms for said non-overlapping cosets; and (4) successively applying said mixing transforms associated with the non-overlapping cosets to said linear orthomorphic block substitution equations to yield said set of non-linear orthomorphic block substitution equations;

wherein for each first binary value to be encrypted, adding modulo 2 to a corresponding second binary value to yield a third encrypted binary value.

4. A method of encryption to be performed by a computer, by substituting for any one of the $2^n$ unique clear text blocks of n bit binary numbers, an associated unique encrypted block of n bit binary numbers comprising the steps of:

(a) finding a first set $G^n$ of $2^n$ equations, representing a linear orthomorphism, each equation representing the modulo 2 additions of one of the $2^n$ clear text n-bit blocks in a left column of the first set $G^n$ of $2^n$ equations, with a unique one of $2^n$ n-bit blocks in a middle column of the first set $G^n$ of $2^n$ equations, to provide an associated unique n-bit block in a right

441 column of the first set $G^n$ of $2^n$ equations, all of the equations in the first set of $2^n$ equations being characterized by the vector sum modulo 2 of any number of the equations also being one of the equations in the first set, the equations including the identity equations $\Theta \oplus \Theta = \Theta$ and other equations of the form $X_{k-1} \oplus X_k = X_{k-p}$ and the remaining $2^n-1$ equations being orderable as follows:

| Row Number | L | | M | | R |
|---|---|---|---|---|---|
| 0 | $\Theta$ | $\oplus$ | $\Theta$ | = | $\Theta$ |
| 1 | $L_1$ | $\oplus$ | $M_1$ | = | $R_1$ |
| 2 | $L_2$ | $\oplus$ | $M_2$ | = | $R_2$ |
| . | . | | . | | . |
| . | . | | . | | . |
| k | $L_k$ | $\oplus$ | $M_k$ | = | $R_k$ |
| . | . | | . | | . |
| . | . | | . | | . |
| m | $L_m$ | $\oplus$ | $M_m$ | = | $R_m$ | where $L_k = X_{k-1}$, $M_k = X_k$ and $R_k = X_{k-p}$;

(b) modifying a plurality of the non-zero $2^n-1$ equations in the first set of $2^n$ equations to provide a second set of $2^n$ equations, representing nonlinear orthomorphism, the plurality of equations being modified so that the modified plurality of equations collectively map the same text blocks in the left column to unique n-bit blocks in the right column, but in a nonlinear manner so that each of the equations in the modified set is not generally the sum modulo 2 of any number of the equations in the same set wherein said modification of said plurality of the non-zero $2^n-1$ equations is achieved by finding a consistent set of equations $$L_i \oplus M_j = R_k,$$

442 where $x_{k-1} = L_k$ is the left column; $x_k = M_k$ is the middle column; and, $x_{k-p} = R_k$ is the right column and k is a function of i and j, by (1) developing a table of indices of k, wherein each row and each column of the table contain each index in the set $\{0, 1, 2, \ldots, m\}$, where if row i and column j are selected, the index k in the table corresponds to $L_i \oplus M_j = R_k$;

(2) selecting one entry from each row and column of said table without duplicates, and (3) applying said selected non-duplicate entries to said first set of equations to yield said second set of equations;

(c) for each clear text block in the left column to be encrypted, adding modulo 2 to that block, the unique one of the $2^n$ n bit blocks associated therewith in the middle column, in accordance with the associated equation of the second set of $2^n$ equations, to obtain the encrypted block in the right column.

5. The method of claim 4, wherein said step of selecting one entry from each row and each column of said table without duplicates is performed by choosing an index and selecting entries along a diagonal within said table containing said index extending from high to low j and low to high i until duplication occurs, then selecting a new nonduplicate entry and proceeding along the diagonal containing the new entry.

6. The method of claim 5, wherein said set of non-duplicate entries is selected by choosing an index of said table, selecting entries along said diagonal, and skipping any duplicate entries of said table.

7. The method of claim 5, wherein said set of non-duplicate entries is selected by choosing an index of said table, selecting entries along said diagonal, and skipping to a parallel diagonal upon reaching a duplicate entry within said table.

8. The method of claim 4, wherein said table of indices is generally represented by

| | | \multicolumn{7}{c}{$M_j$ Middle Column} | | |
|---|---|---|---|---|---|---|---|---|
| | | 0 | 1 | 2 | 3 | | l | m |
| | 0 | 0 | p+1 | p+2 | p+3 | | p+l | p+m |
| | 1 | p | 1 | k(1,2) | k(1,3) | | k(1,l) | k(1,m) |
| | 2 | p+1 | 0 | 2 | k(2,3) | | k(2,l) | k(2,m) |
| $L_i$ Left Column | 3 | p+2 | k(3,1) | 0 | 3 | | k(3,l) | k(3,m) |
| | l | p+l−1 | k(l,1) | k(l,2) | k(l,3) | | l | k(l,m) |
| | m | p+m−1 | k(m,1) | k(m,2) | k(m,3) | | k(m,l) | m | where $L_i \oplus M_{i-1} = R_0 = \Theta$ for all i so that $k(i,i-1)=0$, $L_i \oplus M_i = R_i$ so that $k(i,i)=i$, $L_0 \oplus M_i = R_{i+p}$ and $L_i \oplus M_0 = R_{i+p-1}$. p is the shift between the middle and right columns, $X_{k-1} \oplus X_k = X_{k-p}$, determined by a generating function for the linear orthomorphism and $k(0,i)=i+p$ and $k(i,0)=i+p-1$.

* * * * *